US011032514B2

(12) United States Patent
Lee et al.

(10) Patent No.: US 11,032,514 B2
(45) Date of Patent: Jun. 8, 2021

(54) METHOD AND APPARATUS FOR PROVIDING IMAGE SERVICE

(71) Applicant: Samsung Electronics Co., Ltd., Gyeonggi-do (KR)

(72) Inventors: Wonsik Lee, Gyeonggi-do (KR); Jongkyun Shin, Gyeonggi-do (KR); Hyunyeul Lee, Seoul (KR); Pragam Rathore, Seoul (KR); Yang-Hee Kwon, Seoul (KR); Young-Rim Kim, Seoul (KR); June-Seok Kim, Seoul (KR); Jinho Song, Seoul (KR); Ji-In Won, Gyeonggi-do (KR); Dong Oh Lee, Gyeonggi-do (KR); Sunjung Lee, Seoul (KR); Jingoo Lee, Seoul (KR); Taik Heon Rhee, Seoul (KR); Wan-Soo Lim, Gyeonggi-do (KR); Sung-Bin Jeon, Seoul (KR); Seungyeon Chung, Seoul (KR); Kyuhyung Choi, Seoul (KR); Taegun Park, Gyeonggi-do (KR); Dong-Hyun Yeom, Gyeonggi-do (KR); Suha Yoon, Seoul (KR); Euichang Jung, Seoul (KR); Cheolho Cheong, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/883,705

(22) Filed: May 26, 2020

(65) Prior Publication Data
US 2020/0358981 A1 Nov. 12, 2020

Related U.S. Application Data

(63) Continuation of application No. 16/075,026, filed as application No. PCT/KR2017/001066 on Feb. 1, 2017, now Pat. No. 10,715,762.

(30) Foreign Application Priority Data

Feb. 2, 2016 (KR) .................... 10-2016-0012793

(51) Int. Cl.
*H04N 7/14* (2006.01)
*H04W 4/18* (2009.01)
(Continued)

(52) U.S. Cl.
CPC ......... *H04N 7/147* (2013.01); *G06F 3/04817* (2013.01); *G06F 3/04842* (2013.01);
(Continued)

(58) Field of Classification Search
CPC ...................................................... H04N 7/14
See application file for complete search history.

(56) References Cited

U.S. PATENT DOCUMENTS 7,321,384 B1 1/2008 Wu
8,165,622 B2 4/2012 Lee et al.
(Continued)

FOREIGN PATENT DOCUMENTS

CN 101426246 5/2009
CN 101500126 8/2009
(Continued)

OTHER PUBLICATIONS

European Search Report dated Jun. 5, 2020 issued in counterpart application No. 17747710.6-1230, 6 pages.
(Continued)

*Primary Examiner* — Olisa Anwah
(74) *Attorney, Agent, or Firm* — The Farrell Law Firm, P.C.

(57) ABSTRACT

An electronic device includes a camera; a display; at least one sensor; a communication unit configured to establish wireless communication with another electronic device
(Continued)

using at least one protocol; and a processor configured to be functionally connected to the camera, the display, the at least one sensor, and the communication unit, wherein the processor is configured to perform a call with the other electronic device, detect a state change of the electronic device based on sensing information sensed by the at least one sensor while the call is maintaining, determine whether the state change of the electronic device corresponds to a user gesture for switching a call mode, and in response to determining that the state change or the electronic device corresponds to the user gesture for switching the call mode, switch the call mode.

18 Claims, 86 Drawing Sheets

(51) Int. Cl.
    *H04W 76/10*     (2018.01)
    *H04W 76/15*     (2018.01)
    *G06F 3/0481*     (2013.01)
    *G06F 3/0484*     (2013.01)

(52) U.S. Cl.
    CPC ............. *H04W 4/18* (2013.01); *H04W 76/10* (2018.02); *H04W 76/15* (2018.02); *H04N 2007/145* (2013.01)

(56) References Cited

U.S. PATENT DOCUMENTS

| | | |
|---|---|---|
| 8,189,429 B2 | 5/2012 | Chen et al. |
| 8,254,828 B2 | 8/2012 | Terlizzi |
| 8,346,236 B2 | 1/2013 | Lai |
| 8,373,799 B2 | 2/2013 | Reponen |
| 8,452,020 B2 | 5/2013 | Gregg et al. |
| 8,744,420 B2 | 6/2014 | Cranfill et al. |
| 8,874,090 B2 | 10/2014 | Abuan et al. |
| 8,947,491 B2 | 2/2015 | Rosenberg |
| 8,970,653 B2 | 3/2015 | Bowen |
| 9,002,332 B2 | 4/2015 | Dwarkaprasad et al. |
| 9,372,550 B2 * | 6/2016 | Lin ........................ H04N 7/144 |
| 10,148,868 B2 | 12/2018 | Oyman |
| 2010/0149302 A1 | 6/2010 | Malik |
| 2011/0145868 A1 | 6/2011 | Hultkrantz |
| 2012/0170572 A1 | 7/2012 | Bareli et al. |
| 2013/0141515 A1 | 6/2013 | Setton |
| 2013/0176250 A1 | 7/2013 | Lee et al. |
| 2014/0122726 A1 | 5/2014 | Jafry et al. |
| 2014/0165000 A1 | 6/2014 | Fleizach |
| 2014/0240440 A1 | 8/2014 | Seo et al. |
| 2015/0049158 A1 | 2/2015 | Olatunji et al. |
| 2015/0222849 A1 | 8/2015 | Kang et al. |

FOREIGN PATENT DOCUMENTS

| | | |
|---|---|---|
| CN | 102075727 | 5/2011 |
| CN | 201887888 | 6/2011 |
| CN | 102685241 | 9/2012 |
| CN | 203410366 | 1/2014 |
| CN | 104065683 | 9/2014 |
| KR | 1020090008719 | 1/2009 |
| KR | 1020120079010 | 7/2012 |
| KR | 1020140029740 | 3/2014 |
| KR | 1020150009103 | 1/2015 |
| KR | 1020150009644 | 1/2015 |

OTHER PUBLICATIONS

PCT/ISA/210 Search Report dated Apr. 28, 2017 issued on PCT/KR2017/001066 (pp. 3).
PCT/ISA/237 Written Opinion dated Aug. 7, 2018 issued on PCT/KR2017/001066 (pp. 7).
Use FaceTime with your iPhone, iPad, or iPod touch—Apple Support, Published Jun. 9, 2018, © 2018 Apple Inc. https://support.apple.com/en-us/HT204380?cid=wwa-kr-kwg-features-com (pp. 4) dated Aug. 1, 2018.
Chinese Office Action dated Jan. 19, 2020 issued in counterpart application No. 201780016569.9, 31 pages.
European Search Report dated Dec. 17, 2018 issued in counterpart application No. 17747710.6-1230, 9 pages.
Chinese Office Action dated Sep. 22, 2020 issued in counterpart application No. 201780016569.9, 37 pages.
Indian Examination Report dated Mar. 3, 2021 issued in counterpart application No. 201817032790, 6 pages.
Chinese Office Action dated Apr. 6, 2021 issued in counterpart application No. 201780016569.9, 38 pages.

\* cited by examiner

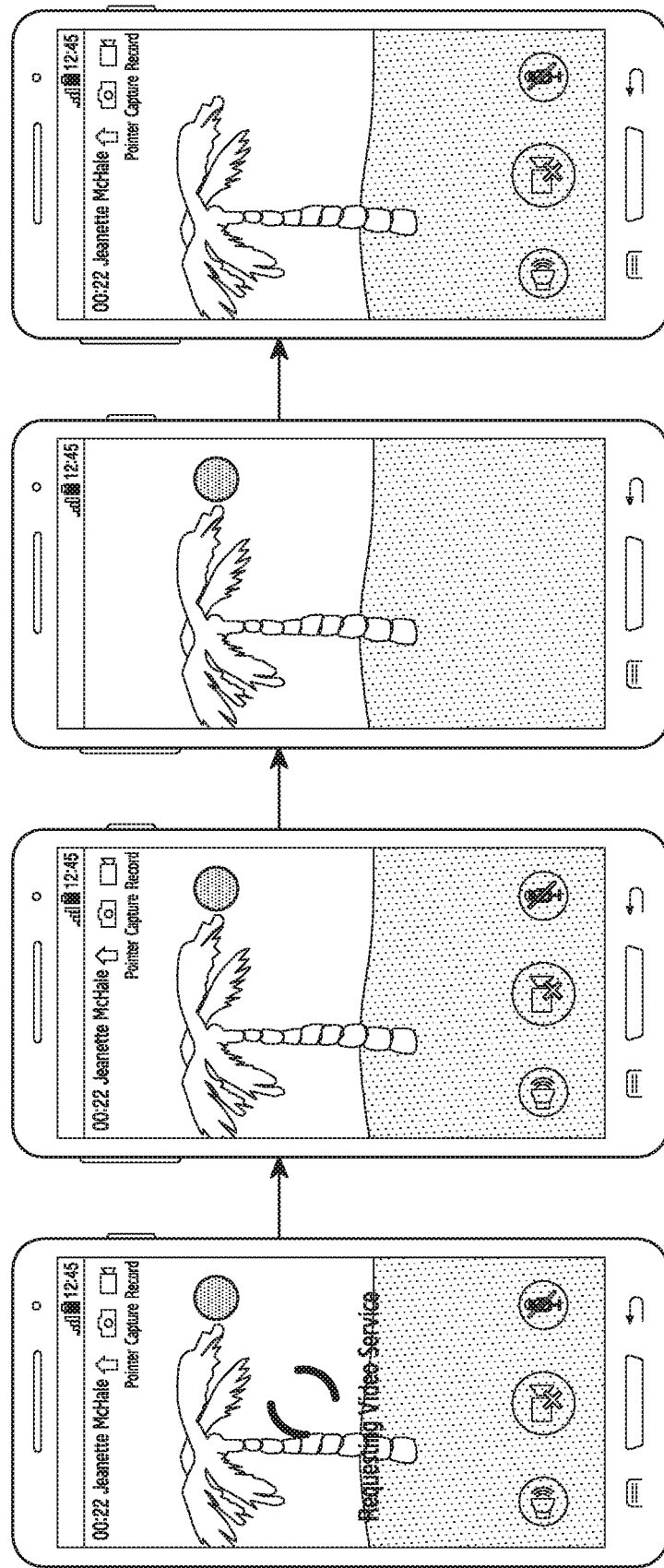

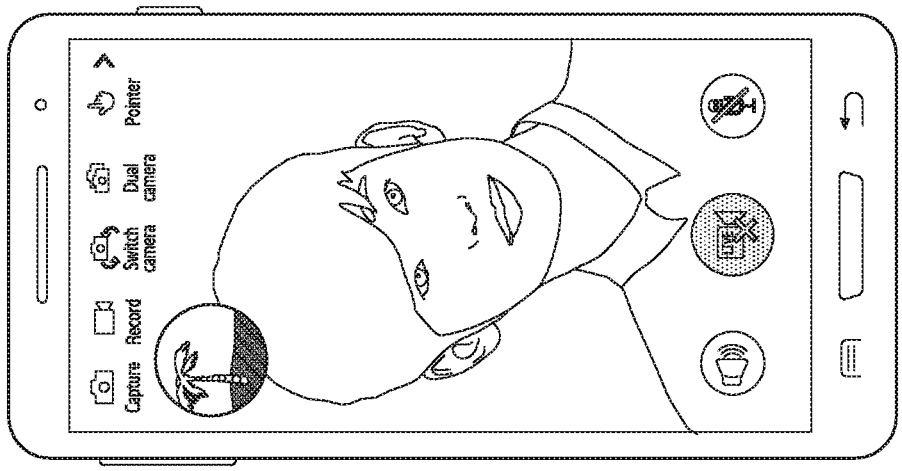
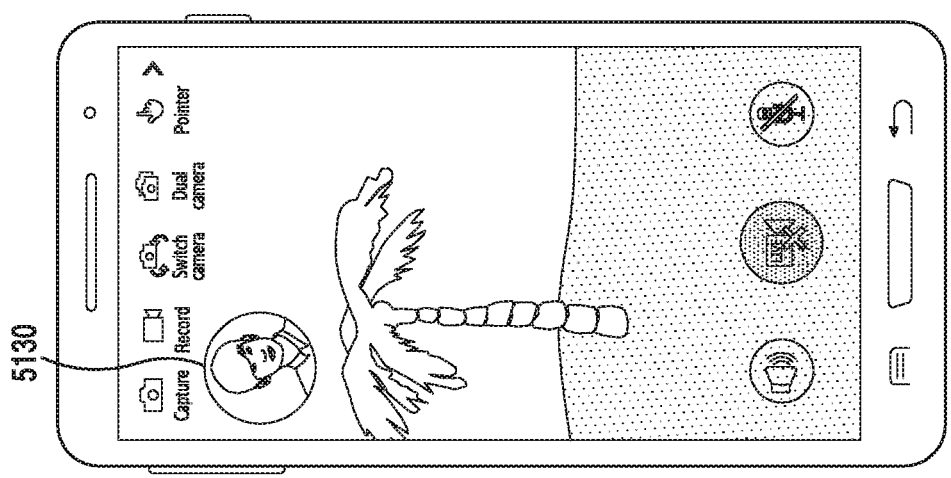
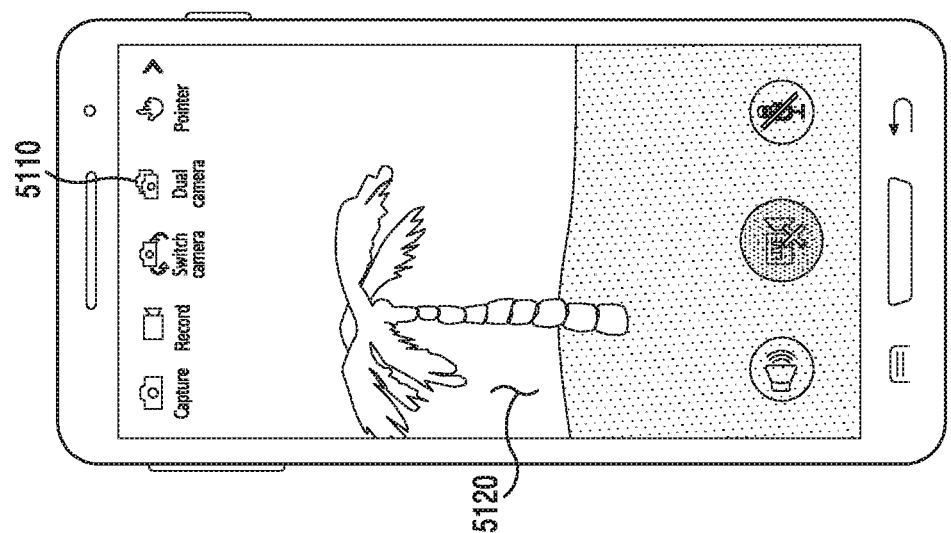
FIG.51A

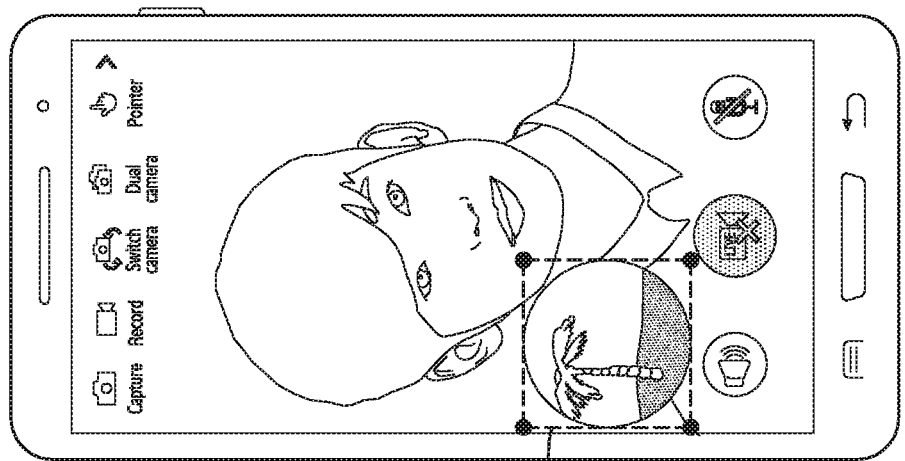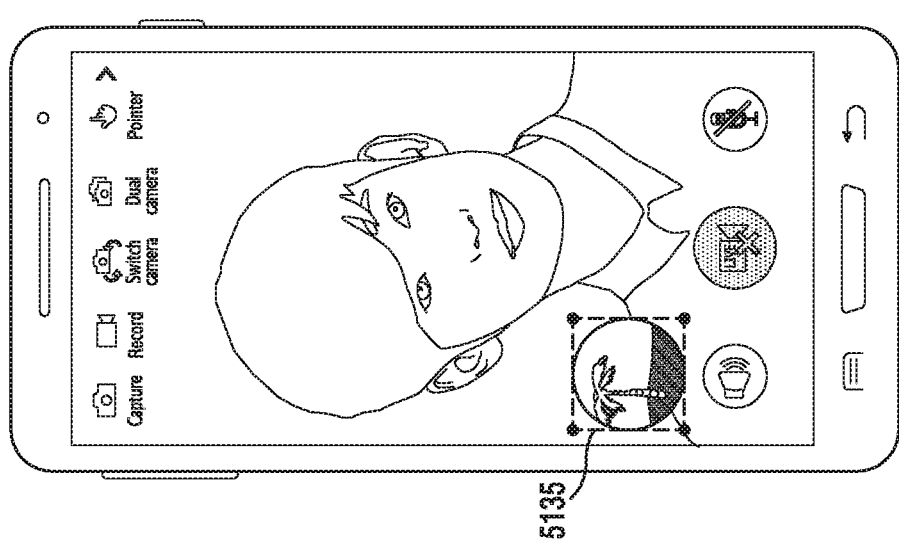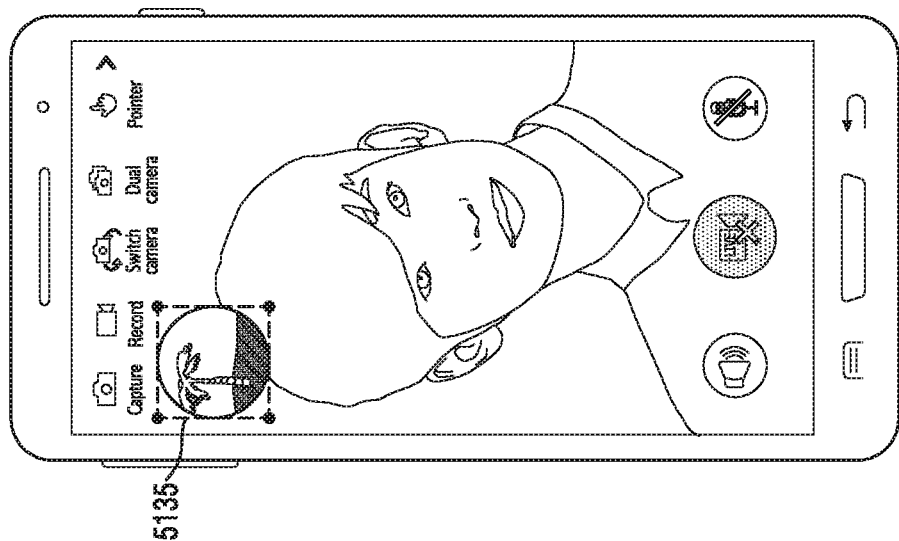
FIG.51B

METHOD AND APPARATUS FOR PROVIDING IMAGE SERVICE

PRIORITY

This application is a Continuation Application of U.S. patent application Ser. No. 16/075,026, filed on Aug. 2, 2018, in the U.S. Patent and Trademark Office, which is a National Phase Entry of PCT International Application No. PCT/KR2017/001066, which was filed on Feb. 1, 2017, and claims priority to Korean Patent Application. No. 10-2016-0012793, which was filed on Feb. 2, 2016, the contents of each of which are incorporated herein by reference.

BACKGROUND ART

Recently, with the development of digital technology, various types of electronic devices such as a mobile communication terminal, a smart phone, a tablet personal computer (PC), a personal digital assistant (PDA), an electronic organizer, a notebook, a wearable device, an. Internet of Things (IoT) device, an audible device, etc., have been widely used.

In recent years, with the rapid spread of electronic devices, existing voice communication services focused on simple voice calls have been converted into data communication services focused on data communication, and various types of services have been proposed. For example, in an electronic device, a web page can be browsed or an application can be installed using the Internet so that a user can receive a desired service (e.g., a video service {e.g., video sharing, video call service, or the like}) via the electronic device anywhere.

Conventionally, a video service such as a video sharing service or a video call service is mainly performed through a mobile communication network. In most cases, a video call is performed by pressing a separate video call button. However, the conventional video service has a Limitation that it must go through a mobile communication network providing a video call service. Accordingly, for example, it is impossible to simultaneously provide a video service such as video call or video sharing while performing a voice call through a mobile communication network.

Conventionally, the video service and the voice call service must be separately provided, so that the video service cannot be provided simultaneously while the voice call is performed. For example, in an electronic device with a built-in camera, a voice call and a video capturing and transmitting function are separated. Therefore, in order for a user to capture and transmit a video to the other party, there is an inconvenience that a caller himself or herself has to perform various processes for capturing, storing, and transmitting the video after activating a camera, when the user is not in a voice call. In addition, the conventional video service may be provided using a stable data network such as Wi-Fi or a network of the same company when video data and audio data are exchanged in a mobile environment, and thus, since the conventional video service is mainly aimed at simple video and audio data exchange, it cannot support various interactions among users.

SUMMARY

Various embodiments disclose a method, apparatus, and system that may provide video services such as video sharing or video call services while performing a voice call in an electronic device.

Various embodiments disclose a method, apparatus, and system that may enhance the stability of communication connection for video transmission when transmitting a video to a call partner during a voice call.

Various embodiments disclose a method, apparatus, and system that may provide dynamic data transmission and reception considering different networks and network conditions so that sharing of video and audio can be seamlessly provided between different communication providers.

Various embodiments disclose a method, apparatus, and system that may determine a data communication connection method for determining whether data communication with a call partner of a voice call is possible, identifying the data communication quality with the call partner when the data communication is possible, and transmitting a video during the voice call on the basis of the identified result.

Various embodiments disclose a method, apparatus, and system that can simultaneously perform a video service-related function while performing a voice call in an electronic device.

Various embodiments disclose a method, apparatus, and system that may dynamically share a situation related to a video service to a user.

Various embodiments disclose a method, apparatus, and system that may capture a video to be transmitted during a voice call in an electronic device, transmit (share) the captured video to the other party without performing a separate transmission operation, and display the transmitted video on a counterpart electronic device.

Various embodiments disclose a method, apparatus, and system in which videos (e.g., videos or images) input in real time may be transmitted to other devices using a communication means, and a plurality of devices may share the transmitted videos and provide video services that interact on the basis of the shared videos.

Various embodiments disclose a method, apparatus, and system that may include a user interface capable of providing various interactions between users on the basis of video data and audio data shared in a plurality of electronic devices.

Various embodiments disclose a method, apparatus, and system that may enable multimedia processing and remote control for capturing and sharing videos in various situations occurring during a voice call between users.

In accordance with an aspect of the present disclosure, there is provided an electronic device including: a camera; a display; a communication unit configured establish wireless communication with another electronic device using at least one protocol; and a processor configured to be functionally connected to the camera, the display, and the communication unit, wherein the processor is configured to perform a voice call with the other electronic device based on a first network, detect a user input for performing a video call with the other electronic device while performing the voice call with the other electronic device, connect the video call based on a second network in response to the user input and display a user interface associated with the video call on the display, and display a video acquired using the camera through the user interface and transmit the displayed video to the other electronic device through the second network.

In accordance with another aspect of the present disclosure, there is provided an operating method of an electronic device including: performing a voice call with another electronic device based on a first network; detecting a user input for performing a video call with the other electronic device while performing the voice call with the other electronic device; connecting the video call based on a second network in response to the user input and displaying a user interface associated with the video call on a display; and displaying a video acquired using the camera through the user interface and transmitting the displayed video to the other electronic device through the second network.

In order to solve the above problems, various embodiments of the present disclosure may include a computer-readable recording medium recording a program for executing the method in a processor.

The recording medium according to various embodiments of the present disclosure may include a computer-readable recording medium recording a program for executing an operation of performing a voice call with another electronic device based on a first network, an operation of connecting the video call based on a second network in response to a user input for performing a video call with the other electronic device while performing the voice call with the other electronic device and displaying a user interface associated with the video call on the display, an operation of displaying a video acquired using the camera through the user interface and transmitting the displayed video to the other electronic device through the second network.

In order to solve the above-described problems, an electronic device and an operating method thereof according to various embodiments may provide a camera video to the other party on the basis of more stable connection than that when transmitting or sharing the camera video during a voice call. According to various embodiments, an electronic device may provide a video service such as video sharing or video call through a network (e.g., second communication) separate from a network (e.g., first communication) for voice call.

According to various embodiments, it is possible to provide video transmission and reception even when using different communication networks during a voice call through a mobile communication network (e.g., cellular network), and to support various remote controls through a user input. According to various embodiments, a user may share his or her situation via a video, may upload the same to a social service (e.g., SNS), or may manage the same separately according to the user. According to various embodiments, it is possible to enable efficient video encoding and transmission on the basis of users' devices and network conditions. According to various embodiments, a user's pose may be predicted on the basis of a gesture so that a suitable call mode (e.g., video service mode or voice service mode) may be determined and resources of an electronic device may be allocated on the basis of the determination result.

According to various embodiments, a user may be provided with a video service during a voice call, thereby improving user's convenience and inducing user's interest. According to various embodiments, a user may perform camera activation, video capturing, and video processing and transmission during a voice call by a single user input (e.g., button selection, voice command input, or gesture (motion) input using an electronic device) set in the electronic device, when desiring to transmit a video during the voice call, thereby improving the accessibility to user's use of the electronic device and convenience thereof.

BRIEF DESCRIPTION OF THE DRAWINGS

FIGS. 34A, 34B, 34C, and 34D are diagrams illustrating an example of a screen in which a video service is performed in an electronic device according to various embodiments of the present disclosure;

FIGS. 51A, 51B, 52, and 53 are diagrams illustrating an example of an operation of performing a video service in electronic devices according to various embodiments of the present disclosure;

DETAILED DESCRIPTION

Figure 1:
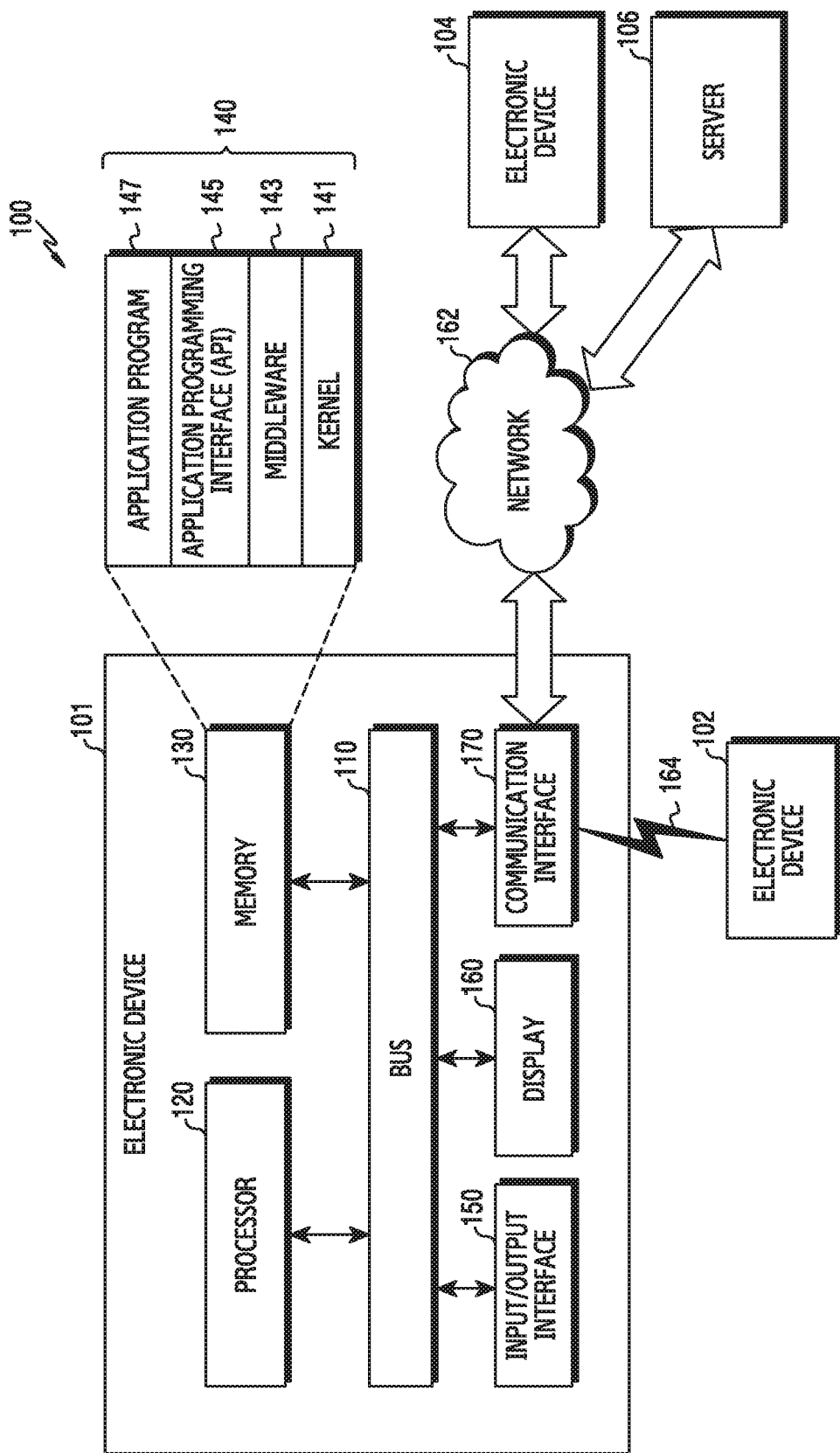
FIG. 1 is a diagram illustrating a network environment including an electronic device according to various embodiments.

Hereinafter, various example embodiments of the present disclosure will be described with reference to the accompanying drawings. However, it should be understood that there is no intent to limit the present disclosure to the particular for disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second.", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) ii a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to some embodiments of the present disclosure may be a flexible device. Further, the electronic device according to an example embodiment of the present disclosure is not limited to the aforementioned devices, and may include a new electronic device according to the development of technology.

Hereinafter, an electronic device according to various embodiments will be described with reference to the accompanying drawings. In this document, the term "user" may indicate a person using an electronic device or a device (for example, an artificial intelligence electronic device) using an electronic device.

FIG. 1 is a diagram illustrating a network environment including an electronic device according to various embodiments;

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101. An operation of processing (or controlling) the processor 120 according to various example embodiments will be described below in detail with reference to the accompanying drawings.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The memory 130 may include computer readable recording medium having a program recorded thereon to execute the method according to various example embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing: the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, wind control, image processing, character control, and the like.

The input/output interface 150, for example, may include various input/output circuitry and function as an interface that may transfer commands or data input from a user or another external device to the other element (s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode ((OED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LIE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended. Standard 232 (RS-232), and a Plain Old Telephone Service (POTS).

The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, client-server computing technologies may be used.

Figure 2:
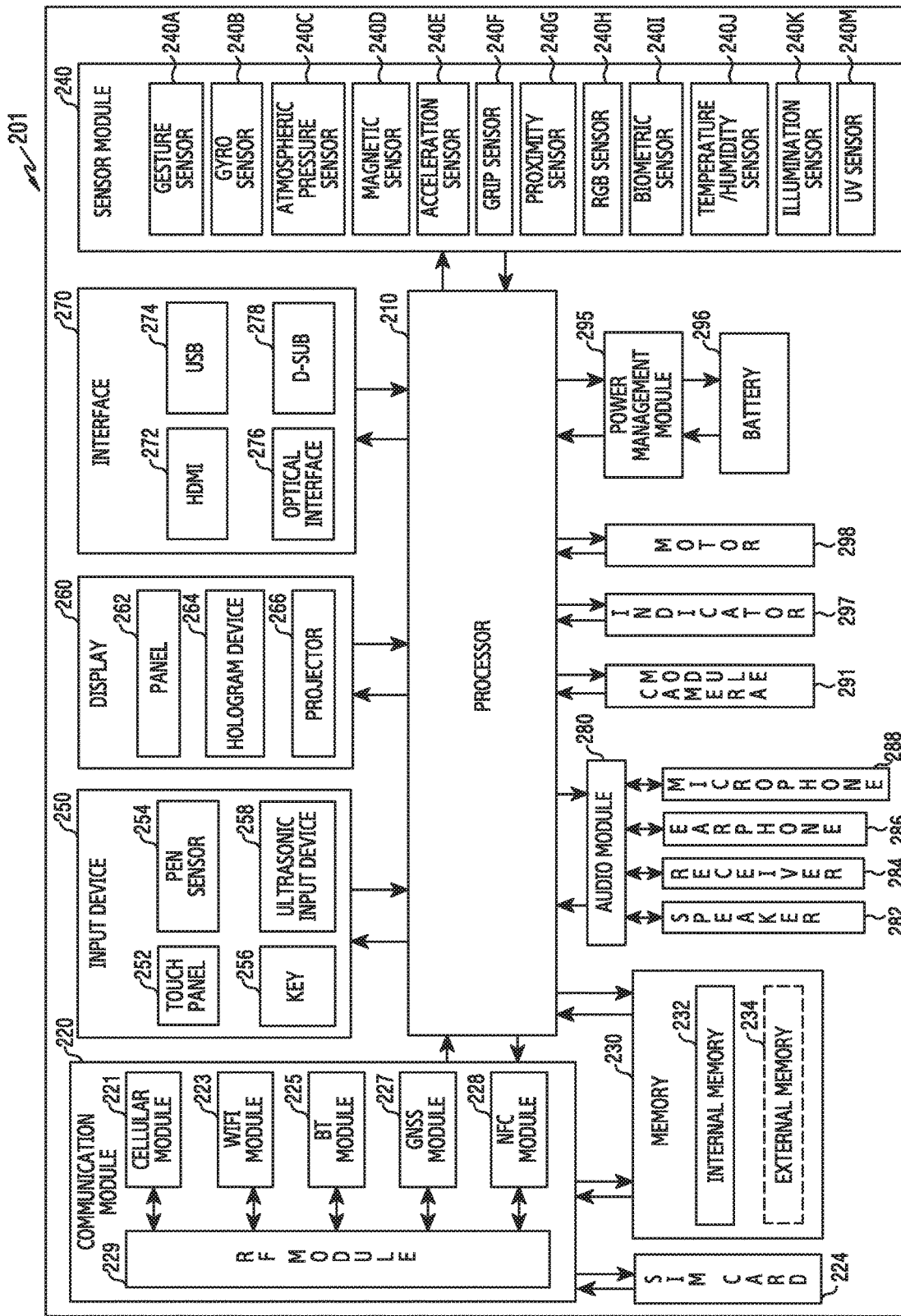
FIG. 2 is a block diagram illustrating an electronic device according to various embodiments.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least Some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the PT module 225, the GNSS module 227, and the NFC module 228 may be included in one integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the PT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact. Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 2402J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EIEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without imitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266.

The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, an. Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting, state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a CPU) for supporting a mobile TV. The processing device for supporting a mobile TV may process, for example, media data according to a certain standard such as Digital Multimedia Broadcasting (DNB), Digital Video Broadcasting (DVB), or media-FLO™.

Each of the above-described component elements of hardware according, to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
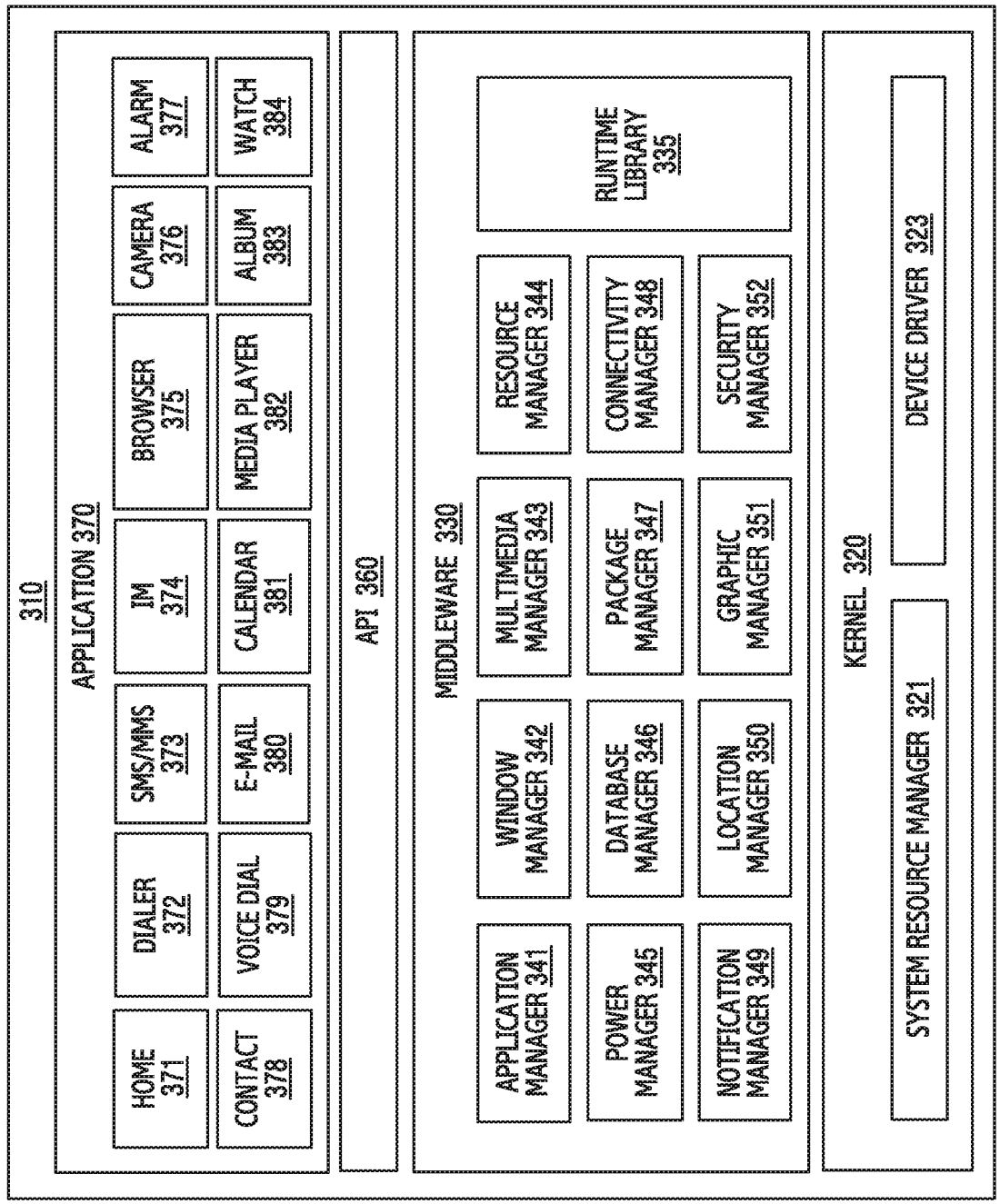
FIG. 3 is a block diagram illustrating a program module according to various embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., tree electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USE driver, a keypad driver, a Wi-Fi driver, an audio driver, or an. Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a diaper 372 an EMS/MMS 373, an Instant Message (IM) 374, a browser 375, a camera 376, an alarm 377, a contact 378, a voice dial 379, an email 380, a calendar 381, a media player 382, an album 383, a watch 384. According to various example embodiments, the application 370 may include an application for providing a health care (e.g., for measuring exercise quantity or blood sugar, etc.), or environment information (e.g., providing atmospheric pressure, humidity, or temperature information).

According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) designated according to the attributes of an external electronic device (for example, the electronic device 102 or 104). According to an embodiment, the applications 370 may include applications received from an external electronic device (for example, the server 106 or the electronic device 102 or 104). According to an embodiment, the applications 370 may include a preloaded application or a third-party application that can be downloaded from a server. The names of the elements of the program module 310, according to the embodiment illustrated in the drawing, may vary depending on the type of operating system.

According to an embodiment, the application 370 may include an application received from the external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Msc (DVD)), magneto-optical media (e.g., a floptical disk), a hardware device (e.g., a Read. Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Various embodiments disclose a method, apparatus, and system that may provide video services such as video sharing or video call services while performing a voice call in an electronic device. Various embodiments disclose a method, apparatus, and system that may enhance the stability of communication connection for video transmission when transmitting a video to a call partner during a voice call. Various embodiments disclose a method, apparatus, and system that may provide dynamic data transmission and reception considering different networks and network conditions so that sharing of video and audio can be seamlessly provided between different communication providers. Various embodiments disclose a method, apparatus, and system that can simultaneously perform a video service-related function while performing a voice call in an electronic device.

An electronic device according to various embodiments of the present disclosure supports communication function and/or camera function, and may comprising any devices using one or more of an AP (application processor), a CP (communication processor), a GPU (graphic processing unit) and a CPU (central processing unit). For example, an electronic device according to various embodiments of the present, disclosure, may comprises any data transmission device, multimedia device, wearable device, IoT (Internet of Things) device supports communication function and/or camera function or any application devices thereof.

Hereinafter, an electronic device and an operating method according to various embodiments of the present disclosure is described with reference to accompanying drawings. However, various embodiments of the present disclosure do not limited to contents described below. Hereinafter, the various embodiments of the present disclosure of the application may be described as an example with hardware approaching method. However, the various embodiments of the present disclosure of the application comprises technologies using both of hardware and software, therefore, the described embodiments do not exclude software approaching method.

Figure 4:
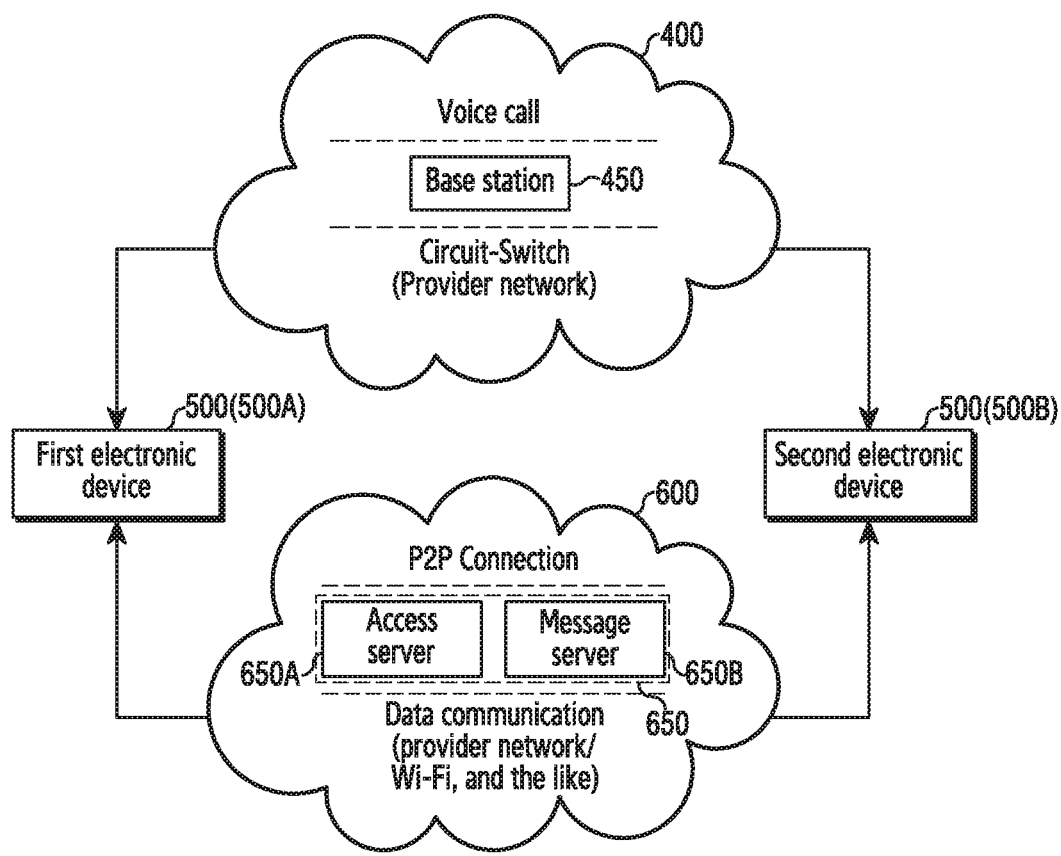
FIG. 4 is a diagram illustrating a system according to various embodiments of the present disclosure.

FIG. 4 is a diagram illustrating a system according to various embodiments of the present disclosure.

As illustrated in FIG. 4, the system according to various embodiments of the present disclosure may include an electronic device 500 (e.g., a first electronic device 500A or a second electronic device 500B), at least two networks (e.g., a first network 400 and a second network 600), and one or more servers 650 (650A and 650B). According, to various embodiments, the electronic device 500 may include the first electronic device 500A for originating side operation and the second electronic device 500B for receiving side operation.

The network 400 according to various embodiments may be divided into the first network 400 for first communication (e.g., voice call) and the second network 600 for second communication (e.g., video service). According to various embodiments, the first network 400 may be a mobile communication network (or a cellular network) for mobile communication service and may include a base station 450. According to various embodiments, the second network 600 may be a data communication network for peer to peer (P2P) connection, and may include an access server 650A and a message server 650B.

Referring to FIG. 4, the first electronic device 500A and the second electronic device 500B may perform a voice call via the first network 400, and may perform data communication with each other via the second network (e.g., a PS network or Wi-Fi network).

The first electronic device 500A may transmit a video (e.g., a moving image received or stored via a camera, or a still image) to the second electronic device 500b during a voice call with the second electronic device 500B. Hereinafter, this function will be referred to as a video service. According to various embodiments, the first electronic device 500A and the second electronic device 500B are connected in a P2P manner to transmit and receive videos between the electronic devices 500A and 500B, but the present disclosure is not limited thereto. According to one embodiment, the first electronic device 500A and the second electronic device 500B may transmit and receive videos in a server-client manner. According to another embodiment, the first electronic device 500A and the second electronic device 500B may transmit and receive videos to and from each other using a multimedia server (not shown). According to another embodiment, the first electronic device 500A and the second electronic device 500B may transmit and receive voice using data communication.

In various embodiments, the electronic device 500 (e.g., the first electronic device 500A or the second electronic device 500B) may include a camera inside or outside thereof. For example, the electronic device 500 may include an internal camera that is physically connected or an external camera that is functionally connected.

In various embodiments, the videos transmitted and received between the first electronic device 500A and the second electronic device 500B may include camera shot videos captured in real time using, a camera, or may include stored (e.g., recorded) videos. According to various embodiments, the stored videos may be stored either inside or outside the electronic device 500 (e.g., a wearable device, a server, etc.).

In various embodiments, examples of an operation of the electronic device 500 which transmits and receives videos for the video service during a voice call will be described in detail with reference to the drawings described later.

The server 650 may connect the first electronic device 500A and the second electronic device 500B in a P2P manner, and may be configured as one or more. For example, according to various embodiments, an example in which the server 650 is configured as an access server 650A and a message server 650B will be described.

In various embodiments, the access server 650A may provide a domain name system (DNS) function for session connection of the first electronic device 500A and the second electronic device 500B. In various embodiments, the access server 650A may connect the first electronic device 500A and the second electronic device 500B in a P2P manner.

According to various embodiments, by the message server 650B, the first electronic device 500A may transmit a start request message for initiating video transmission and reception to the second electronic device 500B.

In various embodiments, the server 650 (e.g., the access server 650A or the message server 650B) may manage user accounts, profile information, and service subscription information.

In various embodiments, regardless of a subject which requests (e.g., originates) a voice call connection or receives a voice call connection request, an electronic device that wishes to transmit a video during a voice call may become a calling terminal r; and an electronic device that receives the video may become a receiving terminal. In various embodiments, a user interface for the video service during a voice call may be provided differently depending on the calling terminal and the receiving terminal, which will be described in detail with reference to the drawings described later.

Figure 5:
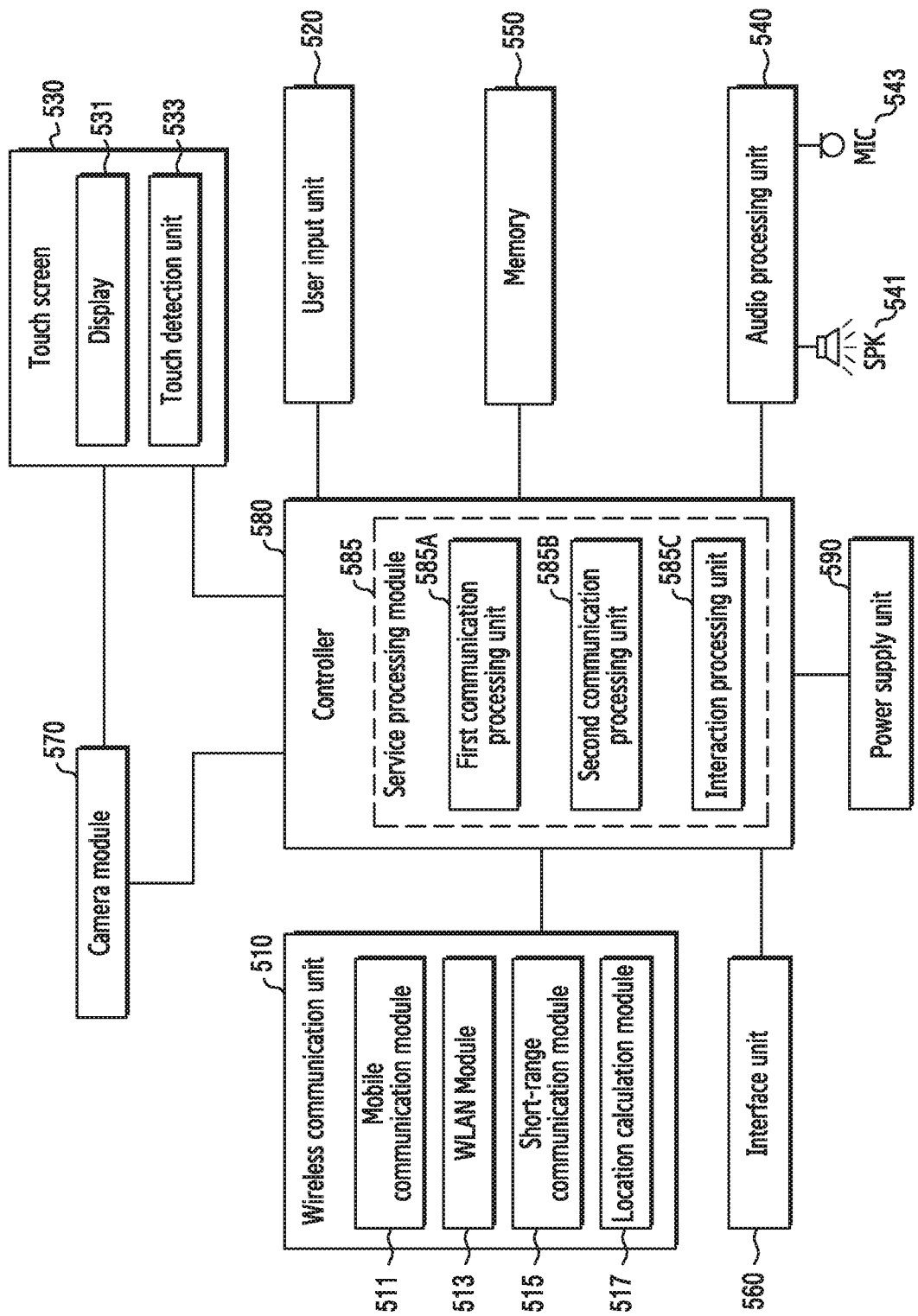
FIG. 5 is a schematic diagram illustrating the configuration of an electronic device according to various embodiments of the present disclosure.

FIG. 5 is a schematic diagram illustrating the configuration of an electronic device according to various embodiments of the present disclosure.

Referring to FIG. 5, the electronic device 500 according to various embodiments of the present disclosure may include, for example, a wireless communication unit 510 (e.g., a communication unit including communication circuitry), a user input unit 520 (e.g., an input unit including input circuitry), a touch screen. 530, an audio processing unit 540 (e.g., an output unit including output circuitry), a memory 550, an interface unit 560, a camera module 570, a controller 580 (e.g., a processor 120 or 210 including processing circuitry), and a power supply unit 590. The electronic device 500 in various embodiments of the present disclosure is not required to have components illustrated in FIG. 5, so that the electronic device 500 may be implemented to have more or fewer components than those illustrated in FIG. 5.

The wireless communication unit 510 may have, for example, the same or similar configuration as or to the communication module 220 of FIG. 2. The wireless communication unit 510 may include one or more modules enabling wireless communication between the electronic device 500 and an external electronic device (e.g., another electronic device 102 or 104, or a server 106 or 650). For example, the wireless communication unit 510 may include a mobile communication module 511, a wireless local area network (WLAN) module 513, a short-range communication module 515, and a location calculation module 517. The wireless communication unit 510 in various embodiments may include a module (e.g., a short-range communication module or a long-range communication module) for communicating with surrounding external electronic devices.

The mobile communication module 511 may have, for example, the same or similar configuration as or to the cellular module 221 of FIG. 2. The mobile communication module 511 may transmit and receive a wireless signal to and from at least one of a base station, an external electronic device (e.g., another electronic device 104), and various servers (e.g., an application server, a management server, an integration server, a provider server, a content server, an Internet server, a cloud server, etc.) on a mobile communication network. The wireless signal may include a voice signal, a data signal, or various types of control signals. The mobile communication module 511 may transmit various data required for the operation of the electronic device 500 to an external device (e.g., the server 106 or another electronic device 104) in response to a user request.

The WLAN module 513 may have, for example, the same or similar configuration as or to the Wi-Fi module 223 of FIG. 2. The WLAN module 513 may indicate a module for establishing a wireless Internet connection and a wireless LAN link with another external electronic device (e.g., another electronic device 102 or server 106). The WLAN module 513 may be externally or internally mounted on the electronic device 500. As a wireless Internet technology, wireless fidelity (Wi-Fi), wireless broadband (Wibro), world Interoperability for microwave access (WiMax), high speed downlink packet access (HSDPA), millimeter wave (mm-Wave), or the like may be used. The WLAN module 513 may transmit or receive various data of the electronic device 500 to and from the outside, in conjunction with another external electronic device (e.g., another electronic device 104) connected to the electronic device 500 via a network (e.g., a wireless Internet network) (e.g., the network 162). The WLAN module 513 may always remain in a turned-on state or may be turned on according to the setting of the electronic device 500 or a user input.

The short-range communication module 515 may indicate a module for performing short-range communication. As a short-range communication technology, Bluetooth, Bluetooth low energy (BLE), radio frequency identification (RFID), infrared data association (IrDA), ultra wideband (UWE), Zigbee, near field communication (NFC), or the like may be used. The short-range communication module 515 may transmit or receive various data of the electronic device 500 to and from the external electronic device, in conjunction with another external electronic device (e.g., another electronic device 102) connected to the electronic device 500 via a network (e.g., a short-range communication network). The short-range communication module 515 may always remain in a turned-on state or may be turned on according to the setting of the electronic device 500 or a user input.

The location calculation module 517 may have, for example, the same or similar configuration as or to the GNSS module 227 of FIG. 2. The location calculation module 517 may be a module for acquiring the location of the electronic device 500, and may include a global position system (GPS) module as a representative example. The location calculation module 517 may measure the location of the electronic device 500 based on the principle of triangulation.

The user input unit 520 may generate input data for controlling the operation of the electronic device 500 in response to a user input. The user input unit 520 may include at least one input device for detecting various user inputs. For example, the user input unit 520 may include a keypad, a dome switch, a physical button, a touch pad (resistive type/capacitive type), a jog & shuttle, a sensor (e.g., the sensor module 240), etc.

The user in input unit 520 may be implemented in the form of buttons located outside the electronic device 500 or some or all of the user input 520 may be implemented in the form of a touch panel. The user input unit 520 may receive a user input for initiating the operation (e.g., an audio reproduction function, an electronic device connection function, a video transmission or sharing function, etc.) of the electronic device 500 and may generate an input signal according to a user input.

The touch screen 530 may indicate an input/output device that simultaneously performs an input function and a display function, and may include a display 531 (e.g., the display 160 or 260) and a touch detection unit 533. The touch screen 530 may have an intermediary role to provide an input/output interface between the electronic device 500 and a user, to transmit a touch input of the user to the electronic device 500, and to show an output from the electronic device 500 to the user. The touch screen 530 may show a visual output to the user. The visual output may be text, graphic, video, or a combination thereof.

The display 531 may display (output) various types of information processed in the electronic device 500. For example, the display 531 may display a user interface (UI) or a graphical UI (GUI) related to the video service during a voice call. As the display 531, various displays (e.g., the display 160) may be used. In various embodiments, a bendable display may be used as the display 531.

In various embodiments, in a liquid crystal display (LCD), a light emitting diode (LED), an organic LED (OLED), an active matrix OLED (AMOLED), or the like, the display 531 may replace a glass substrate surrounding liquid crystal with a plastic film to assign flexibility to be folded and unfolded. In various embodiments, the display 531 may extend to at least one side (e.g., at least one of the left, right, top, and bottom sides) of the electronic device 500 such that the bendable display may be folded below an operable radius of curvature (e.g., a radius of curvature of 5 cm, 1 cm, 7.5 mm, 5 mm, 4 mm, etc.) and fastened to the side of a housing.

The touch detection unit 533 may be seated on the display 531, and may detect a user input that is in contact with or in proximity to the surface of the touch screen 530. The user input may include a touch event or a proximity event that is input based on at least one of a single-touch, a multi-touch, hovering, and an air gesture. The touch detection unit 533 may receive a user input for initiating an operation related to the use of the electronic device 500, and may generate an input signal according to the user input. According to various embodiments, the touch detection unit 533 may be configured to convert a change in pressure applied to a specific portion of the display 531 or a change in electrostatic capacitance generated at a specific portion of the display 531 into an electric input signal. The touch detection unit 533 may detect a location and an area of the surface of the display 531 which an input means (e.g., a user's finger, an electronic pen, or the like) contacts or approaches. The touch detection unit 533 may be implemented to also detect pressure (e.g., force touch) when a touch is made according to the applied touch type.

The audio processing unit 540 may have, for example, the same or similar configuration as or to the audio module 280 of FIG. 2. The audio processing unit 540 may perform a function of transmitting an audio signal received from the controller 580 to a speaker (SPK) 541 and transferring an audio signal such as a voice or the like, which is received from a microphone 543, to the controller 580. The audio processing unit 540 may convert voice/sound data into an audible sound through the speaker 541 based on the control of the controller 580, may output the audible sound, may convert an audio signal such as a voice or the like which is received from the microphone 543 into a digital signal, and may transfer the digital signal to the controller 580.

The speaker 541 may output audio data that is received from the wireless communication unit 510 or stored in the memory 550. The speaker 541 may output a sound signal associated with various operations (functions) executed by the electronic device 500.

The microphone 543 may receive an external sound signal and may process the same into electrical voice data. Various noise reduction algorithms may be implemented in the microphone 543 to remove noise generated in the process of receiving an external sound signal. The microphone 543 may serve to input an audio stream such as a voice command (e.g., a voice command for initiating functions such as audio play, electronic device connection, or video transmission or sharing).

The memory 550 (e.g., the memory 130 or 230) may store one or more programs executed by the controller 580 and also perform a function of temporarily storing input/output data. The input/output data may include, for example, video, image, photo, and audio files, and network information (or communication quality information). The memory 550 may serve to store acquired data and may store data acquired in real time in a temporary storage device and data, which is decided to be stored, in a storage device which can store the data for a long time.

According to various embodiments of the present disclosure, the memory 550 may perform a voice call based on a first network with another electronic device, may detect a user input for performing a video call with the other electronic device while performing the voice call with the other electronic device, may connect the video call based on a second network and display a user interface associated with the video call on a display, in response to the user input, and may display a video acquired using a camera through the user interface and store one or more programs related to transmitting the displayed video to the other electronic device via the second network and data or instructions.

In various embodiments, the memory 550 may determine an operation of performing a voice call based on first communication with another electronic device, may determine whether a service connection is established based on at least a part of whether data communication by second communication with the other electronic device is possible and data communication quality in response to a service execution request during the voice call, may display a video acquired using a camera (e.g., the camera module 570) on the display 531 when the service connection is determined, and may store one or more programs related to transmitting the video to another electronic device based on the second communication and data or instructions.

In various embodiments, the first communication may utilize a cellular communication protocol and the second communication may utilize a short-range communication protocol. For example, in various embodiments, the first communication may be based on circuit switching of the cellular communication protocol and the second communication may be based on packet switching of the cellular communication protocol.

In various embodiments, when the service connection is determined, the memory 550 may additionally store one or more programs related to changing the voice call from the first communication to the second communication and transmitting the changed voice call to another electronic device and data or instructions. For example, according to various embodiments, when the service connection is determined, the memory 550 may terminate the first communication, or may transmit and receive only data for maintaining connection to and from another electronic device, may additionally store one or more programs related to an operation of the voice call which is changed to be transmitted and received based on the second communication and data and instructions.

According to various embodiments, at the time of the service connection, audio and video may use different communications or the same communication. According to one embodiment, when a voice uses the packet switching of the cellular communication protocol, the voice may be transmitted using the packet switching of the video or cellular communication protocol. According to another embodiment, when voice and video are switched to use the same communication, the connection of the communication used for the voice may be terminated. Alternatively, only minimum connection of the communication used for the voice may be maintained and thereafter, the communication used for the voice may be used again for the voice call at the time of video termination (e.g., service connection termination). According to another embodiment, the first communication in which only the minimum connection is maintained may automatically support the voice call after the end of video communication. According to one embodiment, a dummy packet such as a keep alive packet may be transmitted to maintain only the minimum connection. For example, when there is no transmission of a packet, a communication entity (e.g., electronic devices) may determine that there is no more communication, and may disconnect the communication connection. Accordingly, to prevent this, the keep alive packet may be transmitted.

The memory 550 may include one or more application modules (or software modules). In various embodiments, the memory 550 may include a computer-readable recording medium.

According to various embodiments, the recording medium may include a computer-readable recording medium that records a program for executing an operation of performing a voice call based on a first network with another electronic device, an operation of connecting a video call based on a second network and displaying a user interface associated with the video call on a display, in response to a user input for performing the video call with the other electronic device during the voice call with the other electronic device, and an operation of displaying a video acquired using a camera through the user interface and transmitting the displayed video to the other electronic device via the second network.

The interface unit 560 may have, for example, the same or similar configuration as or to the interface 270 of FIG. 2. The interface unit 560 may receive data or power from another electronic device, and may transfer the same to each component included in the electronic device 500. The interface unit 560 may enable data within the electronic device 500 to be transmitted to another electronic device. For example, the interface unit 560 may include a wired/wireless headphone port, an external charger port, a wired/wireless data port, a memory card port, an audio input/output port, a video input/output port, an earphone port, and the like.

The camera module 570 (e.g., the camera module 291) may indicate a configuration that supports a photographing function of the electronic device 500. The camera module 570 may photograph an arbitrary object according to the control of the controller 580, and may transfer photographed data (e.g., video or image) to the display 531 and the controller 580. Although not shown in various embodiments of the present disclosure, the camera module 570 may include an internal camera module mounted on the electronic device 500 or an external camera module connected. (e.g., a cable connection or a Bluetooth connection) by a wired or wireless interface to the electronic device 500. For example, the camera module 570 may include a peripheral camera device (e.g., virtual realty (VR) device, a 360 camera {or a 360 degree camera}, or another electronic device {e.g., robot cleaner, TV, monitor, or the like} including a camera) connected to the electronic device 500 by Bluetooth. According to various embodiments, the camera module 570 may include an attachable and detachable camera module.

The controller 580 is not limited thereto, but may include various processing circuitry such as a dedicated processor, a central processing unit (CPU), an application processor (AP), a communication processor (CP), etc. The controller 580 may control the overall operation of the electronic device 500. In various embodiments, the controller 580 may have, for example, the same or similar configuration as or to the processor 210 of FIG. 2. In various embodiments, the controller 580 may process an operation of performing a voice call with another electronic device based on a first network, an operation of detecting a user input for performing a video call with the other electronic device while performing the voice call with the other electronic device, an operation of connecting the video call based on a second network and displaying a user interface associated with the video call on the display 531, in response to the user input, and an operation of displaying a video acquired using a camera (e.g., the camera module 570) through the user interface and transmitting the displayed video to the other electronic device via the second network.

According to various embodiments, the controller 580 may process an operation of performing a voice call with another electronic device based on a first communication, an operation of determining whether a service connection is established based on at least a part of whether data communication by second communication is possible and data communication quality in response to a service execution request during the voice call, an operation of displaying a video acquired using a camera (e.g., the camera module 570) on the display 531 and transmitting the displayed video to the other electronic device based on the second communication, when the service connection is determined.

The controller 580 may include one or more processors for controlling the operation of the electronic device 500. In various embodiments, the controller 580 may control operations of hardware modules such as the audio processing unit 540, the interface unit 560, the display 531, the camera module 570, etc. The control operation of the controller 580 according to various embodiments of the present disclosure will be described in detail with reference with the accompanying drawings.

According to various embodiments of the present disclosure, the controller 580 may be implemented as one or more processors that control the operations of the electronic device 500 according to various embodiments of the present disclosure by executing one or more programs stored in the memory 550.

According to various embodiments of the present disclosure, the controller 580 may include a service processing module 585 for processing a service connection related to a video service during a voice call. According to various embodiments, the service processing module 585 may include, for example, a first communication processing unit 585A, a second communication processing unit 585B, an interaction processing unit 585C, and the like.

According to various embodiments, the first communication processing unit 585A may process an operation related to performing a voice call between electronic devices based on first communication (e.g., circuit switch (CS) communication, for example, 3G communication) (e.g., the first network 400).

According to various embodiments, the second communication processing unit 585B may process an operation related to performing a video service between electronic devices based on second communication. (e.g., packet switch (PS) communication, for example, data communication) (e.g., the second network 600). According to various embodiments, the second communication processing unit 585B may determine whether a service connection is established based on at least a part of whether data communication by the second communication with another electronic device is possible and data communication quality in response to a service execution request during a voice call by the first communication, may display an acquired video on the display 531 when the service connection is determined, and may transmit the acquired video to the other electronic device based on the second communication.

According to various embodiments, the controller 580 may output, to the speaker 541, a voice received from another electronic device based on the second communication or acquired by the microphone 543 when the service connection is determined, and may transmit the acquired voice to the other electronic device based on the second communication.

According to various embodiments, the controller 580 may control, when the service connection is determined, the first communication processing unit 585A and the second communication processing unit 585B to change a voice call from the first communication to the second communication and to transmit the changed voice call to another electronic device. For example, when the service connection is determined, the controller 580 may terminate the first communication or may transmit and receive only minimum data for maintaining connection to and from another electronic device, and may control the voice call to be transmitted and received based on the second communication.

According to various embodiments, the interaction processing unit 585C may process an operation related to providing a user interface associated with a video service during a voice call. According to various embodiments, the interaction processing unit 585C may process user interactions that are entered based on the user interface associated with the video service during the voice call. According to various embodiments, the interaction processing unit 585C may detect a gesture during the voice call and may process real-time conversions between modes (e.g., voice service mode and video service mode) in response to the detected gesture.

The power supply unit 590 may receive external power and internal power under the control of the controller 580 and may supply power required for the operation of each component. In various embodiments of the present disclosure, the power supply unit 590 may supply or cut off power to the display 531, the camera module 570, and the like under the control of the controller 580.

As discussed above, the electronic device 500 according to various embodiments of the present disclosure may include a camera (e.g., the camera module 570), the display 531, a communication circuit (e.g., the wireless communication unit 510) configured to establish wireless communication with another electronic device using at least one protocol, and a processor (e.g., the controller 580) functionally connected to the camera 570, the display 531, and the communication circuit 510. The processor may be configured to perform a voice call based on a first network with the other electronic device, to detect a user input for performing a video call with the other electronic device while performing the voice call with the other electronic device, to connect the video call based on a second network and to display a user interface associated with the video call on the display, in response to the user input, and to display a video acquired using the camera through the user interface and to transmit the displayed video to the other electronic device via the second network.

According to various embodiments, the user input may include a pose state change, a proximity state chance, a gesture input, situation awareness, or a voice command input of the electronic device.

According to various embodiments, the user input may include a state change signal received from the other electronic device via the second network.

According to various embodiments, the processor may be configured to monitor the user input and to switch a call mode in response to a change in the user input.

According to various embodiments, the processor may be configured to switch the call mode and to request a video call connection or a video call connection termination from the other electronic device according to the switching of the call mode.

According to various embodiments, the processor may be configured to detect a transition to a video call mode according to the user input while the voice call with the other electronic device is maintained by a voice call mode and to process the video call according to the video call mode while the voice call is maintained.

According to various embodiments, when the transition to the video call mode of the electronic device is detected, the processor may be configured to display information about the call mode of the other electronic device through the user interface displayed on the display.

According to various embodiments, the processor may be configured to display, in the video call mode, at least one object associated with additional function execution on the user interface.

According to various embodiments, the processor may be configured to detect a user input associated with function execution on the object or the user interface and to process at least one of camera transition, video pausing, pointing, zooming, capturing, and recording in response to the user input.

According to various embodiments, the process may be configured to pause a video according to a first input and to display a pointer on the paused video according to a second input, in the video call mode.

According to various embodiments, the first input and the second input may be input by at least one of the electronic device and the other electronic device.

According to various embodiments, the processor may be configured to resume the paused video in response to a third input in a state in which the video is paused.

According to various embodiments, the processor may be configured to display an indication (e.g., a service object) about whether a video call with the other electronic device is possible through the user interface.

According to various embodiments, the processor may be con: figured to monitor whether the video call with the other electronic device is possible and to change (e.g., activate/deactivate) and display the indication according to whether the video call with the other electronic device is possible.

According to various embodiments, the processor may be configured to determine whether the video call with the other electronic device is possible during the voice call.

According to various embodiments, when the transition to the video call mode determined, the processor may be configured to determine whether the video call is possible based on the capability or status information of the electronic device and the other electronic device before transmitting the video to the other electronic device.

According to various embodiments, based on the determination result, the processor may be configured to display activation of the indication when the video call is possible and to display deactivation of the indication when the video call is impossible.

According to various embodiments, the processor may be configured to switch a power mode of the camera to a camera driving mode or a camera standby mode upon switching the video call mode.

According to various embodiments, the other electronic device may be configured to perform a transition to the video call mode when the user input is detected during a voice call with the electronic device and to receive and display a video transmitted from the electronic device via the second network.

According to various embodiments, the other electronic device may be configured to automatically allow video reception when the video call mode is requested by the electronic device and to automatically receive a video transmitted from the electronic device.

Figure 6:
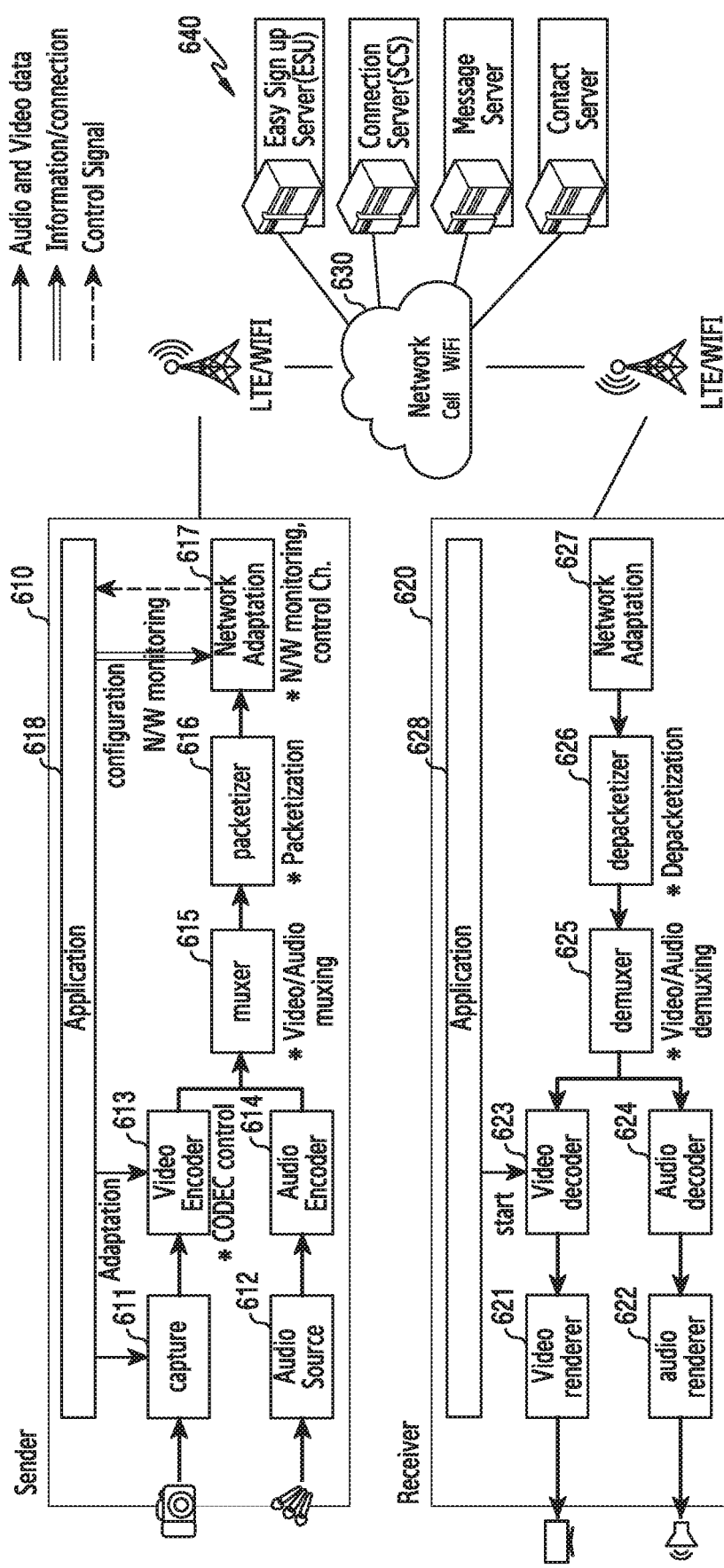
FIG. 6 is a diagram illustrating an example of a system including an electronic device according to various embodiments of the present disclosure.

FIG. 6 is a diagram illustrating an example of a system including an electronic device according to various embodiments of the present disclosure.

Referring to FIG. 6, the electronic device 500 according to various embodiments of the present disclosure may include a first electronic device 610 (a transmission electronic device, sender) for originating side operation providing (transmitting) a video and a second electronic device 620 (e.g., a reception electronic device, receiver) for receiving side operation provided with (receiving) a video. According to various embodiments, each of the first electronic device 610 and the second electronic device 620 may include a configuration corresponding to FIG. 5. For example, each of the first electronic device 610 and the second electronic device 620 may include an application processor, a display module, a camera module, an audio module, and a communication module. The first electronic device 610 and the second electronic device 620 may further include a sensor module according to the type of the electronic device 500.

As illustrated in FIG. 6, the first electronic device 610 may include an image receiving unit (capture) 611, an audio receiving unit (audio source) 612, a video encoder 613, an audio encoder 614, a muxer (multiplexer 615, a packetizer 616, a network adaptation 617, and an application 618.

The capture 611 may be composed of one or more cameras, and may receive videos (e.g., moving images or images {still images}) through a camera. The capture 611 may receive a control signal from the application 618 and may control a camera function in response to the control signal.

The video encoder 613 may generate video data encoded according to settings such as a bit rate, a frame rate, a drop rate, an encoding codec type, a resolution, an image aspect ratio, a pixel aspect ratio, etc., in order to store a video received via the capture 611 or to transmit the same to another electronic device (e.g., the second electronic device 620). According to one embodiment, the video encoder 613 may generate a still image (e.g., JPEG) encoded for a still image and may add metadata thereto. The video encoder 613 may receive a control signal through the application 618 to adjust various settings.

The audio source 612 may receive audio (e.g., voice, music, etc.) signals through one or more microphones.

The audio encoder 614 may generate audio data encoded according to one or more settings of a bit rate, a frame rate, a drop rate, an encoding codec type, and characteristics (e.g., support codec, network policy, etc.) of a supported common carrier network in order to store the received audio signal or transmit the same to another electronic device (e.g., the second electronic device).

The muxer 615 may include a device or a software module for synthesizing audio data and video data into one data format. The muxer 615 may synthesize the same kind of data.

According to one embodiment, the muxer 615 may synthesize encoded audio data and encoded video data to generate a file or a data stream including a video layer and an audio layer together. For example, an F4V file may indicate a file format synthesized using an H.264 video codec and an AAC audio codec.

According to one embodiment, the muxer 615 may synthesize audio data and video data before each piece of data is encoded.

The packetizer 616 may packetize the encoded data (e.g., packet data) to enable one or more of the encoded data (e.g., video data and audio data) to be transmitted to another electronic device through a network 630, and may transmit the packetized as a to the network adaptation 617.

The network adaptation 617 may serve to transmit and receive data, and may monitor the status of the network 630 and control the functions of the first electronic device 610 accordingly.

According to one embodiment, the network adaptation 617 may transmit one or more of the encoded data and the control signal through the network 630 to another electronic device (e.g., the second electronic device). The encoded data may include one or more of an encoded video and encoded audio. The control signal may include, for example, at least one of a request signal for video call, a message transmission related signal, a camera control request signal, device status related information, a video processing signal, and network setting information.

According to one embodiment, the network adaptation 617 may set or change a bit rate, a frame rate, a drop rate, etc., through the control of the application 618. For example, the network adaptation 617 may monitor the status of the network 630, and may transmit the monitored status to the camera, the encoder 613 or 614, or the network adaptation 617 via the application 618 as the control signal, thereby changing or setting at least one of a bit rate, a frame rate, a drop) rate, an encoding codec type, a resolution, an image aspect ratio, and a pixel aspect ratio.

The application 618 may indicate a module for controlling modules constituting the first electronic device 610 and processing a user input.

According to one embodiment, the application 618 may determine a device status. For example, the application 618 may check the internal status of a corresponding device such as available memory capacity, processor performance, battery capacity, a power mode, etc., and thereby may process to control modules constituting the device.

According to one embodiment, the application 618 may control camera and encoder functions. For example, it is possible to monitor camera initialization, video input through the camera, video processing control of the camera, and the status of the network 630, and may control the camera, the encoder, and data transmission according to the status of the network 630.

According to one embodiment, the application 618 may perform processing according to a user input. For example, the application 618 may perform processing for providing a user interface for performing a video call in a visual, audible, and/or tactile manner. For example, the application 618 may drive a camera function, a phone function, etc., may monitor the communication status of the phone, and may generate a control signal for processing video or audio, and thereby may control the overall multimedia processing and transmission/reception and may control a display, a memory, and an audio input/output device.

As illustrated in FIG. 6, the second electronic device 620 may include a video renderer 621, an audio renderer 622, a video decoder 623, an audio decoder 624, a demuxer (demultiplexer) 625, a depacketizer 626, a network adaptation 627, and an application 628.

The network adaptation 627 may receive at least one of encoded data (e.g., video data and audio data) or a control signal from another electronic device (e.g., the first electronic device 610), and may transmit the received encoded data to the decoder 623 or 624 so that the encoded data can be decoded. According to one embodiment, the network adaptation 627 may receive a control signal from another electronic device (e.g., the first electronic device 610) and may transmit the received control signal to the application 628, and thereby may be operated to control the second electronic device 620.

The depacketizer 626 may depacketize the packetized data (e.g., packet data) transmitted from the network adaptation 627 through the network 630 and may transmit the depacketized data to the demuxer 625. According to one embodiment, the depacketizer 626 may receive the packetized data transmitted through the network 630, and may extract encoded data (e.g., video data and audio data) of the corresponding packetized data and transmit the extracted data to the demuxer 625.

When the data received through the network 630 includes both audio data and video data, the demuxer 625 may serve to separate the audio data and the video data to extract encoded video data and encoded audio data.

The video decoder 623 may decode the encoded video (e.g., video or image) received through the network adaption 627 and may transmit the decoded video to the video renderer 621, thereby outputting (displaying) the decoded data through a video output device (e.g., a display).

The audio decoder 624 may decode the received encoded audio signal and may transmit the decoded signal to the audio renderer 622 so that the decoded signal can be output through an audio output device (e.g., a speaker).

A renderer (e.g., the video renderer 621 or the audio renderer 622) may perform video processing or audio processing so that video data or audio data decoded by a decoder (e.g., the video decoder 623 or the audio decoder 624) may be output to an output device (e.g., an output device such as a display, a speaker, or the like). According to one embodiment, the renderer 621 or 622 may receive a control signal through the application 628 and may control one or more of resolution, color, contrast, volume, sound field effect, and reproduction function control (e.g., reproduction speed, rewind, fast forward, pause, stop, resume, etc.).

As illustrated in FIG. 6, the data transmitted through the network adaptation 617 of the first electronic device 610 may be generated in the form of packets and may be transmitted to one or more server 640 (e.g., easy sign up server (ESU), a connection server {e.g., SCS server}, a message server, a contact server, etc.) or another electronic device (e.g., the second electronic device 620) via the network 630. For example, packets of data in which video data and audio data are combined may be transmitted using a cellular network (e.g., LTE, CDMA, WCDMA, 3GPP, or the like) or the network 630 such as Wi-Fi, BT, Zigbee, or the like. According to one embodiment, the packets of data in which video data and audio data are synthesized may be transmitted using an audible frequency, an ultrasonic wave, or an optical signal.

The electronic device 500 (e.g., the first electronic device 610 or the second electronic device 620) may perform various services by exchanging information with the server 640 via the network 630. According to one embodiment, the electronic device 500 may perform authentication using each electronic device or a user's ID (e.g., at least one of phone number, serial number, and account number) so that the electronic device 500 is connected to an ESU server to generate a unique ID for a video service based on each electronic device or a user, and may input information for service subscription. According to one embodiment, a service subscriber may register information such as a phone number or an e-mail address in a contact server, and may determine whether another user has subscribed to the corresponding service, whether an application (or app) is installed, and the like, through the related information related to the electronic device. According to one embodiment, in the case of the message server, it may be used to transmit a message such as a video reception request to another service subscriber. According to one embodiment, the connection server may be used for information exchange for connecting communication sessions between a plurality of electronic devices for video or control signal transmission.

As described above, according to various embodiments, the first electronic device 610 may obtain captured or stored videos (e.g., videos or images), and may transmit encoded data obtained by encoding the obtained videos to the second electronic device 620 via the network 630. The second electronic device 620 may receive the data encoded by the first electronic device 610 via the network 630, may decode the received data, and may output the decoded data to the second electronic device 620. A basic process according to various embodiments will be described below.

According to various embodiments, the first electronic device 610 may receive images in real-time through one or more cameras and may receive audio through an audio device. The first electronic device 610 may perform video encoding through the video encoder 613 to transmit the received video to the second electronic device 620, thereby generating encoded video data. According to one embodiment, the first electronic device 610 may encode a video stream or a video file based on at least one of H.264, 3gpp, AVI, WMV, VP9, MPEG2, QuickTime movie, and FLV. According to one embodiment, the first electronic device 610 may store the received image as one or more still image formats of JPEG, BMP, TIFF, and PNG.

According to various embodiments, the first electronic device 610 may convert the received audio into at least one of AMR, QCELP, MP3, WMA, AAC, and FLAC formats through the audio encoder 614.

According to various embodiments, the first electronic device 610 may packetize one or more of the encoded data (e.g., video or audio data) and may transmit the packetized data to the second electronic device 620 through via the network 630. According to one embodiment, the first electronic device 610 may synthesize the video data and the audio data by the muxer 615 before transmitting the encoded data via the network 630.

According to various embodiments, the second electronic device 620 may receive one or more of the encoded data (e.g., the video data and the audio data) via the network 630, may decode the received data, and may output the decoded data through a corresponding output device (e.g., a display or audio output device {e.g., a speaker}).

According to various embodiments, each of the first electronic device 610 and the second electronic device 620 may transmit a control signal to another electronic device to perform at least one of controlling the corresponding electronic device, service request, message transmission, and device status information exchange, and may transmit/receive the related data in response to this.

Figure 7:
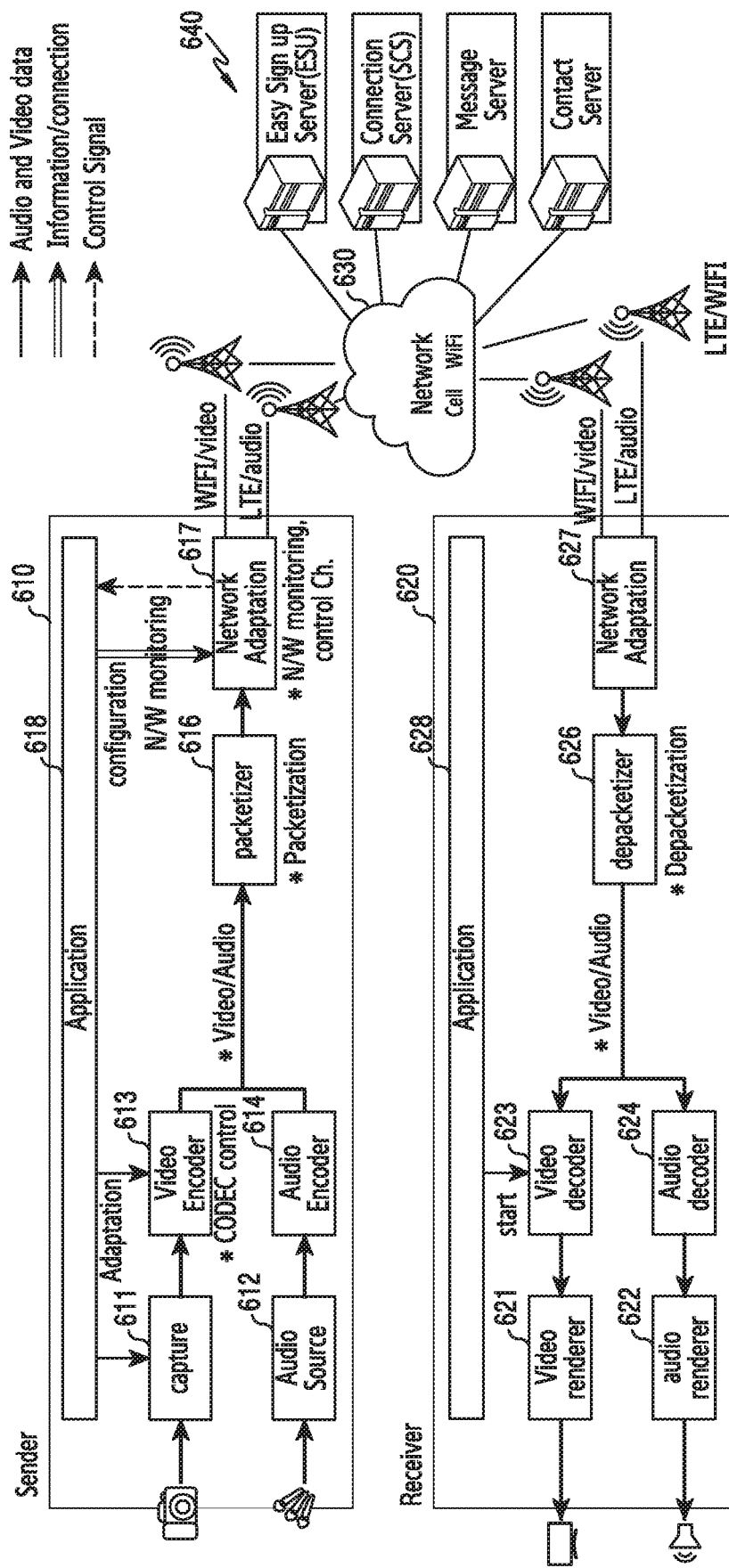
FIG. 7 is a diagram illustrating another example of a system including an electronic device according to various embodiments of the present disclosure.

FIG. 7 is a diagram illustrating another example of a system including an electronic device according to various embodiments of the present disclosure.

Referring to FIG. 7, an example of processing data is illustrated in various embodiments. For example, an example in which communication channels (e.g., a video communication channel and an audio communication channel) are separated to process data is illustrated. According to various embodiments, FIG. 7 illustrates case in which data is transmitted and received using a separate communication means (e.g., at least one of a communication channel, a communication port, and a communication path) for each of video data and audio data.

According to various embodiments, an operation example of processing data using the muxer 615 of FIG. 6 as an example will be described as follows.

According to various embodiments, video data and audio data may be transmitted separately through different communication channels or communication ports. In such a case, as shown in FIG. 7, the muxer 615 for synthesizing video data and audio data may not be needed.

According to one embodiment, the muxer 615 may also be used to synthesize the same kind of data. For example, when two videos are received from two or more cameras, the two videos may be synthesized through a video muxer. By way of another example, when voice data input through a microphone and audio data (e.g., MP3 file, background music stream, or the like) stored or being reproduced in the electronic device 500 are synthesized, two audio data may be synthesized through an audio muxer. According to various embodiments, the multiplexer 615 may serve as a video composer and an audio composer.

According to one embodiment, in addition to the video muxer and the audio muxer, another muxer that synthesizes the synthesized video data with one or more audio data or the synthesized audio data with one or more video data may be provided. In this manner, according to various embodiments, the multiplexer (or muxer) may include a module for synthesizing different types of media.

According to various embodiments, an operation example of processing data using a composer (e.g., video composer or audio composer) as an example will be described as follows.

According to one embodiment, the video composer may include various methods of synthesizing videos (e.g., images) to be output to the screen of the display. For example, the video composer may hierarchically synthesize a plurality of videos, may assign transparency to a specific video such that the specific video can be viewed together with a video disposed in a lower layer, may provide a picture in picture (PIP) or picture by picture (PBP) function, or may provide a GUI associated with a user's interaction such that the GUI can be viewed together with a video or a still image.

According to one embodiment, the audio composer may be used to synthesize a plurality of sound sources to generate a single audio stream, or may be used to provide audio effects to the plurality of sound sources. For example, it is possible to add effects such as increasing the sound pressure of a specific sound source with respect to sound sources input through two or more microphones, performing synthesis to give a stereo effect, adjusting an equalizer for the sound source, removing noise, increasing clarity in a specific range, imparting a sense of space, and the like.

According to various embodiments, an operation example of processing data using a network as an example will be described as follows.

As illustrated in FIG. 7, the video data and audio data may be transmitted using different communication networks. For example, video data encoded in the first electronic device 610 may be transmitted to the second electronic device 620 using a Wi-Fi network, and audio data encoded in the first electronic device 610 may be transmitted to the second electronic device 620 using a cellular network. According to one embodiment, when the first electronic device 610 and the second electronic device are required to share video data while performing a voice call with each other via the cellular network, a user may operate a camera to encode a captured video or a still image, and may transmit the encoded data to the Wi-Fi network. In another embodiment, the network may be operated separately for transmission of control signals or files.

According to another embodiment, video data and audio data may use the same communication network, for example, a cellular network, and may be transmitted using different port numbers. For example, a port number for video communication, a port number for audio communication, a port number for control signal, and the like may be separately set, and each electronic device may transmit data using the corresponding port according to the type of data to be transmitted.

According to another embodiment, different types of data ray be transmitted using the same pair of port numbers regardless of the data type. For example, when a packet including an original pair of port numbers corresponding to a data type of a packet is generated, the generated packet is transmitted using the same port number, and then the transmitted packet is depacketized in an electronic device (e.g., the second electronic device 620) of a receiver, a corresponding port number may be obtained together with corresponding data and data corresponding to a corresponding port may be transmitted using the obtained port number, thereby providing the same effect as transmitting the corresponding packet to different ports according to the data type. According to one embodiment, the first electronic device 610 may multiplex the encoded video, the encoded audio, and the control signal to generate a packet in an RTP stream and transmit the generated packet to the second electronic device 620. The second electronic device 620 may reconstruct each piece of data through demultiplexing which maps the type of the data and the port number using a port number field in the internal data structure of the RTP stream. According to another embodiment, the original pair of port numbers may be tracked or monitored while each piece of data is packetized and transmitted to one port, and thereby the corresponding data may be processed when the second electronic device 620 receives data.

Figure 8:
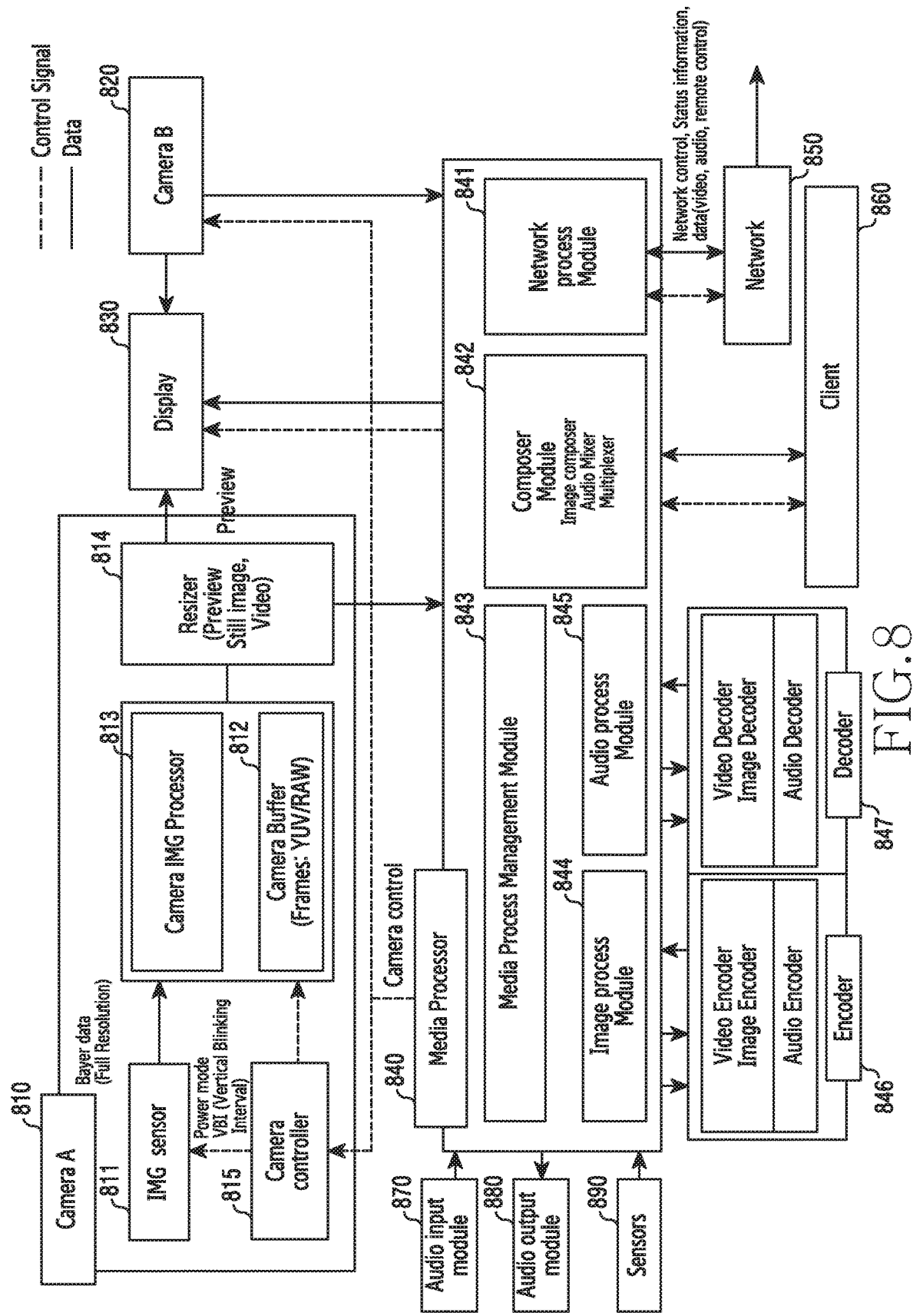
FIG. 8 is a diagram illustrating a video processing operation in an electronic device according to various embodiments of the present disclosure.

FIG. 8 is a diagram illustrating a video processing operation in an electronic device according to various embodiments of the present disclosure.

Referring to FIG. 8, dashed lines may indicate the propagation path of a control signal and solid lines may indicate the propagation path of data.

Referring to FIG. 8, the video processing operation according to various embodiments may include processing Bayer data (e.g., raw data) received through one or more cameras 810 and 820 to store the processed Bayer data in a camera buffer 812, encoding the stored data to be generated in the form of a still image or a video, and storing the encoded data in a memory (e.g., the memory 550) or transmitting the same to another electronic device via a network 850. In addition, the cameras 810 and 820 may transmit a preview image processed for display to a display buffer (not illustrated) of a display 830 to display the transmitted preview image on the display 830. The electronic device 500 may receive data received from another electronic device, via the network 850, and may decode the received data to output the decoded data via the display 830 and an audio output module 880 (e.g., a speaker or an earphone). According to various embodiments, the video processing operation may be performed through the control of a media processor 840.

Referring to FIG. 8, in various embodiments, the process by the cameras 810 and 820, for example, Bayer data generated through an image sensor (IMG sensor) 811 may be stored in the camera buffer 812 (e.g., a ring buffer), may be subjected to image processing by a processor (e.g., a camera controller 815 or a camera IMG processor 813) inside the cameras 810 and 820, and then may be transmitted to the display buffer or an encoder 846. Alternatively, according to one embodiment, the Bayer data may be first subjected to image processing, may be stored in the camera buffer 812, and then may be transmitted to the display buffer or the encoder 846.

According to various embodiments, the cameras 810 and 820 may include the IMG sensor 811, the camera buffer 812 (e.g., a ring buffer), the camera IMG processor 813, a resizer 814, a camera controller 815, and the like. In various embodiments, the camera controller 815 may receive a control signal through the media processor 840 or the camera IMG processor 813, and thereby may control components of the cameras 810 and 820.

The IMG sensor 811 may collect Bayer data through a camera sensor using one or more or a CCD, a CMOS, and an IR optical sensor. According to one embodiment, the IMO sensor 811 may be controlled by the camera controller 815 and may or may not receive a video according to power on/off. According to one embodiment, a plurality of IMG sensors may be incorporated in one electronic device. According to one embodiment, the electronic device 500 may include a front camera (e.g., camera A 810) and a rear camera (e.g., camera B 820) in such a manner that they face each other. According to another embodiment, the electronic device 500 may incorporate therein an RGB camera and an IR camera at adjacent positions on one plane thereof. According to various embodiments, the electronic device 500 may measure a distance between an, object and a camera together with the video of the object through the RGB camera and the IR camera. In various embodiments, the electronic device 500 may acquire different videos according to the direction of the camera or a difference in the area of the received video by disposing a plurality of RGB cameras on the same plane, and therefore the acquired videos may be used as basic information to generate a stereo image or a 3D image.

The camera buffer 812 may store the video received by the IMG sensor 811. According to one embodiment, the video received by the IMG sensor 811 may be subjected to video processing by the camera IMG processor 813 and then may be stored. The video stored in the camera buffer 813 may be transmitted to the camera IMG processor 813 or the media processor 840 to be subjected to image processing.

According to one embodiment, the image stored in the camera buffer 812 may be transmitted to and displayed on the display 830.

According to one embodiment, the camera buffer 812 may be a line array type buffer or a frame buffer. For example, the line array buffer may store pixels constituting a Bayer image or a YUV/RGB image constituting an image in a one-dimensional manner. For example, the frame buffer may store pixels constituting a Bayer image or a YUV/RGB image constituting an image in a one-dimensional manner. According to one embodiment, the camera buffer 812 is provided as a ring buffer to store a plurality of videos in chronological order so that, when the buffer is all filled, the oldest video may be removed and new images may be filled therein. Accordingly, since the previous image storage position may be determined from the position where a currently received image is stored to an n-th position, the previously received image may be searched and used as needed.

According to one embodiment, the one or more camera buffers 812 may be disposed to be dedicated to one camera sensor, or a plurality of cameras may be used in common. For example, in the case of FIG. 8, a dedicated buffer exists for each camera sensor. For example, the camera buffer 812 in the electronic device 500 in which two or more cameras 810 and 820 are incorporated may alternately store videos received through the respective camera sensors or may store the same in each separate memory area.

According to various embodiments, an interval at which an image received and stored in the camera buffer 812 or transmitted to the camera IMG processor 813 may be set by the control signal of the camera controller 815. For example, a frame rate may be adjusted by adjusting vertical blanking intervals (VBI). The VBI is a time interval from the reception of the last line of the image received from the camera sensor (e.g., the IMG sensor 811) to the reception of the first line of the next image or a time interval between the last received image frame and the next received image frame. According to one embodiment, even when the images received from the plurality of camera sensors share the camera buffer 812 or the camera IMG processor 813, the images received from the respective IMG sensors 811 may be separately stored or transmitted by adjusting the VBI. The VBI may be set or changed through the camera controller 815 so that the frame rate of each camera sensor received through the cameras 810 and 820 may be determined and accordingly synchronization for receiving and processing images may occur in the camera IMG processor 813 and the camera buffer 812. According to various embodiments, the camera buffer 812 may further include depth information or transparency information for ea pixel or a set of predetermined pixels.

The camera IMG processor 813 may convert the Bayer image received through the camera sensor (e.g., the IMG sensor 811) into a color space (e.g., YUV, RGB, or RGBA) to transmit the converted result to the camera buffer 812 or the media processor 840. According to one embodiment, the camera IMG processor 813 may perform video processing related to correction of an error or distortion of the received image, changes in color or size, and the like. The camera IMG processor 813 may sequentially process each video processing function using a pipeline or drive selectively only necessary function, and may change or set a parameter of a specific function in consideration of the result of the previous processing.

According to various embodiments, the image processing functions that are processed by the camera IMG processor 813 may include, for example, bad pixel correction (BPC), lens shading (LS), de-mosaicing, white balance (NB), gamma correction, color space conversion (CSC), hue, saturation, contrast (HSC), size conversion, filter (e.g., high pass filter or low pass filter), video analysis module, and the like.

The BPC is a technique for correcting, when an error occurs in a pixel unit, the error using color values of surrounding other pixels, the LS is a technique for correcting image distortion occurring at the outer edge of an image due to the lens, the de-mosaicing (or de-Bayering) is a technique for converting a Bayer image into an RGB image, the WB is a color constancy technique for correcting distortion caused by illumination of an image, the gamma correction is a technique for correcting the color affected by the image sensor 811 or the display 830, the HSC is a technique for improving color, brightness, and contrast using a color space model, and the CSC is a color model conversion technique (e.g., conversion from RGB to YUV color model).

The video analysis module may analyze a processed image and may transmit a signal to the camera controller 815 according to the analyzed result, thereby adjusting the type and intensity of the image processing. For example, blurring or brightness information of pixels may be analyzed to provide a function such as auto exposure or auto focus, and the analyzed information may be controlled based on depth information.

The resizer 814 may be performed through the camera IMG processor 813, and may be configured as a separate module. The resizer 814 may indicate a module for setting or controlling the size or resolution of an image processed through the camera IMG processor 813 or an image stored in the camera buffer 812. For example, the resizer 814 may convert maximum image data received through the IMG sensor 811 so as to have a specific resolution, or may extract a part of the maximum image data and convert the extracted image data according to the specific resolution. The resizer 814 may set the size or area of at least one of a moving image, a still image, or a preview image. The resizer 814 may set the size or area of an image to be displayed on the display of the transmission electronic device. The resizer 814 may set or change the resolution or pixel area of an image to be encoded. The resizer 814 may set or change the resolution or pixel area of a still image to be encoded. The resizer 814 may set the size or resolution of an image to be displayed on the display 830 or encoded, when a control signal for a zoom (e.g., zoom-in/out) operation is input. According to one embodiment, the resizer 814 may be operated in conjunction with digital zooming.

The camera controller 815 may receive a control command via the media processor 840 or the camera IMG processor 813 and may control the components of the cameras 810 and 820. The camera controller 815 may control interleaving adjustments (e.g., VPI) of a capture command time for multiple cameras and camera functions (e.g., one of frame rate, zoom level, exposure level, focus, and lighting control). The camera controller 815 may control image processing functions (e.g., BPC, LS, de-mosaicing, WB, gamma correction, CSC, HSC, size conversion, filter, and image analysis module) through the camera IMG processor 813.

The camera controller 815 may control the camera IMG processor 813 to change or set parameters of a selected specific function. For example, the camera controller 815 may perform operations such as image conversion and noise reduction by changing the parameters according to the algorithm of a filter function. According to one embodiment, the camera controller 815 may receive a feedback on the image analysis result via the camera IMG processor 813, and thereby may perform control for the camera IMG processor 813. For example, in order to perform auto focus, the camera IMG processor 813 may obtain a variance value of adjacent pixels around a reference pixel for focusing, may determine a blurring level through the obtained variance value, and then may determine a focus level to transmit the determined focus level to the camera IMG processor 813.

The camera controller 815 may control a camera power mode. For example, the camera controller 815 may control a camera off mode (e.g., IMG sensor 811 power off), a standby mode (e.g., IMG sensor 811 power on or image reception or processing off), a camera driving mode (e.g., IMG sensor 811 power on or image reception and processing on), and the like. The camera controller 815 may control the image received through the IMG sensor 811 to be transmitted to the media processor 840. The camera controller 815 may extract one or more images stored in the camera buffer 812 and may control the extracted image to be transmitted to the media processor 840. For example, one or more images may be selected based on time information transmitted by the media processor 840 among the images stored in the camera buffer 812 and the selected image may be transmitted to the media processor 840 or the camera IMG processor 813. To this end, the camera controller 815 may change the resolution, size, or ratio of the image through the resizer 814 and then transmit the image.

The camera controller 815 may control a plurality of image sensors and the related module. For example, the camera controller 815 may include a camera driver (not illustrated) for controlling submodules of the cameras 810 and 820 under the control of the media processor 840. According to one embodiment, it is possible to control one or more of a plurality of IMG sensors, a plurality of camera buffers, a plurality of camera IMG processors, and a plurality of resizers through one camera controller 815. The camera controller 815 may control power modes of the plurality of EMG sensors and modules associated with the IG sensors. The camera controller 815 may control one or more of the function of each camera and image processing functions using the image processor 813. The camera controller 815 may control to mix a plurality of images received through the plurality of IMG sensors to generate mixed images such as PIP or PBP.

Referring to FIG. 8, in various embodiments, the media processor 840 may include a module for performing one or more of collecting, processing, storing, and transmitting video data, audio data, and a control signal. For example, the media processor 840 may include one or more of a separate chip, a system on chip (SOC), and software modules.

The media processor 840 may receive images from the cameras 810 and 820, may perform predetermined video processing on the received images, may transmit the video-processed images to the encoder 846, may receive an encoded video or an encoded still image, which is processed and generated by the encoder 846, and may output the received video or image to the display 830 or transmit the same through the network 850. According to various embodiments, encoding setting information may be determined according to network connection attributes (e.g., speed) and device attributes (e.g., resolution, display type, window size, etc.) of a video service receiving electronic device.

The media processor 840 may decode encoded media, which is transmitted from another electronic device and received through the network 850, through a decoder 847, and may control the decoded media to be output through one or more of the display 830 and the audio output module 880 (e.g., a speaker, an earphone, or the like).

The media processor 840 may control one or more of the cameras 810 and 820, the encoder 846, the decoder 847, an audio output module 880, sensors 890, the network 850, a client 860, and the display 830 based on signals received through the sensors 890, the client 860 (e.g., application), the network 850, or the audio input module 870 (e.g., a microphone).

According to various embodiments, the media processor 840 may include a media process management module 843, an image process module 844, a composer module 842, an audio process module 845, a network process module 841, and the like.

The media process management module 843 may perform control of each module of the media processor 840. For example, the media process management module 843 may control various functions (e.g., video app and instruction exchange, data transmission/reception control via a network, image processing, etc.) for the video service.

The media process management module 843 may control the cameras 810 and 820. For example, the media process management module 843 may transmit a control signal to the camera controller 815 for one or more camera modules, and thereby may process one or more of camera module initialization, camera power mode control, camera function control, processing (e.g., in-buffer image retrieval or VBI control) of the camera buffer 812, captured image processing, size control, camera function pause, and resume.

When controlling the plurality of cameras 810 and 820, the media process management module 843 may selectively drive the plurality of cameras 810 and 820 or may transmit a control command for synthesizing images from the plurality of cameras 810 and 820 to one or more camera controllers 815. The media process management module 843 may transmit, to the camera controller 815, a command such as a region (e.g., region of interest (ROI)) for image control or a level setting of the camera function.

The media process management module 843 may control the camera controller 815, thereby controlling camera image photographing and processing functions to be controlled. For example, the media process management module 843 may control one or more of auto focusing, auto exposure, resolution, bit rate, frame rate, camera power mode control, vertical blinking intervals (VBI), zoom, gamma, and white balancing.

The media process management module 843 may control image processing. For example, the media process management module 843 may transmit the images received via the cameras 810 and 820 to the image process module 844 and may control image processing to be performed.

The media process management module 843 may control audio processing. For example, the media process management module 843 may receive audio data generated by the audio input module 870 (e.g., a microphone), the network (e.g., a wireless microphone), or a media player (not illustrated) and may control the audio process module 845 and the audio output module 880 (e.g., a speaker or an earphone) to process noise reduction, giving sound effect, sound pressure control, feeling of sound field, equalizer adjustment, and the like.

The media process management module 843 may transmit one or more of image and audio to the encoder 846 and may control the encoder 846 to perform encoding of media. The media process management module 843 may transmit an encoded video or still image or encoded audio to the network 850 to control the network 850 to transmit the transmitted image or audio to another electronic device.

The media process management module 843 may control video processing on the video received via the network 850. For example, the media process management module 843 may control the decoder 847 (e.g., a video decoder), the image process module 844, the network process module 841, and the display 830 to decode the encoded video received via the network and to transmit the decoded video to the display 830.

The media process management module 843 may control the decoder 847 (e.g., an audio decoder), the audio process module 845, the network process module 841, and the audio output module (e.g., a speaker, an earphone, a headphone, or the like) to decode the encoded audio received via the network and to transmit the decoded audio to the audio output module (e.g., a speaker, an earphone, a headphone, or the like).

The media process management module 843 may transmit a control signal associated with the media process to another connected module based on the signal received from the user interface or the network, the sensors 890, or the cameras 810 and 820. According to one embodiment, it is possible to detect one or more of a battery status, a temperature, a process resource occupancy rate, and a memory status through the sensors 890, and may control modules associated with the media process and media transmission/reception based on measured values. For example, it is possible to detect a change in the resource through the sensors 890 and to change a frame rate, a bit rate, and a drop rate of video or audio according to the detected change.

The media process management module 843 may transmit one or more data of media and audio to the composer module 842 and may synthesize the transmitted data.

The image process module 844 may include, for example, a graphic processing module. The image process module 844 may control image processing such as two-dimensional (2D) or three-dimensional (3D) image processing, noise reduction, filtering, image synthesizing, color correction, color conversion, video transformation, 3D modeling, image drawing, augmented reality (AR) or virtual reality (VR) processing, dynamic range adjusting, perspective, sharing, transformation, resizing, edge extraction, region of interest (ROI), image matching, image segmentation, and the like.

The image process module 844 may perform a separate function which is not processed by the camera IMG processor 813. For example, the image process module 844 may be used when post-treatment is required, such as synthesizing of images received from the plurality of cameras 810 and 820, stereoscope image generation, depth-based panoramic image generation, or synthesizing another image (e.g., a GUI image provided by application or an image selected or drawn by a user) together with a camera image such as AR or VR, based on the results of the image processing performed by each camera 810 or 820.

According to one embodiment, the image process module 844 may perform biometric identification (e.g., iris, fingerprint, face, pose-based activity recognition, etc.), character recognition, handwriting recognition, image code recognition (e.g., barcode, quick response (QR) code, PDF-417, color code, etc.), machine vision such as object recognition, artificial intelligence, machine learning, and decision tree function. The image process module 844 may be interlocked with a database or learning engine of an external device in connection with performing various functions.

The audio process module 845 may receive audio generated by the audio input module 870 (e.g., a microphone), the network (e.g., a wireless microphone), or the client 860 (e.g., a media player) to process noise reduction, giving sound effect, sound pressure control, feeling of sound field, equalizer adjustment, and the like, and may transmit the processed audio to the encoder 846 (e.g., the audio encoder).

When the encoded audio received via the network is decoded by the decoder 847 (e.g., the audio decoder), the audio process module 845 may control the decoded audio to be transmitted to the audio output module (e.g., a speaker, an earphone, or a headphone) to correspond to a control signal input through the client 860 or a media process manager (e.g., a media process management module 843). According to one embodiment, the control signal may be received through the application, and thereby one or more functions of volume, sound field effect, equalizer, and reproduction function control (e.g., reproduction speed, rewind, fast forward, pause, stop, resume, etc.) may be controlled.

The audio process module 845 may include an audio encoder and an audio decoder.

The audio process module 845 may perform functions related to a voice recognition function. To this end, the audio process module 845 may transmit audio data to a server via the network, and then may receive the recognized result via the network 850. Alternatively, the audio process module 845 may perform functions in conjunction with a voice recognition engine (not illustrated) of a local device (e.g., the electronic device 500). According to one embodiment, the audio process module 845 may provide speech-to-text (STT) or text-to-speech (TTS) functions.

The network process module 841 may perform functions to establish, maintain, and control a communication session between a local device (e.g., an electronic device) and a remote device (e.g., another electronic device). The network process module 841 may support data transmission with a suitable protocol among various protocols. For example, one or more of RTP, UDP, TCP, and HTTP may be used to establish communications to communicate with a remote device or server.

The network process module 841 may transmit network status information or resource status information of the received remote device to the media process manager to control one or more of submodules of the media processor 840, for example, the cameras 810 and 820, the encoder 846, and the network 850, thereby determining a media specification (e.g., one or more of a frame rate or a resolution, a bit rate, a drop rate, VBI, a resizing level, and lower bit encoding). For example, the network process module 841 may predict an appropriate value of an upload bandwidth through the network status, may calculate an available data transmission amount according to the predicted value, and may transmit the calculated amount to the media process manager. The media process manager may determine the media specification corresponding to the data transmission amount and may transmit the determined media specification to the encoder 846, the network process module 841, or the cameras 810 and 820, thereby controlling one or more of data generation, encoding, and transmission.

According to one embodiment, the network process module 841 may monitor the status of the network using the network 850 and may dynamically determine and process the specification of the media according to the network status. The network process module 841 may control the processed media to be packetized and transmitted to a remote device (e.g., another electronic device). According to another embodiment, the network process module 841 may determine whether the media is to be transmitted to the remote device (e.g., another electronic device) according to the monitored result of the network status. In various embodiments, the network status may include one or more of one way delay, packet loss, roundtrip delay, calculation of bandwidth-based bit rate estimation value, and call service status (e.g., during call, dialing, incoming call, outgoing call, hold, or P2P connection status).

According to one embodiment, the network process module 841 may receive resource status information of the remote device transmitted from the remote device (e.g., another electronic device), and may control modules related to video or audio transmission/reception of the local device (e.g., electronic device) to correspond to the received information. For example, the network process module 841 may dynamically determine the specification of the media to transmit the media to the remote device or to receive the media of the remote device.

The network process module 841 may control the network 850 and the network 850 may adjust an amount of data to be transmitted according, to the control of the network process module 841. For example, the network 850 may determine drop rates of encoded video frames or whether the encoded video frames are transmitted, thereby reducing the amount of data.

The network process module 841 may control transmission according to the media type. According to one embodiment, the network process module 841 may multiplex and transmit/receive multiple data types through a single virtual communication channel. For example, when transmitting video data, audio data, and a control signal to the remote device (e.g., another electronic device), the network process module 481 may assign different port numbers according to the respective data types and may open ports of the local device (e.g., electronic device) and the remote device to establish each separate channel, thereby transmitting the video data, the audio data, and the control signal. According to various embodiments, the network process module 841 may perform multiplexing for network without establishing a channel for each data type and transmit the multiplexed data via one channel, and the remote device receiving the multiplexed data may identify and process the original pair of port numbers for each data type through demultiplexing.

In various embodiments, through multiplexing, a delimiter (or an identifier) may be assigned and packetized for each data type to transmit the video data, the audio data, and the control signal via one channel so that the video data, the audio data, and the control signal may be transmitted via one channel, for example, the same pair of port numbers. In various embodiments, through demultiplexing, the data types may be divided using the delimiter from the received packet and the original pair of port numbers may be assigned for each divided data type to perform depacketizing. Accordingly, the audio data, the video data, and the control signal (e.g., remote control) may be transmitted and received using one channel.

According to one embodiment, the remote device may control the media process management module 843 or the network process module 841 based on the control signal transmitted to the remote device, thereby controlling one or more of the cameras 810 and 820, the media processor 840, and the client 860. According to various embodiments, data including the control signal (e.g., remote control) which the electronic device 500 receives via the network 50 may be extracted (e.g., demultiplexed) via the network process module 841, and one or more of the cameras 810 and 820, the media processor 840, the network 850, and the client 860 may be controlled by controlling the media process management module 843 or the network process module 841 based on the extracted control signal.

The network process module 841 may separately manage audio (e.g., voice) communication and video communication. For example, audio communication (or audio transmission) may be performed via a cellular network, and video communication (or video transmission) may be transmitted to a remote device via a Wi-Fi network.

In receiving and processing data, the network process module 841 may process, when the network 850 of the local device receives one or more of the encoded video data, the encoded audio data, and the control command transmitted from the remote device, the received data. For example, the network process module 841 may transmit the received data to the decoder 847 to control the media to be decoded and to control demultiplexing and depacketizing of the received data. According to one embodiment, the network process module 841 may receive request transmissions and responses thereto to monitor the current network conditions from time and bandwidths thereof. According to one embodiment, the network process module 841 may check the resource status of the local device and may control the decoder 847 to determine a bit rate for reproduction, a frame rate, whether reproduction is performed, and the like through the media process management module 843.

According to one embodiment, the network process module 841 may perform synchronization based on a time stamp between media types of the received data. The network process module 841 may determine subscribed service networks of the local device and the remote device, and thereby may determine whether video data is transmitted and received and a video transmission/reception method.

The composer module 842 may function as a module for performing synthesis of media (e.g., video and audio), which is different from multiplexing performed by the network process module 841. The composer module 842 may be divided into a muxer that mixes the same data type and a multiplexer that mixes different data types. According to various embodiments, the composer module 842 may include at least one of an image composer, an audio mixer, and a multiplexer.

The composer module 842 may perform, for example, image synthesis, transparency processing, layer processing of each image, audio mixing, audio and video multiplexing, and audio path processing. For example, the composer module 841 may act as Android Surface flinger or Audio flinger of Android operating system (OS).

The composer module 842, e.g., the image composer may synthesize a plurality of images. For example, images received from a plurality of cameras may be synthesized, or images received from different devices may be synthesized. For example, the composer module 842 may synthesize an image received through the camera with a GUI provided through the application of the local device or the remote device. According to one embodiment, the composer module 842 may synthesize and display corresponding images in an overlay form so the synthesized image may be displayed on one screen, may synthesize the same in a PIP or PBP form, or may synthesize the same in a screen division form.

The composer module 842 may perform synthesis for each case to separately generate an image to be drawn on the display 830 of the local device and an image to be transmitted to the remote device, respectively. According to one embodiment, the composer module 842 may synthesize the corresponding images to display, on the display 830 of the local device, another GUI provided from the application of the local device based on a preview image received from the camera of the local device, the GUI selected through the application of the local device, and the control signal received through the remote device. For example, the composer module 842 may synthesize the preview image, a local GUI, and a remote control-based GUI. For example, the composer module 842 may synthesize a preview video, a local GUI, and a remote control-based GUI. According to one embodiment, the composer module 842 may synthesize only a video image of the local device and the GUI selected through the application of the local device for a video stream to be transmitted to the remote device. For example, the composer module 842 may synthesize the preview image and the local GUI.

According to various embodiments, the preview image and the video image may differ in resolution or size from each other. For example, when the resolution of the local device is quarter video graphic array (QVGA), the composer module 842 may generate the corresponding size for the display 830 as the size of each graphic element in accordance with the QVGA size. Alternatively, when the resolution of the video to be transmitted to the remote device is FHD, the composer module 842 may adjust a ratio of the size of the local GUI in accordance with an object size of the FHD. This is because the resolution of the display 830 of the remote device may be different from that of the local device, the requested resolution may be different, or the resolution of the display 830 of the remote device may vary depending on the application for storage.

The composer module 842 may include various methods for synthesizing images to be displayed on the screen. For example, multiple images may be synthesized hierarchically, or transparency may be assigned to a specific image so that the specific image may be viewed together with an image disposed in a lower layer.

The composer module 842, for example, the audio composer may be used to synthesize multiple sound sources to produce one audio stream, or to provide audio effects for multiple sound sources. For example, the composer module 842 may synthesize sound sources input through two or more microphones into one, may increase the sound pressure of a specific sound source during synthesis, or nay synthesize the same to give a stereo effect. In addition, the composer module 842 may add effects such as adjusting an equalizer for a sound source, reducing noise, enhancing clarity in a specific range, or giving a sense of space.

According to various embodiments, as to the sound sources, audio reproduced using the media player of the local device as well as the audio input module may be synthesized with the sound source input to the audio input module 870 (e.g., a microphone), or may be synthesized with sound sources different from audio output through the audio output module 880 (e.g., a speaker, an earphone, or the like).

According to various embodiments, the composer module 842 may be included in the image process module 844 or the audio process module 845.

The encoder 846 may perform encoding according to a bit rate, a frame rate, a drop rate, an encoding codec type, and the like. According to various embodiments, the encoder 846 may include, one or more of, for example, a video encoder, an audio encoder, and an image encoder. The result encoded by the encoder 846 may be generated in the form of streams or files.

The decoder 847 may perform decoding of a video stream, an audio stream, a media file, and the like. According to various embodiments, the decoder 847 may include one or more of, for example, a video decoder, an audio decoder, and an image decoder.

According to various embodiments, the encoder 846 and the decoder 847 may be separate hardware or software modules.

The network 850 may include a wired or wireless modem for transmitting and receiving data or an antenna that is connected to at least one of a cellular network such as GSM, CDMA, or LTE, a local network such as Wi-Fi or Bluetooth, and a wired network.

The network 850 may perform packetizing of the data to be transmitted and depacketizing of the received data. In addition, the network 850 may separate or collect the received data for each data type.

The network 850 may transmit the data received via the network to the network process module 841. The network 850 may perform power on/off or transmission/reception control under the control of the network process module 841.

The network 850 may include a network buffer (not shown) for storing one or more of encoded video, encoded audio, or a control command for data packetizing. According to various embodiments, the amount of data to be transmitted may be adjusted using the data stored in the network buffer and the control of the network process module 841. For example, the network 850 may determine drop rates of encoded video frames or whether the encoded video frames are transmitted, may process the data stored in the network buffer according to the determined information, and may packetize data according to the processed result to transmit the packetized data to another electronic device, thereby adjusting the amount of data.

According to one embodiment, the network 850 may be included in the network process module 841, or may be implemented to perform the function of the network process module 841 in a separate chip (e.g., communication processor (CP)).

The client 860 (or application) may be a software module for providing call and media transmission/reception services and receiving a user input for performing local and remote control commands, and may be, for example, a standalone application or an application submodule.

The client 860 may receive a user input (e.g., pointing, position, gesture, voice input, gaze tracking, etc.) and may transmit the received user input to the media processor 840, and thereby may control one or more of the cameras 810 and 820, the media processor 840, the network 850, the encoder 846, and the decoder 847.

The client 860 may include various GUI elements for displaying information and the various GUI elements may be displayed according to the user input, the command of the remote device, and the control of the media processor 840. According to one embodiment, the client 860 may be a telephony application capable of video communication. According to one embodiment, the client 860 may be a communication application that can control screen operations as needed during video transmission and reception. According to one embodiment, the client 860 may be a remote control application that can control the function of the remote device on the local device.

The sensors 890 may include at least one of a sensor for sensor motion recognition (e.g., an acceleration sensor or a gyro sensor), a sensor for pose recognition of an electronic device (e.g., a gyro sensor or a geomagnetic sensor), a sensor (e.g., a proximity sensor or a touch sensor) for proximity recognition, an optical sensor, and a biosensor (e.g., a heart rate sensor, an electrocardiogram sensor, a blood pressure sensor, a fingerprint sensor, or an iris sensor).

According to various embodiments, the electronic device 500 may include various input and output devices. For example, the electronic device 500 may include the display 830, the audio input module 870, the audio output module 880, etc., and may further include a TSP (not shown), a mouse (not shown), a gaze tracking device (not shown), and the like.

Figure 9:
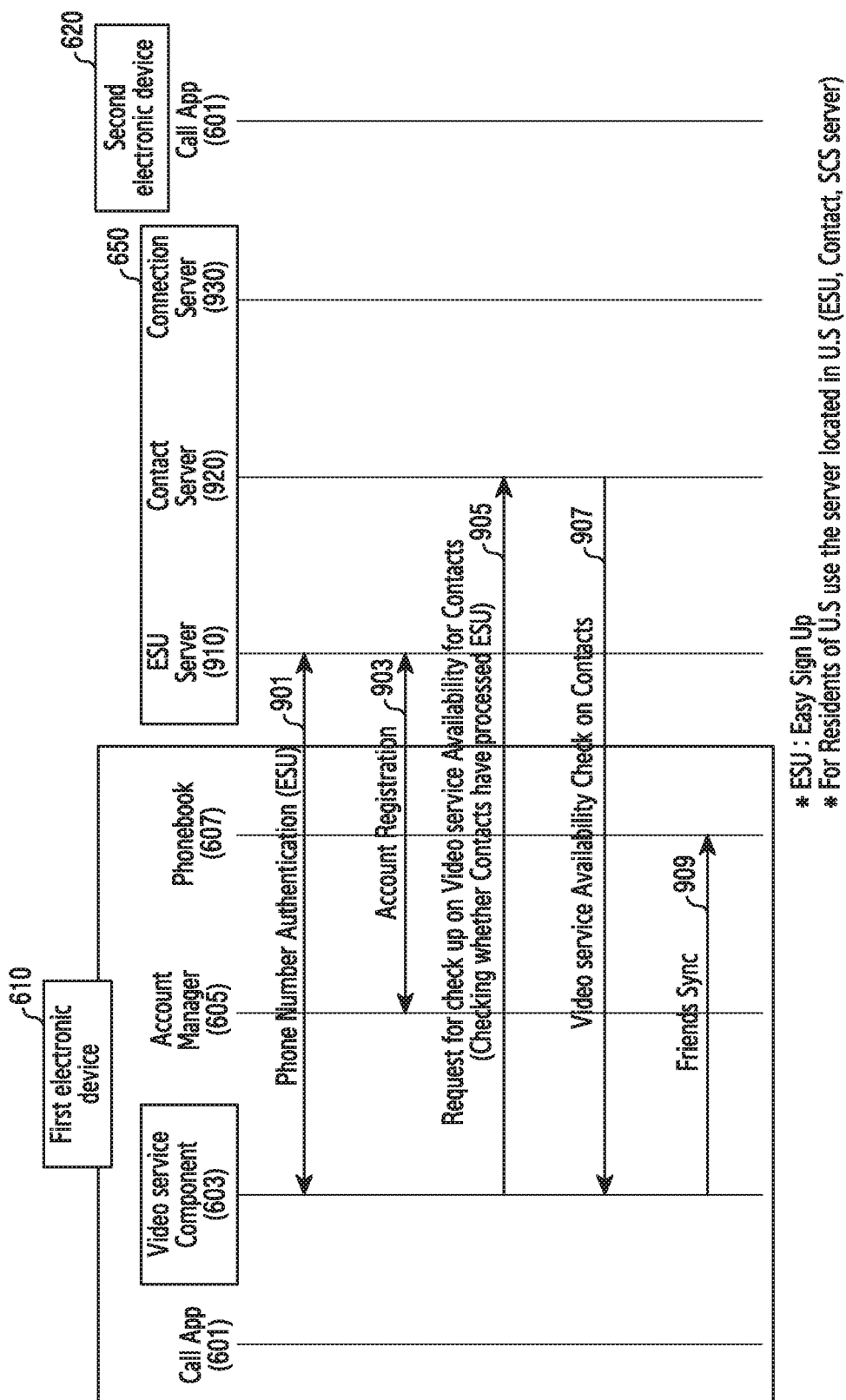
FIG. 9 is a diagram illustrating a registration operation of a video service in a system according to various embodiments of the present disclosure.

FIG. 9 is a diagram illustrating a registration operation of a video service in a system according to various embodiments of the present disclosure.

As illustrated in FIG. 9, in various embodiments, an example of service registration procedures is illustrated as a video service initial setup operation for video service between electronic devices. In various embodiments, the video service may represent a service that is connected via a network to include real-time video communication or still image sharing and related functions. FIG. 9 illustrates service registration procedures for initiating the video service by performing data communication connection (e.g., P2P connection) for the video service through the server 650 of the second network 600 while the first electronic device 610 and the second electronic device 620 perform a voice call via the first network 400.

In various embodiments, a call app 601 is an application for configuring and displaying input and output for a user, and may be associated with other modules to process functions such as a general phone connection, a video service phone connection, an audio output mode (e.g., a receiver mode or a speaker mode), a keypad input, a mute (e.g., silent processing), etc. According to various embodiments, the modules for processing the above-described functions may include a video service component 603, an account manager 605 (e.g., Android account manager), a phone book 607, and the like.

In various embodiments, the video service component 603 is a module for a video service phone connection, and may transmit and receive control messages to and from the server 650 (e.g., an easy sign up (ESU) server 910) existing outside the electronic device 500, a contact server 920, a connection server 930 (e.g., SCS server), and the like. In addition, the video service component 603 may request and update the phone book 607 and address information (not shown) as an initial setup process for the video service. Inc video service component 603 may be a partial software module of the call mop 601, a separate app (application), or a module including an operating system (OS). According to one embodiment, the video service component 603 may include the media processor 840 or may be functionally connected thereto to be operated.

In various embodiments, the electronic device 500 may use the account manager 605 to obtain an account registered in the electronic device 500. According to one embodiment, the account manager 605 may be utilized when fetching specific account information (e.g., Google account information), and may also be used when requesting account information of another already installed application. According to one embodiment, the account manager 605 may use an account of an electronic device manufacturer or service company.

In various embodiments, the phone book 607 is a module used when a user registers a phone number or updates additional information in a previously registered phone book. In various embodiments, the phone book 607 may transmit and receive messages when registering and updating friends for the video service. According to one embodiment, the phone book 607 may include one or more of another user's contacts and video service subscription information.

In various embodiments, the server 650 may include, for example, the ESU server 910, the contact server 920, the connection server 930, etc.

The ESU server 910 may represent a server for managing and updating subscriber information from the electronic device 500 using the video service.

The contact server 920 may represent a server in which the address book of the phone book 607 of the electronic device 500 is stored and managed by an external server.

The connection server 930 may represent a separate server for establishing a P2P connection with another user's electronic device for video service connection. According to various embodiments, through the connection server 930, connection may be made between the electronic devices (e.g., the first electronic device 610 and the second electronic device 620) for video communication. According to one embodiment, the media transmitted by the first electronic device 610 may be processed and transmitted to the second electronic device 620. According to one embodiment, at least two or more server functions of the connection server 930, the contact server 920, and the ESU server 910 may be included in one server.

Hereinafter, a service registration process according to various embodiments will be described with reference to FIG. 9. In various embodiments, the service registration process may include five operations such as phone number authentication (operation 901), account registration (operation 903), request for check up on video service availability for contacts (operation 905), video service availability check on contacts (operation 907), friend synchronization (sync.) (operation 909).

Referring to FIG. 9, in an operation 901, as one embodiment, the electronic devices 610 and 620 may perform phone number authentication. For example, when a video service application is installed, the electronic devices 610 and 620 may transmit a message to the ESU server 910 to authenticate video service subscribers through the video service component 603. In various embodiments, the message may include an identifier (e.g., one or more a phone number, a MAE address, an electronic device serial number, and/or an email address) of an electronic device for video service registration and authentication. In various embodiments, the phone number authentication does not require a separate account, which can provide convenience in joining the video service.

In operation 903, the electronic devices 610 and 620 may perform account registration. According to one embodiment, the identifier or the electronic device may be transmitted for account registration of the electronic device. For example, the ESU server 910 having received a phone number authentication request message from the electronic devices 610 and 620 may perform an authentication operation on the electronic devices 610 and 620 based on a user's phone number. The ESU server 910 may transmit the authentication result to the account manager 605 of the electronic devices 610 and 620 when the authentication on the electronic devices 610 and 620 is completed and the account is registered in the server 650. In various embodiments, an account registration message may include information related to subscription to the video service. In various embodiments, the account registration message may include additional information associated with the electronic device for providing the video service, for example, one or more of software (e.g., OS or installed video service application), supportable specifications (e.g., mounted camera information, supported communication type, or multimedia and communication information (e.g., SIM, eSIM, or common carrier information).

In operation 905, the electronic devices 610 and 620 may perform request for check up on video service availability for contacts. For example, when the account manager 605 receives the account registration message, the video service component 603 may transmit an available confirmation message of the video service to the external contact server 920 based on video service account registration information and the identifier (e.g., phone number or the like) of the electronic devices 610 and 620. When receiving the message, the contact server 920 may perform whether an easy sign up process has been performed. In various embodiments, the message may include content that requests to determine whether other users subscribe to the video service.

In operation 907, the electronic devices 610 and 620 may perform video service availability check on contacts. For example, the contact server 920 may determine whether the video service subscription and availability is executed, which is requested by a user device, and may transmit the determination result to the video service component 603. For example, using electronic device-related additional information for providing the video service, whether video service subscription and availability is executed may be determined. According to one embodiment, the contact server 920 may determine whether the video service availability is executed using the electronic device-related additional information transmitted by the account manager 605 of the electronic devices 610 and 620 or in conjunction with the ESU server 910. According to one embodiment, when it is determined that the service of the common carrier to which the electronic device subscribes does not permit the video service, the contact server 920 may transmit information indicating that the use of the video service is impossible to the video service component 603 of the electronic device.

In operation 909, the electronic devices 610 and 620 may perform friend sync. For example, the phone hook 607 may be changed using service subscription of the video service users received from the external server 650 and information on whether the video service application is installed. According to one embodiment, whether the video service is used for each user registered in the phone book 607 may be displayed on the phone book 607. In various embodiments, information on whether subscription and installation is executed may be periodically or non-periodically updated via the image service component 603 upon data change on the server 650.

In various embodiments, a method of installing an application for the video service, inducing update for the application, and deleting the application will be described.

In various embodiments, it is possible to induce the installation and/or update of the application in a voice call execution state.

For example, in a state in which a transmitter (e.g., the first electronic device 610) and a receiver (e.g., the second electronic device 620) execute a voice call prior to a video service switch, messages such as SMS, MMS, push message, and the like may be transmitted to the receiver in response to a request of the transmitter. When receiving the message, the receiver may display an address link (e.g., storing address, URL, etc.) capable of installing an application. In various embodiments, the address link may include a separate application such as a store app (application) capable of installing various types of applications. In addition, the address link may include an access address of a server (e.g., a store server, a market, a content server, or the like) capable of directly downloading an application.

In various embodiments, the receiver (e.g., the second electronic device 620) may determine permission or refusal of an application installation request, and may re-transmit the determination result to the transmitter in the same manner.

In various embodiments, it is possible to induce the installation and/or update of the application in the state before executing the voice call.

For example, prior to executing the voice call, a user may proceed to execute the voice call, including the installation of the application of the video service. According to one embodiment, the transmitter (e.g., the first electronic device 610) may transmit an application installation request for the video service together with a phone connection request. When a call is accepted by a user, the receiver (e.g., the second electronic device 620) may automatically install an application for the video service at the corresponding point of time. According to one embodiment, when the user of the receiver (e.g., the second electronic device 620) does not receive the call, the application may not be installed.

In various embodiments, the application installed in the receiver (e.g., the second electronic device 620) may be an application such as (the same) version (e.g., development purpose, service purpose, etc.) of the application installed in the transmitter (e.g., the first electronic device 610), or may be the latest version of application. According to various embodiments, when the application installed in the receiver is the latest version of application, the updating process may be included in both the transmitter and the receiver.

In various embodiments, when a video call according to the video service is terminated, an operation of deleting the corresponding application. (e.g., an application for the installed video service) may be executed in response to a user's request or automatically. In various embodiments, the deleting operation is omitted in the electronic device of the user, and may not be included in the server 650 (e.g., the ESU server 910, the contact server 920, the connection server 930, or the like).

As described above with reference to FIG. 9, according to various embodiments, before transmitting a message "request for check up on video service availability for contacts", the video service component 603 (e.g., chat agent) of the electronic device 500 (e.g., the first electronic device 610 as a caller device) may identify a contact DB within the electronic device to determine whether service subscription is executed. According to one embodiment, the video service component 603 may be included in the video service application, a phone application for a voice call, or the media processor 840.

According to various embodiments, where there are users who do not subscribe to the video service, the electronic device 500 may transmit a message "request for check up on video service availability for contacts" to the contact server 920 to further determine whether the users subscribe to the video service.

In various embodiments, in order to determine whether the users who have previously subscribed to the video service leave the same, the electronic device 500 may transmit a message "request for check up on video service availability for contacts" to the contact server 920 to further update the change.

According to various embodiments, the electronic device 500 may induce the users who do not subscribe to the video service to install and/or update the application, and may further provide a deletion function of the installed application.

According to various embodiments, with respect to a plurality of electronic devices authenticated with an electronic device identifier (e.g., the same phone number or the same email), whether the application for the video service is installed may be classified to update a contact list that has recently updated in the contact server 920, and thereby may match sync. To this end, additionally, it is possible to identify each of the plurality of electronic devices based on a unique identifier (e.g., MAC address or the like) of the electronic device and to synchronize the contact list between them using the contact server 920.

According to various embodiments, before the electronic device 500 transmits a message "video service availability check on contacts", the contact server 920 may partially filter whether a user subscribes to, installs, or registers the video service and may transmit the filter information. According to various embodiments, an object to be filtered may be filtered only by the number specified by a user's request. According to various embodiments, the object to be filtered may be filtered for numbers other than the number specified by the user's request. According to various embodiments, when communication subscriber information of the electronic device 500 is changed (e.g., a mounted SIM card is changed or information of eSIM is changed), the above-described service subscription process may be re-performed.

Figure 10:
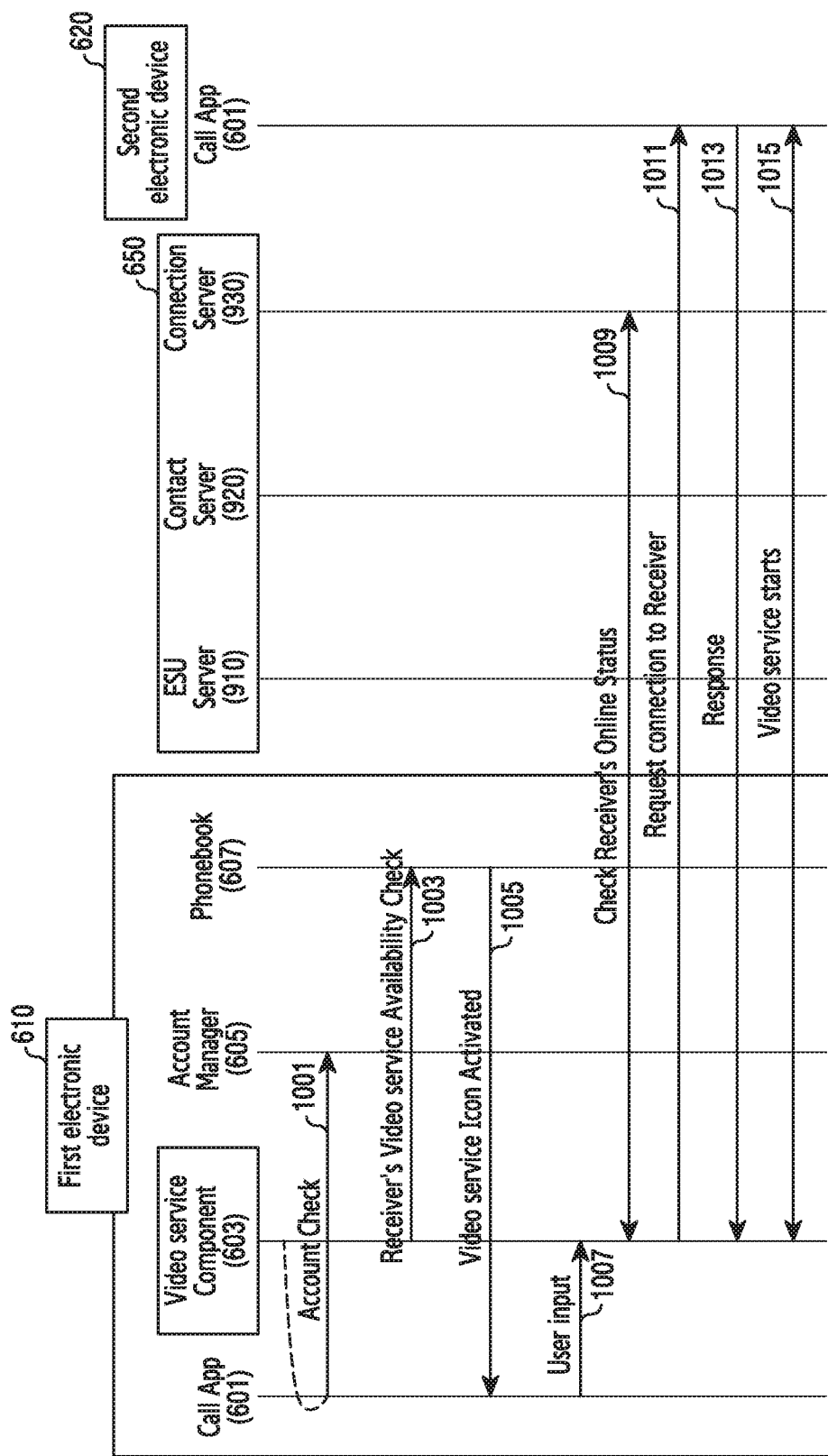
FIG. 10 is a diagram illustrating an activation operation of a video service in a system according to various embodiments of the present disclosure.

FIG. 10 is a diagram illustrating an activation operation of a video service in a system according to various embodiments of the present disclosure.

As illustrated in FIG. 10, in various embodiments, an example of activating a video communication function as a connection operation for the video service between electronic devices (e.g., the first electronic device 610 and the second electronic device 620) is illustrated. FIG. 10 illustrates an example in which the first electronic device 610 and the second electronic device 620 perform data communication connection (e.g., P2P connection) for the video service via the server 650 of the second network 600 to connect the video service while performing a voice call via the first network 400. For example, in the first electronic device 610, an example in which data communication is connected to the second electronic device 520 which is connected through the first network 400 and is in a voice call is illustrated.

In various embodiments, the connection operation may be performed during the voice call.

Referring to FIG. 10, in operation 1001, the electronic device 500 may perform an account check operation. For example, the call app 601 of the first electronic device 610 may perform the account check operation through the account manager 605. According to various embodiments, the account check operation may be performed independently of the call. In various embodiments, the account check operation may be performed by the video service component 603. In various embodiments, the account check operation may include an operation of identifying subscription information of an electronic device manufacture or a service company for the use of the video service or the application for the video service and an operation of determining whether the corresponding electronic device can be used. To this end, the video service subscription information may be identified using the contact server 920 or the ESU server 910, and the network quality between the two electronic devices 610 and 620 and the connection server 930 may be identified, or whether a client is installed or whether video communication is possible may be determined through the contact server 920.

In operation 1003, the electronic device 500 may perform a receiver's video service availability check operation. For example, the video service component 603 of the first electronic device 610 may perform check on whether a partner user (e.g., the second electronic device 620) is a user (or an electronic device) using the video service in the phone book 607.

In operation. 1005, the electronic device 500 may activate an object for the video service based on the checked result. For example, the first electronic device 610 may receive the checked result through the video service component 603 to transmit the received result to the call app 601, or the call app 601 may obtain the corresponding result value in a method (shown) (operation 1005) in which the call app 601 directly receives the checked result. In various embodiments, the call app 601 may activate or deactivate the video service function so that a user input can be received through an object (e.g., a service button, a service icon (e.g., a video communication icon) (hereinafter, referred to as a service object) for the video service based on the checked result, and may display the activated or deactivated video service function through the service object (e.g., a service button, text, video communication icon).

In operation 1007, the electronic device 500 may perform an operation corresponding to whether a user input is executed using the service object. For example, a user may provide inputs to the activated service object in various ways (e.g., touch, click, voice input, gesture recognition, etc.). In various embodiments, the user input may be transmitted to the video service component 603. In various embodiments, other signals (e.g., a call app driving signal, a video service icon activation signal, etc.) may be transmitted to the video service component 603, instead of the user input.

In operation 1009, the electronic device 500 may check the online status of the other party. For example, when the user input is transmitted, the video service component 603 of the first electronic device 610 may check the network status of the second electronic device 620 via the connection server 930. In various embodiments, as to the checked status, whether the second electronic device 620 is in a data communication enabled state, whether a network quality suitable for video communication is maintained, whether the second electronic device 620 is in an online maintenance state, or the like may be checked. For example, it is possible to check one or more of whether a P2P communication channel state between the first electronic device 610 and the second electronic device 620 is suitable for video communication and the network status (e.g., an uplink status of the first electronic device 610 or a downlink status of the second electronic device 620) for the second electronic device 620 to receive video data transmitted by the first electronic device 601. According to various embodiments, to check the online status, the video service component 603 of the first electronic device 610 may check the network quality via the server 650 (e.g., one or more the connection server 930 and a multimedia streaming server {not shown}) in order to transmit video information from the first electronic device 610 to the second electronic device 620 through the connection server 930.

In operation 1101, the electronic device 500 may request a connection from the other party based on the checked result. For example, the video service component 603 of the first electronic device 610 may request the connection from the second electronic device 620 when the service connection is made possible by the second electronic device 620 based on the checked result.

In operations 1013 and 1015, the electronic device 500 may start the video service when the other party accepts the connection. For example, in operation 1013, the second electronic device 620 may transmit a response to accept the connection request of the first electronic device 610 according to a user input. Accordingly, in operation 1015, the first electronic device 610 and the second electronic device 620 may be connected to each other. When the first electronic device 610 is connected to the second electronic device 620, the first electronic device 610 may be in a state capable of transmitting a video.

As described above with reference to FIG. 10, according to various embodiments, a process of checking whether subscription to the video service is executed may proceed in advance at the time of connecting a voice call, other than at the time of pressing the service object. For example, in FIG. 10, a message "receiver's video service availability check" may be transmitted at the time of connecting the voice call (e.g., incoming dialing or outgoing dialing) or after the voice call is connected.

In various embodiments, when data communication is unavailable during the voice call, for example, when the transmission of a message "check receiver's online status" is disabled in FIG. 10 due to problems (e.g., bandwidth, communication speed, etc.) in the common carrier's policies (e.g., video communication unavailability, bandwidth limitation, etc.) or the communication network (e.g., CDMA 2000 or 3G communication) performance, whether subscription to the video service is executed may be checked by transmitting the message "check receiver's online status" at the time of reconnecting the voice call through automatic redial, according to the user input by the service object.

Figure 11:
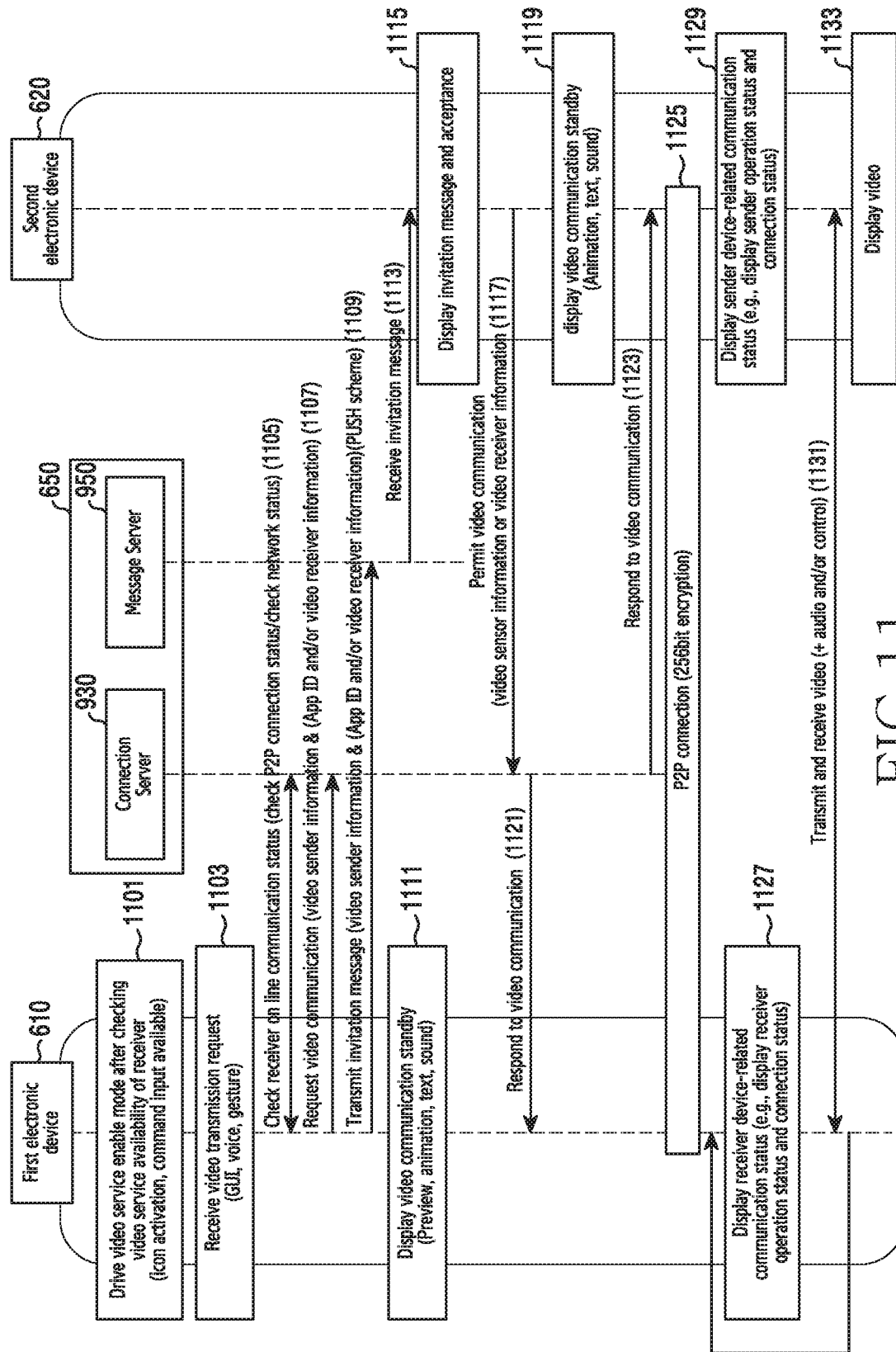
FIG. 11 is a diagram illustrating an activation operation of a video service in a system according to various embodiments of the present disclosure.

FIG. 11 is a diagram illustrating an activation operation of a video service in a system according to various embodiments of the present disclosure.

As illustrated in FIG. 11, in various embodiments, another example of activating a video communication function as a connection operation for the video service between electronic devices (e.g., the first electronic device 610 and the second electronic device 620).

In operation 1101, the first electronic device 610 (e.g., a video transmitting electronic device) may check the service availability of the second electronic device 620 (e.g., a video receiving electronic device) and may drive a video service function mode. For example, only when the service availability is determined and enabled, the service object (e.g., a service button or a video communication icon) may be activated and thereby a user input may be received.

According to various embodiments, the process of checking whether subscription to the video service is executed may proceed in advance at the time of connecting a voice call, other than at the time of pressing the service object. For example, in FIG. 11, a message "receiver's video service availability check" or a message "check receiver's online status" may be transmitted at the time of connecting the voice call (e.g., incoming dialing or outgoing dialing) or after the voice call is connected. In operation 1103, the first electronic device 610 may receive a video transmission request from a user. According to various embodiments, the video transmission request may be performed from a user input by an input via a GUI, an input via a voice, an input via a gesture, and the like. According to various embodiments, the first electronic device 610 that has received the user input for the video transmission request may be switched to a speakerphone mode.

In operation 1105, the first electronic device 610 may perform an online status check (e.g., P2P connection availability check or network status check) of the second electronic device 620 via the connection server 930 (e.g., an, SCS server). In various embodiments, as to the checked status, whether the second electronic device 620 is in a data communication enabled state, whether a network quality suitable for video communication is maintained, whether the second electronic device 620 is in an online maintenance state, or the like may be checked. For example, it is possible to check one or more of whether a P2P communication channel state between the first electronic device 610 and the second electronic device 620 is suitable for video communication and the network status (e.g., an uplink status of the first electronic device 610 or a downlink status of the second electronic device 620) for the second electronic device 620 to receive video data transmitted by the first electronic device 610. According to various embodiments, to check the online status, the video service component 603 of the first electronic device 610 may check the network quality via the server 650 (e.g., one or more the connection server 930 and a multimedia streaming server {not shown}) in order to transmit video information from the first electronic device 610 to the second electronic device 620 through the connection server 930.

In operation 1107, the first electronic device 610 may request a video communication (e.g., a video service connection) with the second electronic device 602 from the connection server 930 based on one or more of the checked result and a video transmission request reception (e.g., operation 1103). In various embodiments, the first electronic device 610 may include information (e.g., device information, user information, or the like) of the first electronic device 610 transmitting a video, information. (e.g., device information, user information, or the like) of the second electronic device 620 receiving, a video, app ID (e.g., an Android app package name, an app authentication key, a token value, an app version, and an app registration information), and the like, as request signals for a video communication connection.

In operation 1109, the first electronic device 610 may transmit, to a message server 950, a message request for video communication in order to transmit a video communications-related message to transmit a video communication-related message (e.g., an invitation message) to be transmitted to the second electronic device 620 or to transmit the video communication-related message to the second electronic device 620. In various embodiments, as in the above-described process, the video communication-related message may include the information of the first electronic device 610, the information of the second electronic device 620, the app ID, and the like. In various embodiments, in operation 1113, the video communication-related message may be relayed to the second electronic device 620 through the message server 950.

In operation 1111, the first electronic device 610 may transmit the video communication-related message and may display a video communication standby to provide the displayed information to a user. According to one embodiment, the first electronic device 610 may provide a preview (e.g., camera photographing information), animation effect, text (e.g., 'during connection'), sound (e.g., connection tone), and the like to the user.

In operation 1115, the second electronic device 620 which has received the video communication-related message (e.g., an invitation message) from the message server 950 may display a message including a minimal portion of the video communication-related message or corresponding thereto. For example, the second electronic device 620 may display, on a screen, a user interface that allows a user to receive whether to accept or decline the video communication request of the first electronic device 610. According to various embodiments, the second electronic device 620 may inform the user of the reception of the video communication-related message via sound, haptic, and the like.

In operation 1117, the second electronic device 620 may transmit information about the acceptance or declination of the video communication request to the connection server 930 according to the user input. For example, when the user accepts the video communication request via various input methods (e.g., GUI selection, voice input, gesture, etc.), the second electronic device 620 may transmit a video communication permission message to the connection server 930. In various embodiments, the video communication permission message may include one or more or the information of the first electronic device 610 transmitting a video and the information of the second electronic device 620 receiving a video.

In operation 1119, after transmitting the video communication permission message, the second electronic device 620 may display a video communication standby to provide the displayed information to the user. For example, the second electronic device 620 may provide animation effect, text (e.g., 'during connection'), sound (e.g., connection tone), and the like.

In operations 1121 and 1123, the first electronic device 610 and the second electronic device 620 may receive a response message (e.g., a video communication connection response) from the connection server 930. In various embodiments, operation 1121 may be performed after operation 1113 based on operation 1107, or may be performed after the connection server 930 receives a video communication permission (e.g., operation 1117)-related signal, based on operation 1117. In various embodiments, operations 1121 and 1123 may also be performed after a P2P connection (e.g, operation 1125). According to various embodiments, in operations 1121 and 1123, the response may include information indicating that the video communication is accepted or declined with respect to each electronic device or related information of the counterpart electronic device for the video communication.

In operation 1125, the first electronic device 610 and the second electronic device 620 may perform the P2P connection. In various embodiments, the P2P connection may be encrypted (e.g., 256 bit encryption) in various encryption schemes for security.

In operations 1127 and 1129, the first electronic device 610 and the second electronic device 620 may display the communication status (e.g., one or more a connection status, an operation state, a camera operation state, a video communication transmission or reception state) of the counterpart electronic device, after the P2P connection. For example, in operation 1127, the first electronic device 610 may display the communication status of the second electronic device 620 receiving a video, after the P2P connection. In operation 1129, the second electronic device 620 may display the communication sate of the first electronic device 610 transmitting a video, after the P2p connection. In various embodiments, after the P2P connection between the first electronic device 610 and the second electronic device 620, examples of an operation of displaying the communication status of the counterpart electronic device will be described in detail with reference to the drawings (e.g., FIG. 48 and the like) to be described later.

In operation 1131, the first electronic device 610 may transmit and receive a video to and from the second electronic device 620 based on the P2P connection, and may transmit and receive a voice and a control signal to and from the same.

In operation 1133, the second electronic device 620 may receive a video from the first electronic device 610, may display the received video, and may provide the displayed video to the user.

Figure 12:
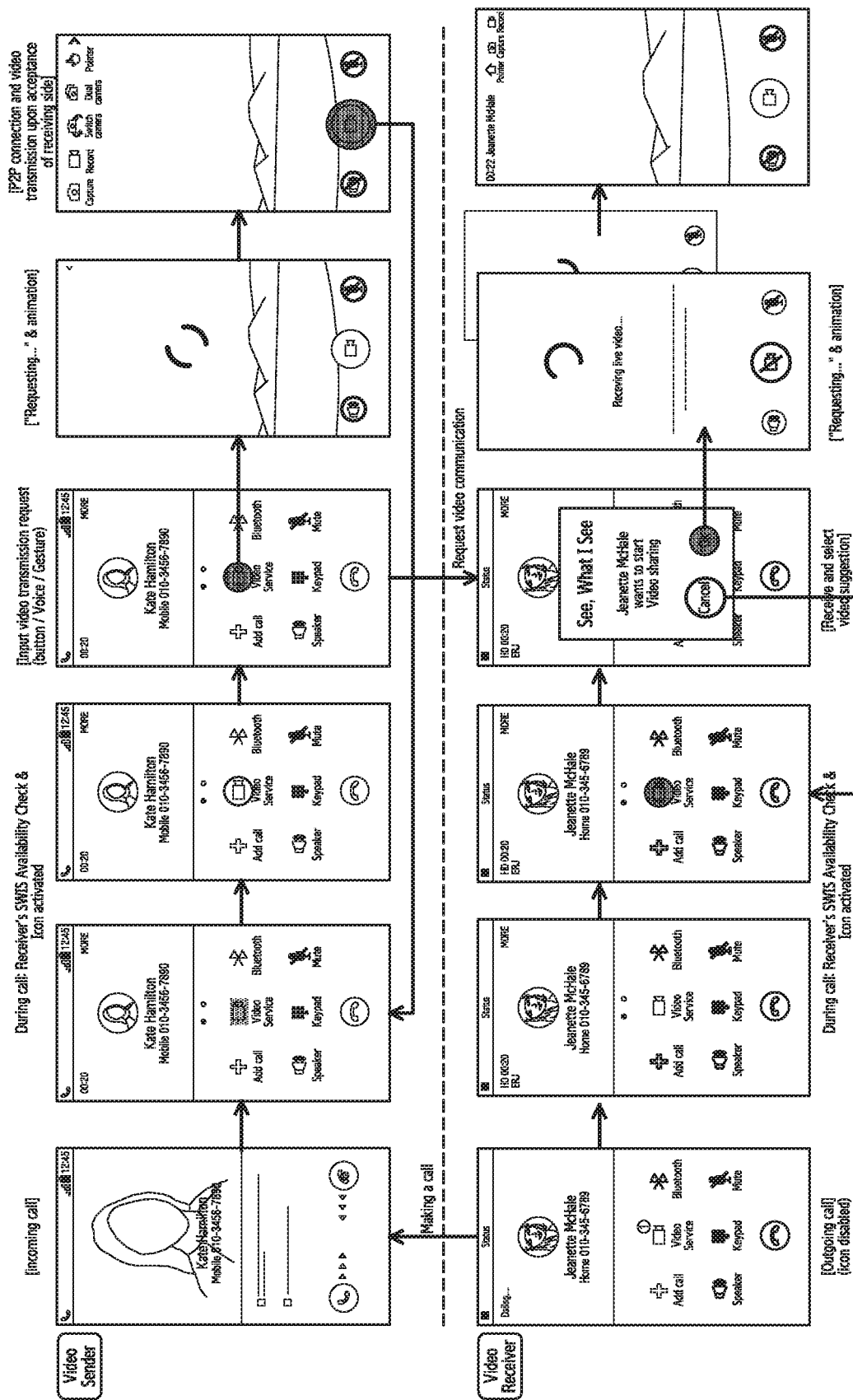
FIG. 12 is a diagram illustrating an operation of connecting a video service during a call in an electronic device according to various embodiments of the present disclosure.

FIG. 12 is a diagram illustrating an operation or connecting a video service during a call in an electronic device according to various embodiments of the present disclosure.

As illustrated in FIG. 12, an example of a user interface connecting a video service while a voice call is performed by connecting the voice call between a video sender (e.g., the first electronic device 610) and a video receiver (e.g., the second electronic device 620) is illustrated.

Referring to FIG. 12, the first electronic device 610 and the second electronic device 620 may check the video service availability of the video service during a call (voice call) between the sender and the receiver and may activate or deactivate a service object (e.g., a service button or a video communication icon) within the call app 601 and a function associated with the service object based on the checked result. To this end, the video service availability may be determined using one or more of the account manager 605, the phone book 607, the ESU server 910, the contact server 920, and the connection server 930. According to various embodiments, one user of the users of the first electronic device 610 and the second electronic device 620 (e.g., one of the sender and the receiver) may input a video transmission request to the electronic device in various schemes (e.g., activated service object selection, voice input, gesture input, etc.). FIG. 12 illustrates a case in which a user input for video transmission by the user of the first electronic device 610 occurs.

The first electronic device 610 may transmit a video communication request to the second electronic device 620 based on the user input during the voice call, and may provide a visual effect. (e.g., animation effect) indicating that the first electronic device 610 is in a video communication standby state until the second electronic device 620 agrees to the video communication. In various embodiments, a previously designated camera may be driven to display a preview moving image on a display screen.

When receiving the agreement of the second electronic device 620, the first electronic device 610 may perform the P2P connection with the second electronic device 620 during the voice call. When the P2P connection is established or completed, the first electronic device 610 and the second electronic device 620 may be automatically switched to a speakerphone mode. For example, in the video communication mode, usability may be improved by outputting a voice via a speaker (e.g., a speaker device capable of outputting a large volume) other than a receiver or by relatively increasing and outputting the output of audio.

According to various embodiments, when receiving the agreement of the second electronic device 620, the first electronic device 610 may perform a connection via the second electronic device 620 and a multimedia streaming server during the voice call. For example, when the first electronic device 610 transmits video or audio data associated with the video service to the multimedia streaming server, the multimedia streaming server may utilize account information of the second electronic device 620 and receiver online status information to generate image or audio streaming information to be reproduced in the second electronic device 620, and may transmit the generated information to the second electronic device 620.

When receiving the video communication request from the first electronic device 610 during the voice call with the first electronic device 610, the second electronic device 620 may provide a user interface capable (e.g., a pop-up window) of receiving whether the video communication is performed.

The second electronic device 620 may determine whether the video service is connected to the first electronic device 610 based on the user input by the pop-up window. When the video service connection is accepted, the second electronic device 620 may display that the second electronic device 620 is in a video communication standby state. When the video service connection is declined, the second electronic device 620 may be operated to display the previous user interface.

Referring to FIG. 12, in various embodiments, an example of an operation of performing the video service during the voice call between electronic devices (e.g., the first electronic device 610 and the second electronic device 620) will be described.

In the first electronic device 610 and the second electronic device 620, any one electronic device (e.g., the first electronic device 610) may drive an application (e.g., a communication application {e.g., call app}) to perform the voice call, and then may transmit a voice call request to the other electronic device (e.g., the second electronic device 620).

According to one embodiment, when the service object (e.g., a service button or a video communication icon) is deactivated during dialing and the voice call is connected, the first electronic device 610 may determine whether the service object is activated according to whether the video communication is possible between the two electronic devices 610 and 620.

According to various embodiments, when the electronic device (e.g., the first electronic device 610) to transmit a video among the two electronic devices 610 and 620 transmits a video communication connection request to the other electronic device (e.g., the second electronic device 620) using the service object, the other electronic device receiving the video communication connection request may determine whether the connection for the video communication connection request is executed.

According to various embodiments, when the video communication connection request is permitted, the other electronic device may connect the video communication between the two electronic devices 610 and 620, and the electronic device transmitting videos (e.g., the first electronic device 610) may transmit videos in real time. In various embodiments, the first electronic device 610 and the second electronic device 620 may change (e.g., from a receiver to a speaker) a device for outputting audio in the video call mode so that a user can conveniently use the video service, or may change the output of the audio.

According to various embodiments, after the video communication is first connected, audio may be transmitted together with the video. For example, when an application is driven and information (e.g., an ID) of the other electronic device to perform the video communication connection is determined, the electronic device may make the video communication request. As a result, when the counterpart electronic device permits the video communication, the P2P for video communication and audio communication or server (e.g., multimedia streaming server) connection on a network shared by the two electronic devices 610 and 620 may be performed to perform the video communication.

According to various embodiments, a user interface including various menus and various objects (e.g., icons) for providing various services may be provided during a video communication. In various embodiments, a detailed screen example of various user interfaces according to the above-described video service will be described in detail with reference to the drawings to be described later.

Figure 13:
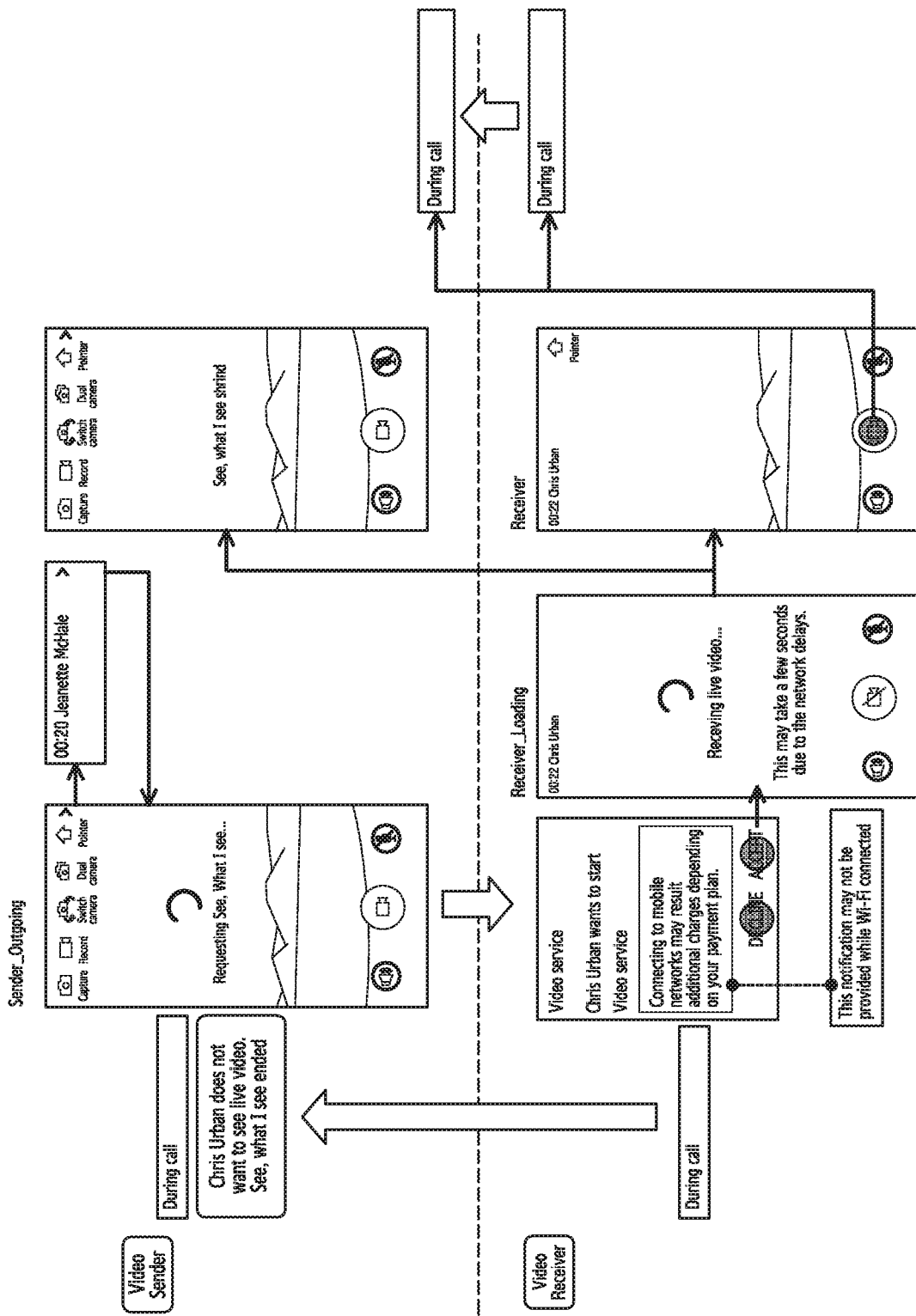
FIG. 13 is a diagram illustrating an operation of connecting a video service during a call in an electronic device according to various embodiments of the present disclosure.

FIG. 13 is a diagram illustrating an operation of connecting a video service during a call in an electronic device according to various embodiments of the present disclosure.

As illustrated in FIG. 13, an example of a user interface of connecting a video service while a voice call is connected between a video sender (e.g., the first electronic device 610) and a video receiver (e.g., the second electronic device 620) to perform the voice call is illustrated.

Referring to FIG. 13, the first electronic device 610 and the second electronic device 620 may check video service availability during a call between the sender and the receiver, and may activate a service object (e.g., a service button or a video communication icon) within a call app based on the checked result. According to various embodiments, one user (e.g., one of the sender and the receiver) of the users of the first electronic device 610 and the second electronic device 620 (e.g., one of the sender and the receiver) may input a video transmission request to the electronic device in various schemes (e.g., activated service object selection, voice input, gesture input, etc.). FIG. 13 illustrates a case in which a user input for video transmission by the user of the first electronic device 610 occurs.

The first electronic device 610 may transmit a video communication request to the second electronic device 620 based on the user input during the voice call, and may provide an animation effect until the second electronic device 620 agrees to the video communication or until the video communication between the first electronic device 610 and the second electronic device 620 is performed.

In various embodiments, in the second electronic device 620, the process of agreeing to the video communication request may be represented by a separate graphical user interface (GUI) (e.g., a pop-up window). According to various embodiments, a GUI that determines whether to accept or decline a video service transition may additionally inform a user that data costs may be additionally paid. The second electronic device 620 may receive a user input for the video service transition based on the GUI, may attempt to establish a communication connection for the video service with the first electronic device 610 according to the user input, and may display a communication standby screen. According to one embodiment, when ACCEPT is selected in the GUI, the second electronic device 620 may determine the video service transition and may perform a video service connection operation. According to one embodiment, when DECLINE is selected in the GUI, the second electronic device 620 may determine a video service non-transition (e.g., to prevent a transition to the video service) and may not perform the video service connection operation.

According to various embodiments, before the GUI is displayed, the video service component 603 may check the connection status of a wireless access network such as Wi-Fi, BT/BLE, NFC, etc. For example, when a communication module that is not separately charged due to data reception is detected by checking the communication connection status, the video service component 603 may connect the communication module that is not charged and then may manually or automatically perform the communication connection for the video service. According to one embodiment, when the second electronic device 620 is connected to a Wi-Fi network, the P2P connection may be performed via Wi-Fi or connection status information may be updated, and a video service-related pop-up window may be displayed. According to various embodiments, in the case of Wi-Fi, notification indicating that it can be charged may be deleted.

According to one embodiment, when Wi-Fi is available for the video service while a voice communication is performed through a cell network (e.g., 3G, 4G, LTE, WCDMA, or the like), the video service may be performed through the available Wi-Fi. At this time, the voice communication can also be switched to Wi-Fi.

According to various embodiments, when the video service is connected during a voice call, since the voice call is maintained, the total talk time may be displayed and provided in one area of the screen. According to various embodiments, the video service may be terminated by any one of a video transmitting electronic device (e.g., the first electronic device 610) and a video receiving electronic device (e.g., the second electronic device 620). According to various embodiments, during the voice call, the video transmitting electronic device (e.g., the first electronic device 610 may turn on (or deactivated state display→activated state display) a speaker button (e.g., a speaker icon) simultaneously with the start of the video service (e.g., video transmission), and may turn off (e.g., activated state display→deactivated state display) the speaker button when the video service is terminated.

According to various embodiments, an example of a detailed screen of various user interfaces according to the video service as described above will be described in detail with reference to the drawings to be described later.

Figure 14A:
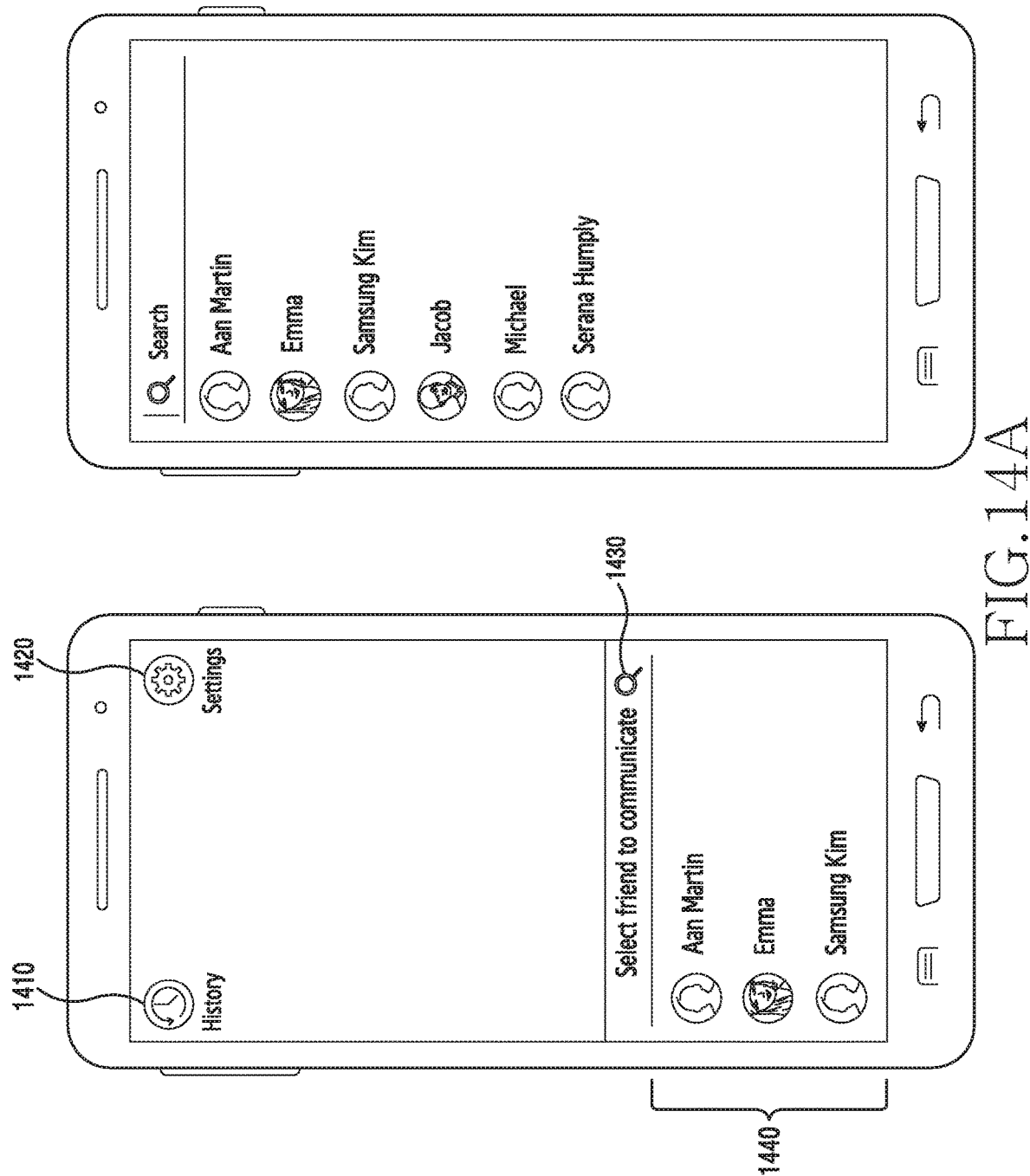
FIGS. 14A, 14B, and 14C are diagrams illustrating an example of a user interface of an electronic device according to various embodiments of the present disclosure.
Figure 14B:
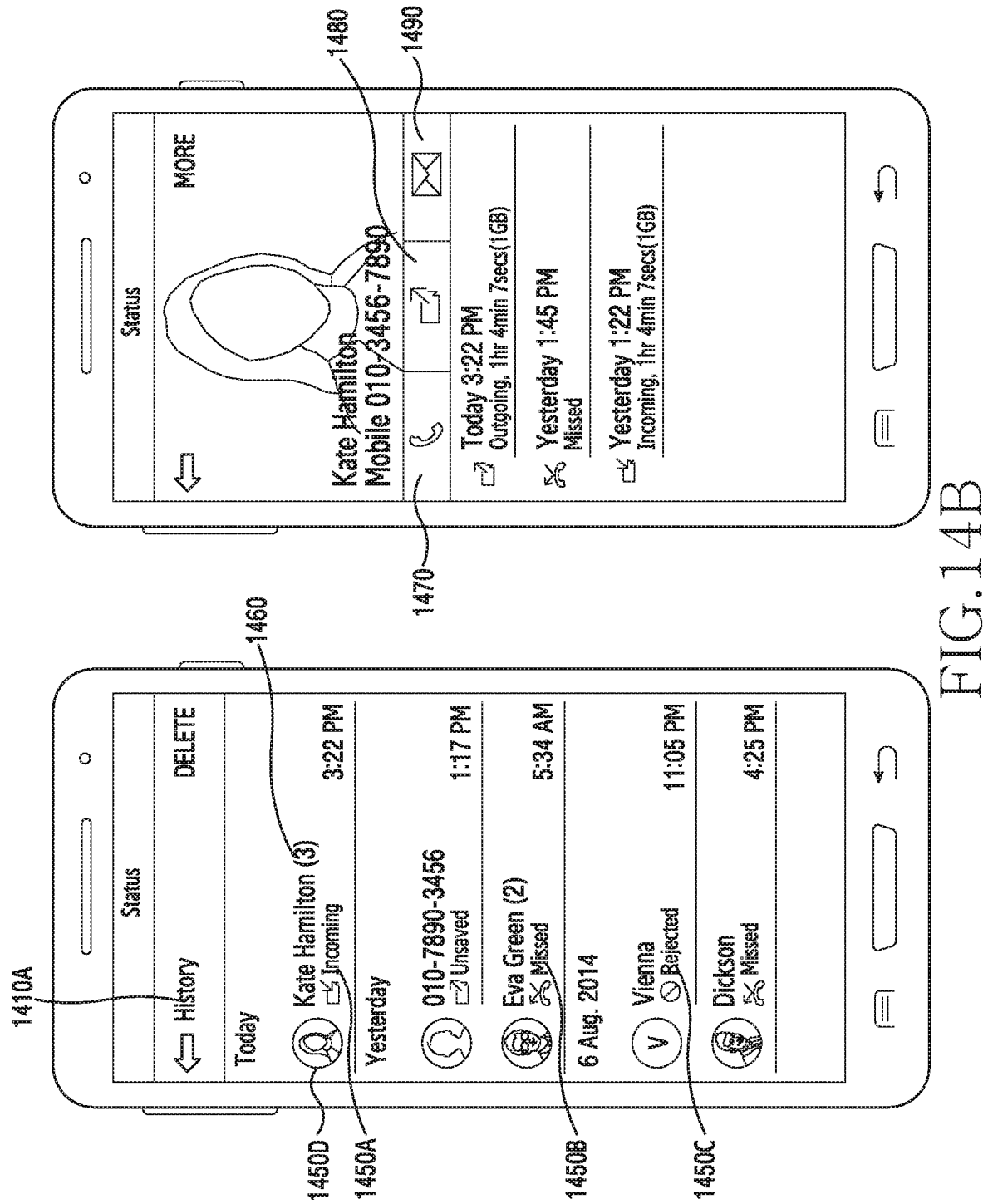
Figure 14C:
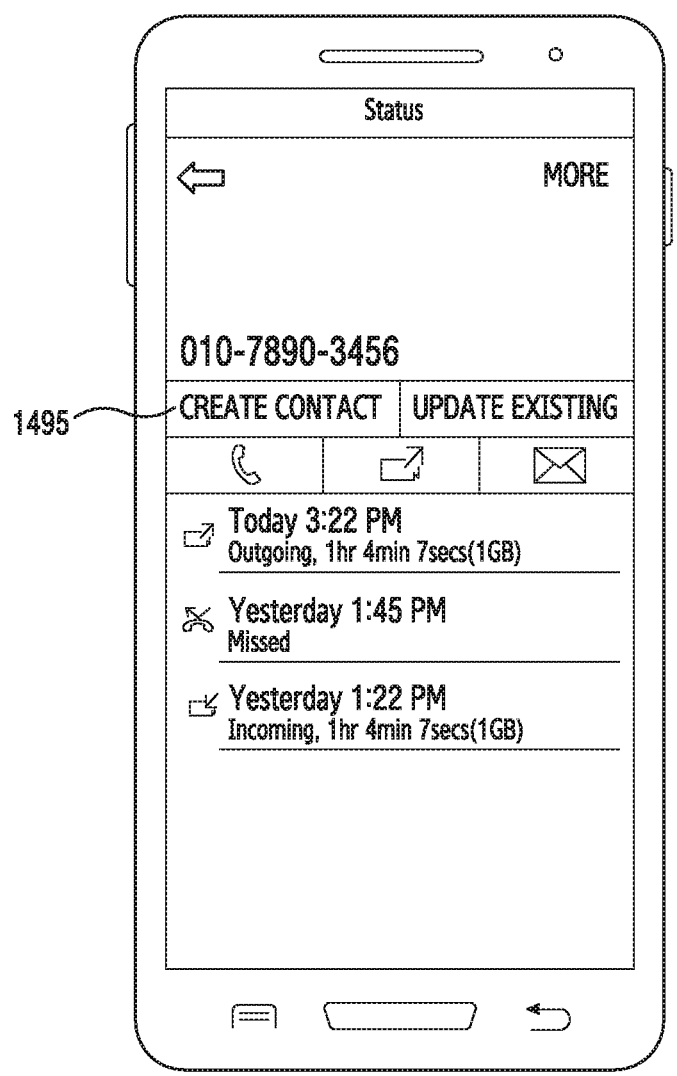

FIGS. 14A, 14B, and 14C are diagrams illustrating an example of a user interface of an electronic device according to various embodiments of the present disclosure.

As illustrated in FIGS. 14A, 14B, and 14C, an example of a user interface regarding a video service connection in the electronic device 500 or a history according to the video service connection is illustrated.

Referring to FIG. 14A, according to various embodiments, in a user interface prior to a video service connection, tree electronic device 500 (or a communication application {e.g., call app}) may display an object 1410 for displaying a video service history, an object 1420 for setting related to the video service, an object 1430 for searching for or selecting a video service or a user (friend) for video communication, and an object 1440 for providing a list of video service users (e.g., users of priority or favorite), and may provide the displayed information to a user. According to various embodiments, the electronic device 500 may provide (when there is a missed video service) a badge for missed video services through a region overlapping with or adjacent to the object 1410 (e.g., a history button).

In various embodiments, the electronic device 500 (or a communication application {e.g., call app}) may provide a function of displaying a video service history to a user. For example, as illustrated in FIG. 14A, the history button 1410 of one region (e.g., an upper end of the left side of a screen) of a screen may be provided.

According to various embodiments, when a user selects (e.g., clicks or touches) the history button 1410, the electronic device 500 may provide a user interface to display a communication history 1410A related to the video service, as illustrated in FIG. 14B. In various embodiments, as the communication history 1410A, one or more of video communication completion, missed call, reject, outgoing/incoming, communication point of time, communication time (e.g., today, yesterday, 6 Aug. 2014, time of day {e.g., 3:22 PM, 1:17 PM, etc.}), partner information, and registration photo of the other party may be provided.

According to one embodiment, referring to FIG. 14B, the communication history 1410A may include and provide video communication completion information 1460 (e.g., (2), (3), etc., as the number of communications) according to video service performance, information 1450A (e.g., outgoing and incoming) about sending or receiving the video service, video service failure information 1450B (e.g., missed), rejection information 1450C (e.g., rejected) for a video service request, and partner information 1450D (e.g., name, image, phone number, etc.). According to various embodiments, each piece of the communication history 1410A may be provided in at least one or a combination of text, images, icons, and the like.

According to various embodiments, the communication history may be recorded in chronological order and may be organized (e.g., grouping) for each user (person), so that, for example, a grouping log may be provided. According to one embodiment, when the communication history is provided by grouping, missed calls may be separately displayed.

According to various embodiments, when a user selects any one (or a communication history item) of the communication history, detailed communication history (e.g., user information {e.g., name, phone number, image, etc.}) with a corresponding user of the selected communication history, all histories according to the use of the video service with a user, a video service type (e.g., outgoing or incoming), and whether the video service is performed (e.g., missed or rejected) may be provided to conveniently perform video service outgoing (e.g., the first button 1470), a voice call (e.g., the second button 1480), a message transmission (e.g., the third button 1490), and the like through various input buttons (e.g., a first button 1470, a second button 1480, and a third button 1490) provided from a corresponding screen.

According to various embodiments, when the phone number of the other party is not registered in the book 607 (e.g., corresponding to unsaved in FIG. 14B), a button 1495 such as "CREATE CONTACT" in which the corresponding phone number can be registered in the phone book 607 may be provided, as illustrated in FIG. 14C.

According to various embodiments, as illustrated in FIG. 14A, when a user selects (e.g., clicks or touches) the setting button 1420 of one region (an upper end of the right side of the screen) of the screen, a setting-related screen of the video service may be provided.

According to various embodiments, as illustrated in FIG. 14A, when a user selects (e.g., clicks or touches) the search button 1430 of one region (e.g., a center portion of the screen) of the screen, the corresponding screen may be shifted to a screen showing a list (e.g., friends list) of users registered in the phone book 607, which uses the video service.

According to various embodiments, as illustrated in FIG. 14A, the list (e.g., priority users, favorite users, recent call users, information on users set by a user, and the like) of users registered in the phone book 670, which uses the video service, may be provided together in one region (e.g., a region adjacent to the search button 1430 to be connected to an upper side or a lower side).

According to various embodiments, although not shown, whether subscription to the video service is performed or a usage history may be displayed together with user information (e.g., name, image, phone number, etc.) in a list (e.g., contact list) screen of the phone book 607.

In various embodiments, examples of a screen of a service user interface that is provided by the electronic device 500 according to the execution of the video service during a voice call are illustrated in FIGS. 15, 16, 17, 18, and 19.

Figure 15:
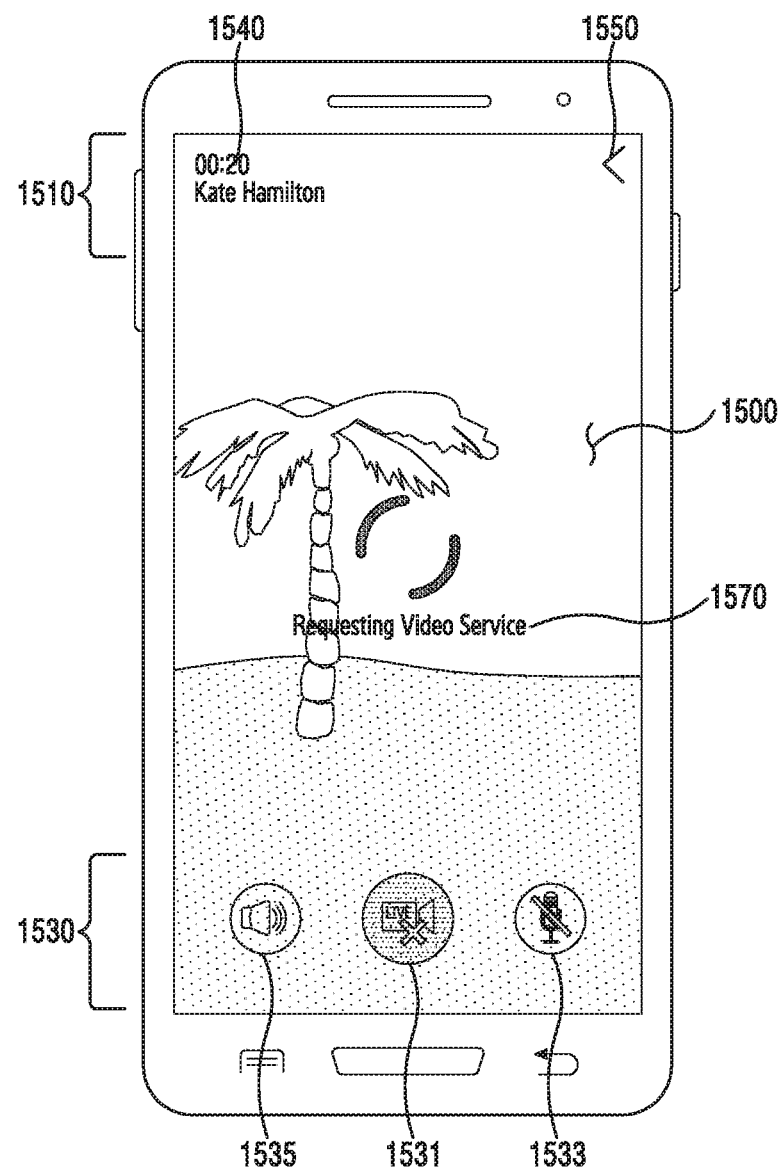
FIGS. 15 and 16 are diagrams illustrating an example of a screen in which a video service is performed in an electronic device according to various embodiments of the present disclosure.
Figure 16:
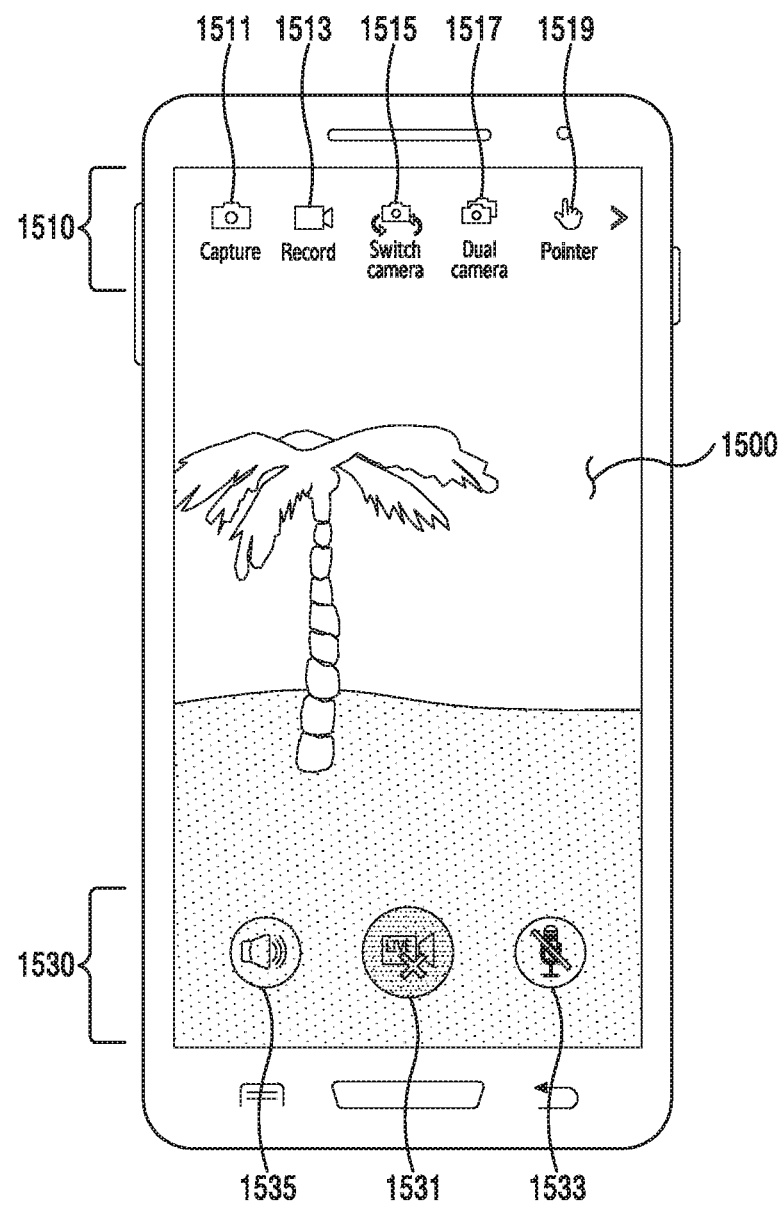

FIGS. 15 and 16 are diagrams illustrating an example of a screen in which a video service is performed in an electronic device according to various embodiments of the present disclosure.

Referring to FIGS. 15 and 16, examples of a screen of a service user interface that is provided at the time of service connection standby or service connection establishment according to a video service execution request during a voice call are illustrated. According to various embodiments, FIGS. 15 and 16 are screen examples of an originating terminal in which the electronic device 500 transmits a video.

As illustrated in FIGS. 15 and 16, a service user interface may include a preview region 1500, a first function selection region 1510, and a second function selection region 1530 for implementation.

In various embodiments, the preview region 1500 may indicate a region where a video is displayed in response to the video service execution during a voice call. According to one embodiment, the preview region 1500 may provide a real-time video (or a live video) acquired through a camera (e.g., the camera module 570) (e.g., at least one of front and rear cameras) driven in response to the video service execution. According to one embodiment, the preview region 1500 may provide a list (e.g., a video list stored in the memory of the electronic device 500, a list of the preview videos collected through a plurality of cameras, or a list of videos acquired via a network) of videos acquired from the inside or outside of the electronic device 500 in response to the video service execution, and may provide a video selected by a user from the list. In various embodiments, the list may be displayed as text or images (e.g., thumbnail, preview, etc.).

In various embodiments, the first function region 1150 may provide service information 1540 including a usage time using the video service with the counterpart electronic device to which the video service is connected, partner information (e.g., name or by name), and the like. In various embodiments, the first function region 1510 may provide a menu button 1550 to display (e.g., menu call) an object (e.g., icon or text) for various functions (or applications) related to the video service executed during a voice call. According to one embodiment, when the menu button 1550 is selected (e.g., clicked or touched) by a user, the object (e.g., icon or text) for various functions (or applications) related to the video service may be displayed on the first function region 1510.

According to one embodiment, as illustrated in FIG. 16, the first function region 1510 may include an object 1511 (e.g., a capture button) capable of capturing and storing a video displayed on the preview region 1500, an object 1513 (e.g., a record button) capable of recording (e.g., recording during video transmission) a video displayed on the preview region 1500 and a video (e.g., a full resolution video) related to the displayed video, an object 1515 (e.g., a switch camera button) capable of changing (e.g., transition from the rear camera to the front camera or from the front camera to the rear camera) a camera obtaining a video among a plurality of cameras, an object 1517 (e.g., a dual camera button) for executing at least two cameras (e.g., a dual camera simultaneously driving the front camera and the rear camera), an object 1519 (e.g., a pointer button) for calling and displaying (e.g., performing a pointing function within the screen) a pointer on the preview region 1500, and the like.

According to various embodiments, the first function region 1510 may be provided from an originating terminal in the video service, and may be implemented by various function buttons to perform storage, selection, or setting change in association with the video displayed through the preview region 1500.

In various embodiments, the second function region 1530 may provide an object (e.g., an icon or text) for various functions (or applications) related to the video service and/or a voice call. According to one embodiment, the second function region 1530 may indicate a region that is commonly provided from both an originating terminal and a receiving terminal for the video service. According to one embodiment, the second function region 1530 may include an object 1531 (e.g., an end button) for terminating (e.g., service connection termination) the video service, an object 1533 (e.g., a speaker button) for setting a volume or speaker mode or turning on/off a speaker, an object 1535 (e.g., a mute button) for mute selection, and the like.

According to various embodiments, the object 1519 (e.g., a pointer button) for calling and displaying the pointer on the preview region 1500 may be provided commonly by both the originating terminal and the receiving terminal, and may be included in the second function region 1530.

According to various embodiments, when the object 1519 is selected (e.g., clicked or touched), the pointing function may be executed and the pointer may be displayed and provided. (e.g., pointer driven) in the preview region 1500. According to various embodiments, the corresponding screen may be paused (e.g., capture of the preview image, which is real-time or dynamically displayed, obtained through a camera) at the time of pointer driving.

In various embodiments, various objects according to the first function region 1510 and the second function region 1530 and the arrangement of the various objects are not limited to the examples of FIGS. 15 and 16, and may be variously changed and designed according to the setting of the electronic device 500.

In various embodiments, the electronic device 500 (an originating terminal for video transmission) may provide at least one of an object 1570 (e.g., an item {e.g., an animation icon} notifying a progress status) for displaying a video service execution state and text (e.g., requesting video service . . . ) in one region of the preview region 1500 in response to the video service execution. According to one embodiment, as described above, the electronic device 500 may provide information indicating that the corresponding service is being connected to a user based on the intuitive object 1570 during the progress of a service connection procedure (e.g., before an actual service connection with the receiving terminal) performing the video service connection with the receiving terminal. According to one embodiment, when the video service with the receiving terminal is being executed (e.g., when the video service is connected), the electronic device 500 may not display the object 1570 notifying that the service connection is being executed.

Figure 17:
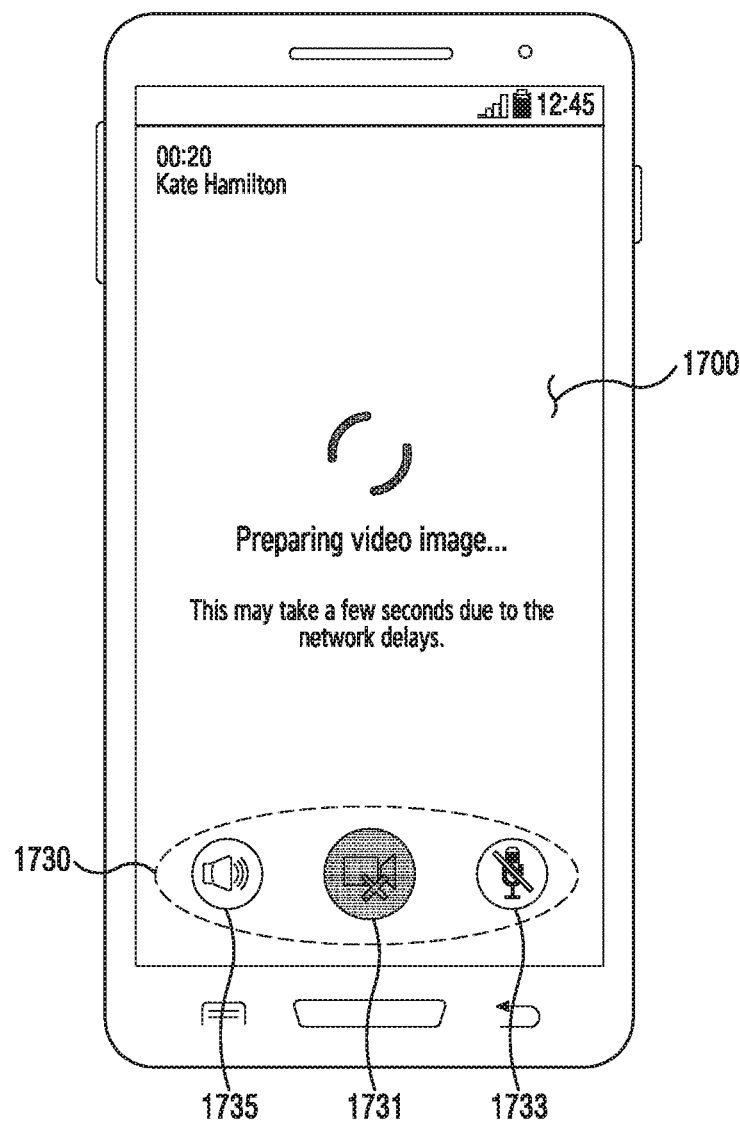
FIGS. 17, 18, and 19 are diagrams illustrating an example of a screen in which a video service is performed in an electronic device according to various embodiments of the present disclosure.
Figure 18:
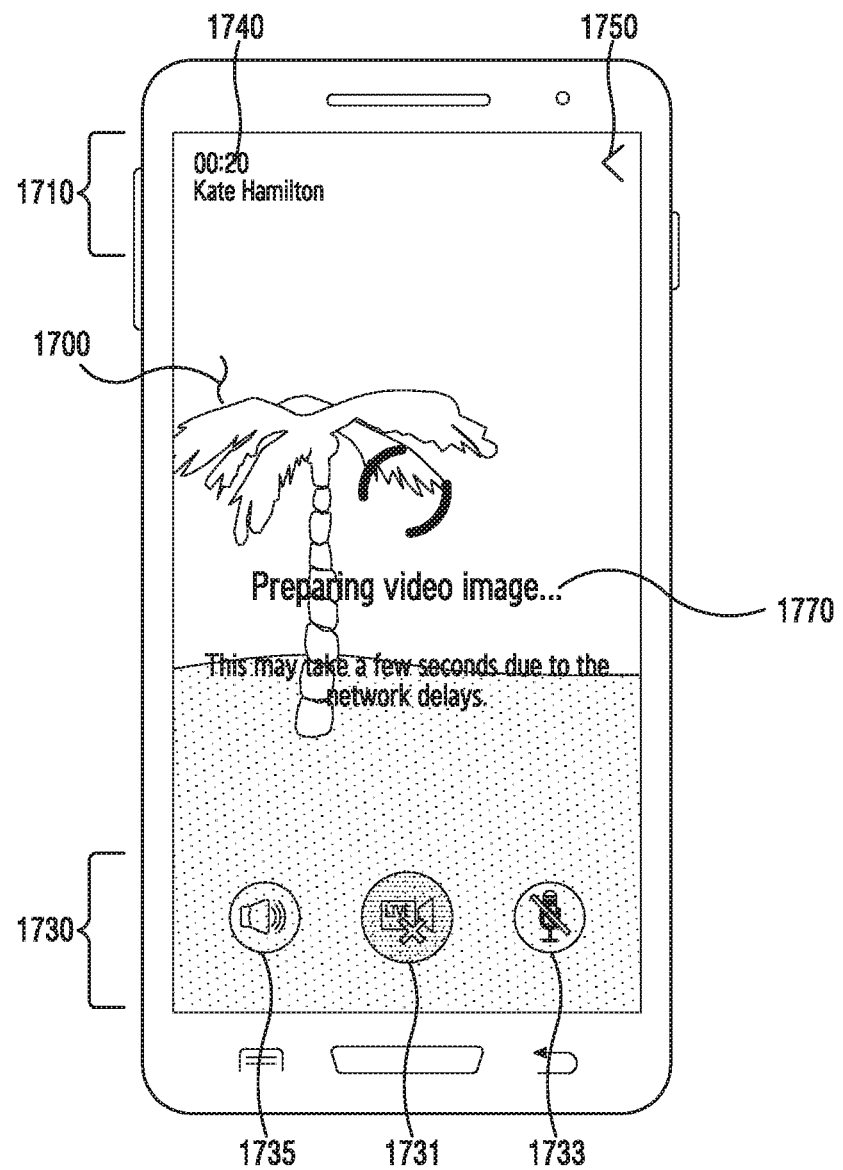
Figure 19:
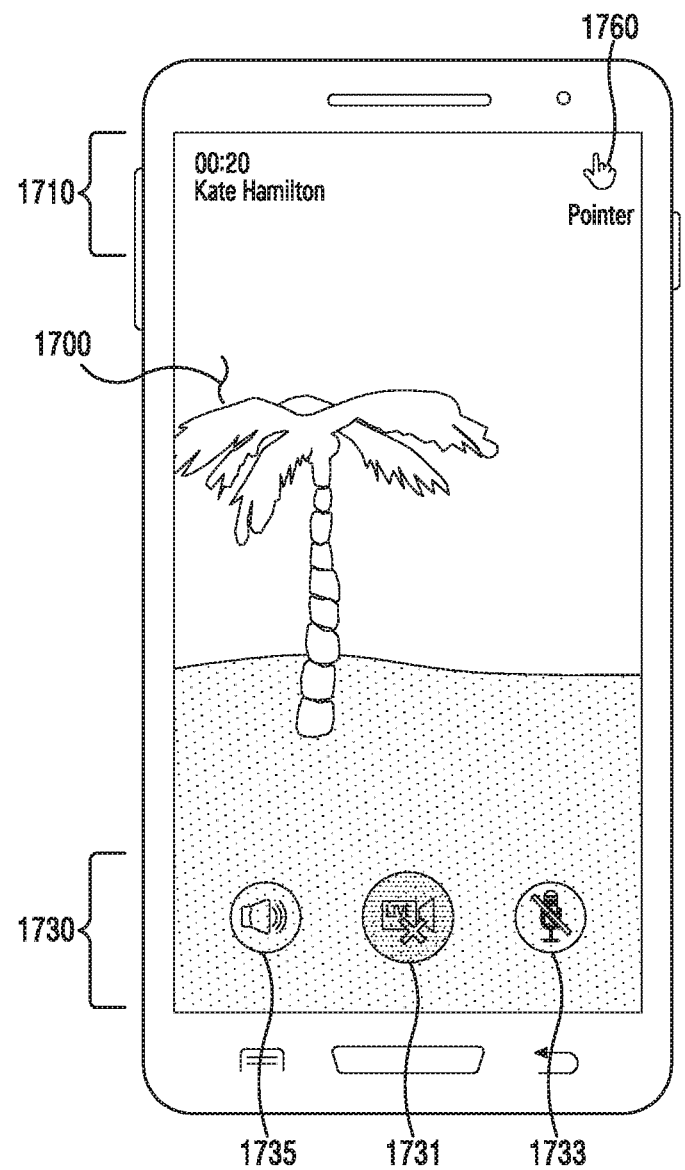

FIGS. 17, 18, and 19 are diagrams illustrating an example of a screen in which a video service is performed in an electronic device according to various embodiments of the present disclosure.

Referring to FIG. 17, a screen example of a service user interface provided during a voice call in the electronic device 500 is illustrated. For example, FIG. 17 illustrates a screen example of a service user interface provided at the time of service connection standby for video reception with another electronic device which is in a voice call or service connection establishment. In various embodiments, FIG. 17 illustrates a screen example of a receiving terminal in which the electronic device 500 receives a video.

As illustrated in FIG. 17, the service user interface may include a first function region 1710 and a second function region 1730 corresponding to the description made with reference to FIGS. 15 and 16, and may include a preview region 1700. According to various embodiments, the second function region 1730 may be a region that is commonly provided from both an originating terminal and a receiving terminal for the video service. In FIGS. 17, 18, and 19, objects 1731, 1733, and 1735 of the second function region 1730 may correspond to the objects 1531, 1533, and 1535 described with reference to FIGS. 15 and 16.

According to various embodiments, FIG. 17 illustrates a screen example of a state of waiting for video reception according to a service connection. In this case, the electronic device 500 may provide the preview region 1700 with black out processing, and may provide at least one of an object 1770 (e.g., an item {e.g., an animation item} notifying a progress status) for notifying that it is waiting for video reception from another electronic device and text (e.g., preparing video image . . . this may take a few seconds due to the network delays) in one region of the preview region 1700.

According to various embodiments, when a service connection request is received from another electronic device during a voice call with the other electronic device, the electronic device 500 may notify a user that the service connection request is received based on a pop-up or the like, and may receive information about whether the service connection is established. When the service connection is permitted by a user, the electronic device 500 may display a video transmitted from the other electronic device on the screen. An example thereof is illustrated in FIGS. 18 and 19.

Referring to FIG. 18, in various embodiments, the first function region 1710 may provide service information 1740 including a usage time using the video service with the counterpart electronic device to which the video service is connected, partner information (e.g., name or by name), and the like. In various embodiments, the first function region 1710 may provide a menu button 1750 that enables objects (e.g., icons or text) for various functions (or applications) related to the video service executed during a voice call to be displayed (e.g., menu call). According to one embodiment, when the menu button 1750 is selected. (e.g., clicked or touched) by a user, the objects (e.g., icons or text) for various functions (or applications) related to the video service may be displayed on the first function region 1710.

According to one embodiment, as illustrated in FIG. 19, the first function region 1710 may display and provide an object 1760 (e.g., a pointer button) for calling and displaying (e.g., performing a pointing function within a screen) a pointer on the preview region 1500.

According to various embodiments, when the object 1760 is selected (e.g., clicked or touched), the pointing function may be executed and the pointer may be displayed and provided (e.g., pointer driven) in the preview region 1700. According to various embodiments, the corresponding screen may be paused (e.g., capture of a still image obtained through a camera or a preview image displayed in real-time) at the time of pointer driving.

Referring to FIG. 19, a screen example of a service user interface providing a received video according to a service connection from another electronic device during a voice call in the electronic device 500 is Illustrated. In various embodiments, FIG. 19 illustrates a screen example of a receiving terminal in which the electronic device 500 receives a video.

According to various embodiments, in the case of the electronic device 500 receiving a video, some objects of the first function region 1510 described above in the description made with reference to FIGS. 15 and 16 may be omitted. For example, in the electronic device 500 of the receiving terminal, only the object 1760 for the pointing function may be displayed and provided in the first function region 1710.

In various embodiments, the video displayed through the preview region 1700 may be the same as the video displayed on the preview region (e.g., the preview region 1500 of FIG. 16) of the other electronic device.

According to various embodiments, at the time of a video service connection for video transmission and reception (or video sharing) during a voice call between electronic devices (the first electronic device 610 and the second electronic device 620), the user interfaces of an originating terminal transmitting a video and a receiving terminal receiving a video may be separately provided. For example, as illustrated in FIGS. 15 to 19, the user interfaces of the originating terminal and the receiving terminal may display videos commonly through the preview regions 1500 and 1700, and may provide the second function regions 1530 and 1730 on one region of the preview regions 1500 and 1700. Additionally or alternatively, the user interface of the originating terminal may further include various objects for performing storage, selection, or change on the transmitted videos in the first function region 1510, in comparison with the user interface of the receiving terminal.

Figure 20:
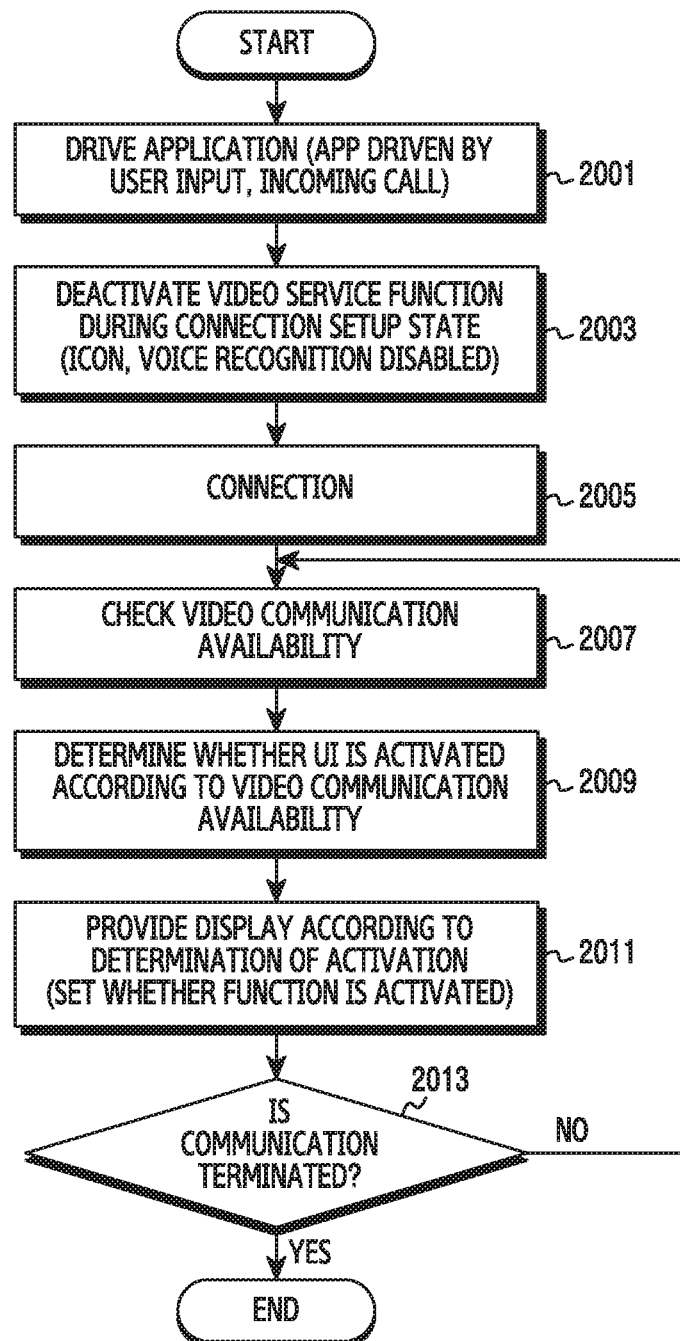
FIG. 20 is a flowchart illustrating a method of performing a video service in an electronic device according to various embodiments of the present disclosure.

FIG. 20 is a flowchart illustrating a method of performing a video service in an electronic device according to various embodiments of the present closure.

In various embodiments, FIG. 20 illustrates an operation of activating a service object (e.g., a service button or a video communication icon) of a user interface at the time of a service connection for video transmission. For example, an example of an operation of activating a service object in an originating terminal for video transmission is illustrated.

Referring to FIG. 20, in operation 2001, the controller (e.g., a processor of an electronic device operated as an originating terminal) of the electronic device 500 may drive an application (e.g., a communication application {e.g., a call app}) based on a user input. According to various embodiments, the controller 580 may display availability of a video service through a service object. According to one embodiment, the controller 580 may display the service object as being in an inactive state when the video service is unavailable, and may display the service object as being in an active state when the video service is available. According to various embodiments, an application or a video service module (e.g., thread, task, or the like) may be driven based on a user input selecting (e.g., touching or clicking) the service object, and a predetermined video service module or an application including the corresponding module may be driven automatically in response to the reception of an incoming call. In various embodiments, the indication of the active or inactive state of the service object will be described in detail with reference to the drawings to be described later (e.g., FIGS. 21 and 22).

In operation 2003, the controller 580 may deactivate the video service function during a connection setup state for the video service. For example, in order to deactivate the video service function, the controller 580 may not detect user inputs such as service object selection, voice recognition, gesture recognition, etc., related to a video service-related function, may not process a user input-related function related to the video service even though the user inputs are detected, or may replace the video service function with another function (e.g., error message display).

In operation 2005, the controller 580 may establish a connection with the counterpart electronic device in response to a connection acceptance of the counterpart electronic device.

In operation 2007, the controller 580 may check availability of the video communication. In various embodiments, the controller 580 may determine whether video communication with another electronic device which is in a voice call is performed.

According to one embodiment, the controller 580 may determine whether the other electronic device which is currently in the voice call is a terminal subscribed to the video service capable of receiving a video, based on service subscription information. According to another embodiment, the controller 580 may identify capability related to the other electronic device which is currently in the voice call. The capability related to the other electronic device may include the type of the electronic device and device information related to at least one electronic device that is connected to (or that can be connected to) the other electronic device. In various embodiments, in order to increase the stability of a data communication connection, whether data communication with the other electronic device is possible may be determined based on at least a part of the service subscription information and the capability related to the electronic device before attempting an actual data communication connection.

In various embodiments, the service subscription information used for determining whether subscription to the video service is executed may be determined based on, for example, a contact database. According to various embodiments, the contact database may include a contact database stored in the electronic device 500 or a contact database stored in a server. According to various embodiments, when the service subscription information of the other electronic device is identified based on the contact database, the controller 580 may determine that the other electronic device is a device (e.g., a service connection enabled device) capable of performing data communication. According to various embodiments, when the service subscription information of the other electronic device is not identified based on the contact database, the controller 580 may determine that the other electronic device is a device (e.g., a service connection disabled device) incapable of performing data communication.

In operation 2009, the controller 580 may determine whether the user interface is activated according to the video communication availability. According to one embodiment, when the video communication is available, the controller 580 may determine to activate the user interface related to the video service. According to another embodiment, when the video communication is unavailable, the controller 580 may determine not to activate the user interface related to the video service.

In operation 2011, the controller 580 may perform a user interface display function on the display 531 according to the determination for activation. According to various embodiments, when the user interface display function is executed, the controller 580 may also set whether various functions related to the video service are activated.

According to various embodiments, when it is determined that data communication with the other electronic device which is in the voice call is impossible, the controller 580 may control a guidance display. According to one embodiment, when it is determined that a user of the other electronic device does not subscribe to the corresponding service or the other electronic device is a device in which service support is impossible based on the result obtained by identifying the capability of the electronic device, that is, when it is determined that video communication with the other electronic device is impossible, the controller 580 may output a message informing that it cannot respond to a video transmission request of the user of the electronic device 500. For example, the controller 580 may display a set guidance message (e.g., informing that the user of the other electronic device is a user who does not subscribe to the service or the other electronic device is a device in which service support is impossible based on the identified result of the capability of the electronic device) through a pop-up window. In various embodiments, it is determined that data communication with the other electronic device is impossible, the controller 580 may deactivate and display the service object for the video service. Additionally or alternatively, the controller 580 may output the guidance message as a voice.

According to various embodiments, when it is determined that the video communication with the other electronic device which is in the voice call is possible, the controller 580 may control the display of the user interface related to the video service. According to one embodiment, when it is determined that the user of the other electronic device is a user who subscribes to the service or the other electronic device is a device in which service support is possible based on the identified result of the capability of the electronic device, that is, when the video communication with the other electronic device is possible, the service object for the video service may be activated and displayed. In various embodiments, to increase the stability of the video communication connection, the video service availability may be determined before attempting an actual video communication connection.

In operation 2013, the controller 580 may determine whether the communication is terminated. According to one embodiment, the controller 580 may determine whether the communication is terminated based on a user input terminating the video service based on the service object. According to one embodiment, the controller 580 may determine the communication termination in response to the termination of the communication connection from the other electronic device.

In operation 2013, when the communication termination is not detected (NO of operation 2013), the controller 580 may proceed to operation 2007 and may perform operations before operation 2007.

In operation 2013, when the communication termination is detected (determined) (e.g., YES of operation 2013), the controller 580 may terminate the video communication. According to one embodiment, the controller 580 may determine whether the voice call is terminated when the video communication is terminated. In various embodiments, the determining whether the voice call is terminated may be performed based on setting information set in advance by a user.

In various embodiments, service object activation conditions may be various set.

According to various embodiments, during a voice call dialing (e.g., incoming call or outgoing call), deactivation (disabled) processing may be performed.

According to various embodiments, the video service availability may be checked during the voice call and whether the service object is activated may be determined based on the checked result.

According to one embodiment, when the video service is available in the second electronic device 620 (e.g., a mobile device in a remote place, a wearable device, home appliances, or the like) connected in a wired or wireless manner during the voice call, the first electronic device 610 may display the service object as active and may provide the displayed information to a user. For example, the availability may be determined according to one or more of the installation state, capability, and service status of an application or a module, and thereby may display or service a GUI.

In various embodiments, as to checking the installation state and capability of the application or module, the first electronic device 610 may perform availability check in which the second electronic device 620 identifies whether the application or module for the video service is installed or the availability. For example, the video service availability may be determined based on the installation state or capability information of the application related to the seconds electronic device 620 stored in the contact server. By way of another example, an operation of determining the video service availability may be performed by confirming one or more of the installation state of the application related to the second electronic device 620 or the capability information of the second electronic device 620 in the phone book or the contact list stored in the first electronic device 610. By way of another example, when the first electronic device 610 transmits video data to the second electronic device 620 using one or more of capability (e.g., one or more resolution, codec, and processor performance) of the electronic device and network characteristic information of a subscribed network provider based on the information of the contact server or the phone book, whether the video data can be normally displayed on the second electronic device 620 may be determined. Alternatively, conditions (e.g., one or more of a resolution, a frame rate, encoding-related information, and a bit rate) for normal service providence may be determined and parameter setting for the video service may be performed based on the determined conditions.

According to various embodiments, the service status may be checked and whether the service object is activated may be determined based on the checked result.

According to one embodiment, an operation of confirming the service status of the first electronic device 610 or the second electronic device 620 may be performed and an operation of checking video service availability according to the service status may be performed, and thereby the service object may be displayed and provided based or the performed results.

For example, whether the service is available according to the network status between the first electronic device 610 and the second electronic device 620 may be determined. By way of another example, the service availability may be determined according to the status (e.g., a memory, a battery, a camera, a price policy such as data quantification system, etc.) of the first electronic device 610. In various embodiments, as to the price policy based on the data quantification system, records periodically stored and updated by the electronic device 500 may be determined based on setting or the like, and data may be provided through a provider server. By way of another example, the service availability may be determined according to data transmission and reception environment (e.g., data transmission policy between providers) based on the provider policy. By way of another example, the service availability may be determined according to a state (e.g., an activated state of KNOX or MDM) in which a security application (e.g., KNOX, MDM, or the like) is executed in the first electronic device 610 or the second electronic device 620.

In various embodiments, an operation according to the determination of the video service availability will be described below. According to various embodiments, the electronic device 500 may determine the video service availability and may perform various operations according to the service availability.

According to one embodiment, the electronic device 500 may activate or deactivate the service object. According to one embodiment, when the state of the video service is changed, the electronic device 500 may provide a feedback based on at least a part of sound, voice, and haptic. According to one embodiment, when receiving a video service driving command (e.g., one or more of inputs by a voice recognition-based command, a user interface, and a predetermined gesture), the electronic device 500 may determine whether the video service is executed.

According to various embodiments, the capability or service status may be different for each electronic device (e.g., the first electronic device 610 and the second electronic device 620), and thereby the activated state may be different for each electronic device. For example, there is a case in which the first electronic device 610 is capable of performing video transmission to the second electronic device 620 through the video service, but the second electronic device 620 is incapable of performing video transmission to the first electronic device 610. In various embodiments, when the service is unavailable in any one electronic device, service disabled information and service enabled information. (e.g., application installation information) may be provided.

Figure 21:
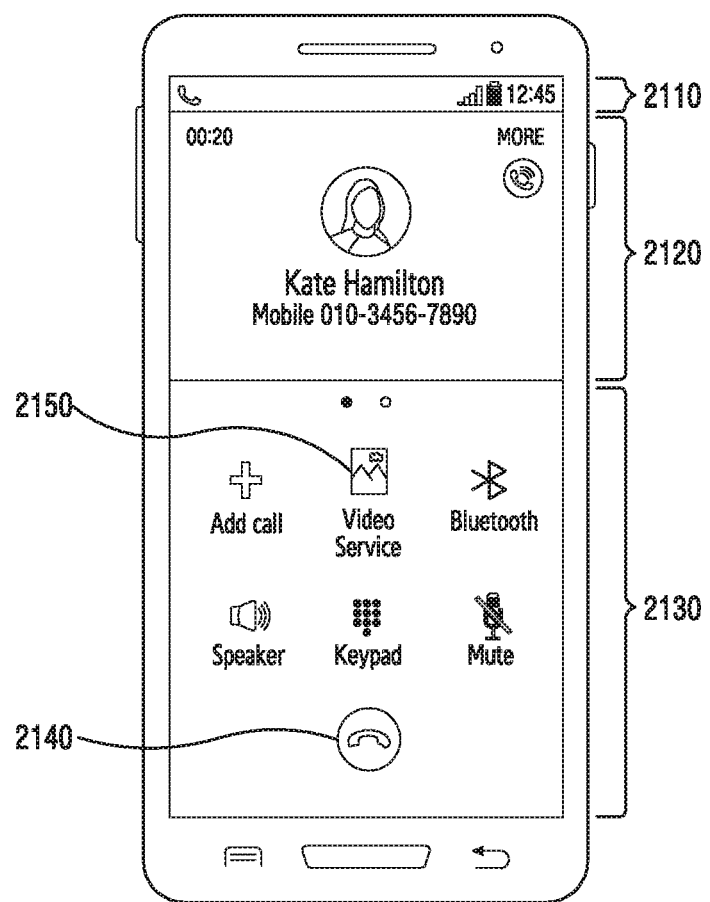
FIGS. 21, 22A, 22B and 22C are diagrams illustrating an example of a screen in which a video service is performed in an electronic device according to various embodiments of the present disclosure.

FIGS. 21 and 22 are diagrams illustrating an example of a screen in which a video service is performed in an electronic device according to various embodiments of the present disclosure.

Referring to FIG. 21, a screen example of a service user interface provided during a voice call in the electronic device 500 is illustrated. In various embodiments, FIG. 21 illustrates a screen example of an originating terminal transmitting a video, and in an operation related to the voice call even in a receiving terminal receiving a video, the screen of the user interface corresponding to FIG. 21 may be provided.

As illustrated in FIG. 21, the service user interface may include an indicator region 2110, a call information region 2120, and a function selection region 2130.

In various embodiments, the indicator region 2110 may provide information. (e.g., information about charging state, time, call state, alarm, etc.) related to the use of the electronic device 500 and/or information (e.g., weather information, received message information, feed information, etc.) received from the outside.

In various embodiments, the call information region 2120 may provide a call sate, call duration, call target information, and the like during the voice call of the electronic device 500.

In various embodiments, the function selection region 2130 may provide objects (e.g., icons or text) for various functions (or applications) that can be performed (executed) by the electronic device 500 during the voice call. According to one embodiment, the function selection region 2130 may include an object (e.g., add call button) capable of adding a voice call object, an object (e.g., video service button, hereinafter, referred to as service object) 2150 for video transmission, an object. (e.g., Bluetooth button) for Bluetooth setting, an object (e.g., speaker button) for setting a volume or speaker mode, an object (e.g., keypad button) for calling a keypad, an object (e.g., mute button) for mute selection, an object (e.g., end button) 2140 for selecting whether the call is terminated, and the like.

According to various embodiments, the electronic device 500 may receive (detect) a user input based on a service object 2150 while performing a voice call with another electronic device (e.g., the second electronic device 620). When receiving the user input based on the service object 2150, the electronic device 500 may determine to execute a video service for transmitting a video (e.g., real-time camera video or stored video) to the other electronic device (e.g., the second electronic device 620) which is currently in the voice call. According to various embodiments, when the video service is determined to be executed, the electronic device 500 may drive a camera (e.g., the camera module 570) according to a predetermined method, and may initiate (e.g., display the related user interface and transmit a service connection request) a service connection operation for transmitting a video (e.g., a preview video) obtained through the camera. According to various embodiments, when the video service is determined to be executed, the electronic device 500 may extract videos stored therein according to the predetermined method, may initiate (e.g., display the related user interface and transmit the service connection request) the service connection operation for transmitting the extracted videos (e.g., a video selected by a user after the list of the extracted videos is displayed).

According to various embodiments, the service user interface may be various provided depending on the connection status of the electronic device 500. An example thereof is shown in FIGS. 22A-22C.

Figure 22C:
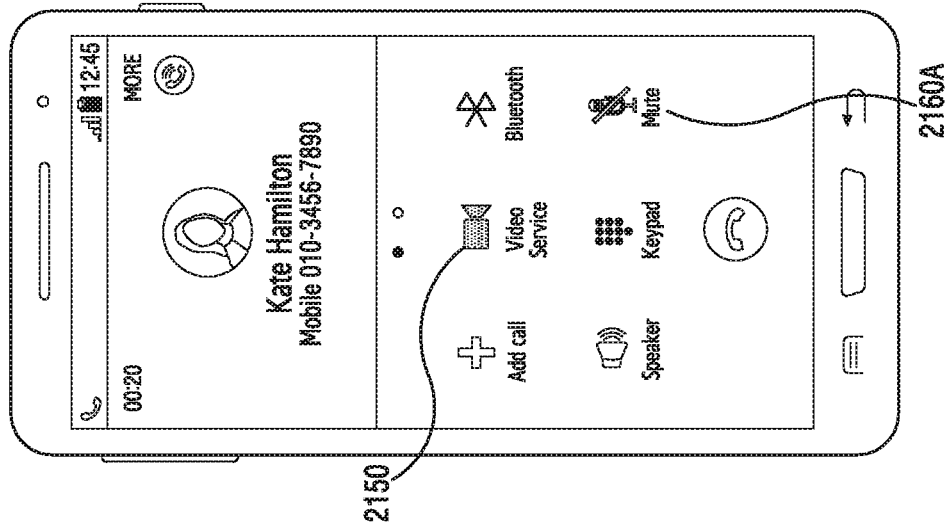
Figure 22B:
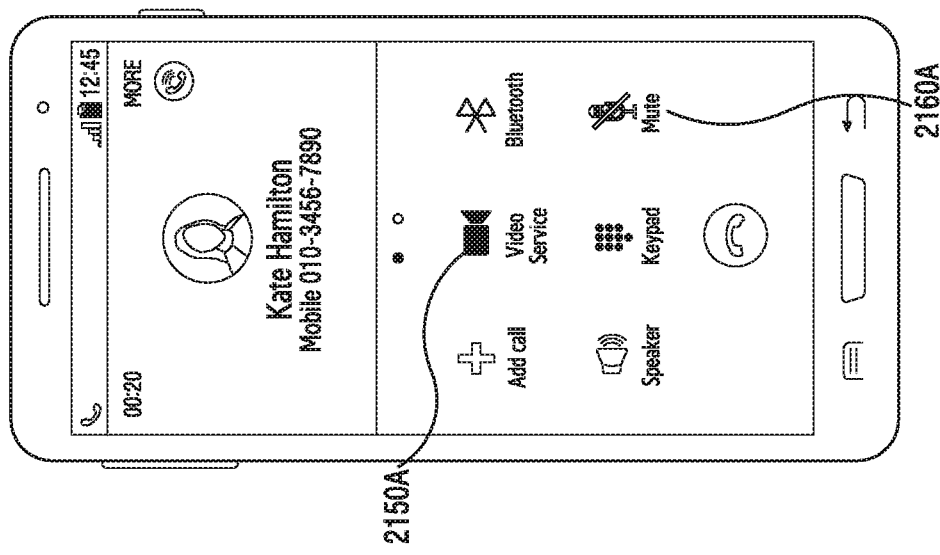
Figure 22A:
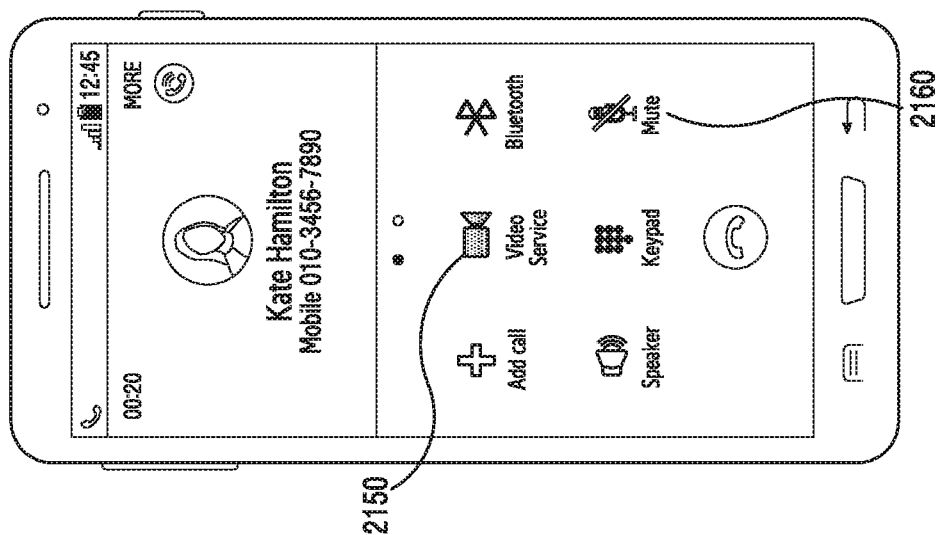

Referring to FIGS. 22A-22C, an example in which the electronic device 500 activates or deactivates a service object 2150 for a video service based on results (e.g., service availability) according to a service status check with a counterpart electronic device during a voice call is illustrated. Thereby, a user may intuitively identify information about a service connection enabled state.

In FIG. 22A, a screen example of a case in which the electronic device 500 is attempting to perform a voice call (e.g., during call originating) is shown. For example, as shown in FIG. 22A, the service object 2150 for the video service may be provided as being in an inactivate state (e.g., gray- or dim-processed icon or the like). Additionally, the electronic device 500 may provide even another object (e.g., mute button 2160) corresponding to unavailable functions as being in an inactive state while attempting to perform the voice call.

In FIG. 22B, a screen example of a case in which video service performance with the counterpart electronic device is identified to be possible while the electronic device 500 is attempting to perform a voice call or during a voice call (e.g., a state in which communication for a voice call is connected) is shown. For example, as shown in FIG. 22B, the service object 2150 for the video service may be changed from an inactive state to an active state as in a service object 2150A and may be provided. Additionally, the electronic device 500 may change another deactivated object (e.g., mute button 2160) to an activated state as in another object 2160A and may be provided, when communication for a voice call is connected during the voice call.

In FIG. 22C, a screen example of a case in which video service performance with the counterpart electronic device is identified to be impossible while the electronic device 500 is attempting to perform a voice call or during a voice call (e.g., a state in which communication for a voice call is connected) is shown. For example, as shown in FIG. 22C, the service object 2150 for the video service may be kept in an inactive state. Additionally, the electronic device 500 may change another deactivated object. (e.g., mute button 2160) to an activated state as in another object 2160A and may be provided, when communication for a voice call is connected during the voice call.

As described above, according to various embodiments, the video service availability may be displayed through the service object, using an application (e.g., call app) or a module. According to one embodiment, the service object may be differently using one or more attributes of whether the service object is displayed, shape, color, brightness, dimensional sensation, and size of the service object depending on the active state and the inactive state.

According to one embodiment, at the time of dialing (e.g., ongoing call, outgoing call, or incoming call) for a voice call in an application or the like, the video service function may be deactivated. For example, the service object 2150 may be displayed as being in an inactive state and may be provided.

According to one embodiment, the activation or deactivation of the service object 2150 may be determined according to the video communication availability during the voice call (e.g., voice call service). In various embodiments, the activation or deactivation of the service object 2150 may be changed in real-time as shown in FIGS. 22A-2C.

Figure 23:
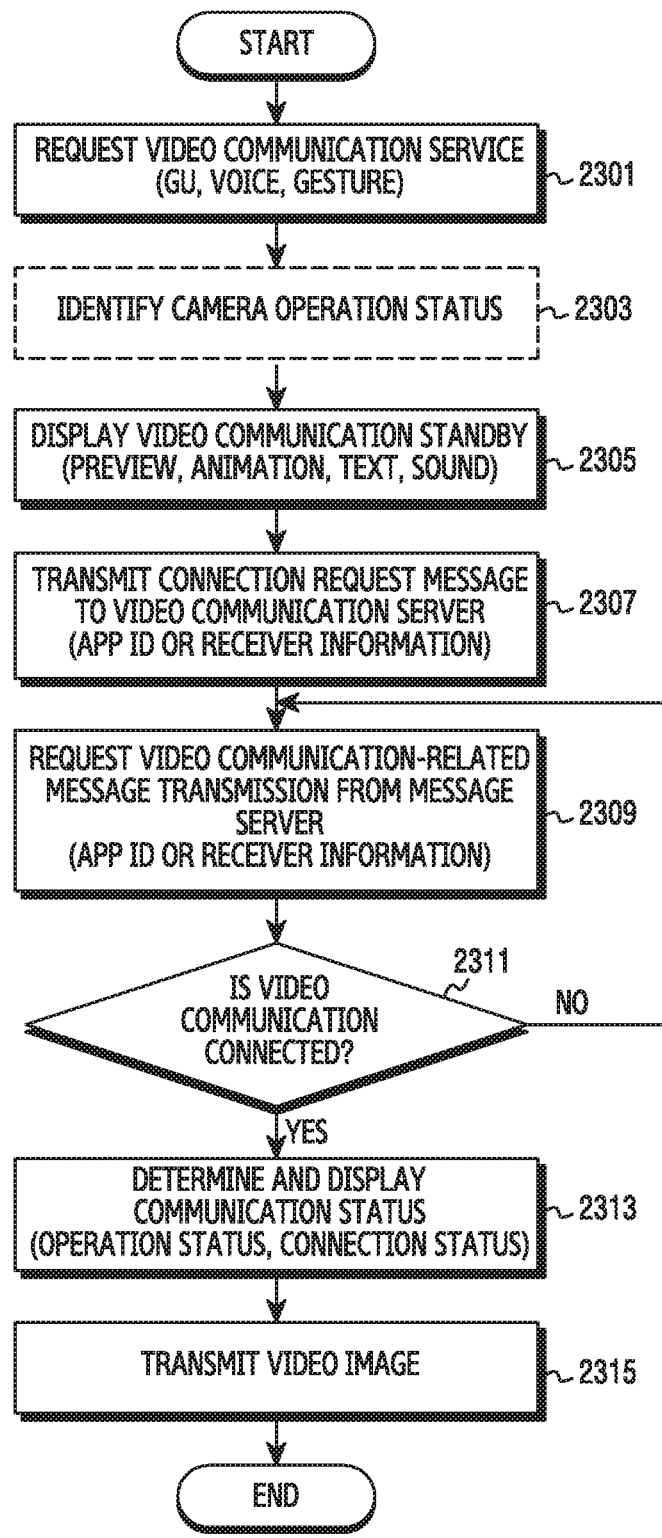
FIG. 23 is a flowchart illustrating a method of performing a video service in an electronic device according to various embodiments of the present disclosure.

FIG. 23 is a flowchart illustrating a method of performing a video service in an electronic device according to various embodiments of the present disclosure.

In various embodiments, FIG. 23 illustrates the operation of an originating terminal that requests a service connection for video transmission from another electronic device which is in a voice call and that transmits a video at the time of the service connection. For example, an example in which the electronic device 500 is operated as the originating terminal illustrated.

Referring to FIG. 23, in operation 2301, the controller 580 (e.g., a processor of the electronic device acting as the originating terminal) of the electronic device 500 may detect a video communication service request. For example, the controller 580 may detect the video transmission request in response to a user input for a service object during a voice call. According to one embodiment, the controller 580 may process a general operation related to voice call performance with another electronic device (e.g., the second electronic device 620) based on first communication. The controller 580 may determine whether there is a request (e.g., a user input) for transmitting a video service by a user during the voice call. For example, when selection (e.g., click or touch) of the service object provided for video transmission as in the above-described example is detected during the voice call, the controller 580 may determine to execute the video service. In various embodiments, the video communication service request may be performed based on the user input according to a GUI, a voice, a gesture, or the like.

In operation 2303, the controller 580 may identify a camera operation state. For example, the controller 580 may identify an on or off state of the camera, and may apply power to corresponding processors through the turn-on control of the camera when the camera is in the off state, that is, when power is not applied to a camera sensor or a camera processor. According to one embodiment, when the camera is in the on state, operation 2303 may not be performed.

In operation 2305, the controller 580 may display a video communication standby and may provide the displayed information to in a user. According to one embodiment, the controller 580 may provide a video communication standby to a user based on at least a part of preview, animation, text, and sound.

In operation 2307, the controller 580 may transmit a connection request message for requesting video communication from a video communication server (e.g., the connection server). According to various embodiments, the controller 580 may transmit a connection request message for a service connection to the video communication server in response to a user input executing the service connection for video transmission during a voice call with another electronic device. According to various embodiments, when transmitting the connection request message to the video communication server, the controller 580 may include at least one of an application identifier (e.g., app ID)) and receiver information, and may transmit the corresponding information.

In operation 2309, the controller 580 may transmit a video communication-related message (e.g., an invitation message) to a message server. According to various embodiments, when transmitting the video communication-related message, the controller 580 may include at least one of the application ID (e.g., one or more of an application unique identifier, application user identification information, and installed device information) and the receiver information. (e.g., one or more of contact information, phone number, email address, account information), and communication ID) and may transmit the corresponding information.

In operation 2311, the controller 580 may determine whether the video communication connection is established. According to one embodiment, the controller 580 may count a waiting time. For example, the controller 580 may set the waiting time waiting the video communication connection in response to a video communication connection request, and may wait for the video communication connection by the set waiting time. According to various embodiments, the waiting time may be automatically set after the electronic device 500 initiates the video communication connection request, or may be set in advance and stored in the electronic device 500. According to various embodiments, the controller 580 may count the set or stored waiting time after the video communication connection request is initiated.

In operation 2311, when the video communication is not connected (NO of operation 2311), the controller 580 may proceed to operation 2309 to wait for the video communication connection, and may perform corresponding operations before operation 2309. According to one embodiment, when the video communication is not connected until the waiting time expires, the controller 580 may determine that the video communication is impossible and may process the related operation. For example, the controller 580 may terminate a video communication connection (e.g., service connection for video transmission) attempt by second communication while maintaining the voice call by the first communication. By way of another example, the controller 580 may terminate the voice call with the other electronic device. For example, when the connection with the other electronic device is not established in a state in which the other electronic device subscribes to the service for the video transmission, the controller 580 may determine that data communication is not performed due to instability of the network situation and may terminate the voice call with the other electronic device for video communication reconnection. According to various embodiments, the controller 580 may process a guidance output for the termination of the voice call when the voice call is terminated. For example, the controller 580 may output a message informing that the voice call is terminated for video communication reconnection, based on at least a part of a GUI, voice, and vibration.

In operation 2313, when the video communication is connected (YES of operation 2311), the controller 580 may determine the communication status and may display the determination result. According to one embodiment, the controller 580 may display the communication status (e.g., connection status, communication process status, etc.) of the counterpart electronic device. For example, the controller 580 may display the communication status (e.g., notification of whether a video is received, quality information related to a bit rate, a frame rate, and resolution of the video communication, an expected time difference between a transmission side and a reception side, etc.) of the counterpart electronic device receiving a video after a P2P connection.

In operation 2315, the controller 580 may process video image transmission. According to various embodiments, the controller 580 may transmit a video (e.g., a real-time video, a live video, or a stored video) acquired (or corresponding to a user selection) during the voice call, to the other electronic device which is in the voice call.

According to various embodiments, the controller 580 may transmit a video to the other electronic device based on the second communication according to the video communication connection, other than the first communication for the voice call. According to various embodiments, as to the voice call and the video communication, the controller 580 may transmit a video to the other electronic device based on the first communication or newly connected second communication. For example, according to various embodiments, voice and video may use different communications or may use the same communication. According to one embodiment, in a case in which voice uses packet switching among cellular communication protocols, the voice may be transmitted using video or the packet switching of the cellular communication protocol. According to another embodiment, in a case in which voice and video are switched to use the same communication, the connection of communication used in the voice may be terminated, or only a minimum connection thereof may be maintained and then may be used again in the voice call at the time of video termination (e.g., service connection termination). According to another embodiment, the first communication of which only minimum connection is maintained may automatically support the voice call after the video communication termination.

According to various embodiments, during the voice call between electronic devices, an electronic device for originating a video may request the video service from the counterpart electronic device, and the counterpart electronic device may perform the video service according to whether the video service request is accepted.

According to various embodiments, when the electronic device 500 is in a video service connection enabled state during a call, the electronic device 500 may detect a request for the video service connection through a user input (e.g., touch, voice, gesture, or the like). In various embodiments, the video service connection enabled state may be, for example, a state in which a video service enabled state is determined so that the service object on an application (e.g., call app) is activated.

When detecting the video service connection request, the electronic device 500 may identify the camera status of the electronic device 500. According to one embodiment, when the camera status is identified, the front or rear camera of the electronic device 500 may be executed so that the preview may be displayed.

When a user requests the video service connection, the electronic device 500 may display a user interface (e.g., text, icon, animation, or the like) indicating a standby state on the display 531 of the electronic device 500.

The electronic device 500 may transmit the video service connection request message to the counterpart electronic device through a server. In various embodiments, the server may be constituted of a first server (e.g., a connection server or the like) and a second server (e.g., a message server or the like). The electronic device 500 may identify availability (e.g., whether P2P connection is established, network status, etc., as the video service availability) for the video communication of the counterpart electronic device through the first server. The electronic device 500 may transmit the video service connection request message to the counterpart electronic device through the second server.

In various embodiments, the video service connection request message may include one or more of information (e.g., information of a transmitting electronic device or user information of the transmitting electronic device) of the electronic device 500 and a video service application ID (e.g., app ID) of the electronic device 500.

After transmitting the video service connection request message, the electronic device 500 may display the standby state. According to one embodiment, the display of the standby state may be provided as at least one of text, voice, vibration, icon, and animation related to the status according to the video communication connection.

According to various embodiments, when the video service connection request of the electronic device 500 is accepted by the counterpart electronic device, the video communication connection between the electronic device 500 and the counterpart electronic device may be established. According to one embodiment, when the video service is connected between the electronic devices, a video photographed through the camera of the electronic device 500 may be transmitted to the counterpart electronic device through the server.

Figure 24:
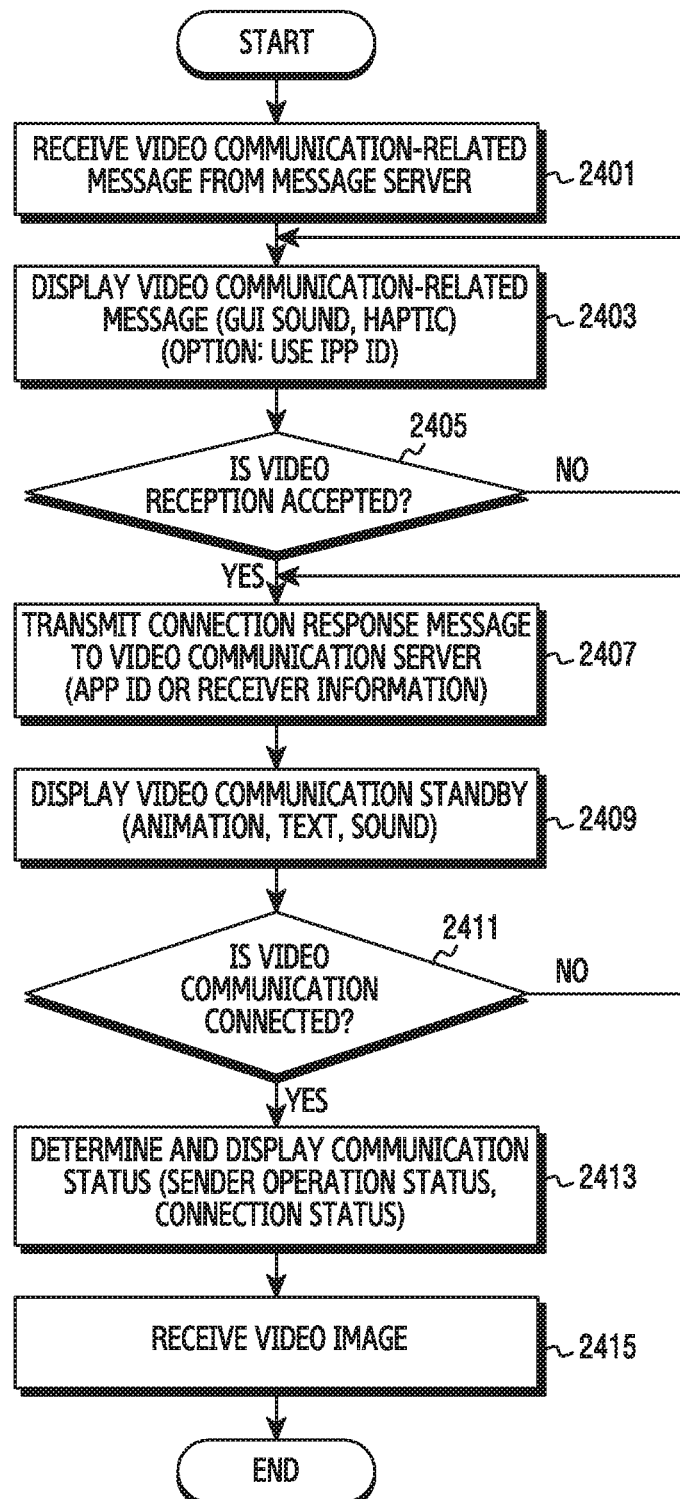
FIG. 24 is a flowchart illustrating a method of performing a video service in an electronic device according, to various embodiments of the present disclosure.

FIG. 24 is a flowchart illustrating a method of performing a video service in an electronic device according to various embodiments of the present disclosure.

In various embodiments, FIG. 24 illustrates the operation of a receiving terminal that receives a video service connection request from another electronic device during a voice call with the other electronic device and receives a video of the other electronic device at the time of video service connection. For example, an example of a case in which the electronic device 500 operates as the receiving terminal is illustrated.

Referring to FIG. 24, in operation 2401, the controller 580 (e.g., a processor of the electronic device acting as the receiving terminal) of the electronic device 500 may detect the reception of a video communication-related message (e.g., an invitation message) for a video service connection during a voice call. For example, the controller 580 may process a general operation related to voice call performance with another electronic device based on first communication. The controller 580 may receive the video communication-related message (e.g., an invitation message) transmitted from the other electronic device, from a message server during the voice call, and may determine the reception of the video communication-related message in response to a video service connection request.

In operation 2403, when receiving the video communication-related message, the controller 580 may display the video communication-related message. According to one embodiment, the controller 580 may process a guidance display related to the video communicator-related message based on at least one of a GUI, sound, and haptic. According to one embodiment, the controller 580 may select a corresponding application or software module to drive the same using selectively using an application ID (e.g., app ID, file extension, MIME type, URL information, etc.), or may display a plurality of corresponding candidate applications or software modules and select them through a user interface. For example, when a plurality of video communication applications are provided, candidate applications may be displayed so that a user can select them, and a user may select (e.g., select the same through voice, touch, force input, or the like) the corresponding information among the displayed candidate applications.

In operation 2405, the controller 580 may determine whether the other electronic device accepts or rejects the connection request. For example, the controller 580 may output a message informing that there is the connection request for the video service from the other electronic device which is in the voice call, through a guidance based on at least a part of text and voice message in response to the reception of the video communication-related message. The controller 580 may receive an input of the acceptance or rejection of the connection request (e.g., video reception) from a user based on the guidance.

In operation 2405, when an input of selecting the acceptance or rejection in response to the connection request by the user is not detected (NO of operation 2405), the controller 580 may proceed to operation 2403 may perform corresponding operations before operation 2403. According to one embodiment, when the rejection of the connection request is input by the user, the controller 580 may transmit a connection rejection message to the other electronic device. To this end, the controller 580 may transmit the connection rejection message to the other electronic device based on the message server. In various embodiments, the controller 580 may transmit the connection rejection message for the connection request while maintaining the voice call.

In operation 2407, when the acceptance of the connection request is input by the user (YES of operation 2405), the controller 580 may transmit a connection response message (e.g., a video communication permission message) to the other electronic device in response to the video communication-related message. According to one embodiment, the controller 580 may transmit the connection response message permitting the video communication request to a video communication server (e.g., a connection server). According to various embodiments, when transmitting the connection response message to the video communication server, the controller 580 may include and transmit at least one of an application ID (e.g., app ID) and receiver information. In various embodiments, the electronic device 500 may be set to automatically respond to the service connection request. In this case, operations 2403 and 2405 in FIG. 24 may not be performed, and when the video communication-related message is received from the other electronic device which is in the voice call, the controller 580 may directly proceed from operation 2401 to operation 2407 to automatically transmit the connection response message.

In operation 2409 the controller 580 may display a video communication standby state and may provide the displayed information to the user. According embodiment, the controller 580 may provide the video communication standby to the user based on at least a part of animation, text, and sound.

In operation 2411, the controller 580 may determine whether the video communication is established. According to one embodiment, the controller 580 may count a waiting time. For example, the controller 580 may set the waiting time waiting the video communication connection in response to the transmission of a connection response message for the video communication connection request, and may wait for the video communication connection by the set waiting time. According to one embodiment, when the connection response message is transmitted to the other electronic device during the voice call with the other electronic device, the controller 580 may set a waiting time for waiting for a joining message (e.g., onjoined message; from the video communication server thereafter. In various embodiments, the wanting time may be set after the connection response message is transmitted to the electronic device, or may be set in advance and stored in the electronic device 500. In various embodiments, the controller 580 may count the waiting time after the connection response message is transmitted, and may determine whether the joining message is received during the waiting time.

In operation 2411, when the video communication is not connected (NO of operation 2411), the controller 580 may proceed to operation 2407 to wait for the video communication connection and may perform corresponding operations before operation 2407. According to one embodiment, when the video communication is not connected until the waiting time expires (when the joining message is not received), the controller 580 may determine that the video communication is impossible to perform the related operation. According to one embodiment, when the video communication is not connected until the waiting time expires (e.g., when the joining message is not received), the controller 580 may determine that the video communication connection fails.

According to various embodiments, when the joining message is not received, the controller 580 may determine that the data communication quality is poor even though data communication is possible (e.g., a case in which the electronic device 500 or the other electronic device exists in a shadow area or moves by a transportation means).

According to various embodiments, when it is determined that the data communication quality is poor, the controller 580 may determine that the data communication connection (e.g., service connection for video reception) fails and may terminate the video communication connection. According to various embodiments, when it is determined that the data communication quality is poor, the controller 580 may determine that the data communication connection (e.g., service connection for video reception) fails and may transmit a message informing that the video communication is impossible or a connection rejection message for the connection request to the other electronic device through the message server 950. According to various embodiments, the controller 580 may terminate the video communication connection (e.g., service connection for video reception) by second communication while maintaining the voice call by the first communication. According to various embodiments, when the data communication connection is terminated, the controller 580 may process a guidance output for the termination of the data communication connection. For example, the controller 580 may output a message informing that the video communication cannot be connected based on at least a part of pop up, voice, and vibration.

According to various embodiments, when it is determined that the data communication quality is poor, the controller 580 may transmit a parameter (e.g., image resolution, bit rate, frame rare, codec, communication bandwidth, or the like) of multimedia data that can be received through a control signal for the purpose of the data communication connection (e.g., service connection for video reception) to the counterpart electronic device (e.g., the counterpart electronic device or a multimedia streaming server) to request the video communication according to the corresponding parameter. According to various embodiments, the parameter may be directly transmitted to the counterpart electronic device using P2P communication. According to various embodiments, in order to transmit the parameter to the counterpart electronic device, the parameter may be included in a message through the message server and may be transmitted. According to various embodiments, in order to transmit the parameter to the counterpart electronic device, the electronic device 500 may transmit the parameter to the connection server (e.g., SCS server), and may the connection server may transmit the parameter to the counterpart electronic device.

In operation 2411, when the video connection is connected (YES of operation 2411), the controller 580 may identify and display the communication status in operation 2413. According to one embodiment, the controller 580 may display the communication status (e.g., connection status, operation status, or the like) of the counterpart electronic device. For example, the controller 580 may display the communication status of the counterpart electronic device transmitting a video after the P2P connection. According to one embodiment, when receiving a joining message from the video communication server, the controller 580 may establish the video communication connection with the other electronic device. According to various embodiments, when receiving the joining message, the controller 580 may determine that the data communication connection successfully established, for example, a service connection capable of receiving a video from the other electronic device through the second communication during the voice call is established.

In operation 2415, the controller 580 may receive a video image transmitted from the other electronic device. According to one embodiment, the controller 580 may receive a video through the second communication, may display the received video, and may provide the displayed video to the user. According to various embodiments, the controller 580 may receive a video (e.g., real-time video or stored video) transmitted by the other electronic device during the voice call based on the second communication according to the data communication connection, other than the first communication for the voice call, and may display the received video through a preview region.

According to various embodiments, when a service connection request message of the other electronic device is transmitted through the server (e.g., the message server), the electronic device 500 may display a user interface in which the user (a video receiver) of the electronic device 500 can accept or reject the video service connection and may provide the displayed user interface to the user. In various embodiments, the user interface may be provided as one or more of a GUI such as pop-up, sound, and vibration. In various embodiments, a name, a phone number, etc., of a transmitter may be displayed on the GUI.

The user of the electronic device 500 may accept the video service connection through a user input (e.g., touch, voice, gesture, or the like) for a predetermined time.

When the video service connection is accepted, the electronic device 500 may transmit a connection response message accepting the video service connection to the other electronic device through the server.

In various embodiments, the connection response message may include one or more of information (e.g., information of a receiving electronic device or user information of the receiving electronic device) of the electronic device 500 and an application ID (e.g., app ID) of the electronic device 500.

After transmitting the connection response message, the electronic device 500 may display a standby state until it receives and displays a video (e.g., a real-time video or a still image) from the other electronic device. According to one embodiment, the display of the standby state may be provided as at least one of text, sound, vibration, icon, and animation related to the status according to the video communication connection. According to various embodiments, when the video service with the other electronic device is connected, the electronic device 500 may receive a video photographed using the camera of the other electronic device, through the server, and may display the received video.

In various embodiments, a screen example of a user interface provided by the electronic device 500 according to the video service execution during a voice call will be described.

Figures 25A, 25B:
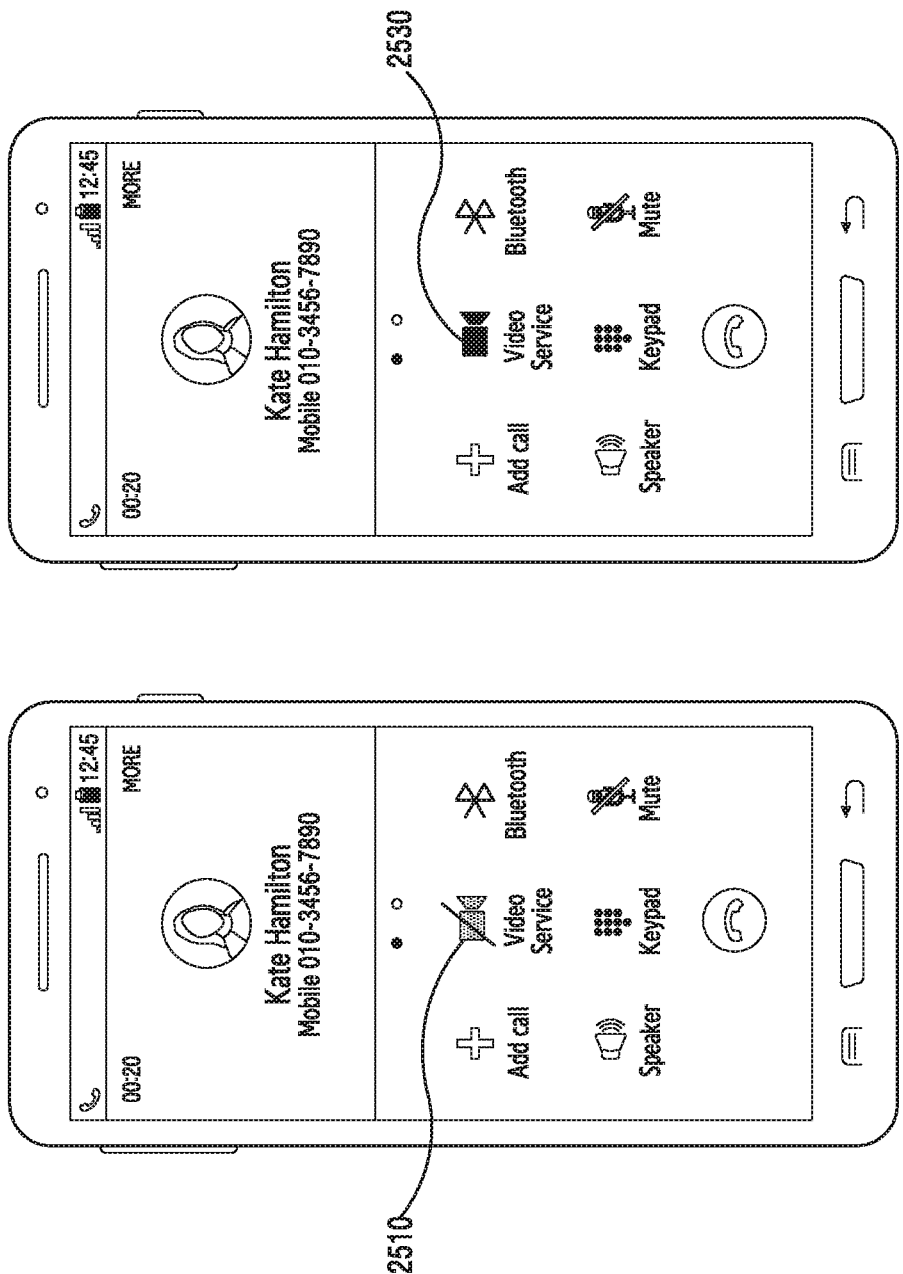
FIGS. 25A and 25B are diagrams illustrating an example of a screen in which a video service is performed in an electronic device according to various embodiments of the present disclosure.

FIGS. 25A-25B are diagrams illustrating an example of a screen in which a video service is performed in an electronic device according to various embodiments of the present disclosure.

Referring to FIGS. 25A-25B, a screen example in which service availability using a service object is provided as an example of displaying video service availability based on the user interface during the voice call in the electronic device 500 is illustrated.

As illustrated in FIGS. 25A-25B, status information of a receiving electronic device which is in a call and available functions during the call may be displayed in the form of various objects (e.g., icons and text). According to various embodiments, the available functions during the call may include various functions such as add call, video service, Bluetooth connection, speaker mode transition, keypad display, mute, end call, and the like.

The electronic device 500 may determine the availability of the video service, and may display, when it is determined that the video service connection cannot be established, the determination result as a service object 2510 (e.g., gray- or dim-processed icon of the service object) which is in an inactive state, as shown in FIG. 25A. At this time, even though the service object 2510 is selected by a user input, the video service may not be driven or information indicating that the execution of the video service is impossible may be displayed.

When it is determined that the video service connection can be established by determining the availability of the video service, the electronic device 500 may display the determination result as a service object 2530 (e.g., color-processed icon of the service object) which is in an active state, as shown in FIG. 25B.

According to various embodiments, as shown in FIG. 25B, when the service object 2530 is activated, a user may request the video service connection through various user inputs (e.g., touch, voice, gesture, etc). For example, the electronic device 500 may operate not to process the user input when the service object 2510 is in the inactive state, and may operate to process the user input when the service object 2530 is in the active state.

Figure 26:
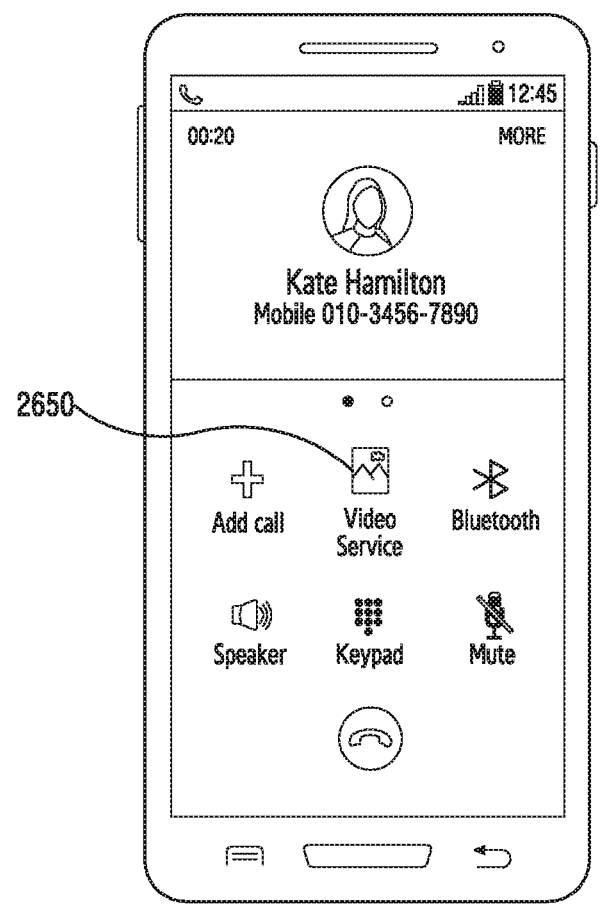
FIG. 26 is a diagram illustrating an example of a screen in which a video service is performed in an electronic device according to various embodiments of the present disclosure.

FIG. 26 is a diagram illustrating an example of a screen in which a video service is performed in an electronic device according to various embodiments of the present disclosure.

Referring to FIG. 26, another example of a service object provided in a user interface for a video service in various embodiments is illustrated.

Referring to FIG. 26, a service object 2650 may be displayed and provided as a real-time image or a still image. According to one embodiment, the electronic device 500 may provide an always on camera function in which a camera is always activated (e.g., power applied state). The electronic device 500 may determine the video service availability, and may display, when it is determined that the video communication is available, a service object or a preview image (screen) of the camera instead of the service object as the service object 2650. According to another embodiment, when an application (e.g., call app) is driven, the electronic device 500 may switch the camera to a driving mode to receive an image, and may display the preview image (screen) as the service object 2650.

Figure 27:
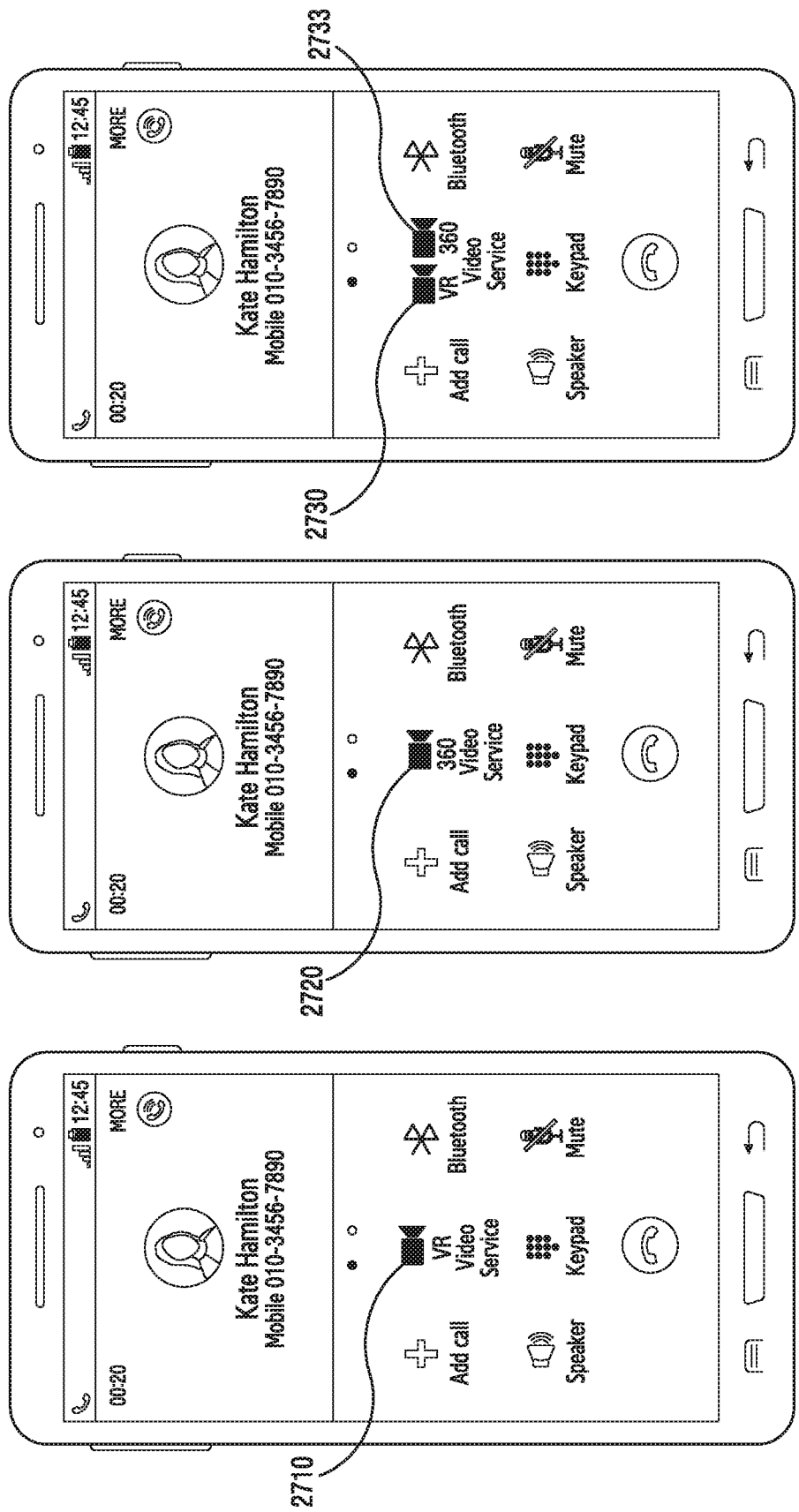
FIGS. 27A, 27B, and 27C are diagrams illustrating, an example of a screen in which a video service is performed in an electronic device according to various embodiments of the present disclosure.

FIGS. 27A-27C are diagrams illustrating an example of a screen in which a video service is performed in an electronic device according to various embodiments of the present disclosure.

Referring to FIGS. 27A-27C, another example of a service object provided by a user interface for a video service in various embodiments is illustrated. According to various embodiments, the service object for the video service may be various implemented and provided. An example thereof is shown in FIGS. 27A-27C.

As shown in FIGS. 27A-27C, when the electronic device 500 provides the video service based on a camera (e.g., camera module 570) of the electronic device 500 as described above, the service object for the video service may be provided based on the above-described service object. According to various embodiments, the electronic device 500 may provide the video service using an external camera other than an internal camera thereof. According to one embodiment, the electronic device 500 may be connected (short-range wireless communication connection) other surrounding peripheral devices and thereby may acquire and provide a video for the video service through the peripheral devices. In various embodiments, when the electronic device 500 is interlocked with the peripheral device, the corresponding information may be provided together with information about the peripheral device. In various embodiments, the peripheral device may include, for example, a VR device, a 360 camera enabling 360 degree shooting, and other devices (e.g., robot cleaner, TV, monitor, etc.) having a camera. For example, the VR device may include a head mounted display (HMI)), a 3D display, a hologram display, and the like. For example, the 360 camera may include a plurality of cameras mounted on a spherical or disc-shaped frame, a camera device receiving images of various angles received through a dome-shaped mirror, and the like.

According to one embodiment, when any one electronic device 500 is interlocked with the VR device to provide the video service, the service object for the video service may be provided with associated service object 2710 (e.g., icon or 'VR' text) based on device information of the VR device, as shown in FIG. 27A. Accordingly, at least a part of the image received by the electronic device or another electronic device may be displayed through the VR device.

According to one embodiment, when any one electronic device 500 is interlocked with the 360 camera to provide the video service, the service object for the video service may be provided with an associated service object 2720 (e.g., icon or '360' text) based on device information of the 360 camera, as shown in FIG. 27B. Accordingly, the electronic device or the other electronic device may receive at least a part of the image received from the 360 camera.

According to one embodiment, when any one electronic device 500 (e.g., a transmitting electronic device) is interlocked with the VR device and the other electronic device 500 (e.g., a receiving electronic device) is interlocked with the 360 camera to provide the video service, the service object for the video service may be provided together with an associated service object 2730 (e.g., icon or 'VR' text) based on the device information of the VR device and an associated service object 2733 (e.g., icon or '360' text) based on the device information of the 360 camera, as shown in FIG. 27C. Accordingly, a minimum part of the image received through the 360 camera may be displayed through the VR device.

Figure 28:
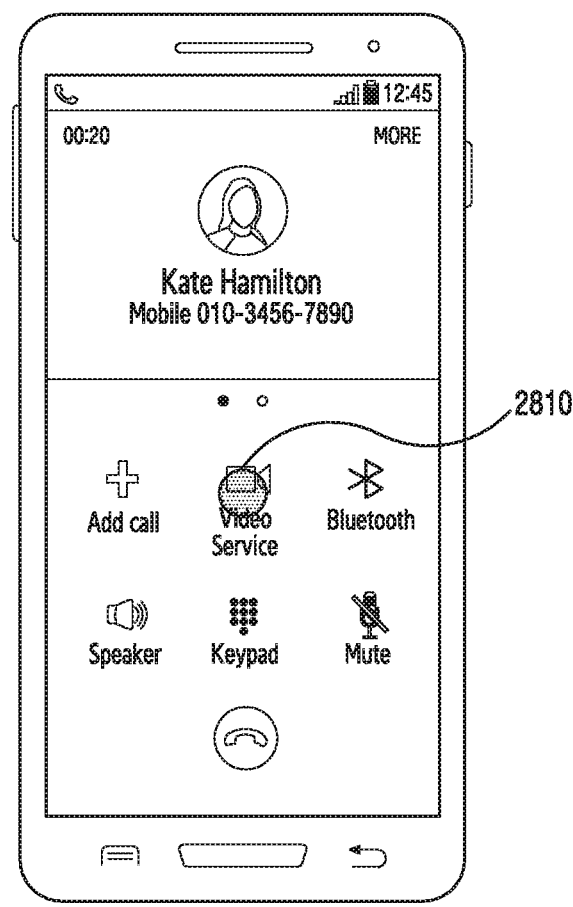
FIG. 28 is a diagram illustrating an, example of a screen in which a video service is performed in an electronic device according to various embodiments of the present disclosure.

FIG. 28 is a diagram illustrating an example of a screen in which a video service is performed in an electronic device according to various embodiments of the present disclosure.

Referring to FIG. 28, a screen example illustrating an operation of executing a video service during a voice call is illustrated. For example, FIG. 28 illustrates an example of requesting a video service based on a service object according to various embodiments. According to various embodiments, the execution of the video service may be requested based on various user inputs (e.g., voice recognition, gesture recognition, motion recognition, etc.) other than the service object.

As shown in FIG. 28, in a state in which a service object 2810 (e.g., the service object 2650 including the preview screen of FIG. 26 and the service objects 2710, 2720, and 2730 including the peripheral device information of FIGS. 27A-27C) provided in various types as described above is displayed, the video service connection may be requested through the selection (e.g., touch or click) of the service object 2810. According to various embodiments, the electronic device 500 may display and provide whether the service object 2810 is selected, through highlighting, color change, or region display. For example, a state about whether the video service can be executed may be displayed and provided through the service object 2810.

In various embodiments, when the service object 2810 is displayed as being in the active state, a user may request the video service execution based on other user inputs (e.g., inputs such as voice, gesture, motion, etc.), other than the selection of the service object 2810.

Figure 29:
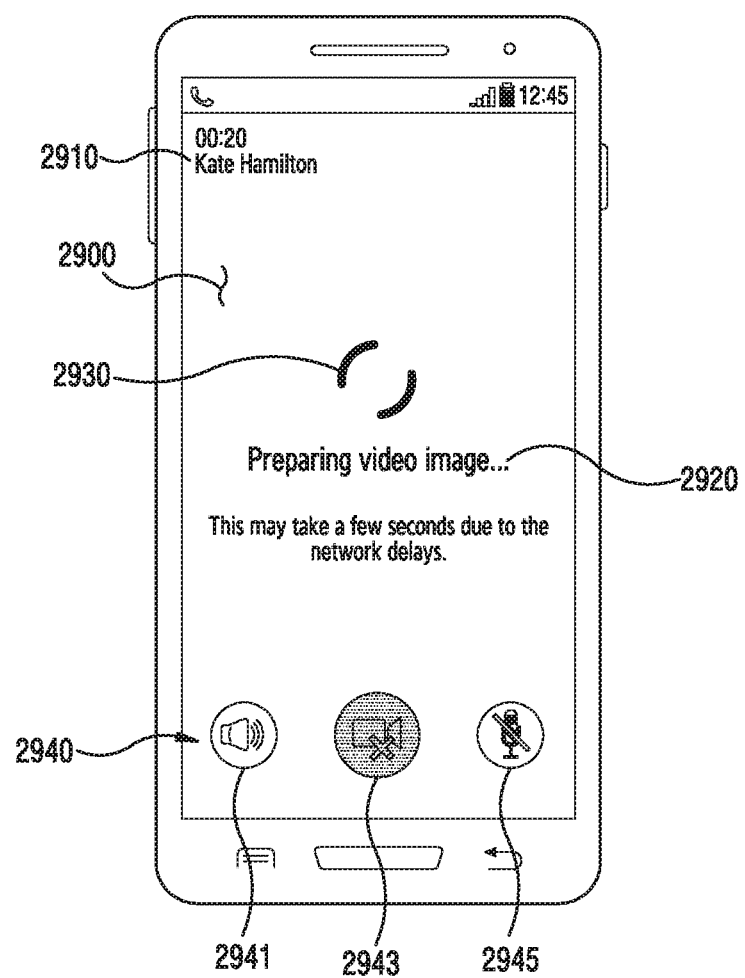
FIG. 29 is a diagram illustrating an example of a screen for displaying a video call standby state at the time of video service connection in an electronic device according tn various embodiments of the present disclosure.

FIG. 29 is a diagram illustrating an example of a screen for displaying a video call standby state at the time of video service connection in an electronic device according to various embodiments of the present disclosure.

Referring to FIG. 29, a screen example of an originating terminal that transmits a video or a receiving terminal that receives a video is illustrated, or a screen example during a video communication standby (e.g., video transmission standby of the originating terminal or video reception standby of the receiving terminal) indicating a transition state to the video service.

As shown in FIG. 29, when the electronic device (e.g., a transmitting electronic device) transmitting a video requests the video service connection, the electronic device (e.g., a receiving electronic device) receiving a video may be switched to a video preview preparing screen. According to various embodiments, even in the electronic device transmitting a video, a transition to the video preview preparing screen as shown in FIG. 29 may be performed.

According to various embodiments, a video preview standby screen 2900 may include various types of information such as a standby state display, an additional function icon, call duration, receiver information, etc., and may be provided. According to one embodiment, in the case of call duration 2910, since voice communication is still maintained, the total call duration including voice call duration may be displayed. According to one embodiment, the display of the standby state may be provided in the form of text 2920 (e.g., preparing video image or the like), an icon 2930, or animation (one or more of the text 2920 and the icon 2930 provided as an animation operation). According to one embodiment, a function icon 2940 may include an icon related to a speaker mode transition 2941, a video service end 2943, a mute function 2940, or the like.

In various embodiments, the video preview preparing screen 2900 may be selectively provided. For example, the video preview preparing screen 2900 may be processed in or in the background during the video service connection without being displayed and provided, and a video screen may be immediately displayed when an actual video is received.

Figure 30:
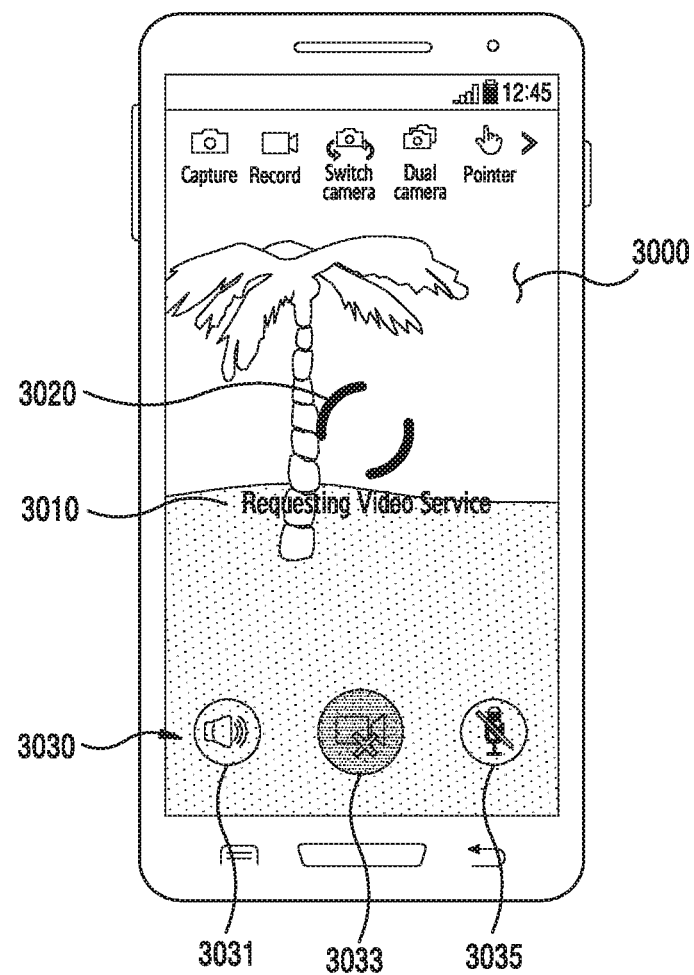
FIG. 30 is a diagram illustrating an example of a screen for displaying a video call standby state at the time of video service connection in an electronic device according, to various embodiments of the present disclosure.

FIG. 30 is a diagram illustrating an example of a screen for displaying a video call standby state at the time of video service connection in an electronic device according to various embodiments of the present disclosure.

Referring to FIG. 30, a screen example of an originating terminal transmitting a video or a screen example during a video communication standby (e.g., a video transmission standby) indicating a transition state to a video service is illustrated.

As shown in FIG. 30, after the video preview preparing screen. 2900 as described with reference to FIG. 29 is displayed, or in a case in which the video preview preparing screen 2900 is not provided, the electronic device 500 may display a video communication standby state 3000 (e.g., video communication standby screen), including a video photographed through a camera when the camera is normally driven.

According to various embodiments, until a video service connection is accepted by a receiving electronic device, the electronic device 500 may display the video communication standby state 3000. In various embodiments, the display of the video communication standby state 3000 may be provided in the form of text 3010 (e.g., "requesting video service" or the like), an icon 3020, or animation (e.g., one or more of the text 3010 and the icon 3020 provided as an animation operation). According to one embodiment, the display of the video communication standby state 3000 may be provided including the function icon 3030 related to a speaker mode transition 3031, a video service end 3033, a mute function 3035, or the like.

According to various embodiments, as described with reference to FIGS. 29 and 30, the video communication standby may be displayed and provided at the time of transition to the video service during the voice call, and related information (e.g., message, icon, etc.) may be changed and provided according to the corresponding status until the video communication connection for the video service is established between the electronic devices.

Figure 31:
FIG. 31 is a diagram illustrating an example of a screen in which a video service is performed in an electronic device according to various embodiments of the present disclosure.

FIG. 31 is a diagram illustrating an example of a screen in which a video service is performed in an electronic device according to various embodiments of the present disclosure.

Referring to FIG. 31, a screen example of a receiving terminal receiving a video is illustrated. For example, FIG.

31 illustrates an example provided to select acceptance or rejection of a user with respect to a video service connection request of an originating terminal, as a screen example of a case in which the electronic device 500 receives the video service connection request from the originating terminal.

As shown in FIG. 31, when a video service connection request message is received from a counterpart electronic device during a voice call, the electronic device 500 may display a user interface in which a user can accept or reject the video service connection. According to one embodiment, the user interface may include a GUI such as pop-up or the like. In various embodiments, the GUI may include one or more of a name, a phone number, a photo, and job-related information of the user of the counterpart electronic device transmitting a video. According to various embodiments, the electronic device 500 may provide additionally or selectively sound, vibration, or the like to the user interface when receiving the video service connection request message.

Figure 32:
FIG. 32 is a diagram illustrating an example of a screen in which a video service is performed in an electronic device according to various embodiments of the present disclosure.

FIG. 32 is a diagram illustrating an example of a screen in which a video service is performed in an electronic device according to various embodiments of the present disclosure.

Referring to FIG. 32, a screen example of a receiving terminal receiving a video is illustrated. For example, FIG. 32 illustrates an example of a screen displayed after the user accepts the video service connection request in the example of FIG. 31.

As shown in FIG. 32, when the video service connection request of the counterpart electronic device is accepted by the user (e.g., when "OK" is selected in FIG. 31), the electronic device 500 may display and provide a video communication standby. FIG. 32 illustrates an example in which information indicating that the video communication is on standby is provided as pop-up.

According to one embodiment, when the user accepts the video service connection, the electronic device 500 may display a standby state display screen and may provide the displayed screen to the user, until the video communication connection for the video service connection with the counterpart electronic device (e.g., a transmitting electronic device) is completed through a server. In various embodiments, the standby state display may be provided in the form of text (e.g., requesting . . . , or the like), icon, or animation.

Figures 33A, 33B:
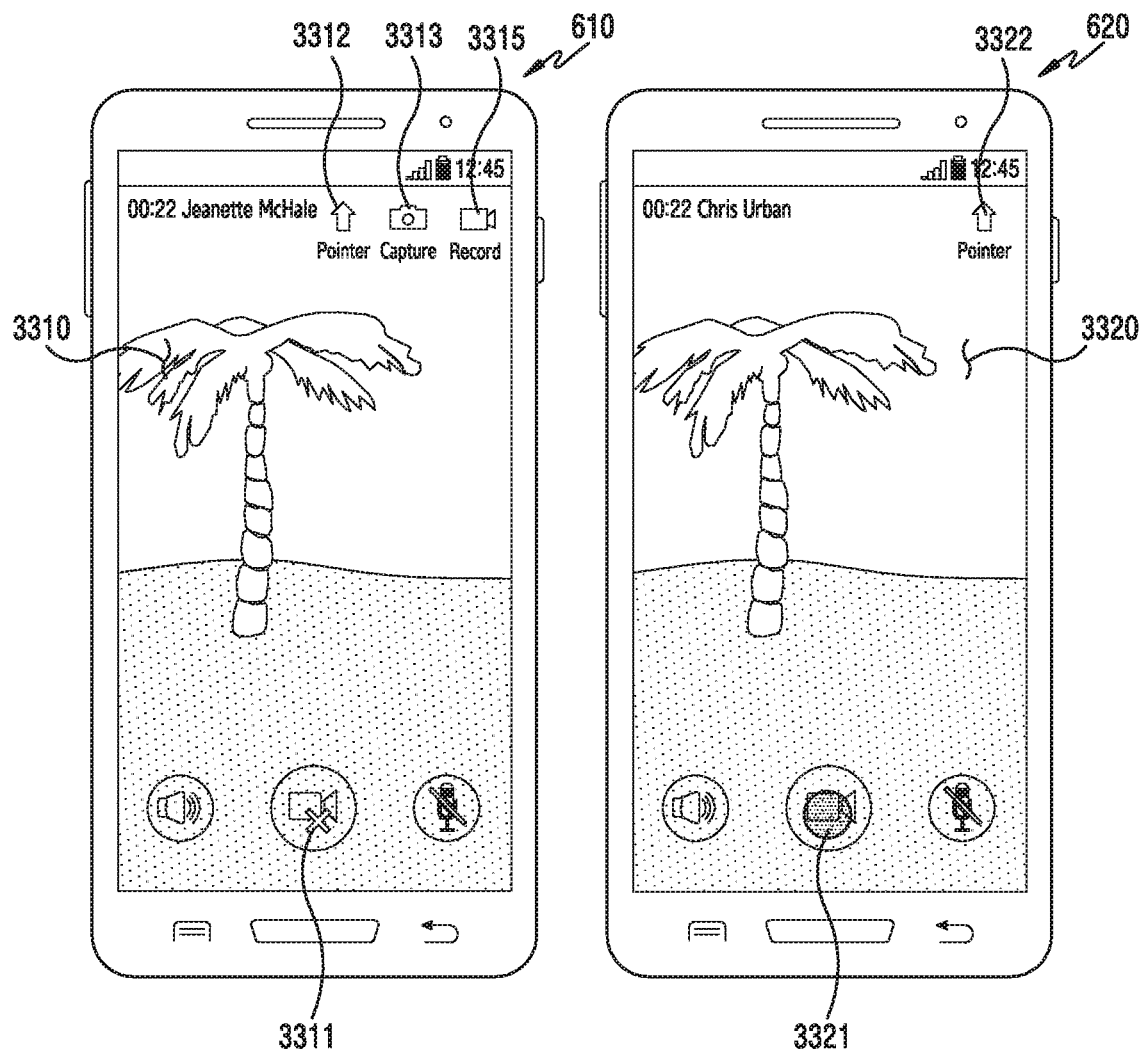
FIGS. 33A and 33B are diagrams illustrating an example of a screen for displaying video call standby at the time of video service connection in an electronic device according to various embodiments of the present disclosure.

FIGS. 33A-33B are diagrams illustrating an example of a screen for displaying video call standby at the time of video service connection in an electronic device according to various embodiments of the present disclosure.

Referring to FIGS. 33A-33B, when a video service connection is established between an originating terminal (e.g., the first electronic device 610) transmitting a video and a receiving terminal (e.g., the second electronic device 620) receiving a video, each screen example is illustrated. For example, (A) of FIGS. 33A-33B illustrate a screen example of an originating terminal side transmitting a video when the video service is connected, and FIG. 33B illustrates a screen example of a receiving terminal side receiving a video when the video service is connected.

As shown in FIG. 33A, when the video service connection between the electronic devices (e.g., the first electronic device 610 and the second electronic device 620) is completed, a video 3310 may be displayed on the first electronic device 610. According to various embodiments, the video 3310 photographed through an internal or external camera may be displayed on the first electronic device 610.

As shown in FIG. 33B, when a video service connection between the electronic devices (e.g., the first electronic device 610 and the second electronic device 620) is completed, a video 3320 may be displayed on the second electronic device 620. The video 3320 transmitted by the first electronic device 610 may be displayed on the second electronic device 620. According to various embodiments, the video 3310 of the first electronic device 610 and the video 3320 of the second electronic device 620 may be provided as the same video.

According to various embodiments, the first electronic device 610 and the second electronic device 620 may include and provide an additional function icon, call duration, transmitter information, and the like, in addition to the videos 3310 and 3320. According to one embodiment, in the case of call duration, since the voice call before the video service connection is still maintained, the total call duration including voice call duration may be displayed.

As shown in FIG. 33A, the additional function icon displayed on the first electronic device 610 may include functions such as speaker mode transition, video service end (e.g., end video service), call end, mute on/off, pointer, capture, record, etc.

According to one embodiment, when the user of the first electronic device 610 selects a video service end function 3311, the video service may be terminated and a transition to the voice call may be performed. According to various embodiments, the video transmission or video call function may be terminated according to the video service end, but the voice call may be maintained. In various embodiments, when the user selects a call end (e.g., voice call end) function, both the video service and the voice call may be terminated.

According to one embodiment, when the user selects the pointer functions 3312, the video 3310 may be paused (e.g., captured or captured capture image is displayed), and an object or object information which is input on the video 3310 by the user at the time of a user input (e.g., writing letters, drawing shapes, entering text, selecting an emoticon, selecting an icon, or the like) may be transmitted to the counterpart electronic device (e.g., the second electronic device 620) and then may be overlaid and displayed on the paused video 3320 of the second electronic device 620 and displayed. According to various embodiments, an object related to an object or object information which is input by the second electronic device 620 may be also displayed on the paused video 3310 of the first electronic device 610 and may be provided.

According to one embodiment, the input object information may include at least one or more of an input position of the object related to the paused video, attributes (e.g., color, thickness, identification information, etc.) of the input object (e.g., letters, shapes, text, emoticons, icons, the like), and orientation information (e.g., three-dimensional phase pose information, motion information, rotation information, landscape or horizontal mode of a display, etc.) based on one or more of various sensors (e.g., geomagnetism sensor, acceleration sensor, gyro sensor, etc.) of the electronic device 500 upon the user input.

According to various embodiments, when the user selects a pointer function 3322 in the second electronic device 620, the video 3320 may be paused (e.g., captured or captured capture image is displayed), and the corresponding image may be transmitted to the first electronic device 610 or time information (e.g., elapsed time since the start of video communication transmission) of a capture point of time may be transmitted to the first electronic device 610, and thereby the two electronic devices 610 and 620 may display the same or similar images and may share the object or object information which is input on the corresponding image, through transmission and reception therebetween. According to various embodiments, the first electronic device 610 may receive the time information of the capture point of time, and a frame image corresponding to or adjacent to the time information may be extracted from the video stored in a camera buffer (e.g., ring buffer) or the memory of the electronic device 500.

According to various embodiments, the object information of the object which is input on the images may be extracted and shared, so that the extracted and shared object information may be displayed on each of the electronic devices 610 and 620. At the same time, when the electronic device 500 receives the object information input by the counterpart electronic device, the object information may be changed and displayed. For example, when the resolution and aspect ratio of the receiving electronic device and the resolution and aspect ratio of the transmitting electronic device are different from each other (e.g., when the resolution of the display is different or the orientation of the display is different (e.g., landscape mode or portrait model), the resolution or orientation at which the corresponding image is to be displayed in the two electronic devices 610 and 620 or the size of the object to be displayed based on zoom state information may be relatively changed and may be displayed at the position according to the corresponding ratio. By way of another example, in a case in which the same color of object is input by the two electronic devices 610 and 620, the object may be changed and displayed in different colors when it is displayed on each of the electronic devices 610 and 620.

According to one embodiment, when the user selects a capture function 3313, a currently photographed video may be captured and stored.

According to one embodiment, when the user selects a record function 3315, a currently photographed video may be recorded and stored.

As shown in FIG. 33B, the additional function icon displayed on the second electronic device 620 may include functions such as speaker mode transition, video service end (e.g., end video service), call end, mute on/off, pointer, and the like.

According to one embodiment, when the user of the second electronic device 620 selects a video service end function 3321, the video service may be terminated and a transition to the voice call may be performed. According to various embodiments, the video transmission or video call function may be terminated according to the video service end, but the voice call may be maintained. According to various embodiments, when the user selects a call end (e.g., voice call end) function, both the video service and the voice call may be terminated.

According to one embodiment, when the user selects the pointer function 3322, the video 3320 may be paused (e.g., captured or captured capture image is displayed), a type (state) drawn on the video 3320 by the user may be transmitted to the counterpart electronic device (e.g., the first electronic device 610) and then may be overlaid and displayed on the paused video 3310 of the first electronic device 610. According to various embodiments, the drawn sate may be also displayed on the paused video 3320 of the second electronic device 620 and may be provided.

According to various embodiments, the various function icons (or menus) provided on the screen displayed on the first electronic device 610 transmitting a video or the second electronic device 620 receiving a video may be displayed, and then may not be displayed after a predetermined time elapses. For example, the function icon may be shown or hidden on the screen. In addition, according to various embodiments, when the user input is recognized after the function icon (or menu) disappears, the disappearing icon (or menu) may be displayed on the screen again. According to one embodiment, a particular icon and menu may remain) displayed without disappearing. A screen example according to the performance of such an operation is shown in FIGS. 34A-34D.

FIGS. 34A-34D are diagrams illustrating an example of a screen in which a video service is performed in an electronic device according to various embodiments of the present disclosure.

Referring to FIGS. 34A-34D, an operation example in which a function icon or menu provided together with a video while a video service is performed is prevented from being displayed on a screen based on an automatic or manual manner and a function icon or menu which is not displayed is displayed according to a user input is illustrated.

As shown in FIG. 34A, during a video service connection request, the icon or menu displayed on the screen may remain displayed without disappearing.

As shown in FIGS. 34B and 34C, when the user input is recognized after the video service is connected, the icon and menu may disappear from the screen or may be displayed on the screen.

According to one embodiment, when the user input is recognized after the video service is connected, the icon and menu may be removed to disappear from the screen. Thereafter, when the user input is recognized again, the icon and the menu may be displayed again on the screen as shown in FIG. 34D.

According to one embodiment, after a predetermined time (e.g., N seconds) has elapsed since the video service was connected, the icon and menu may automatically disappear from the screen and may not be displayed. For example, after a predetermined time elapses in a state in which the user input is recognized and the icon and the menu are displayed, the icon and the menu may disappear again. In addition, when the user input is recognized after the disappearance of the icon and the menu, the icon and the menu may be displayed again on the screen as shown in FIG. 34D.

According to various embodiments, the icon and menu may be set to be selectively displayed or not to be displayed. For example, at least one icon and menu, which is set in advance in the electronic device 500 or set by a user among the icons and the menus, may be continuously displayed on the screen regardless of the user input (or predetermined time).

FIGS. 35A, 35B, 35C, and 35D are diagrams illustrating an example of processing for a video service connection failure in an electronic device according to various embodiments of the present disclosure.

As shown in FIGS. 35A, 35B, 35C, and 35D, according to various embodiments, when a video service connection status is changed according to the availability of a video service, the related status (e.g., one or more of warning message, error pop-up, sound, and vibration) may be displayed through a transmitting electronic device transmitting a video and a receiving electronic device receiving a video. According to various embodiments, a video service connection error may be determined based on a pose status (e.g., at ear mode, an open position mode that is not adjacent to the ear, or the like) of the counterpart electronic device or a proximity status (e.g., cover opened/closed). In various embodiments, the video service connection error according to the pose status (e.g., at ear mode, the open position mode, or the like) or the proximity status may be determined and the performance of an operation according to the determination result will be described with reference to the drawings to be described later.

The types of pop-ups related to the video service connection error according to various embodiments may be provided as shown in the following example.

Figure 35A:
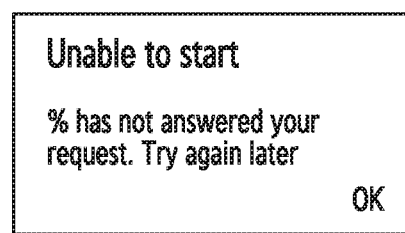
FIGS. 35A, 35B, 35C, and 35D are diagrams illustrating an example of processing for a video service connection failure in an electronic device according to various embodiments of the present disclosure.

As shown in FIG. 35A, an example of a pop-up provided by a transmitting electronic device is illustrated. According to one embodiment, when a video communication-related message for a video service connection has been transmitted to a receiving electronic device but there is no response from the receiving electronic device (e.g., when a user of the receiving electronic device does not accept a video service connection request for a predetermined time (e.g., 20 seconds), or when the video communication-related message is not transmitted), the transmitting electronic device may display a connection error message (e.g., unable to start) in the form of pop-up.

According to various embodiments, when the user does not accept the video service connection request for a predetermined time (e.g., 20 seconds) after the receiving electronic device receives the video communication-related message, the receiving electronic device may automatically transmit a rejection message to the transmitting electronic device in timeout. In this case, the transmitting electronic device may display the connection error message (e.g., unable to start) in the form of pop-up in response to the automatic rejection message of the receiving electronic device.

Figure 35B:
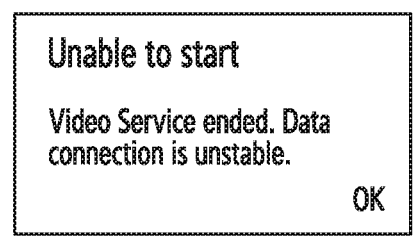
Figure 35C:
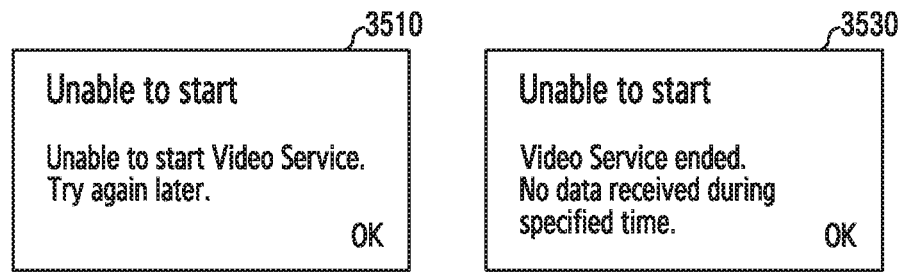

As shown, in FIG. 35B, an example of pop-up provided when the network status cannot maintain the video service even though the receiving electronic device receives the video service connection request is illustrated. According to one embodiment, when the network status is determined and it is determined that the video service is unavailable in a state in which a reception pop-up for the video service connection is displayed on the receiving electronic device, the receiving electronic device may automatically transmit a video service end message to the transmitting electronic device. Each of the transmitting electronic device and the receiving electronic device may display the connection error message (e.g., unable to start) in the form of pop-up in response to the end message. According to various embodiments, when the video service cannot be maintained according to the network status, the connection error message may be automatically displayed without pop-up for acceptance or rejection of the video service connection request.

As shown in FIG. 35B, an example of pop-up provided when a video is not transmitted by an originating terminal within a predetermined time even though the receiving electronic device accepts the video service connection request is illustrated. According to one embodiment, when the transmitting electronic device does not transmit a video even though the receiving electronic device accepts the video service connection request of the transmitting electronic device, the receiving electronic device may automatically terminate the video service. For example, when a video photographed by the transmitting electronic device is not transmitted during a predetermined time (e.g., 10 seconds) after the user accepts the video service connection request so that the video service is connected, the receiving electronic device may transmit the video service end message to the transmitting electronic device. Each of the transmitting electronic device and the receiving electronic device may display the connection error message (e.g., unable to start) in the form of pop-up in response to the end message. According to one embodiment, the transmitting electronic device and the receiving electronic device may display another connection error message. For example, the transmitting electronic device may display and provide a pop-up form 3510 to the user, and the receiving electronic device may display and provide a pop-up form 3530 to the user.

Figure 35D:
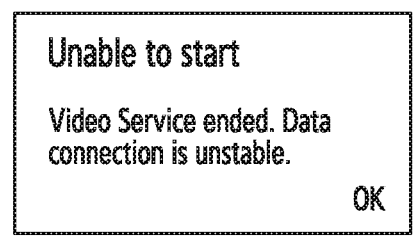

As shown in FIG. 35D, an example of pop-up provided when a P2P connection with the counterpart electronic device is not established within a predetermined time during attempting (originating) a video service connection is illustrated. According to one embodiment, when the video service connection request message of the transmitting electronic device is not transmitted to the receiving electronic device, for example, when the video service connection request message is not transmitted to the receiving electronic device for a predetermined time (e.g., 10 seconds), a corresponding server may transmit a connection disabled message to the transmitting electronic device. The transmitting electronic device may display the connection error message (e.g., unable to start) in the form of pop-up in response to the connection disabled message of the server. In this case, the transmitting electronic device may be in a video service connection standby state, and the receiving electronic device may be in a state in which acceptance/rejection pop-ups are not displayed because the video service connection request is not received.

According to various embodiment, in a state in which the P2P connection is established during attempting (originating) the video service connection as shown in the example of FIG. 35D and the acceptance/rejection of the video service connection request is displayed on the receiving electronic device, the transmitting electronic device may not receive a response to the acceptance/rejection from the receiving electronic device for a predetermined time (e.g., 15 seconds). In this case, the transmitting electronic device may cancel the or according to a timeout (e.g., a predetermined time timer expiration) and may display the connection error message (e.g., unable to start) in the form of pop-up as shown in the example of FIG. 35A.

Figure 36:
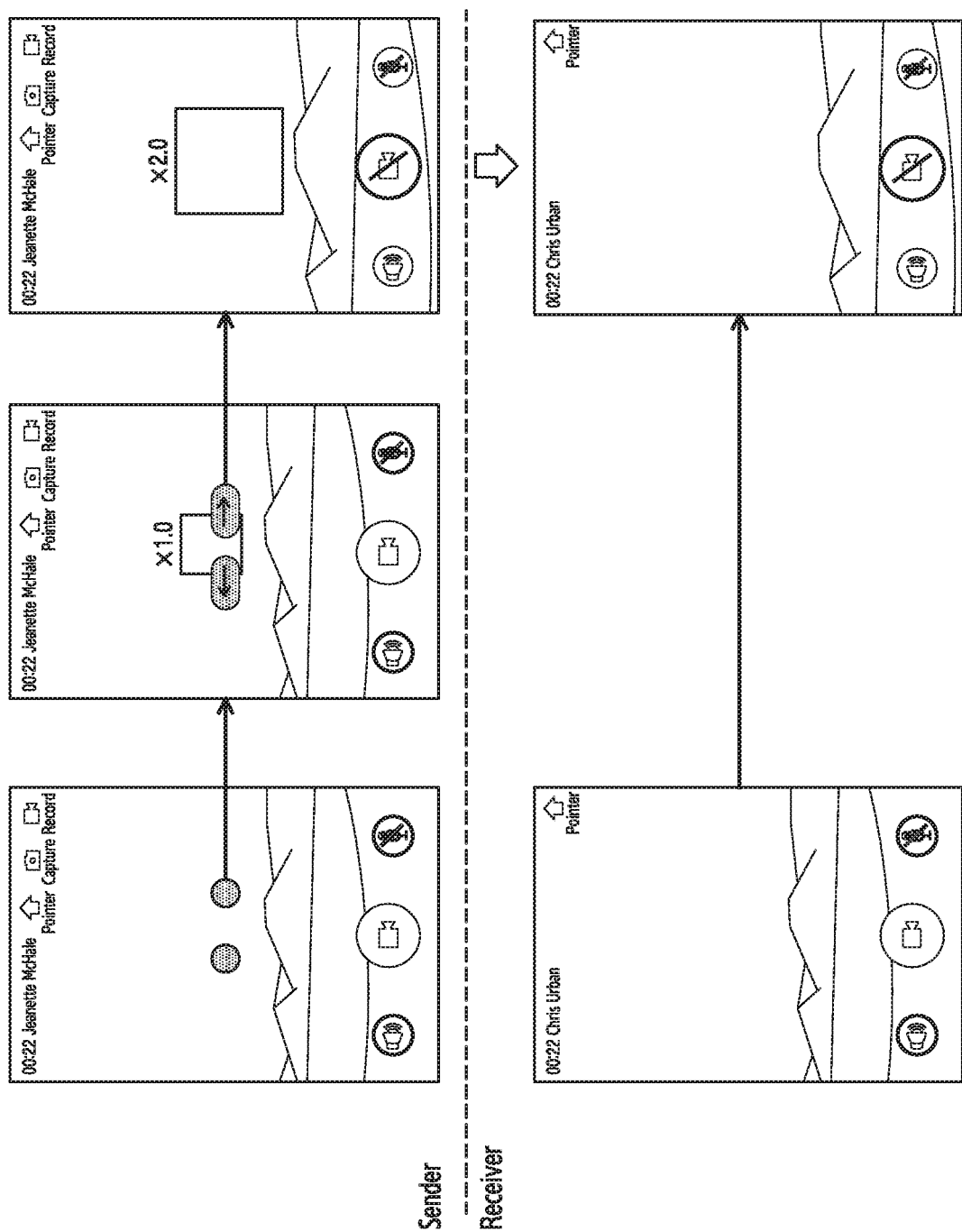
FIG. 36 is a diagram illustrating an example of a screen in which a video service is performed in an electronic device according to various embodiments of the present disclosure.

FIG. 36 is a diagram illustrating an example of a screen in which a video service is performed in an electronic device according to various embodiments of the present disclosure.

Referring to FIG. 36, an operation according to the performance of zooming (e.g., zoom-in/out) in a transmitting electronic device transmitting a video while a video service is performed and a screen example of the operation are illustrated.

As shown in FIG. 36, a user of the transmitting electronic device may perform zooming in the transmitting electronic device while photographing a video. In response to the zooming of the user, the transmitting electronic device may transmit an enlarged video corresponding to the zooming to a counterpart electronic device, may transmit a non-enlarged original video, an enlarged region, and magnification thereto, or may designate and transmit a region to be displayed on a display of a receiving electronic device thereto.

According to one embodiment, the zooming may be performed by pinching a preview screen. The transmitting electronic device may calculate a change in a distance between user's two fingers (e.g., a distance between touched points) by a zoom magnification in the pinching of the user. According to one embodiment, an enlarged portion may be based on a portion where the user's finger is first touched or may be based on a center portion of the two fingers.

According to one embodiment, the zooming may be performed by sensing the pressure using a pressure sensor built in the display. For example, when a pressure sensing value which is larger than or equal to a first threshold value is input for a predetermined time (e.g., 0.3 sec) or longer, zoom-in may be performed, and when the pressure sensing value which is less than the first threshold value and larger than or equal to a second threshold value is input for a predetermined time or longer, zoom-out may be performed. When the pressure sensing value which is less than the second threshold value is input, the zooming function may be determined to be terminated. According to various embodiments, an input position where the pressure is sensed through the position of one or more zoom sensors may be determined, or the input position may be determined in conjunction with a touch sensor.

The transmitting electronic device may separately display the zoom magnification on the preview screen to which the zoom magnification is applied based on the user's input. For example, as shown in the screen example of FIG. 36, the transmitting electronic device may additionally display a reference position to which the magnification is applied and the magnification (for example, X 1.0 or X 2.0) on the screen, starting from a portion where an input for starting the zoom operation starts.

According to various embodiments, a GUI for displaying the magnification may be overlaid and displayed independently of a screen to be zoomed with respect to a predetermined position on the display. For example, even though the center position of the video displayed through the zoom operation is changed, the center point of the GUI displaying the magnification may always be the center point of the display.

According to various embodiments, the receiving electronic device may display the same video as the resultant video obtained through the zooming performed by the transmitting electronic device, based on the enlarged video transmitted by the transmitting electronic device, the non-enlarged original video, the enlarged region, and the magnification, or the designated region.

Figure 37:
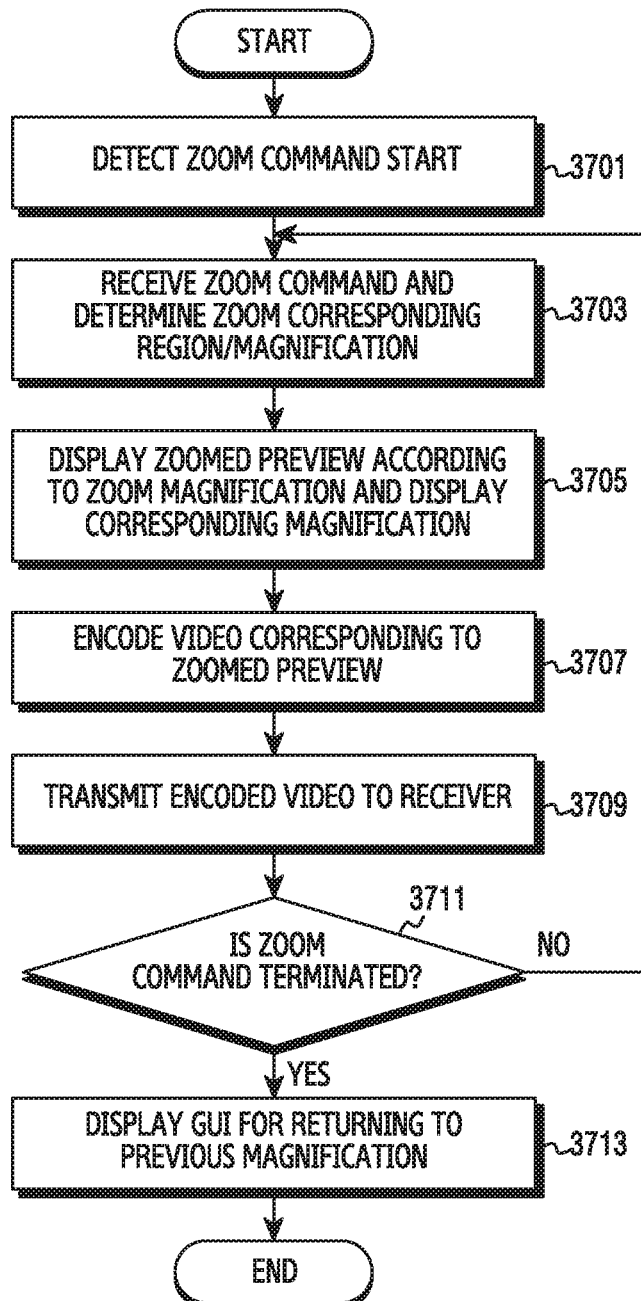
FIG. 37 is a flowchart illustrating a method of performing a video service in an electronic device according to various embodiments of the present disclosure.

FIG. 37 is a flowchart illustrating a method of performing a video service in an electronic device according to various embodiments of the present disclosure.

In various embodiments, FIG. 37 illustrates an example of a processing method according to the performance of zooming as shown in the example of FIG. 36, while the electronic device 500 performs a video service to an originating terminal for video transmission.

Referring to FIG. 37, in operation 3701, the controller 580 (e.g., a processor of an electronic device acting as an originating terminal) of the electronic device 500 may detect the start of a zoom command based on a user input.

In operation 3703, when receiving the zoom command according to the user input, the controller 580 may determine a zoom region/magnification corresponding to the user input.

In operation 3705, the controller 580 may display a screen (e.g., a zoomed preview) to be zoomed according to the zoom magnification, and may display the magnification corresponding to the zoomed screen. In various embodiments, when displaying the magnification, the controller 580 may overlay and display the magnification independently of the zoomed screen.

In operation 3707, the controller 580 may process video encoding corresponding to the zoomed screen.

In operation 3709, the controller 580 may transmit the encoded video to a counterpart electronic device (e.g., a receiving electronic device).

In operation 3711, the controller 580 may determine whether the zoom command is terminated.

When the termination of the zoom command is not detected in operation 3711 (NO of operation 3711) (e.g., when the zoom command is continuously input), the controller 580 may proceed to operation 3703 to perform operations before operation 3703.

In operation 3713, when the termination of the zoom command is detected in operation 3711 (YES of operation 3711), the controller 580 may display a GUI for returning to a previous magnification. In various embodiments, the display of the GUI for returning to the previous magnification of operation 3713 may not optionally be performed. For example, when the zoom command is terminated, the controller 580 may be operated to maintain and display the changed current magnification, or to automatically display a video of the magnification of an original video.

In various embodiments, the results according to the enlargement and reduction of the video caused by the zoom operation may be transmitted to the counterpart electronic device.

According to one embodiment, the electronic device 500 may continuously perform video encoding on a preview to which zoom is applied and may transmitted the result of the video encoding to the counterpart electronic device.

According to one embodiment, when the zoom operation is performed, the electronic device 500 may enlarge or reduce only a part of the entire video input through a camera and may display the enlarged or reduced video as a preview video on the display. Accordingly, transmission to the counterpart electronic device may be performed in the same manner irrespective of whether the zoom operation is performed, and at least one piece of information of magnification, size, and a region to be displayed together with a zoom position may be transmitted to the counterpart electronic device so that processing by the zoom operation may be performed in the counterpart electronic device. According to various embodiments, when the zoom position (e.g., a center point, a display boundary, etc.) is changed by the user interface, the region displayed by the zooming function may also be changed. In various embodiments, video processing tasks such as the zoom operation may transmit a user input received through an application (e.g., 618 of FIG. 8) to a media processor (e.g., 840 of FIG. 8), and the media processor 840 may control and perform one or more of a camera (e.g., 810 of FIG. 8), an encoder (e.g., 846 of FIG. 8), and a network (e.g., 850 of FIG. 8).

According to various embodiments, when the zoom operation is terminated, the electronic device 500 may selectively display, on the display, a GUI (e.g., one or more of a button, an icon, and text) for allowing a user to return to a previous magnification. The selectively displayed GUI may be provided to disappear automatically after a certain time.

Figure 38:
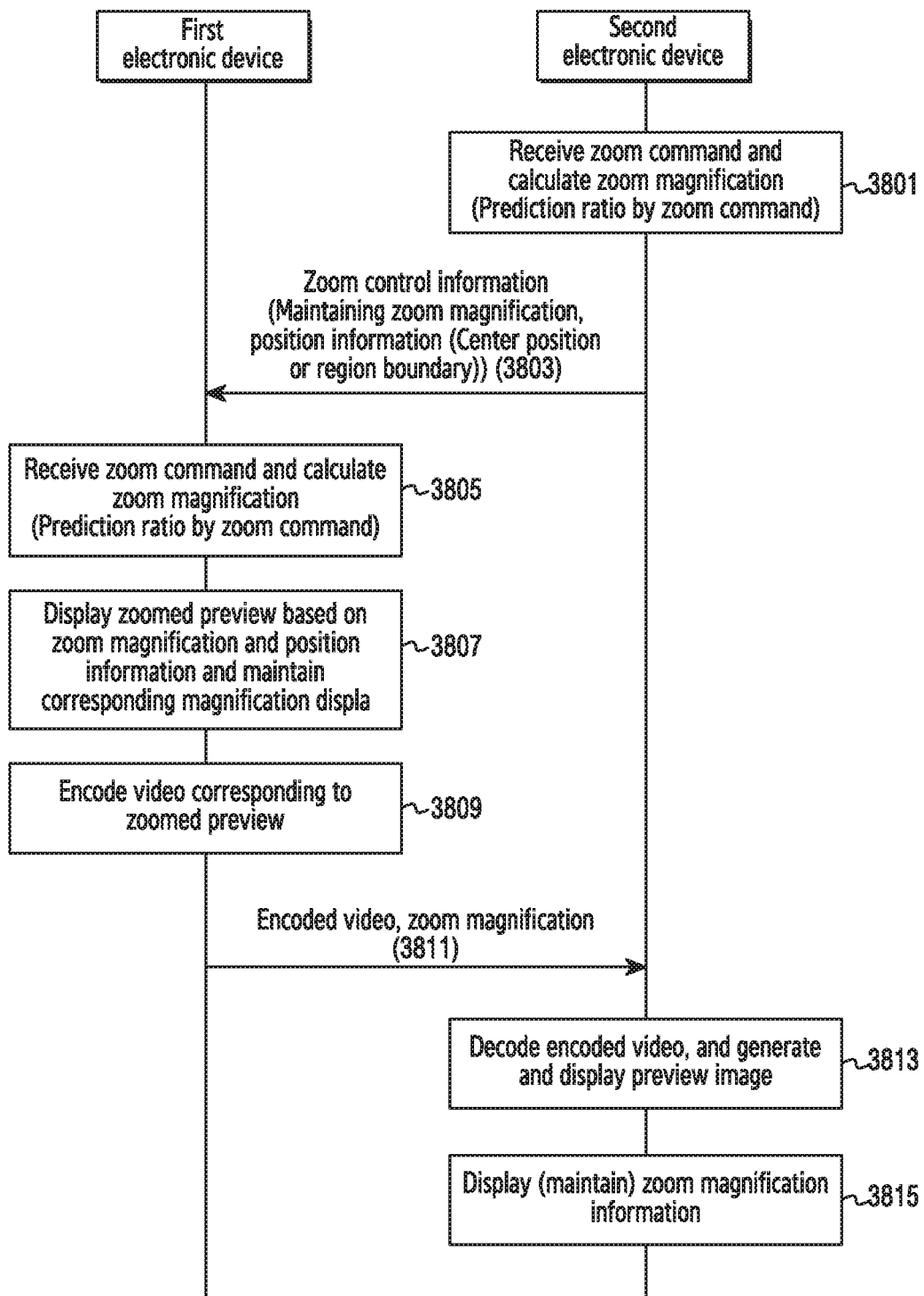
FIG. 38 is a diagram illustrating a method of performing a video service between electronic devices according to various embodiments of the present disclosure.

FIG. 38 is a diagram illustrating a method of performing a video service between electronic devices according to various embodiments of the present disclosure.

In various embodiments, FIG. 38 illustrates an example of an operation of processing and displaying a video according to a zoom operation between electronic devices (e.g., the first electronic device 610 transmitting a video and the second electronic device 620 receiving a video). In FIG. 38, a case in which the zoom operation is requested by the second electronic device 620 receiving a video is illustrated as an example.

Referring to FIG. 38, in operation 3801, the electronic device 620 may receive a zoom command based on a user input, and may calculate a zoom magnification according to the received zoom command. For example, the second electronic device 620 may calculate a prediction ratio by the zoom command.

In operation 3803, the second electronic device 620 may transmit zoom control information to the first electronic device 610 providing a video. In various embodiments, the zoom control information may include zoom magnification and position information (e.g., center position or region boundary), network status information, and the like.

In operation 3805, the first electronic device 610 may calculate the zoom magnification to correspond to the zoom command of the second electronic device 620. For example, the first electronic device 610 may receive the zoom control information from the second electronic device 620, and may determine that the reception of the zoom control information is reception of the zoom command of the video. The first electronic device 610 may calculate a zoom magnification based on the zoom magnification and position information of the zoom control information. For example, the first electronic device 610 may calculate the prediction ratio by the zoom command.

In operation 3807, the first electronic device 610 may display a screen (e.g., a zoomed preview) to be zoomed based on the zoom magnification and the position information. The first electronic device 610 may display information about the magnification of the zoomed screen as an independent overlay, independently of the screen to be zoomed.

In operation 3809, the first electronic device 610 may process video encoding corresponding to the screen (e.g., zoomed preview) to be zoomed, thereby generating an encoded video.

In operation 3811, the first electronic device 610 may transmit the encoded video and the zoom magnification to the second electronic device 620.

In operation 3813, when receiving the encoded video from the first electronic device 610, the second electronic device 620 may decode the encoded video and may generate and display a preview image.

In operation 3815, when displaying the preview image, the second electronic device 620 may display the magnification received from the first electronic device 610 or information about the magnification calculated in operation 3801 as an overlay, independently of the preview image.

As described above, according to various embodiments, zoom-in/out may be provided even by the receiving-side electronic device receiving a video.

According to various embodiments, when receiving a command for zoom-in or zoom-out, the receiving-side electronic device is required to transmit the corresponding command to the transmitting-side electronic device. In various embodiments, control information transmitted to the transmitting-side electronic device according to the zoom performance of the receiving-side electronic device may include, for example, a zoom magnification, a reference position to which the magnification is to be applied, a region boundary when the zoom operation is completed, network status, and the like. According to one embodiment, the control information may be calculated for each frame when an input for the zoom operation is entered to the receiving-side electronic device and may be transmitted. According to another embodiment, the receiving-side electronic device may transmit the control information (signal) at a time when the input for the zoom operation is completed.

According to various embodiments, the transmitting-side electronic device may receive the corresponding information based on the control information transmitted from the receiving-side electronic device, via the media processor, may generate a preview corresponding to the zoom magnification by controlling the camera, the decoder, and the network, and may provide information corresponding to the generated preview to a separate GUI. According to various embodiments, the provided GUI may be the same GUI as in a case in which the transmitting-side electronic device performs the zoom operation, and the color, shape, thickness, etc., of the GUI may be displayed differently based on a user who has input the command. The transmitting-side electronic device may encode the video to which the zoom operation is applied and may transmit the encoded video to the receiving-side electronic device.

According to various embodiments, in some cases, the transmitting-side electronic device may generate and transmit a video for a magnification of at least one between a start zoom magnification and a final zoom magnification of the zoom operation in consideration of a network state at the time of video transmission.

According to various embodiments, the receiving-side electronic device may receive the video transmitted from the transmitting-side electronic device, may display the received video on the screen, and may selectively display magnification information. According to one embodiment, when transmitting the video for the magnification of at least one between the start zoom magnification and the final zoom magnification in the transmitting electronic device, the transmitting-side electronic device may also provide the corresponding magnification information to the receiving-side electronic device, and the receiving-side electronic device may independently display the magnification information together with the video. In addition, the receiving-side electronic device may display the final zoom magnification on the screen.

As described above, according to various embodiments, when the receiving-side electronic device receives the corresponding information through the user input or when a predetermined region is set to be zoomed automatically (e.g., automatic zoom with respect to an object or face region zoom), the receiving-side electronic device may perform zoom-related processing together with the transmitting-side electronic device.

According to various embodiments, a zoom video processing method may be performed based on a camera direct control (e.g., remote control/optical zooming), an image process module control (e.g., digital zooming), and the like.

According to various embodiments, a method of processing the encoded video may be performed by maintaining the transmission of maximum resolution video data and performing the zoom operation in each electronic device (independently performing the zoom operation through the decoded result in each electronic device), transmitting and receiving the maximum resolution video data zoomed in an optical manner through an optical zoom, or performing transmission and reception processing by encoding only the zoomed region.

According to various embodiments, automatic zoom of region of interest (ROI) by a user input may be provided. For example, the ROI or an object region of interesting may be set by the user input (e.g., pointing, drag, object-focused shooting, etc.), and the zoom operation may be performed automatically according to the ROI or the object region of interesting.

According to various embodiments, the reception and display of the zoom region information of the other party may be provided. For example, the ROI or zoom region designated by the other party may be received and the received region may be displayed on the displayed video.

According to one embodiment, when the displayed region is included in the outline of the currently displayed video, the same may be displayed in a separate GUI.

Figure 39A:
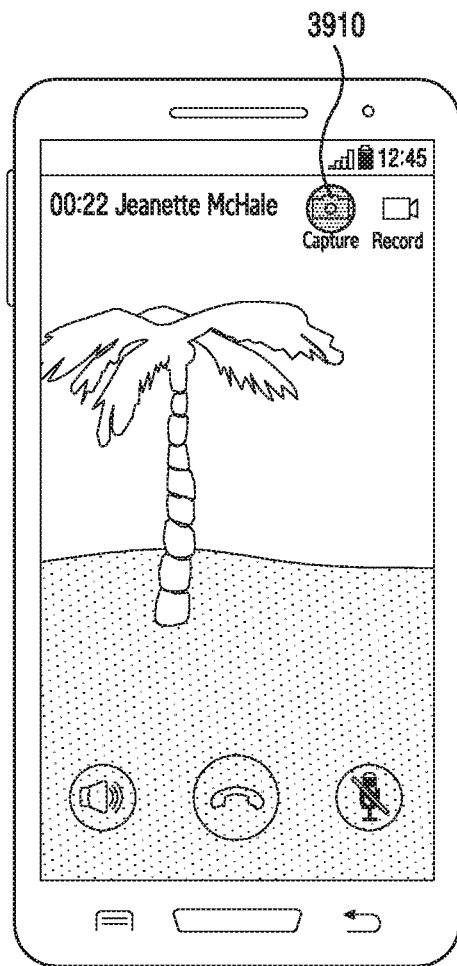
FIGS. 39A and 39B are diagrams illustrating an example of a screen in which a video service is performed in an electronic device according to various embodiments of the present disclosure.
Figure 39B:
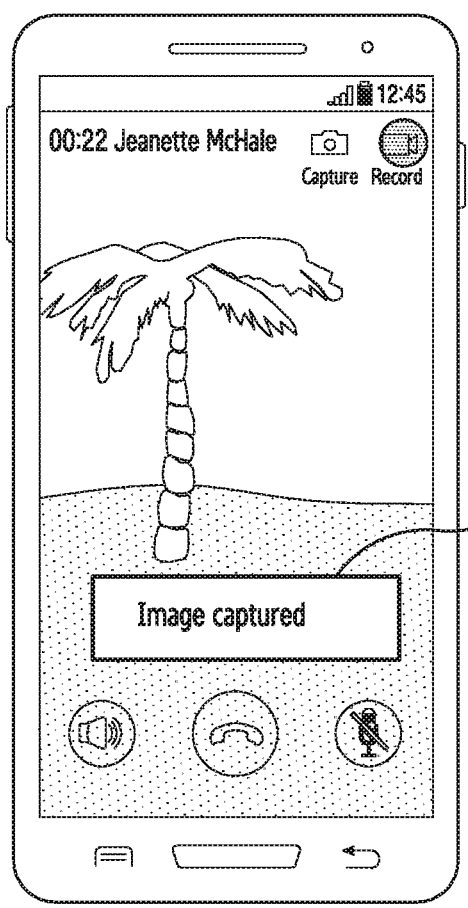

FIGS. 39A-39B are diagrams illustrating an example of a screen in which a video service is performed in an electronic device according to various embodiments of the present disclosure.

Referring to FIGS. 39A-39B, an operation of capturing a displayed video during performing a video service and a screen example of the operation are illustrated.

As shown in FIGS. 39A-39B, a capture function during performing the video service may be performed in such a manner that a user selects a capture button 3910 while the video service is performed. According to various embodiments, an example of performing image capture is as follows.

According to one embodiment, a case in which video capture is performed in a first electronic device providing a video may be provided. The first electronic device may acquire a post-processed image to transmit a high-definition original image and a moving image acquired through a camera in a state in which a user presses the capture button 3910. According to various embodiments, the first electronic device may store the high-definition original image when the capture button 3910 is input, and may additionally share the stored image with a second electronic device. According to various embodiments for an input for the video capture, capture may be requested by the capture button 3910 in the second electronic device other than the first electronic device, and the first electronic device may operate the camera in response to the request of the second electronic device.

According to one embodiment, a case in which video capture is performed in the second electronic device receiving a video may be provided. When the capture button 3910 is selected, the second electronic device may extract an image at the moment of pressing the capture button 3910 in a moving image transmitted in a network stream. The extracted image may have a characteristic in which the quality depends on the network status. When there is a user's separate request or the network quality is poor, the extracted image may be received by requesting a high-quality image stored at the moment of pressing the capture button 3910 from the first electronic device.

According to various embodiments, when the receiving-side second electronic device requests a high-quality original video of the transmitting-side first electronic device, the first electronic device may identify a timestamp at a point of time when the capture button 3910 is pressed in the second electronic device, may search for the original video of the corresponding point of time, and may transmit the searched original video to the second electronic device.

According to various embodiments, when the receiving-side second electronic device requests the high-quality original video of the transmitting-side first electronic device, the first electronic device may acquire a photographed video by operating the camera in response to the request of the second electronic device and may transmit the acquired video to the second electronic device, in the same manner as in a method of manipulating the camera using a remote controller.

According to various embodiments, when the capture function is performed, one or more visual effects (e.g., visual interaction (VI)) of generation of camera shutter effect sound, screen blinking, screen shaking, and fade in effect after screen fade out may be provided, and in a situation in which a videos is captured, the storage of the captured image may be displayed as a pop-up 3930 such as "image captured" or "filename_saved (e.g., AAA001 saved)", and may be provided to a user.

According to various embodiments, when performing a capture operation, the first electronic device and/or the second electronic device may capture only the video acquired through the camera. For example, in FIGS. 39A-39B, only the preview screen may be captured and the captured video may not include a function icon or menu displayed on the screen. In various embodiments, the function icon or menu may be operated independently of the capture of the video. According to one embodiment, call duration may be continuously counted and displayed (e.g., 00:22→00:23). Additionally or alternatively, the captured video may capture the function icon or menu at the time of capture, including them.

Figure 40A:
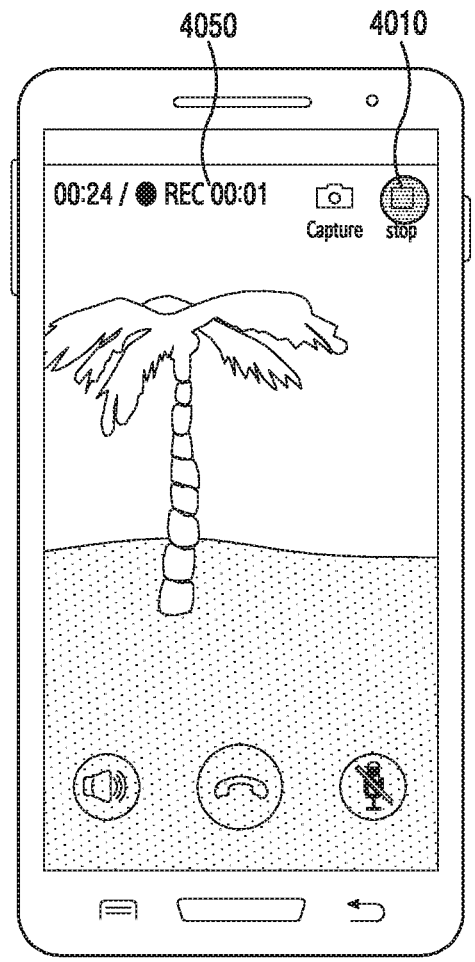
FIGS. 40A and 40B are diagrams illustrating an example of a screen in which a video service is performed in an electronic device according to various embodiments of the present disclosure.
Figure 40B:
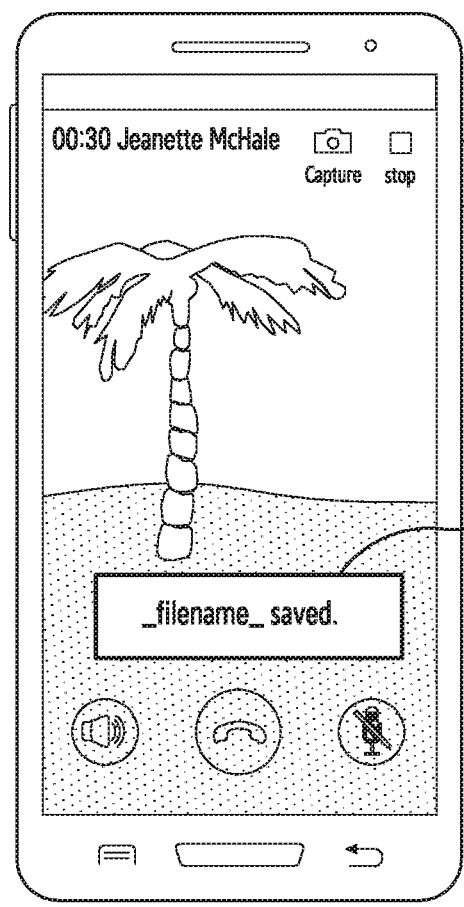

FIGS. 40A-40B are diagrams illustrating an example of a screen in which a video service is performed in an electronic device according to various embodiments of the present disclosure.

Referring to FIGS. 40A-40B, an operation of recording a displayed video while a video service is performed and a screen example of the operation are illustrated.

As shown in FIGS. 40A-40B, a recording function of the video service may be performed in such a manner that a user selects a recording button 4010 while the video service is performed. According to various embodiments, an example of performing recording as follows.

According to one embodiment, a case in which recording is performed in a first electronic device providing a video may be provided. According to various embodiments, in a case of a moving image, it may be encoded through an encoder for network transmission and may be network streamed, and therefore the network condition (e.g., upload channel of the first electronic device and download channel of the second electronic device) may affect the quality of a video even though the recording function is performed in the first electronic device. Accordingly, a video to be recoded may be stored at the highest quality only when the network environment is good, and a moving image having such a characteristic (for example, because a transmission video has a loss of the transmission rate (bit rate) per second compared to a video which is generally taken by the camera {up to 3.5 Mbps, based on 1080p}) may be stored.

In addition, when the first electronic device separately operates an encoder for storing an original moving image, the moving image having the original image quality irrespective of the network condition may be stored. For example, a media processor may be used to control video encoding for network transmission and video encoding for storing the original video received through the camera to be processed separately.

According to one embodiment, a case in which recording is performed by the second electronic device receiving a video may be provided. The second electronic device may store a variable quality video according to the condition of a network path from the first electronic device. According to various embodiments, the second electronic device may request sharing of a recorded moving image of the original quality from the first electronic device to acquire a recorded video, after a voice call, as necessary.

According to various embodiments, the first electronic device may acquire a video of the original quality in response to the request of the second electronic device after the call is terminated. In various embodiments, the acquired data may be local data stored in the first electronic device and data stored in the server.

According to various embodiments, a moving image applies scalable coding, only enhanced layer data of a portion where the quality is degraded from the stored moving image of the second electronic device may be requested to the server. In this case, the server may additionally provide missing enhanced layer data.

According to various embodiments, when the moving image apples a DASH scheme, with respect to a portion where a low quality packet is requested from the stored moving image of the second electronic device, only a high quality portion may be requested again with reference to a DASH playlist in the future to recover the quality.

According to various embodiments, when performing a recording operation, the first electronic device and/or the second electronic device may display a recording elapsed time 4050 (e.g., REC 00:01). According to various embodiments, a user may be informed that recording is being performed, through blinking of the recording elapsed time 4050 and/or a recording icon 4010 while the recording operation is performed. According to various embodiments, when recording is completed, the fact, that the recorded video is stored may be displayed as a pop-up 4030 such as in "_filename_saved (e.g., BBB003 saved)" and may be provided to a user.

According to various embodiments, when performing the recording operation, the first electronic device and/or the second electronic device may record only the video acquired through the camera. For example, in FIGS. 40A-40B, only a preview screen may be recorded, and the recorded video may not include a function icon or menu displayed on the screen. In various embodiments, the function icon or menu may be operated independently of the recording of the video. According to one embodiment, call duration may be continuously counted and displayed (e.g., 00:24→00:30).

As described above with reference to FIGS. 39A, 39B, 40A and 403, according to various embodiments, contents captured or recorded at the time of executing a video service may be shared.

According to various embodiments, when the video service is terminated, the captured image or recorded video performed by a user while the video service is performed may be displayed in the form of thumbnail, or may be briefly summarized. Such information may be provided through pop-ups. The user may confirm the corresponding contents and may designate an object to be shared, thereby sharing contents desired to be shared to other users through a pop-up menu.

According to various embodiments, even when the video service being performed, the previously stored captured image or recorded video may be shared or inquired.

According to various embodiments, contents (e.g., captured image or recorded video) generated during a call may be stored in the electronic device or the server to be stored in a video service-related folder. According to one embodiment, a folder name may include call-related information. For example, the folder name may include time, date, and the other party information. According to various embodiments, after the call is terminated, call information (e.g., time) may be compared with the folder name or it may be determined that the corresponding folder a recently created folder, and therefore it may be determined that the created contents are created during a call with a partner.

According to various embodiments, an operation of sharing contents will be described with reference to the drawings to be described later.

Figure 41:
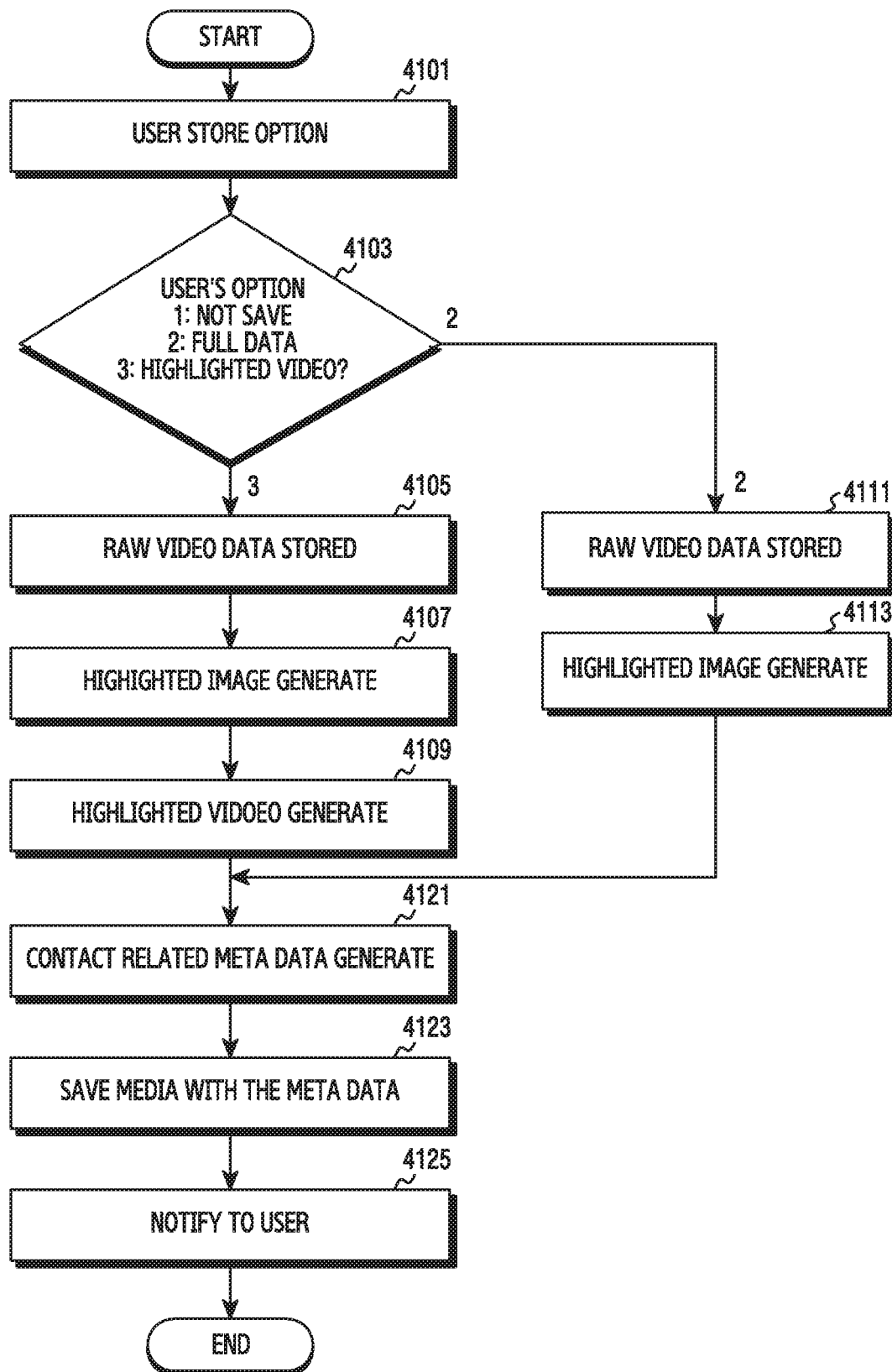
FIG. 41 is a flowchart illustrating a method of performing a video service in an electronic device according to various embodiments of the present disclosure.

FIG. 41 is a flowchart illustrating a method of performing a video service in an electronic device according to various embodiments of the present disclosure.

According to various embodiments, FIG. 41 illustrates an example of an operation in which the electronic device 500 provides a media footprint service. According to various embodiments, tree media footprint service may indicate a function in which contact information is added in the form of metadata to a still image or a moving image created or shared while a video service is performed and thereafter, a user may efficiently use various information according to the video service. According to various embodiments, in addition to the contact information, efficient information according to various conditions while the video service is being used may be added, and therefore it is possible to provide additional benefits to a user. According to various embodiments, the metadata may be included and stored in an image file or may be stored in a separate associated file or database. According to various embodiments, an image may be used as meaning including one or more of a still image, a moving image, an animation, a preview video, and a Bayer image.

Referring to FIG. 41, in operation 4101, the controller 580 (e.g., a processor) of the electronic device 500 may identify a user's storage option and may determine a user's option in operation 4103. According to various embodiments, the user's option may indicate an option that sets a range of data to be stored or shared when the video service is used. The user's option may be stored in advance according to user setting. The user's option may include options such as full data, highlighted video, etc. The controller 580 may identify a selection option stored in advance by a user at the time of a video call according to the video service. For example, the controller 580 may identify the setting option such as whether the user's option is stored, the use of the full data, the use of the highlighted video, or the like.

In operation 4103, when it is determined that the user's option is not stored (e.g., 1 of operation 4103), the controller 580 may prevent a footprint function from being performed or may perform a function based on a reference setting option (e.g., full data) set by the electronic device 500.

When it is determined that the user's option is stored (set) as highlighted data (3 of operation 413) in operation 4103, the controller 580 may acquire raw video data in operation 4105.

In operations 4107 and 4109, the controller 580 may generate a highlighted image and/or highlighted video using the raw video data. In various embodiments, when operations 4107 and 4109 are not limited to the illustrated posterior relationship, operations 4107 and 4109 may be performed sequentially, in parallel, or in reverse order.

When it is determined that the user's option is stored (set) as full data (2 of operation 4103) in operation 4103, the controller 580 may generate a highlighted image using the raw video data in operation 4113.

In operation 4121, the controller 580 may generate metadata related to contact based on the highlighted video generated in operation 4109 or the highlighted image generated in operation 4113.

In operation 4123, the controller 580 may store metadata and media.

In operation 4125, the controller 580 may notify a user of the corresponding information.

As described above, in various embodiments, a video call according to the video service may be stored or shared according to the selection option of the user. In various embodiments, the media footprint service may be provided. The media footprint service may include service that is managed and provided by adding contact information in the form of metadata to the image or moving image generated or shared in the video service situation. Hereinafter, an example of a specific operation of FIG. 41 of storing (or sharing) video call data according to a user's video service will be described.

As shown in operations 4101 and 4103, the storage (or sharing) of the video according to the video call (hereinafter, referred to as video call) by the video service may be based on the option selection of the user, and may be stored based on capability of the electronic device 500 and a service check status.

In various embodiments, the user's option may be classified into, for example, not save, full data, highlighted video, image, and the like.

The not save may include an option that does not store the video call of the user. The full data may indicate an option that stores the video call of the user as raw data and automatically generates a highlighted image for the corresponding data. The highlighted video may indicate an option that does not store the raw data and generates a highlighted video and a highlighted image and then deletes the raw data. The image may indicate an option that detects a user input operation (e.g., capture, focusing, pause, pointing, or the like) and stores an image which is acquired through a camera at the corresponding point of time, is displayed through a screen, or is stored in one memory (e.g., ring buffer). The stored image may be a still image, an animation image (e.g., gif), a panorama image, or a 3D or 2.5D image using a depth sensor value (e.g., depth information).

In various embodiments, the capability check of the electronic device may be classified into, for example, battery status check, memory space check, etc.

When a battery status for storing a video is insufficient (e.g., less than predetermined capacity) through the battery status check, the electronic device may not store the corresponding video. When a memory space for storming a video is insufficient (e.g., less than a predetermined size) through the memory check, the electronic device may store full data or a highlighted video according to the memory status, and then may discard the original one. When the memory space is insufficient to store the highlighted video according to the memory status, the video may not be stored. In various embodiments, the stored data may include a user's voice call content and video data, and may include additional information that can be sensed by the electronic device, such as location information of a caller, location information of a receiver, call duration (e.g., call date & time) information, and the like.

As shown in operations 4107 and 4113, a method of generating the highlighted image may be performed as follows.

According to one embodiment, a large change in a scene may be used. For example, when a large change in a scene during a video call progress by differential image analysis, a change request of a front/rear camera by switching a camera, or a large movement of an electronic device through a motion sensor is detected (acquired), a blurriness image before and after the large change in the scene may be acquired by editing a ring buffer storing a video, and a highlighted image may be generated based on the corresponding image.

According to one embodiment, a focused image may be used. For example, when detecting an object that a user wishes to share during a video call, the electronic device may automatically focus on the object or may focus thereon by a user's gesture. For example, the electronic device may generate a highlighted image based on a video of the corresponding object or region when a camera lens focuses on the object.

According to one embodiment, the blurriness image may be used. For example, the quality of the video may deteriorate due to the movement of the electronic device according to the video call progress or due to slight or large tremors in the user's hand holding the electronic device. As such, when obtaining the blurless image during the video call, the electronic device may generate the highlighted image based on that moment.

According to one embodiment, a pointed image may be used. For example, when a paused image is generated through a user's pausing gesture, a highlighted image may be generated based on the paused image.

A method of generating the highlighted video, which is shown in operation 4109, may be performed as follows.

According to one embodiment, a large change in a scene may be used. For example, when it is detected that a predetermined amount of change or more has occurred based on an amount of change in a motion through a differential video, an amount of change in a color, and the like, a highlighted video may be generated.

According to one embodiment, a large change in a voice may be used. For example, when a sound of a predetermined volume or more is generated or when a sensing direction of a sound is changed using a multi-microphone, a highlighted video may be generated.

According to one embodiment, a change in a topic may be used. For example, when an event is detected or a new topic is detected using voice recognition or video recognition (e.g., character recognition, new character detection through face recognition, barcode recognition, deep learning-based object recognition, or the like), a highlighted video may be generated.

A method of generating contact-related metadata, which is shown in operation 4121, may be performed as follows.

For example, contact data of the call partner may be generated as metadata in media data generated by a video call. According to various embodiments, information that can be added (inserted) as the metadata may include a caller's name of the other party that originates/receives a call, call date & time, caller's location information, receiver's location information, and the like.

A method of storing media and metadata, which is shown in operation 4123, may be performed as follows.

Figure 42:
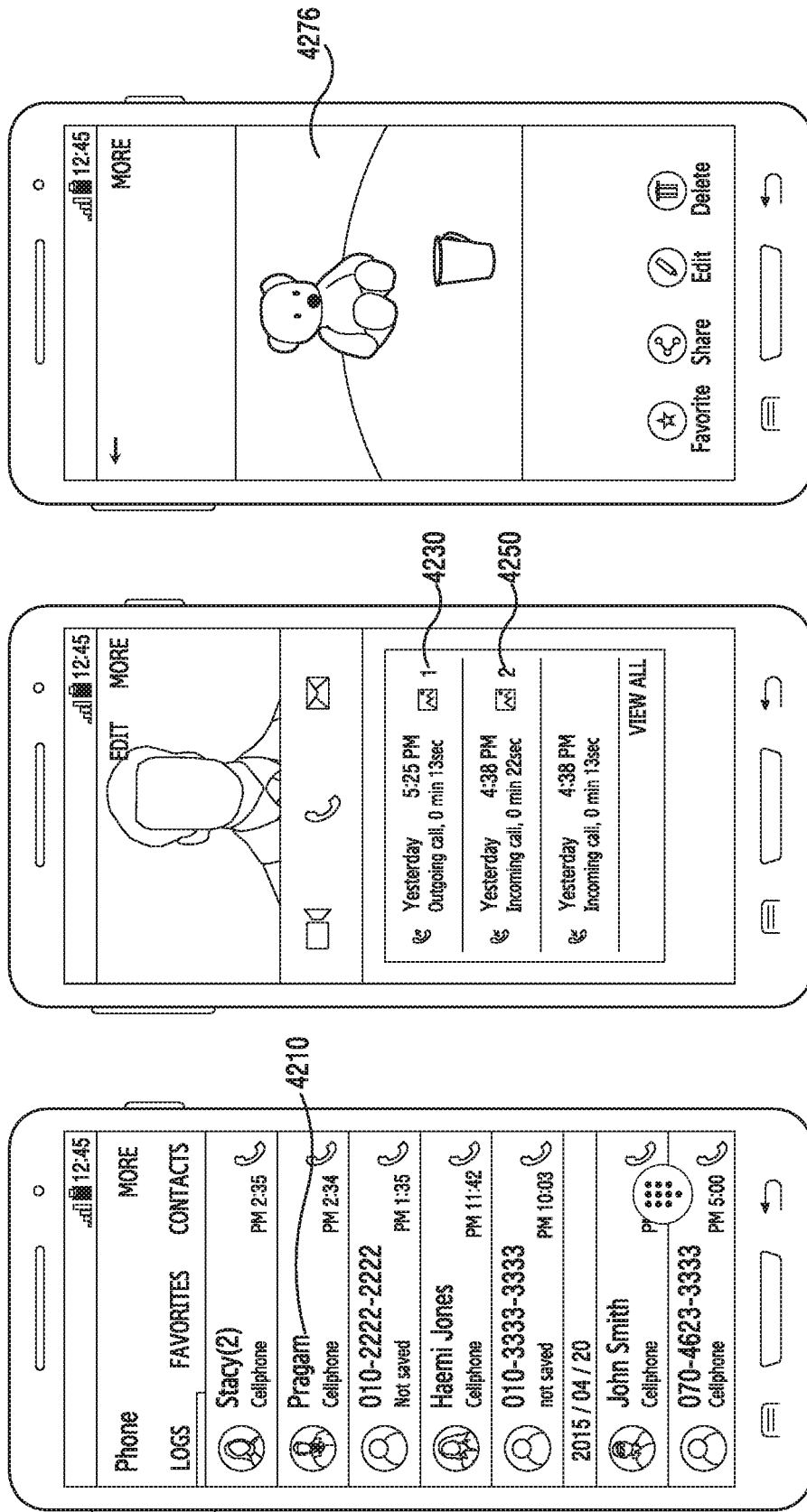
FIGS. 42A, 42B, and 42C are diagrams illustrating an example of a user interface of an electronic device according to various embodiments of the present disclosure.

According to one embodiment, media data may be attached to a call log detailed view. For example, when a call log for managing a video call is generated, corresponding media data may be directly connected and managed in the call log based on the generated metadata various embodiments, the call log according to the video call may be managed in the same structure for two types of calls, that is, a circuit switching (CS) call and a packet switching (PS) call. According to one embodiment, shortcuts (e.g., icon, text, numbers, etc.) of associated media data may be generated as the caller's name and call date & time information on a detailed view screen of the call log through the metadata generated after the video call is terminated, as shown in FIGS. 42A-42C to be described later. In various embodiments, when the generated shortcut is selected, media data separated according to the metadata included in the corresponding shortcut may be provided. In various embodiments, the media data may have the form of a general picture and a moving image, and may be operable for file attributes that general media data may have, such as designating, sharing, editing, or deleting favorites. A screen example related to this will be described with reference to FIGS. 42A-42C to be described later.

According to one embodiment, the associated contact may be generated as new metadata. According to various embodiments, when file attributes for the media file generated through the video call are identified, the content of the generated metadata may be identified. According to one embodiment, a contact name of the video call partner may be identified, and a video call date and time, location information of a caller, location information of a receiver, and the like may be identified. According to one embodiment, the content of the metadata which can be identified may not include all the content of the generated metadata. According to one embodiment, general attribute information (e.g., file name, file path, type, size, resolution, orientation, etc.) of the media data not related to the video call may be identified, and attributes (e.g., categories, detected people, etc.) extracted from characteristics of the corresponding image may also be identified. A screen example related to this will be described with reference to FIG. 43 to be described later.

According to one embodiment, media may be searched based on metadata. According to various embodiments, search for the highlighted video and highlighted image automatically generated after the video call is terminated may be possible through metadata. For example, media search for the video service-related content according to a name of the other party who made a video call based on the video service, date and time of the video call, a location of the other party, and my location may be possible, such as 'pictures during a call with Mike', 'content of a call with Mike at Christmas', 'video call made by Mike during his trip to New York', 'video call made by me during my trip to Jeju Island', 'video call that has been made in the evening of a week before', and the like. To this end, the electronic device 500 may perform natural language processing and may use search by voice input or character input. A screen example related to this will be described with reference to FIG. 44 to be described later.

A method of notifying a user of corresponding information, which is shown in operation 4125, may be performed as follows.

According to one embodiment, as described above, the video call may store full data or highlighted media data (e.g., highlighted video or highlight image) according to a user's storage option. At this time, the electronic device may automatically generate a highlighted image for the generated video and may provide a notification to a user after a call for the number and size of the generated images is terminated. According to various embodiments, the electronic device may provide an option to view or share the automatically generated image later, an option to view the same in detail, and the like to the user after the end of the call. In various embodiments, options that can be provided to the user after the end of the call may include, for example, dismiss, share all, view, etc. Screen examples for these are shown in FIGS. 45, 46A, 46B, 47A, and 47B to be described later.

As described above, according to various embodiments, the electronic device may generate and provide a media footprint, e.g., a video file associated with the call, in the video service. In various embodiments, a method of generating a video file associated with a call may include: generating a video file including a file box indicating a file type and a compatibility type, a file header including header information, and media data including stream data, and dynamically generating metadata including location information related to the call and information of the call partner among the tracks in which the stream data is stored. In various embodiments, metadata is represented by shortcuts (e.g., icons, text, numbers, etc.) that can be associated with a call log, and thereby may be driven for detailed call log lookups or associated functions. According to various embodiments, the metadata may be confirmed and displayed through the call log and a gallery, and sharing, searching, and storing may be easily performed through the metadata.

FIGS. 42A-42C are diagrams illustrating an example of a user interface of an electronic device according to various embodiments of the present disclosure.

Referring to FIGS. 42A-42C, a screen example of a service user interface provided for inquiring and displaying media data (or a video file) generated and stored according to the performance of a video service in the electronic device 500 may be illustrated. In various embodiments, FIGS. 42A-42C illustrate a screen example commonly provided by an originating terminal transmitting a video and a receiving terminal receiving a video.

As shown in FIG. 42A, the electronic device 500 may record a call log according to a video service and may provide information on a communication record corresponding to the call log in response to a user request. In various embodiments, the communication record may be provided with one or more of video communication completion, missed call, reject, outgoing/incoming, communication point of time, communication time (date, time, etc.), partner information, and a partner registration photo. According to various embodiments, the communication record may include and provide information (e.g., number of communications) about the completion of video communication according to the performance of the video service, information about originating or receiving a video service, information about a video service failure, information about rejection of a video service request, information about the other party, and the like. According to various embodiments, each piece of information in the communication record may be provided as at least one of text, images, icons, and the like, or a combination thereof.

According to various embodiments, the communication record may be recorded in chronological order and may be organized (e.g., grouping) for each user (person). For example, a grouping log may be provided.

According to various embodiments, when a call log according to a video service is generated, the call log may be connected and managed based on metadata generated in performing a video service. For example, after the end of a call according to the video service, a user may confirm a detailed view of the call log through the metadata generated in performing the video service.

According to various embodiments, when a user selects any one of the communication records (or communication record items) (e.g., Program 4210 in FIG. 42A), the corresponding screen may be switched to a screen in which a detailed communication record with the user of the selected communication record can be confirmed and the switched screen may be displayed. For example, a transition from FIG. 42A to FIG. 42B may be performed so that a detailed screen may be displayed.

As shown in FIG. 42B, as the detailed view, user information (e.g., name, phone number, image, etc.), all histories according to the use of the video service with a user, video service types (e.g., outgoing, incoming, etc.), whether the video service is performed (e.g., missed, rejected, or the like), call duration (e.g., date or time), and the like may be provided. In addition, as the detailed view, various input buttons (e.g., buttons for originating a video service, a voice call, message transmission, etc.) provided on the corresponding screen may be provided. According to various embodiments, the detailed view may include indicators 4230 and 4250 of the metadata generated during a video service with the corresponding user and may provide the detailed view to a user.

For example, referring to FIG. 42B, the indicators 4230 and 4250 of the images generated during the corresponding video call among the communication records may be provided. According to various embodiments, the indicators 4230 and 4250 may be provided in various forms of images or icons (e.g., picture icons, audio icons, etc.) according to the type of the generated metadata. According to various embodiments, the indicators 4230 and 4250 may further include numerical information 4235 and 4255 of the included metadata.

In various embodiments, the indicators 4230 and 4250 may provide a shortcut function. For example, when a user selects the indicators 4230 and 4250, a screen associated with the selected indicators 4230 and 4250 may be displayed. According to one embodiment, the indicators 4230 and 4250 may provide separate metadata according to the metadata that the indicators 4230 and 4250 have.

In one embodiment, in FIG. 42B, when the indicator 4230 is selected, the metadata that the indicator 4230 (e.g., an associated video file) has may be searched and a transition to FIG. 42C may be performed, so that a screen according to the metadata may be displayed. For example, when the indicator 4230 is selected (e.g., touched or tapped), an image associated with the indicator 4230 may be searched in a multimedia viewer (e.g., a gallery, video player, video editor, web browser, or the like of Android), and the searched image 4276 may be displayed.

Figure 43:
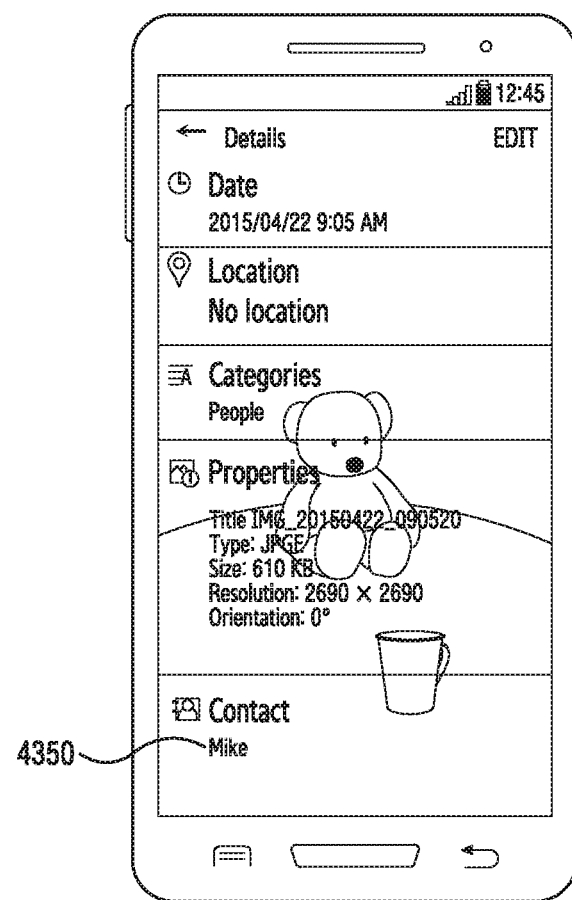
FIG. 43 is a diagram illustrating an example of a user interface of an electronic device according to various embodiments of the present disclosure.

FIG. 43 is a diagram illustrating an example of a user interface of an electronic device according to various embodiments of the present disclosure.

Referring to FIG. 43, a screen example of a service user interface provided for inquiring and displaying media data (or a video file) generated and stored according to the performance of a video service in the electronic device 500 may be illustrated. In various embodiments, FIG. 43 illustrates a screen example provided in common between an originating terminal transmits a video and a receiving terminal receiving a video.

As shown in FIG. 43, detailed information (e.g., file attributes) about a video file generated through a video service may be provided. According to one embodiment, a user may request the detailed information about the video file through a set menu or a set input in a state of FIG. 42C. The electronic device 500 may provide file attributes related to the video file 4270 as shown in FIG. 43, when the display of the detailed information of the displayed video file 4270 is requested in the state of FIG. 42C. According to various embodiments, the file attributes may be provided together with information of the metadata associated with the video file 4270.

For example, referring to FIG. 43, the file attributes may in include general attribute information of the file itself (e.g., file name, file path, type, size, resolution, or orientation) and attributes (e.g., categories or detected people) extracted from the characteristics of the video file.

According to various embodiments, in the file attributes, at least a part of the content of the metadata associated with the video service of the corresponding video file may be included and provided. For example, the file attributes may include and display counterpart information 4350 of the video call in which the corresponding video file is generated.

In addition, in various embodiments, in addition to the counterpart information 4350, the file attributes may include the content of metadata such as video call duration (call date and time) of the corresponding other party, a caller's and/or a receiver's location information, and the like in various embodiments, the content of the metadata that can be provided or confirmed from the file attributes may be provided so as not to include all of the content of original metadata of the video file.

Figure 44:
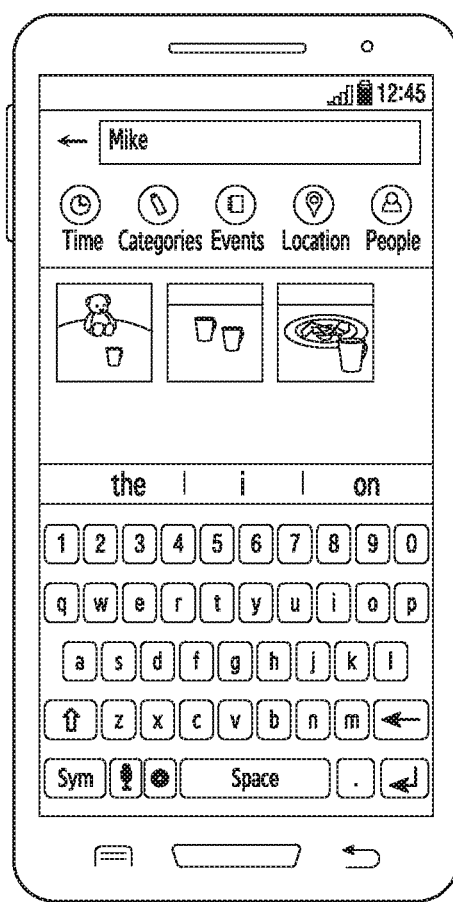
FIG. 44 is a diagram illustrating an example of a user interface of al electronic device according to various embodiments of the present disclosure.

FIG. 44 is a diagram illustrating an example of a user interface of an electronic device according to various embodiments of the present disclosure.

Referring to FIG. 44, a screen example of a service user interface provided to search for and display media data (e.g., a video file) of an associated video service based on the metadata provided through FIG. 43 is illustrated.

For example, when a user selects (e.g., touches or taps) metadata 4350 (e.g., counterpart information) in FIG. 43, the electronic device 500 may retrieve media data associated with the corresponding metadata 4350 based on the selected metadata 4350. According to one embodiment, the electronic device 500 may retrieve all the media data (e.g., video files) generated in accordance with the performance of the video service based on the counterpart information 4350. In various embodiments, the electronic device 500 may display the retrieved media data, as shown in FIG. 44. According to one embodiment, the electronic device 500 may provide thumbnails associated with the video file as a list. According to various embodiments, the electronic device 500 may execute an application that can directly share the retrieved media data, and may provide the media data retrieved through the executed application. According to one embodiment, an application such as a message, a mail, or a messenger may be executed as in the example of FIG. 44, the executed application may be automatically designated as a destination of the other party according to the metadata, and the retrieved media data may be included in an attached format and provided. According to various embodiments, a keypad for inputting text may be included and provided according to the type of the application to be executed.

In various embodiments, various pieces of information on the execution of the video call with the other party may be retrieved and provided based on the metadata, such as media data generated when a video call is made with the corresponding other party, media data generated when a video call is made at a specific anniversary (e.g., Christmas) with the other party, a video call originated or received by the other party at a particular location, a video call with the other party originated or received by a user at a specific location, a video call originated or received in a specific period (e.g., a week ago, during a month, or the evening a year ago), and the like. That is, the electronic device 500 may retrieve media related to the video service according to the name of the other party, date and time, the location of the other party, and the location of the user based on the metadata, and may the retrieved media may be output (e.g., displayed) and provided to a user.

Figure 45:
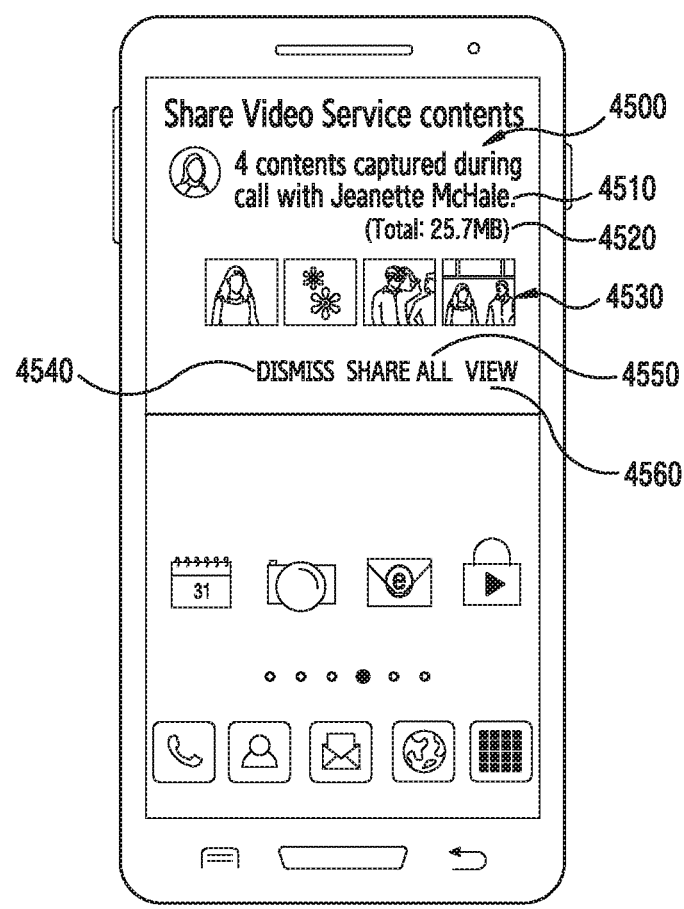
FIGS. 45, 46A, 46B, 47A, and 47B are diagrams illustrating an example of a user interface of an electronic device according to various embodiments of the present disclosure.

FIGS. 45, 46, and 47 are diagrams illustrating an example of a user interface of an electronic device according to various embodiments of the present disclosure.

Referring to FIGS. 45, 46A, 46B, 47A, and 47B, screen examples of a service user interface provided to notify a user of information about media data (e.g., contents) generated upon a video call after the end of a call or the video call and share associated media data are illustrated. According to one embodiment, a function of notifying a user of the information about the media data generated during the video call after the end of the call or the video call and sharing the same may be provided.

According to various embodiments, as to the media data according to the video call, full data may be stored according to a user's storage option, or highlighted data may be stored. In various embodiments, the electronic device 500 may automatically generate a highlighted image for the generated media data, and may notify a user of information about the number and size of the generated highlighted images after the end of the call as in the example of FIG. 45.

Referring to FIG. 45, a pop-up 4500 through which the media data generated after the end of the call can be confirmed or shared may be provided to the media data (e.g., contents) generated during the video call. According to various embodiments, the pop-up 4500 may include various pieces of information related to the video call, such as counterpart information who has executed the video call, information 4510 about the number of pieces of media data generated in the corresponding video call, full size 4520 of the media data, the generated media data (e.g., thumbnail or highlighted image) 4530, various options (e.g., dismiss 4540, share all 4550, view 4560, etc.) for confirming and sharing media data, and the like.

According to various embodiments, the dismiss option 4540 may indicate an option to remove the pop-up 4500 and to confirm the association later, or to delete the automatically generated media data 4530.

Figure 46A:
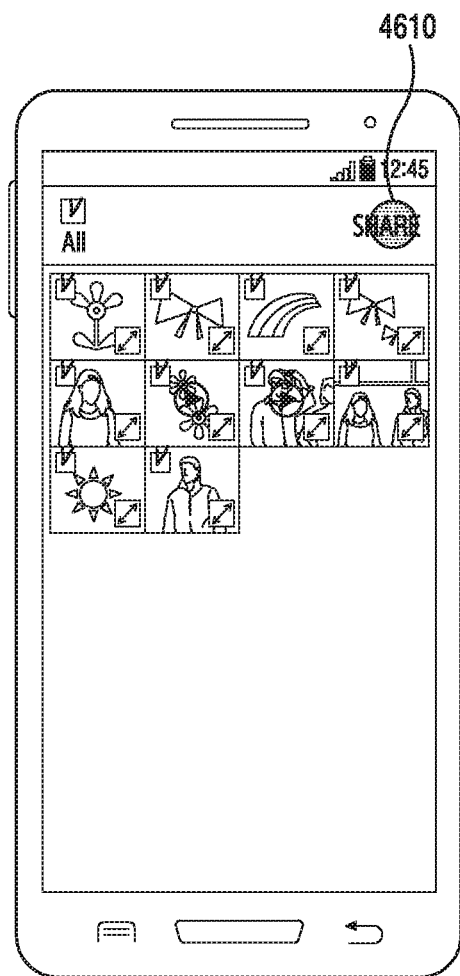

According to various embodiments, the share all option 4550 may indicate an option to display, automatically select, or share all of the media data 4530 at once in a thumbnail view or a list view. For example, when detecting the selection of the share all 4550 from the options of the pop-up 4500, the electronic device 500 may provide a list of the thumbnail (e.g., highlighted image (or image) or highlighted video (or moving image) of the media data 4530, as shown in FIG. 46A. In the example of FIG. 46A, an example in which a highlighted image and a highlighted video are generated is shown.

Figure 46B:
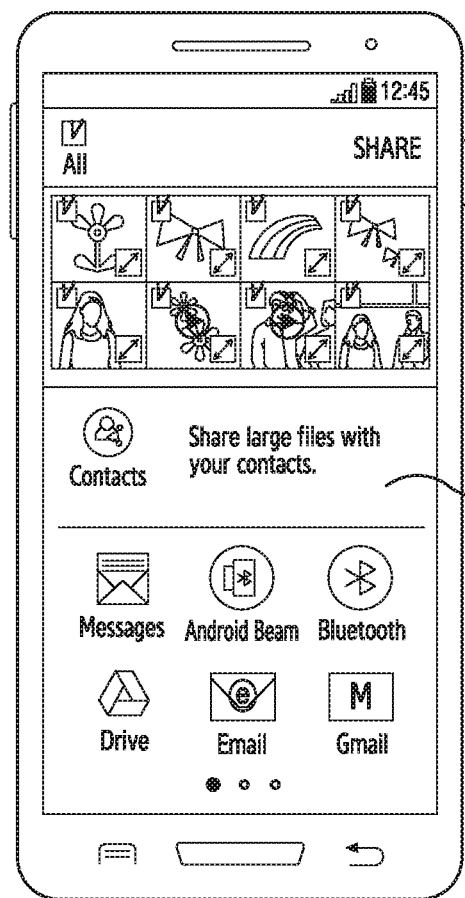

In the state of FIG. 46A, a user may select or deselect one or more pieces of media data to be shared, and then may share finally selected media data. According to one embodiment, when a user selects the share all 4550 in FIG. 45, the electronic device 500 may automatically select and set all of the media data and may provide them as shown in FIG. 46A. The user may deselect all the media data selected in the thumbnail view of FIG. 46A, or at least a part of the media data. The user may share the finally selected media data by selecting a share button 4610. FIGS. 46A-46B show a case where all of the media data are selected using check boxes on the thumbnail, and FIG. 47A shows a case where none of them is selected.

When the share button 4610 is selected, the electronic device 500 may provide a pop-up 4630 to select a service for sharing media data, as shown in FIG. 46B. According to various embodiments, the electronic device 500 may share the media data (e.g., image and/or moving image) using services such as message, Android Beam, Wi-Fi Direct, Bluetooth, drive, email, etc., according to the user's selection using the pop-up 4630, or may share the media data (e.g., image and/or moving image) using a short-range communication such as NFC.

According to various embodiments, the view option 4560 may indicate an option to display media data through a thumbnail view, a list view, or an item view and to execute (e.g., full display or the like) the displayed media data. For example, when the selection of the view 4560 from the options of the pop-up 4500 is detected, the electronic device 500 may provide a list of the thumbnail (e.g., highlighted image (or image) or a highlighted video (or moving image)) of the media data 4530, as shown in FIG. 47A. In the example of FIG. 47A, an example in which a highlighted image 4710 and a highlighted video 4730 are generated is illustrated.

Figure 47A:
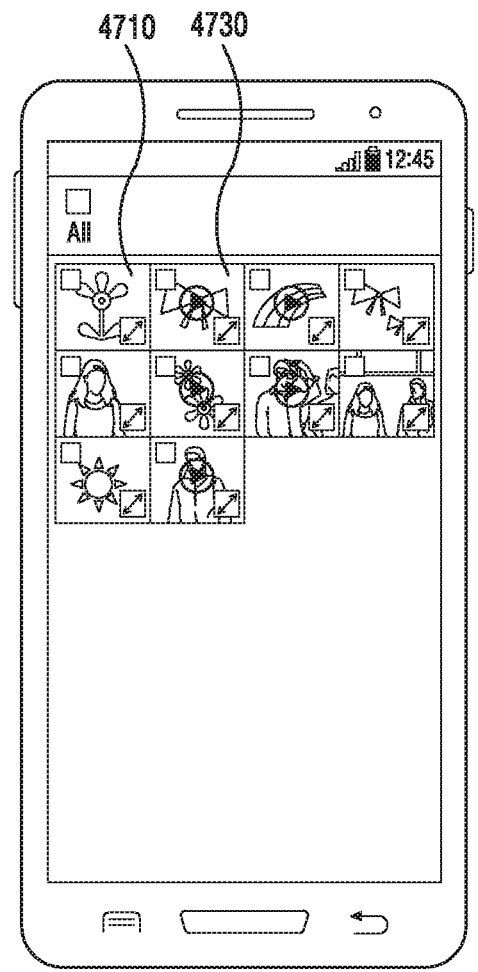
Figure 47B:
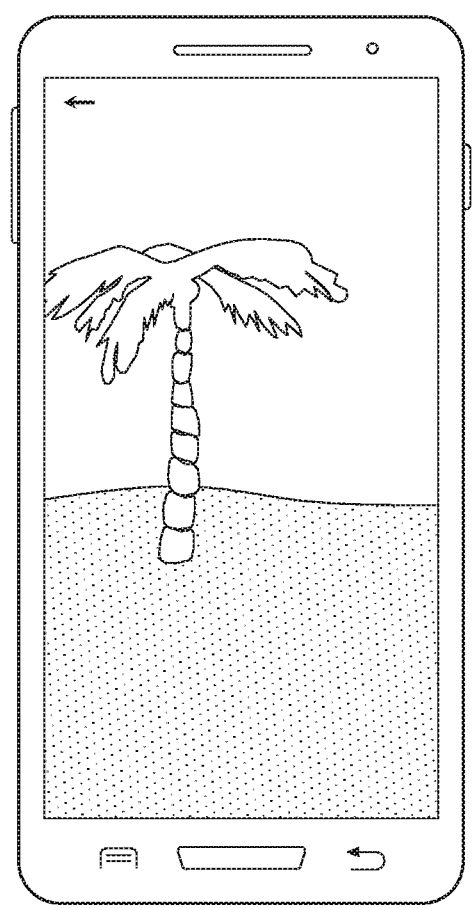

In the state of FIG. 47A, a user may select media data to be executed. When the media data is selected, the electronic device 500 may execute the selected media data, as shown in FIG. 47B. According to one embodiment, when the media data selected by the user is of a type of an image 4710, an original image of a selected thumbnail image (e.g., highlighted image) may be provided to the user in a detailed view (e.g., displayed as a full screen). According to another embodiment, when the media data selected by the user is of a type of a moving image 4730, an original moving image of the selected thumbnail image (e.g., highlight image) may be provided to the user in a detailed view.

According to various embodiments, in the state of FIG. 47B, the corresponding information may be switched to media data arranged in the order of before or after with respect to the media data currently displayed through a user input (e.g., swipe gesture), and may be displayed.

Figure 48:
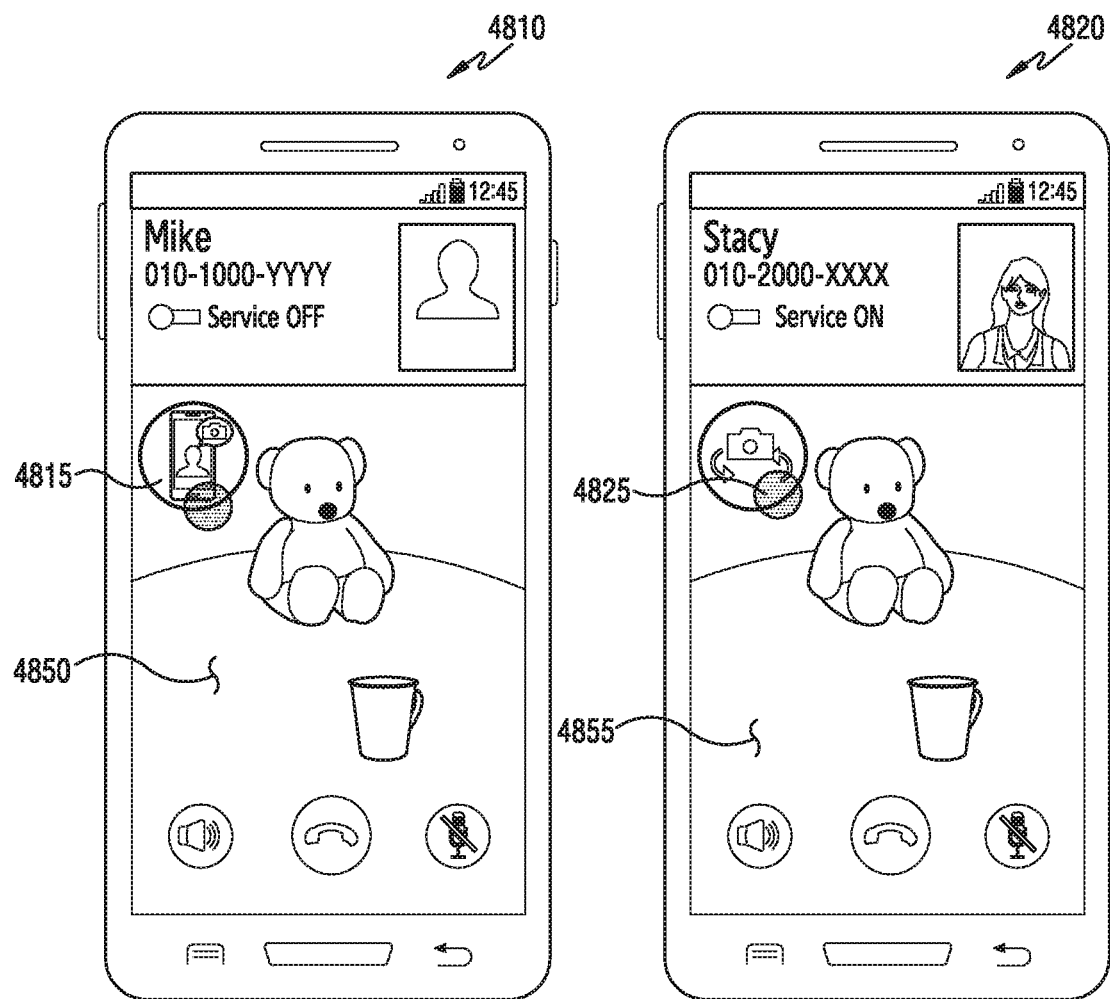
FIGS. 48 and 49 are diagrams illustrating an example of a screen in which a video service performed in an electronic device according to various embodiments of the present disclosure.
Figure 49:
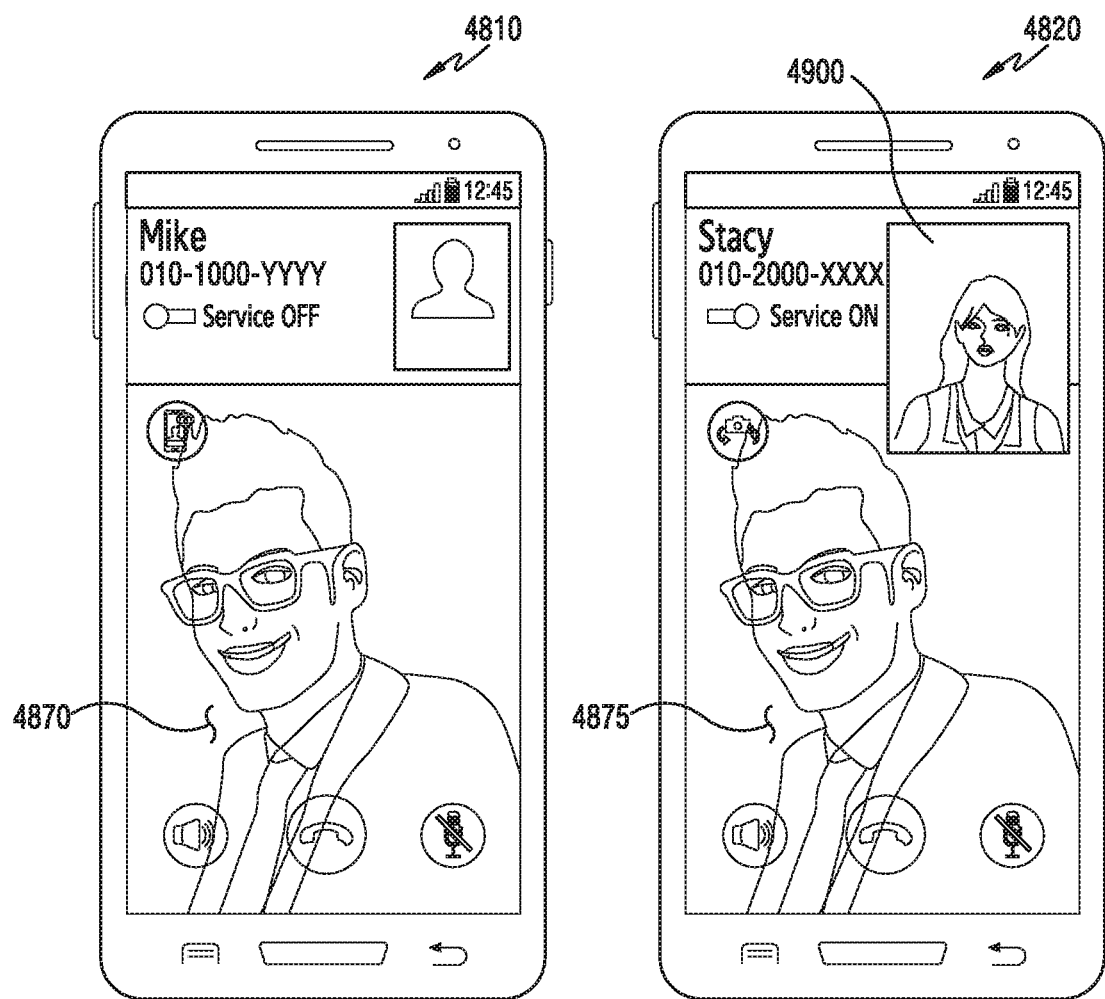

FIGS. 48 and 49 are diagrams illustrating an example of a screen in which a video service is performed in an electronic device according to various embodiments of the present disclosure.

FIGS. 48 and 49 illustrate screen examples of a service user interface according to camera switching while a video call by a video service is performed. In various embodiments, FIGS. 48 and 49 illustrate screen examples provided by each of an originating terminal (e.g., the first electronic device 4810) transmitting a video and a receiving terminal (e.g., a second electronic device 4820) receiving a video.

According to various embodiments, users of the first electronic device 4810 and the second electronic device 4820 may share calls and videos based on the video service. The users may control the camera of the user's electronic device or the counterpart electronic device while using the video service. According to one embodiment, as shown in FIG. 48, the user of the second electronic device 4820 receiving a video may control the camera of the first electronic device 4810 originating a video. According to various embodiments, a camera that acquires a video may be the camera of the first electronic device 4810, and the second electronic device 4820 that receives a video may be in a state in which the camera is turned off. For example, as shown in FIG. 48, the user of the second electronic device 4820 in communication with the first electronic device 4810 is Mike, a state in which a video is not transmitted. (e.g., "service off" or "camera off") is shown, and the second electronic device 4820 shows that Stacy who is the user of the first electronic device 4810 is in a state of transmitting a video (e.g., "service on" or "camera on").

According to various embodiments, the user of the first electronic device 4810 transmitting a video when performing the video service may directly perform, camera switching of the first electronic device 4810.

In various embodiments, the electronic device 500 may include a front camera and a rear camera. Additionally or alternatively, the electronic device 500 may include an external camera, using a peripheral device. In various embodiments, the camera switching may include, for example, switching from the front camera of the electronic device (e.g., the first electronic device 4810) to the rear camera thereof, switching from the rear camera to the front camera, switching from the camera (e.g., front or rear camera) of the electronic device to an external camera of a peripheral device, switching from the external camera of the peripheral device so the camera (e.g., front or rear camera) of the electronic device, and, the like.

FIG. 48 illustrates an example in which the second electronic device 4820 receiving a video requests a transition of the camera of the first electronic device 4810 based on a user input while a video service is performed between the electronic devices 4810 and 4820 and the first electronic device 4810 switches or executes the operating camera 4810 (e.g., acquiring a video) of the first electronic device 4810 in response to the request of the second, electronic device 4820. According to various embodiments, the camera of the second electronic device 4820 receiving a video may be turned off, and thus may not perform an operation for camera control of the second electronic device 4820.

According to various embodiments, the camera of the second electronic device 4820 receiving a video may be turned on, and thus the second electronic device 4820 may also perform the operation for camera control. According to various embodiments, when the electronic devices 4810 and 4820 all transmit and receive videos, a plurality of videos may be displayed on the display. For example, videos transmitted and received in various schemes such as picture-in-picture (PIP), picture-by-picture (PBP), overlay, and multi-window may be simultaneously displayed.

According to one embodiment, when the video is displayed in PIP or PBP, the arrangement of the videos displayed on the two electronic devices 4810 and 4820 may be the same or different from each other.

According to one embodiment, when the corresponding videos are displayed overlaid in the second electronic device 4820 of FIGS. 48 and 49, an image associated with image data received from the other party may be displayed as background images 4855 and 4875, and an image (e.g., a preview image) related to a transmitted image may be displayed in an image region in which information of the other party is present in a displayed region. Accordingly, when the camera is turned off, an image previously stored in the address book may be displayed in the corresponding region, when the camera is turned on, the corresponding video may be changed to an image associated with an image which is received from a designated camera and is to be transmitted to the other party. For example, a small image region displayed in FIG. 49 may be disposed in an overlay manner in which it is changed in size and position by a user input and displayed (4900), and an image associated with an image to be transmitted to the other party may be displayed on the small image region when the camera is, turned on.

According to various embodiments, the first electronic device 4810 and the second electronic device 4820 may provide switching objects 4815 and 4825 for camera switching, respectively, on the user interface. According to various embodiments, the switching objects 4815 and 4825 may be provided in the form of a different icon depending on whether the driven camera is a front camera, a rear camera, an external camera, a camera of a remote electronic device, or a peripheral device (e.g., VR device, a 360 camera, another device including a camera, or the like). In various embodiments, the switching objects 4815 and 4825 may be displayed in at least any one region (e.g., an upper end of the left side of a screen) on a user interface (or a video shared according to a video service) and provided. In various embodiments, the user interface provided to the first electronic device 4810 and the second electronic device 4820 may display information of the other user via, for example, icons, menus, or pop-ups.

The user of the second electronic device 4820 may select (e.g., touch or tap) the switching object 4825 (e.g., icon or menu) for camera switching. When detecting a user input by the switching object 4825 during a video service, the second electronic device 4820 may determine the user input to be a camera switching request, and may transmit the camera switching request to the first electronic device 4810 via a network.

When receiving the camera switching request from the second electronic device 4820 while the video service is performed, the first electronic device 4810 may switch (execute) the camera of the first electronic device 4810 to a camera of another orientation. According to various embodiments, when receiving the camera switching request, the first electronic device 4810 may extract GUI feedback based on vibration, sound, flickering (e.g., switching object flickering), and the like and may provide the extracted GUI feedback to a user.

The first electronic device 4810 may acquire a video from the switched camera in response to the request from the second electronic device 4820, and may transmit the acquired video to the second electronic device 4820 to share the video with the second electronic device 4820. Such an example is shown in FIG. 49.

As shown in FIG. 49, the first electronic device 4810 and the second electronic device 4820 may share and display the video acquired through the switched camera of the first electronic device 4810.

According to one embodiment, in FIG. 48, the first electronic device 4810 may transmit video data (e.g., raw image, resized image, streaming image, still image, or the like) associated with a first video (e.g., background video) 4850 acquired from the rear camera, the second electronic device 4820 may be in a state of displaying 4855 the received video data on the display, and the rear camera may be switched to the front camera according to the camera switching request of the second electronic device 4820. In this case, as shown in FIG. 49, the first electronic device 4810 may transmit video data associated with a second video (e.g., user face) acquired from the front camera to the second electronic device 4820 and may display the transmitted video data on the second electronic device 4820. According to various embodiments, the first electronic device 4810 and the second electronic device 4820 may display and provide the same or similar video obtained from the camera that is driven by the first electronic device 4810. For example, when the resolutions of the two electronic devices 4810 and 4820 are different or the orientations thereof are different, since the video displayed on each of the first electronic device 4810 and the second electronic device 4820 has a different size, shape, or resolution, the first electronic device 4810 and the second electronic device 4820 may display images in different forms and provide them to the user.

Figure 50:
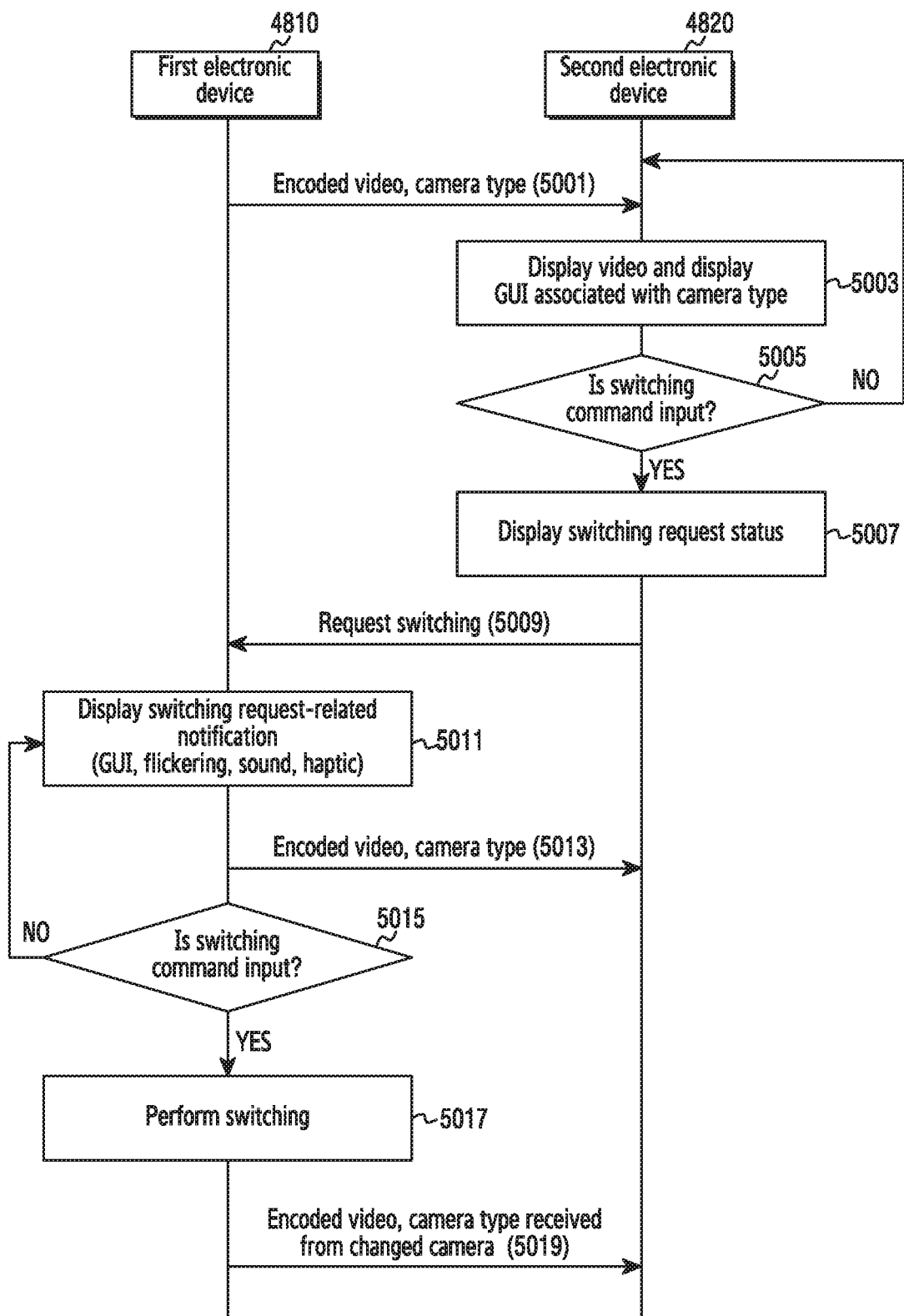
FIG. 50 is a diagram illustrating a method of performing a video service in electronic devices according to various embodiments of the present disclosure.

As shown in the examples of FIGS. 48 and 49, a method in which the user of the second electronic device 4820 receiving a video while performing the video service requests a camera switching control of the first electronic device 4810 transmitting a video and the first electronic device 4810 accepts the corresponding request to switch the camera is shown in FIG. 50.

FIG. 50 is a diagram illustrating a method of performing a video service in electronic devices according to various embodiments of the present disclosure.

As shown in FIG. 50, a camera switching control operation of the first electronic device 4810 by the second electronic device 4820 while a video service is performed between the first electronic device 4810 transmitting a video and the second electronic device 4820 receiving a video may be shown.

Referring to FIG. 50, in operation 5001, the first electronic device 4810 may transmit an encoded video (moving image) and a camera type to the second electronic device 4820 to which the video service is connected. For example, the first electronic device 4810 may start the video service with the second electronic device 4820 as described above, and may transmit information about a video acquired through the driven camera and information about the driven camera to the second electronic device 4820 in response to the start of the video service. According to various embodiments, the first electronic device 4810 may transmit the camera information of the first electronic device 4810 together with the encoded video. In various embodiments, the camera information that can be transmitted together with the video may include the resolution the camera of the first electronic device 4810, the type of the camera (e.g., front camera, rear camera, or external camera), the direction of the first electronic device 4810, (e.g., a landscape mode, a portrait mode, and the like), etc.

In operation 5003, the second electronic device 4820 may receive and display the video transmitted from the first electronic device 4810 and may display the information or the camera of the first electronic device 4810. For example, the second electronic device 4820 may display information (e.g., through the switching object) of the camera of the first electronic device 4810 together with the encoded video, as described with reference to FIGS. 48 and 49. According to one embodiment, the second electronic device 4820 may display a GUI (e.g., the switching object 4825) associated with the camera type of the first electronic device 4810.

In operation 5005, the second electronic device 4820 may determine whether a switching command is input. For example, the second electronic device 4820 may recognize and provide the camera information of the first electronic device 4810 to a user through the display of a user interface (e.g., the switching object 4825), and may execute a switching command that can control the camera of the first electronic device 4810 according to the user input using the switching object 4825. The user of the second electronic device 4820 may request camera switching of the first electronic device 4810 by selecting the switching object 4825 (e.g., icon or menu).

In operation 5005, when the switching command is not input (NO of operation 5005), the second electronic device 4820 may proceed to operation 5003 to perform corresponding operations before operation 5003.

When the switching command is input (YES of operation 5005) in operation 5005, the second electronic device 4820 may display a switching request status in operation 5007. For example, the second electronic device 4820 may perform the display (e.g., a switching status indication) of the state for performing the switching command requested by the user in the first electronic device 4810, in the first electronic device 4810. According to one embodiment, the second electronic device 4820 may display a GUI such as loading pop-up to display the performance status of the switching command, display a GUI such as flickering of the switching object 4825, or display the status through vibration or sound of the second electronic device 4820, and may provide the displayed information to the user. A specific example thereof will be described later.

In operation 5009, the second electronic device 4820 may transmit a switching request for camera switching to the first electronic device 4810 in response to the switching command.

In operation 5011, the first electronic device 4810 may display a notification related to the switching request of the second electronic device 4820. For example, when receiving the switching request for camera switching from the second electronic device 4820 during the execution of the video service, the first electronic device 4810 may transmit the corresponding notification to the user of the first electronic device 4810 as feedback, using at least one of a GUI, flickering (e.g., flickering of the switching object 4815), sound, and vibration.

In operation 5013, the first electronic device 4810 may determine whether the switching command is input. For example, the first electronic device 4810 may determine whether there is a user input that accepts the camera switching via the provided notification. According to one embodiment, the first electronic device 4810 may determine whether the user input by the switching object 4815 is detected.

When the user input corresponding to the switching command is not detected (NO of operation 5015) in operation 5015, the first electronic device 4810 may proceed to operation 5011 to perform operations before operation 5011. According to one embodiment, the first electronic device 4810 may determine the user input according to the switching command within a predetermined time and may transmit a rejection response to the camera switching request of the second electronic device 4820 to the second electronic device 4820 after the elapse of a predetermined time. Alternatively, when the user input that rejects the camera switching, other than the switching command from the user, is detected, the first electronic device 4810 may transmit the rejection response to the camera switching request of the second electronic device to the second electronic device 4820.

When the user input corresponding to the switching command is detected (YES of operation 5015) in operation 5015, the first electronic device 4810 may perform camera switching in response to the user input in operation 5017. According to one embodiment, the first electronic device 4810 may perform switching from a currently driven camera to another camera that can be driven, such as switching from a front camera to a rear camera, switching from the rear camera to the front camera, switching from the camera of the first electronic device 4810 to an external camera of a peripheral device, or switching from the external camera of the peripheral device to the camera of the first electronic device.

According to various embodiments, according to a previously set switching policy, whether operation 5015 is performed may be determined. For example, when receiving the switching request of the second electronic device 4820 according to user's setting, the first electronic device 4810 may automatically perform a switching operation 5017. According to various embodiments, the switching policy setting may be designated by a user input in setting items of the first electronic device 4810. According to various embodiments, the switching policy setting may be associated with the first electronic device 4810 in the setting item of the first electronic device 4810, or may be obtained separately for each of other electronic devices having a history associated therewith. In operation 5019, the first electronic device 4810 may transmit the video (moving image) and camera type obtained from the switched camera.

For example, the first electronic device 4810 may acquire a video from the switched camera, may encode the acquired video, and may transmit the encoded video (moving image) and the camera type (e.g., information about the switched camera) to the second electronic device 4820. According to various embodiments, when the switched camera is the front camera, the first electronic device 4810 may perform video processing on the acquired video so that the acquired video is reversed from left to right such as mirroring effect, and then may transmit the resultant video to the second electronic device 4820.

As described above, the second electronic device 4820 may display the status according to the camera switching of the first electronic device 4810 and may receive the status according to the camera switching from the first electronic device 4810, and thereby may change and display the status display (e.g., switching status indication) of the second electronic device 4820.

According to one embodiment, the second electronic device 4820 may display a waiting state. For example, when the second electronic device 4820 fails to receive a state change for the camera switching request from the first electronic device 4810, the second electronic device 4820 may display a loading pop-up or the like and may provide it to the user.

According to one embodiment, the second electronic device 4820 may display a switched state. For example, when receiving the fact that the camera of the first electronic device 4810 has been switched, the second electronic device 4820 may provide feedback such as pop-up, vibration, or sound to the user.

According to one embodiment, the second electronic device 4820 may display a failed state. For example, when the second electronic device 4820 transmits the switching request for camera switching of the first electronic device 4810 to the first electronic device 4810, the camera switching of the first electronic device 4810 may not be accepted for reasons, such as the receiving state of the first electronic device 4810, loss of signals of first electronic device 4810 or second electronic device 4820, or rejection of the first electronic device 4810. In this manner, when the camera switching of the first electronic device 4810 is not performed for the switching request, the second electronic device 4820 may output feedback such as pop-up, vibration, or sound and may provide the output feedback to the user.

FIGS. 51A, 51B, 52, and 53 are diagrams illustrating an example of an operation of performing a video service in electronic devices according to various embodiments of the present disclosure.

As shown in FIGS. 51A and 51B, according to various embodiments, an example of operating a dual camera (or narration mode) is illustrated. For example, in the case of a conventional general video call, a video call or a voice call must be selected at a call initiation point. On the other hand, according to various embodiments, a video service may be freely switched from a voice call mode to a video call mode (e.g., video service execution mode) or from a video call mode to a voice call mode. With reference to FIGS. 51A and 51B, dual camera (e.g., narration mode) driving (e.g., mode entry operation) and an operation (e.g., object movement or size conversion) according to the dual camera driving will be described.

In various embodiments, the dual camera may have a function to simultaneously execute at least two cameras (e.g., a front camera and a rear camera, a camera of an electronic device, or an external camera of a peripheral device functionally coupled to the electronic device), and an object for the dual camera may be included and provided in a user interface.

Referring to FIGS. 51A and 51B, as to the electronic device 500 (e.g., an originating terminal) (hereinafter, referred to as a first electronic device), when a video service is executed, one camera, for example, a rear camera may be activated to display a video photographed through the rear camera on a first preview region 5120 and to transmit the displayed video to another electronic device (e.g., a receiving terminal) (hereinafter, referred to as second electronic device).

The user of the first electronic device may select (e.g., touch or tap) a dual camera object 5110 (e.g., dual camera icon) for executing the dual camera, or the first electronic device may execute the narration mode in response to a user's voice input. When the narration mode is executed, the first electronic device may drive the front camera simultaneously in a state in which the rear camera is activated. According to another embodiment, the dual camera object 5110 may be an icon within a specific application or may be an icon of a separate application. In the case where the dual camera object 5110 is the separate application, a plurality of cameras may simultaneously receive videos while the corresponding application is driven.

The first electronic device may display a video photographed using the front camera via a second preview region 5130. In various embodiments, the second preview region 5130 may be located in one region (e.g., an upper end of the left side of the screen) on the first preview area 5120. The second preview region 5130 may be displayed in the form of, for example, bubbles. The second preview region 5130 is not limited to the circular shape shown in FIGS. 51A and 51B and may be provided in various forms such as a triangle, a quadrangle, or a polygon (e.g., rhombus shape, star shape, etc.). The second preview region 5130 may be changed in size and location by a caller. A detailed example thereof is shown in FIG. 52.

Figure 52:
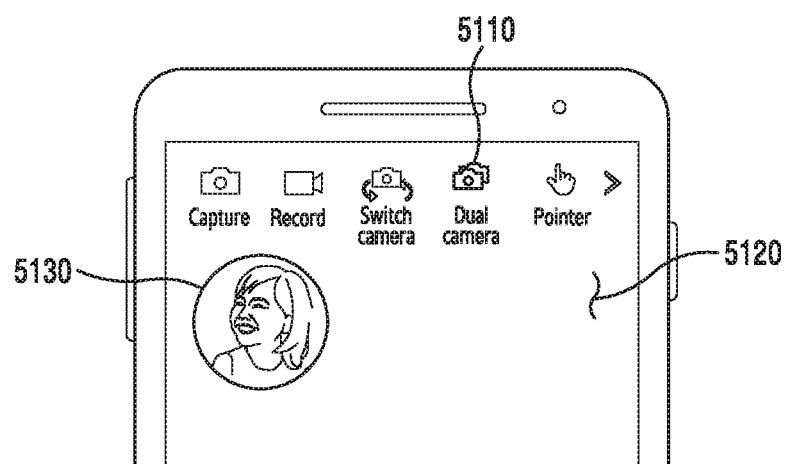

Referring to FIG. 52, an object 5110 for executing the dual camera may be included in one region (e.g., the above described function region) of a user interface (e.g., a video acquired through the rear camera) and provided. Additionally, as shown in FIG. 52, the function region may include an object (e.g., capture object) capable of capturing and storing a video displayed on the first preview region 5120, an object (e.g., record object) capable of recording the video displayed on the first preview region 5120, an object (e.g., switch camera object) capable of switching a camera acquiring videos (e.g., switching the camera from the rear camera to the front camera or from the front camera to the rear camera), an object (e.g., dual camera object) for executing at least two cameras (e.g., dual camera simultaneously driving the front camera and the rear camera or a remote camera), an object (e.g., pointer object) for calling and displaying a pointer on the first preview region 5120, and the like. According to various embodiments, the function region may be provided by the originating terminal in the video service, and may be implemented by various function icons for performing storage, selection, or setting change in association with the video displayed through the first preview region 5120.

According to one embodiment, when the video service is driven, the objects (e.g., dual camera object 5110 for executing the dual camera and/or the other objects of the function region) may be continuously displayed on the screen and provided. According to one embodiment, when the video service is driven, the dual camera object 5110 (and/or the other objects of the function region) may be displayed on the screen, and then may automatically disappear after the elapse of a predetermined time (e.g., show/hide function). In this case, when a user input (e.g., touch or tab) is recognized on the screen, the corresponding object may be displayed again. In FIG. 52, a user may execute the narration mode by additional driving of the camera through the select of the dual camera object 5110.

According to various embodiments, the first electronic device may display the second preview region 5130 in response to the execution of the narration mode.

According to one embodiment, as shown in FIG. 52, the second preview region 5130 may be located on the first preview region 5120. For example, the second preview region 5130 may be provided in the form of picture-in picture (PIP) independently of the first preview region 5120. According to various embodiments, by the user of the first electronic device, the screen (video) displayed on the first preview region 5120 and the screen (video) displayed on the second preview region 5130 may be switched. A screen example related to this will be described with the drawings to be described later.

According to one embodiment, when the second preview region 5130 is located on the first preview region 5120, the second preview region 5130 may be fixed at a fixed position (e.g., an upper end of the left side of the screen).

According to one embodiment, when the second preview region 5130 is located on the first preview region 5120, the second preview region 5130 may be automatically displayed in a background region where there is no specific object (e.g., object included in the video displayed on the first preview region 5120). In this case, when the screen (video) displayed on the first preview region 5120 is changed, the position of the second review region 5130 may be automatically changed through video analysis. For example, when a video including a human face is input in the first preview region 5120, one or more image object regions (e.g., face, human body, barcode, 2D code {QR code, data matrix code, PDF-417, etc.}, text, etc.) may be determined in the first preview region 5120. When it is determined that the second preview region 5130 covers the object region or will cover the same within a predetermined time (e.g., 1 second), the second preview region 5130 may be moved to a location other than the object region and displayed, or the size or shape of the second preview region 5130 may be adjusted (e.g., reduced) to be displayed.

According to various embodiments, video analysis techniques for determining the object region may use one or more of face recognition, OCR, 2D code recognition, determination of differential video analysis-based movement direction, body region and shape analysis by silhouette extraction technique, object region classification by color distribution, and edge-based object region determination. According to one embodiment, when the second preview region 5130 is located on the first preview region 5120, the position of the second preview region 5120 may be changed (e.g., moved) by the user of the first electronic device. A screen example related to this will be described with reference to the drawings to be described later.

According to one embodiment, the second preview region 5130 and the first preview region 5120 may be displayed through independent windows, and one of the windows may be displayed to be overlapped or overlaid with a minimum portion of the other windows.

According to various embodiments, when the second preview region 5130 is located on the first preview region 5120, the size of the first electronic device may be changed by the user of the first electronic device and the user of the second electronic device. A screen example related to this is shown in FIGS. 51A, 51B, and 53.

Figure 53:
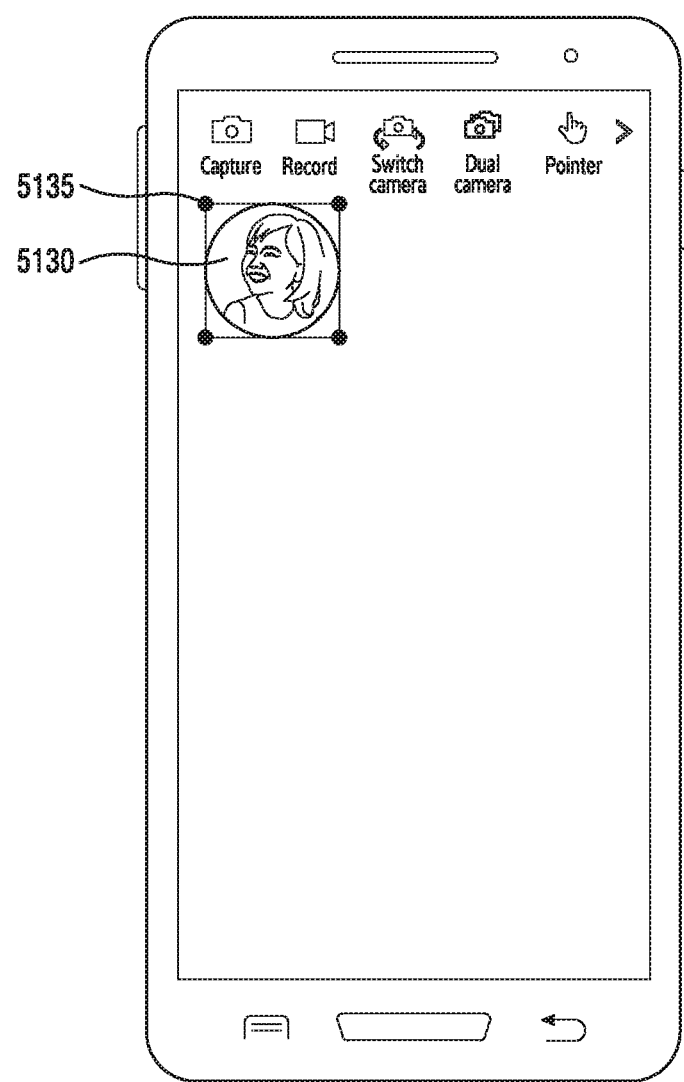

As shown in FIGS. 51A, 51B, and 53, when the second preview region 5130 is located on the first preview region 5120, the size of the second preview region 5130 may be smaller than or equal to the size of the first preview region 5120. According to various embodiments, the size of the second preview region 5130 may be changed by the user (e.g., a caller) of the first electronic device or the user (e.g., a receiver) of the second electronic device.

In various embodiments, when the user of the second electronic device changes the size of the second preview area 5130, the second electronic device may transmit a control signal corresponding to a user input of the second electronic device to the first electronic device. When receiving the control signal from the second electronic device, the first electronic device may perform a region size control command corresponding to the control signal received through a media processor or a client (e.g., application). According to one embodiment, when the first electronic device receives the control signal transmitted from the second electronic device, a media process management module of the first electronic device or a client may determine whether a user performs a size change of the second preview region 5130, and then may perform the size change in response to the permission of the user of the first electronic device.

In various embodiments, when the movement and/or size of the second preview region 5130 is changed, a guidance object 5135 for changing (e.g., positional movement or size change) the second preview region 5130 may be provided, as shown in FIGS. 51B and 53. According to various embodiments, upon the positional movement of the second preview region 5130, the guidance object 5135 may not be displayed, and the position of the second preview region 5130 may be moved to correspond to the user input.

According to one embodiment, the guidance object 5135 may be provided in various forms such as a rectangle, a triangle, a polygon, a circle, and the like. For example, in FIGS. 51B and 53, an example in which the guidance object 5135 is provided as a rectangle may be shown.

According to one embodiment, a user may select one region (point) (e.g., four corners or vertices in FIG. 51B and FIG. 53) of the guidance object 5135, and may change the size of the second preview region 5130 with a user input such as dragging. According to one embodiment, the user may change the size of the second preview region 5130 by enlarging or reducing the size of the second preview region 5130 through the movement in any one direction in a state where the right lower end vertex of the guidance object 5135 is selected.

According to one embodiment, the user may move and change the position of the second preview region 5130 by a movement input (e.g., dragging) in any one direction in a state where the inside (e.g., the second preview region 5130 itself) of the guidance object 5135 is selected (e.g., touched).

According to various embodiments, the second preview region 5130 may be provided in the form of bubbles. According to one embodiment, the shape of the second preview region 5130 may be variously changed by the user of the first electronic device. For example, the second preview region 5130 may be provided as a GUI of any one of various forms set by the user, such as a stamp, cloudy oval, instant photo, heart shape, and the like.

According to various embodiments, the display of the second preview region 5130 may be provided optionally in various display schemes. According to one embodiment, the second preview region 5130 may always be displayed. According to one embodiment, the second preview region 5130 may be displayed when the user's voice of the first electronic device is recognized. According to one embodiment, when the user input is recognized on a touch screen (e.g., 530 of FIG. 5) while the second preview region 5130 is displayed, the displayed second preview region 5130 may not be displayed (e.g., disappear), and the second preview region 5130 may be displayed again when the user input is recognized again on the touch screen.

In various embodiments, it is possible to adaptively provide the show/hide of the second preview region 5130. For example, when the overall brightness value of an image corresponding to the second preview region 5130 is less than or equal to a predetermined reference (e.g., Y value of YUV is 20% or less of the maximum value), when the shape of the object is not detected, or when the focus does not fit, the second preview region 5130 may not be displayed.

According to various embodiments, upon rotation (e.g., change from a horizontal mode to a vertical mode or from the vertical mode to the horizontal mode) of the electronic device in a narration mode, the directions of two cameras (e.g., front camera and rear camera) may be different from each other. That is, the direction of a video received through the camera becomes different according to the change of the orientation of the electronic device. For example, when an electronic device having a front camera and a rear camera is rotated in a clockwise direction, the front camera may rotate clockwise and the rear camera may rotate counterclockwise (anticlockwise) by an acceleration sensor or a pose sensor (e.g., a geomagnetism sensor, a gravity sensor, a gyro sensor, or the like). Accordingly, although the preview screen may appear the same to the user regardless of the rotation state of the electronic device, videos (e.g., images or moving images) actually stored or transmitted may be stored or transmitted in a rotated state according to the rotation direction of the camera. Therefore, in the various embodiments, the videos of the front camera and the video of the rear camera may be compensated (e.g., each camera video is rotated so as to be seen in the right direction) and transmitted by a video transmitting terminal (hereinafter, referred to as the first electronic device), or the compensated videos may be synthesized and transmitted. According to various embodiments, the first electronic device may transmit the video of the front camera and the video of the rear camera, respectively, and may compensate for (e.g., rotate the respective received videos in the right direction) videos received from a video receiving terminal (hereinafter, referred to as second electronic device), and thereby may store or display the compensated videos in a state of being actually seen or may transmit the same to the other electronic devices.

In various embodiments, a case in which front and rear camera videos are synthesized in the first electronic device and transmitted may be performed may be performed as follows.

According to one embodiment, when the first electronic device rotates, since the second electronic device receives and displays the already synthesized video, the second electronic device may rotate the synthesized video in consideration of the orientation of the display of the second electronic device, and then display the rotated video.

According to one embodiment, the rotated video may be stored or transmitted to the second electronic device by compensating for (e.g., rotating) a narration mode video displayed on the preview screen so as to be normally seen based on the rotation direction of the first electronic device. For example, when the first electronic device rotates 180 degrees clockwise, an image corresponding to the preview screen may be rotated 180 degrees counterclockwise to be stored or transmitted. This operation may also be applied to rotations of 90 degrees, 270 degrees, and the like.

In various embodiments, a case in which the first electronic device transmits the videos received by the front and rear cameras of the first electronic device and then the second electronic device synthesizes the videos may be performed as follows.

According to one embodiment, the location, size, shape, and display information (e.g., at least one of a control signal and a separate metadata file included in image information) of the second preview region set by the first electronic device may be transmitted to the second electronic device, and thereby the second electronic device may reconstruct and display the synthesized video.

According to one embodiment, when the first electronic device rotates while the narration mode is displayed on the second electronic device, rotation information of the front and rear cameras of the first electronic device may be transmitted to the second electronic device. The second electronic device may correct the synthesized video based on the transmitted rotation information of the front and rear cameras of the first electronic device, thereby storing, displaying, or transmitting the changed synthesized video. For example, when the first electronic device rotates 90 degrees clockwise, can be determined that the front camera and the rear camera are rotated 90 degrees in opposite directions from each other, and the rotation of each video may be compensated to be stored or transmitted so that each video may be normally displayed based on the gravity direction. At this time, additionally, the video may be rotated in consideration of the orientation of the second electronic device or the orientation of the display of the second electronic device, and then may be displayed on the display, stored, or transmitted.

According to one embodiment, at least one attribute of the location, size, and shape of the second preview region, air ether the second preview region is displayed may be changed by the user of the second electronic device.

Figure 54:
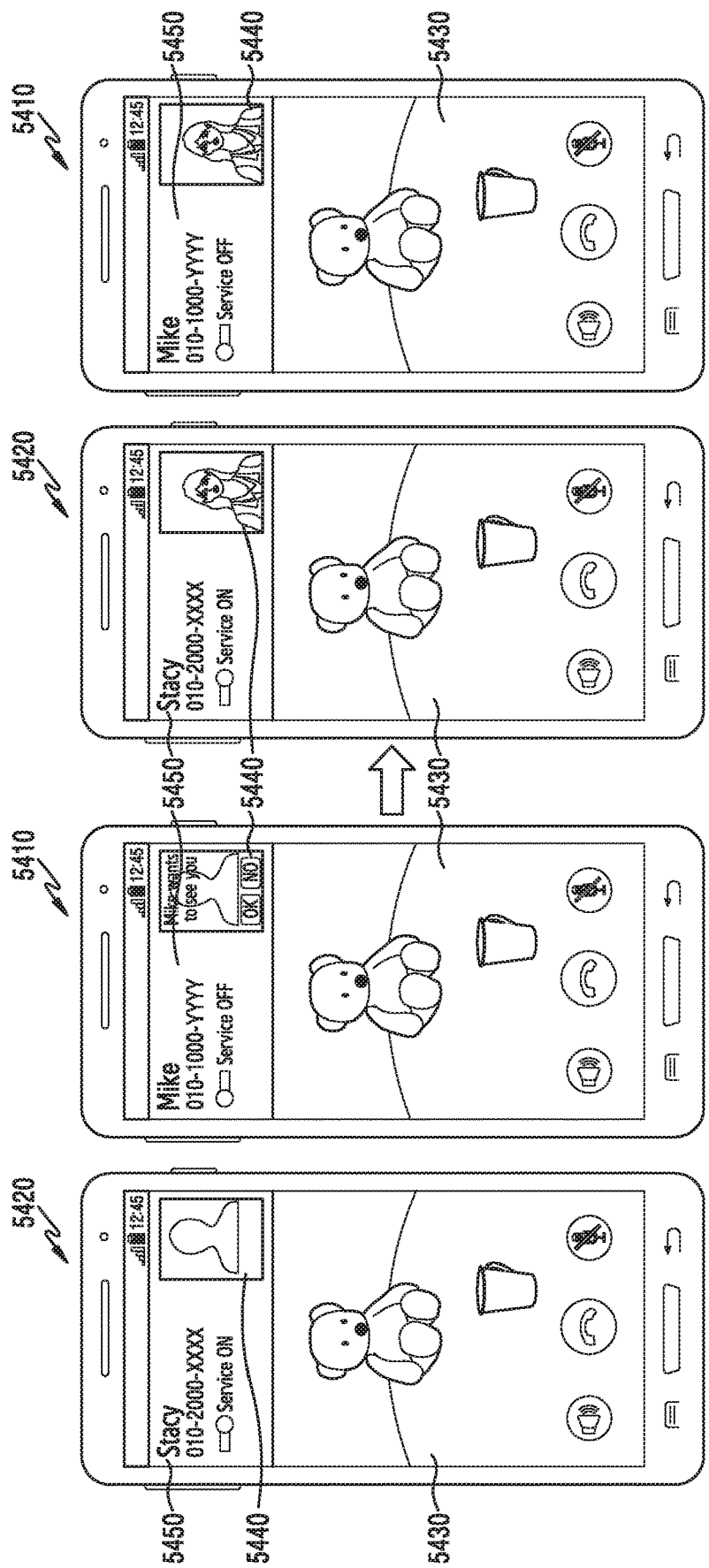
FIGS. 54 and 55 are diagrams illustrating an example of an operation of performing a video service in electronic devices according to various embodiments of the present disclosure.
Figure 55:
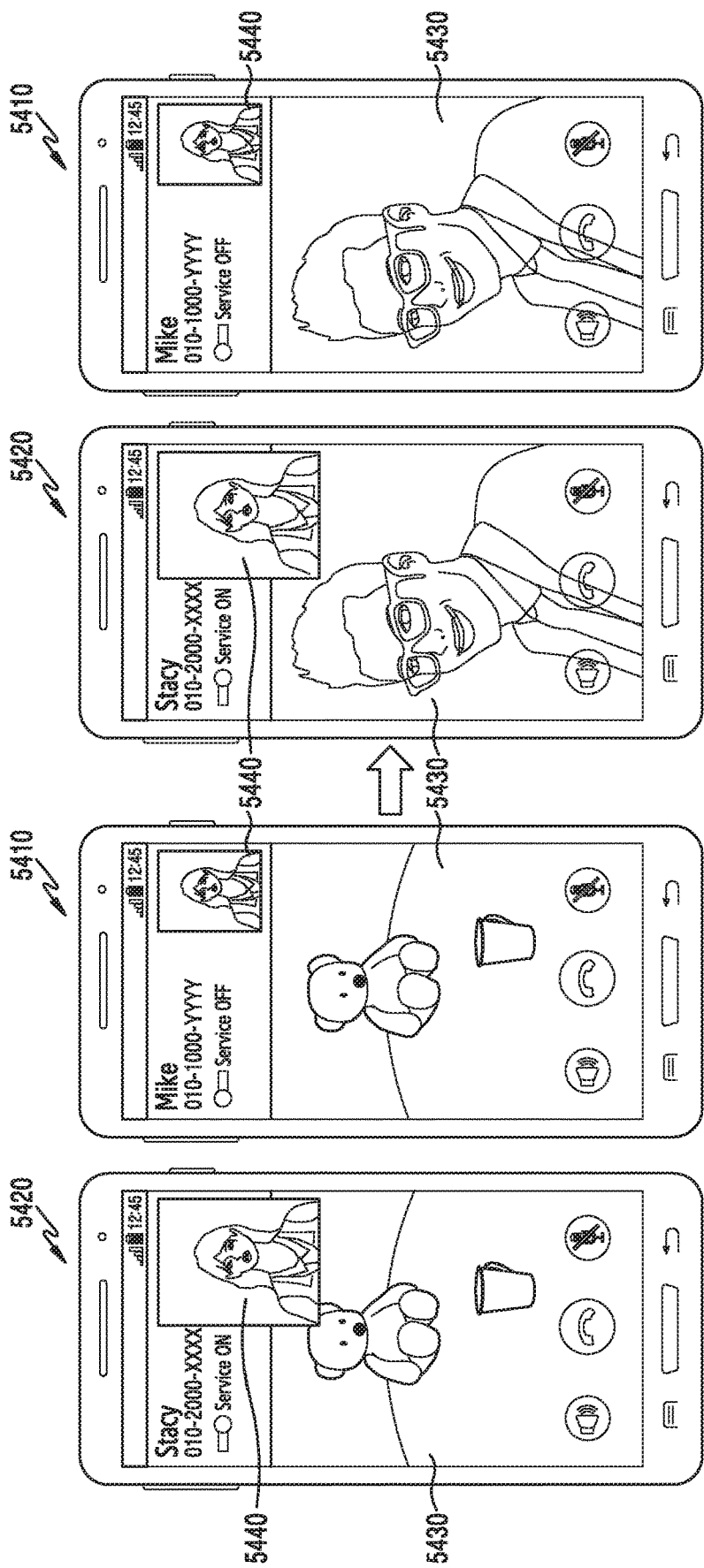

According to various embodiments, an example of an operation of switching the front camera and the rear camera will be descried with reference to FIGS. 54 and 55.

FIGS. 54 and 55 are diagrams illustrating an example of an operation of performing a video service in electronic devices according to various embodiments of the present disclosure.

Referring to FIGS. 54 and 55, screen examples related to an operation of executing a narration mode using a dual camera and performing camera switching (or rotation) during the execution of the narration mode in various embodiments are shown.

According to one embodiment, a first electronic device 5410 (e.g., a video originating terminal) and a second electronic device 5420 (e.g., a video receiving terminal) may exchange (share) a first preview region 5430 and a second preview region 5440. For example, when the respective preview images (the first image and the second image) are set to be in the first preview region 5430 corresponding to a first image received via a rear camera and the second preview region 5440 corresponding to a second image received from a front camera and the set preview images are displayed, the displayed images may be switched through a user interface (e.g., one or more menu, button, touch, and swipe) so that the first preview region 5430 may be changed to correspond to the front camera and the second preview region 5440 may be changed to correspond to the rear camera.

According to one embodiment, when camera switching is performed in the narration mode, the images displayed according to the preview region changed in the first electronic device 5410 may be synthesized and transmitted to the second electronic device 5420, or information indicating that camera switching has been performed may be transmitted to the second electronic device 5420 to control the preview region to be changed.

According to one embodiment, the location, size, shape, and display information of the second preview region 5440 set by the user of the first electronic device 5410 may be transmitted to the second electronic device 5420, and thereby the second electronic device 5420 may reconstruct and display the synthesized video.

According to one embodiment, when displaying the narration mode video using the videos of the front and rear cameras transmitted from the first electronic device 5410, the second electronic device 5420 may control the first preview region 5430 and the second preview region 5440 constituting the narration mode video to control the camera video of the first electronic device 5410 or to drive the camera of the second electronic device 5420, and may display, store, or transmit the video using this. In this regard, description will be made with reference to FIGS. 54 and 55.

In FIGS. 54 and 55, an example in which the second preview region 5440 is provided through a service window 5450 is illustrated. The service window 5450 may be overlaid independently of the first preview region 5430 and displayed in the form of a pop-up. According to one embodiment, the service window 5450 may include contact, information about a counterpart user performing a video service, status information about whether a counterpart electronic device is an originating terminal or a receiving terminal, the second preview region 5440, and the like. For example, the second electronic device 5420 may display contact information (e.g., a user name {e.g., Stacy}, a phone number {e.g., 010-2000-XXXX}, etc.) of the user of the first electronic device 5410 and status information (e.g., service on {or video service on}, etc.) indicating that the counterpart electronic device is acting as a video transmitting terminal, through the service window 5450, and the first electronic device 5410 may display contact information. (e.g., a user name {e.g., Mike}, a phone number {e.g., 010-1000-YYYY}, etc.) of the user of the second electronic device 5420 and status information (e.g., service off {or video service off}, etc.) indicating that the counterpart electronic device is acting as a video receiving terminal, through the service window 5450. Additionally, according to various embodiments, a separate camera ON/OFF-related GUI may be displayed independently of a GUI (e.g., service ON/FF) indicating a video service status, and whether a video is to be transmitted to the other party may be set and driven by controlling ON/OFF of the camera of a local device (e.g., a video transmitting device or the first electronic device 5410). According to various embodiments, the service ON/OFF may indicate the display of whether the counterpart electronic device transmits a video, and the camera ON/OFF may indicate the display of whether the local device transmits a video. For example, through the service window 5450 of the first electronic device 5410, the GUI of camera ON or camera OFF according to whether the first electronic device 5410 transmits a video may be displayed and provided to be adjacent to (e.g., lower end) the GUI of the service ON or service OFF according to whether the second electronic device 5420 transmits a video.

As shown in FIGS. 54 and 55, the second electronic device 5420 may display the rear camera video, which is transmitted by the first electronic device 5410, in real-time in the first preview region 5430. When the second preview region 5440 is selected by a user input and the front camera video of the first electronic device 5410 is not displayed in the second preview region 5440, the second electronic device 5420 may transmit a video transmission request (e.g., a control signal requesting the transmission of the front camera video) to the first electronic device 5410 so that the front camera video of the first electronic device 5410 may be displayed on the second preview region 5440.

When receiving the video transmission request from the second electronic device 5420, the first electronic device 5410 may provide a GUI (e.g., OK button or NO button) to the user through the second preview region so that the user of the first electronic device 5410 may accept or decline the corresponding request. According to one embodiment, as to a selection menu for acceptance or denial of the request, a corresponding GUI may be provided through one region of the service window 5450 or through any one region of the first preview region 5430.

When accepting the request of the second electronic device 5420 through a user input (e.g., pop-up menu, voice input, or gesture recognition), the first electronic device 5410 may confirm the resource and network status of the first electronic device 5410. When it is determined that the corresponding video can be transmitted in response to the video transmission request of the second electronic device 5420 based on the confirmation result, the first electronic device 5410 may drive the front camera to receive the corresponding video. The first electronic device 5410 may encode the video input through the front camera and may transmit the encoded video to the second electronic device 5420 through a network. According to various embodiments, the first electronic device 5410 may be in a state of continuing to transmit the video input through the rear camera to the second electronic device 5420. According to various embodiments, when transmitting the video of the front camera, the first electronic device 5410 may display the video of the front camera sequentially or in parallel through the second preview region 5440 of the first electronic device 5410.

The second electronic device 5420 may receive the video of the front camera corresponding to the video transmission request from the first electronic device 5410 and may display the received video in the second preview region 5440. According to various embodiments, the second electronic device 5420 may be in a state of continuing to display the video of the rear camera received from the first electronic device 5410 through the first preview region 5430.

The second electronic device 5420 may change the second preview region 5440 by a user input and the displayed video may also be changed (e.g., zoomed). For example, when an ROI is set (e.g., a touch by a user input, region setting, pressure detection, or the like) through the second preview region 5440, the second electronic device 5420 may transmit an associated control signal to the first electronic device 5410. According to one embodiment, the associated control signal may include a control command that causes one or more of the following functions: auto exposure, auto focus, resolution change, bit rate, frame rate, color temperature change, gamma value change, noise reduction, and zooming to be performed. According to one embodiment, when the ROI is set in the second preview region 5440, the second electronic device 5420 may perform image processing through a media processor. When the second preview region 5440 is changed according to the user input, the second electronic device 5420 may change and display the second preview region 5440 of the second electronic device 5420 and may provide the changed and displayed second preview region 5440 to the user, as shown in FIG. 55. For example, as to the second preview region 5440 of the second electronic device 5420, the size and/or location may be changed and displayed to correspond to the user input and may be provided in an overlay manner.

According to various embodiments, the first electronic device 5410 or the second electronic device 5420 may receive a user input into the first preview region 5430 or the second preview region 5440 and may variously change the video according to the user input.

According to one embodiment, as described above, the front camera and the rear camera of the first electronic device 5410, which are being driven, may be switched so that another video may be shared. For example, videos captured (photographed) by the front camera of the first electronic device 5410 other than videos captured (photographed) by the rear camera of the first electronic device 5410, or videos captured (photographed) by one or more cameras functionally connected to the first electronic device 5410 may be displayed on the first preview region 5430. By way of another example, videos received from one or more cameras built in the second electronic device 5420 or functionally connected to the second electronic device 5420 may be displayed on the first preview region 5430. In addition, when the second electronic device 5420 operates to display the video of the second electronic device 5420, the second electronic device 5420 may transmit the corresponding video and/or control information to the first electronic device 5410 so that the corresponding video may be displayed through the first preview region 5430 of the first electronic device 5410. This may be performed, according to various embodiments, through an operation of using and selecting various user input schemes (e.g., one or more of button, menu, icon, gesture, and voice recognition) capable of designating a target electronic device (e.g., first electronic device 5410 or the second electronic device 5420) to display a video and one or more cameras (e.g., front camera, rear camera, external camera, etc.) corresponding to the corresponding electronic device for each region (e.g., first preview region 5430 or second preview region 5440).

As described above, according to various embodiments, the first electronic device originating a video may separately transmit a photographed video of the front camera, a photographed video of the rear camera, and audio associated with each video. According to one embodiment, the video of the rear camera in the first electronic device may be displayed in the first preview region. For example, it is possible to provide a background sound received from a first microphone arranged in the same or similar direction as or to the direction of the background and the rear camera. According to one embodiment, the video of the front camera in the first electronic device may be displayed in the second preview region, and a video transmitter received from a second microphone arranged in the same or similar direction as or to the direction of the front camera and voice of the transmitter may be provided.

According to various embodiments, the second electronic device receiving a video may display the video and audio data received by the first electronic device in the same manner. According to one embodiment, the video of the rear camera of the first electronic device in a second electronic device may be displayed on the first preview region. For example, it is possible to provide a background sound received from the first microphone arranged in the same or similar direction as or to the direction of the rear camera. According to one embodiment, the video of the front camera of the first electronic device in the second electronic device may be displayed in the second preview region, and the video transmitter received from the second microphone arranged in the same or similar direction as or to the direction of the front camera and the voice of the transmitter may be provided.

According to various embodiments, the second electronic device receiving a video may separately reproduce the video and audio transmitted by the first electronic device. According to one embodiment, only when the video corresponding to the second preview region is displayed by the user's selection, the second electronic device may reproduce the audio (e.g., voice) of the user of the first electronic device. According to one embodiment, when the second preview region is hidden, the second electronic device may not reproduce the audio (e.g., voice) of the user of the first electronic device. According to one embodiment, when the first preview region is hidden by switching the preview region, the second electronic device may not reproduce the background sound.

FIGS. 56A, 56B, 57A, and 57B are diagrams illustrating an example of an operation of performing a video service in electronic devices according to various embodiments of the present disclosure.

According to various embodiments, FIGS. 56A, 56B, 57A, and 57B illustrate examples of an operation performed when a call is received from another third party user during the execution of a video service. For example, during performing the video service between the first electronic device and the second electronic device, a call reception may be requested from a third electronic device to the first electronic device or the second electronic device. In this way, when a call is received from the third electronic device during the execution of the video service, exception processing as described below may be performed.

According to various embodiments, a call may be received from the third electronic device to the first electronic device transmitting a video. In this case, the first electronic device may notify the call reception of the third electronic device.

Figures 56A, 56B:
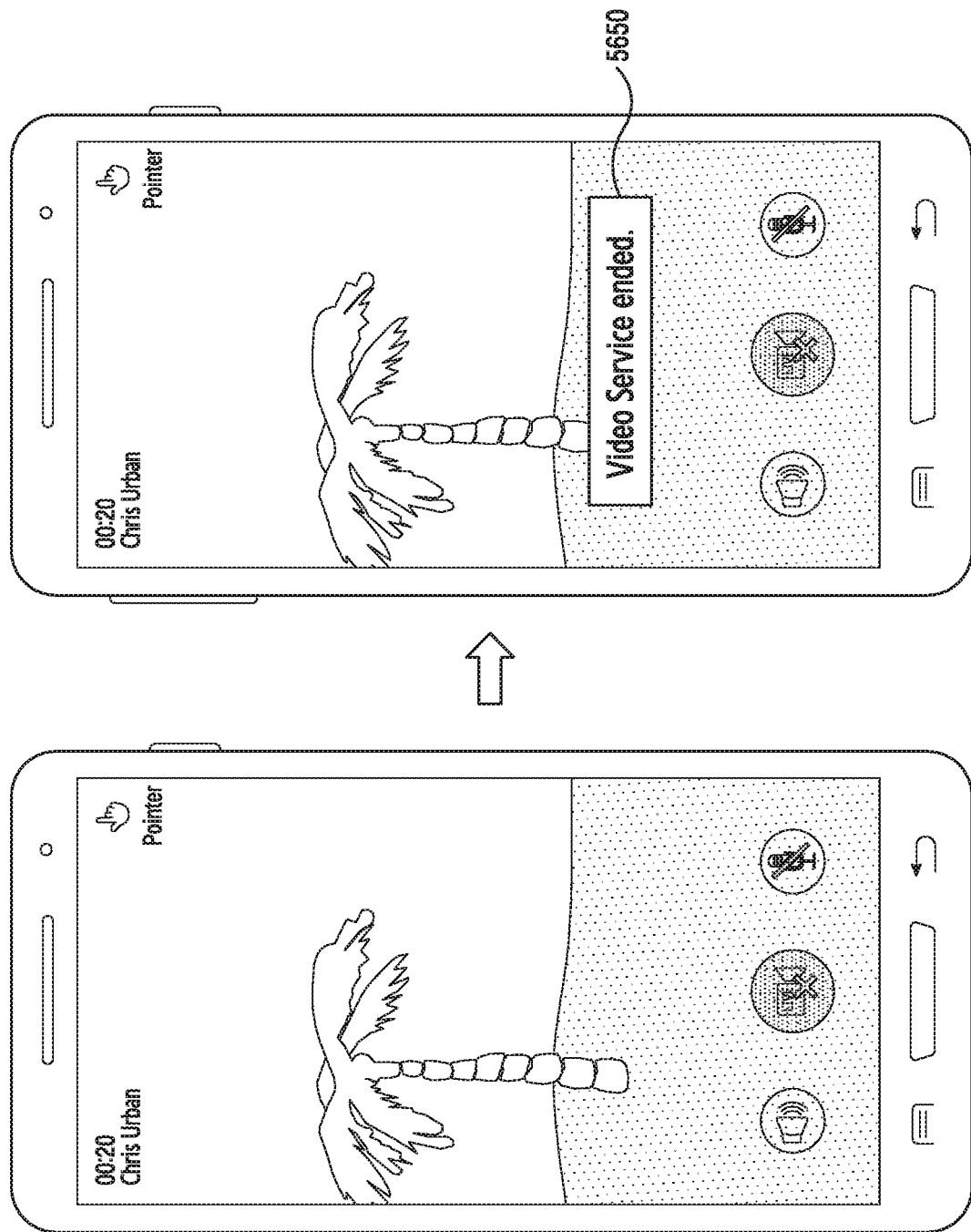
FIGS. 56A, 56B, 57A, and 57B are diagrams illustrating an example of an operation of performing a video service in electronic devices according to various embodiments of the present disclosure.

According to one embodiment, when the user of the first electronic device accepts the call of the third electronic device, the video service may be terminated and the end of the video service may be displayed in the first electronic device and the second electronic device in a GUI manner. According to one embodiment, as shown in FIGS. 56A-56B, a pop-up 5650 (e.g., video service ended) indicating the end of the video service may be displayed and provided to the user.

According to one embodiment, when the user of the first electronic device rejects the call of the third electronic device, the video service may be maintained and rejection information may be transmitted to the third electronic device. The rejection information may include information indicating that the first electronic device is in the video service.

According to various embodiments, a call may be received from the third electronic device to the second electronic device receiving a video. In this case, the second electronic device may notify the call reception of the third electronic device.

Figure 57B:
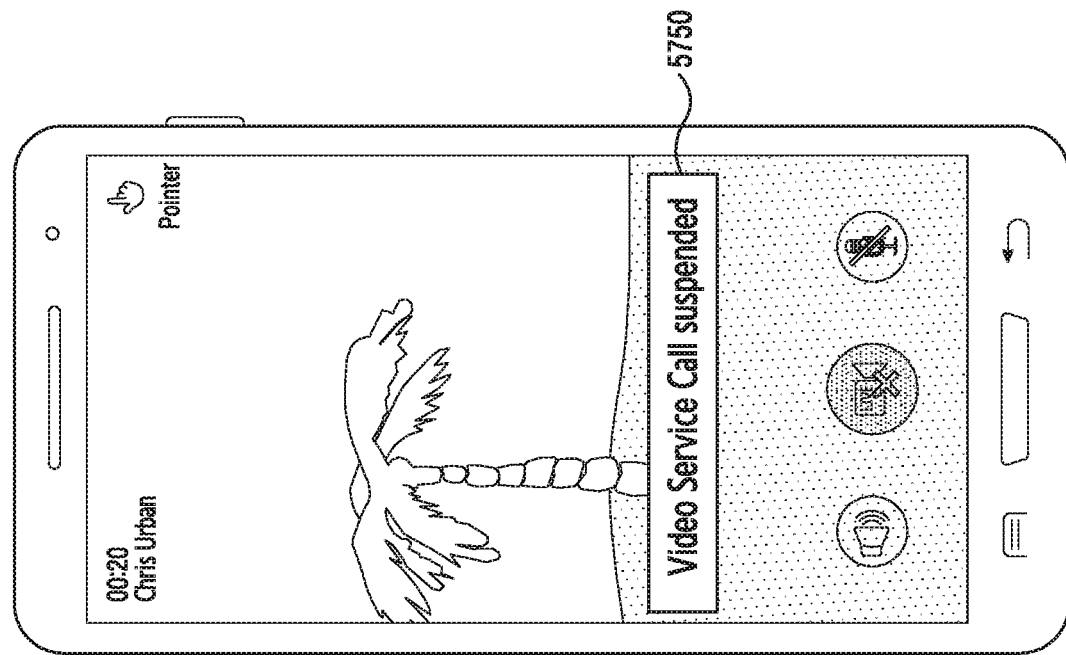
Figure 57A:
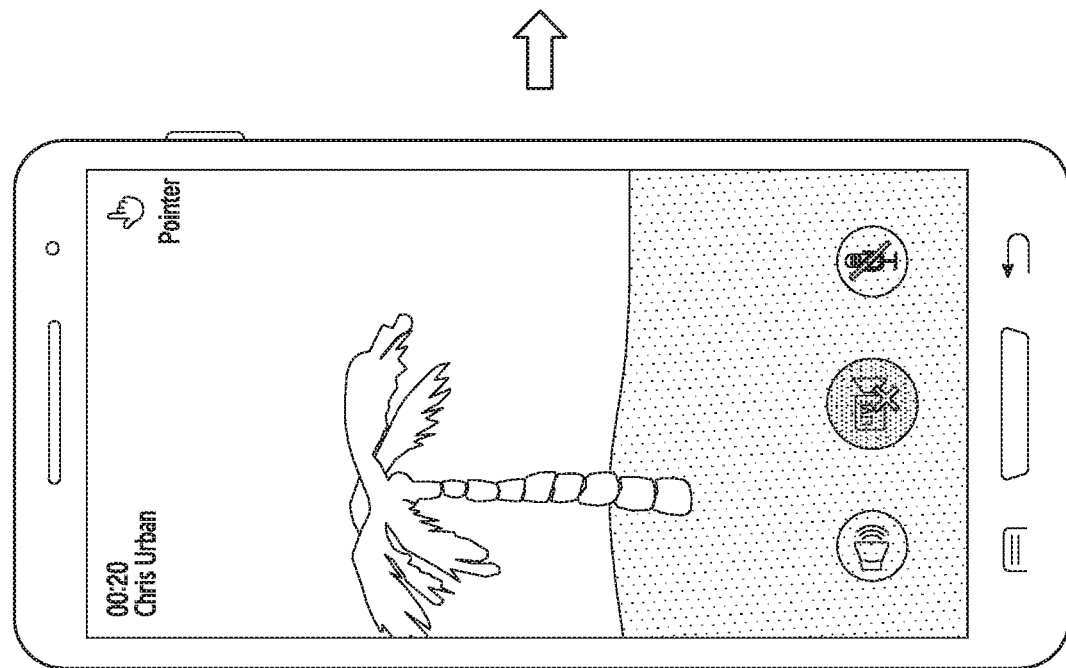

According to one embodiment, when the user of the second electronic device accepts the call of the third electronic device, the second electronic device and the first electronic device may suspend the video service. For example, the second electronic device may be operable to display, on the video service screen, information indicating that the second electronic device has received the call of the third electronic device and to cause the first electronic device to display the same. For example, as shown in FIGS. 57A-57B, the second electronic device may display information indicating that the second electronic device has received another call on the video service screen as a pop-up 5750 (e.g., video service call suspended), and may transmit the same to the first electronic device so that the first electronic device displays the same. At this time, the first electronic device may pause the transmission (e.g., upload) of the camera video and may continue to transmit the video. For example, when pausing the transmission of the camera video, the first electronic device may maintain the connection state so as not to cancel a P2P or a video streaming server connection. Upon the end of the call be the second electronic device and the third electronic device, the first electronic device may resume the transmission of the camera video at a request of the second electronic device.

According to one embodiment, when the user of the second electronic device accepts the call of the third electronic device, as described with reference to FIGS. 56A-6B, the video service may be terminated and a pop-up 5650 (e.g., video service ended) indicating the end of the video service may be displayed in the first electronic device and the second electronic device in a GUI manner.

According to one embodiment, when the user of the second electronic device rejects the call of the third electronic device, the video service may be maintained and reject formation may be transmitted to the third electronic device. The rejection information may include information indicating that the second electronic device is in the video service.

Meanwhile, according to various embodiments, a case in which the user of the first electronic device leaves the video service screen by a home key or the like may occur. In this case, the first electronic device (or the user of the first electronic device) may display the last still image immediately before leaving the video service screen on the screen of the second electronic device.

Figure 58:
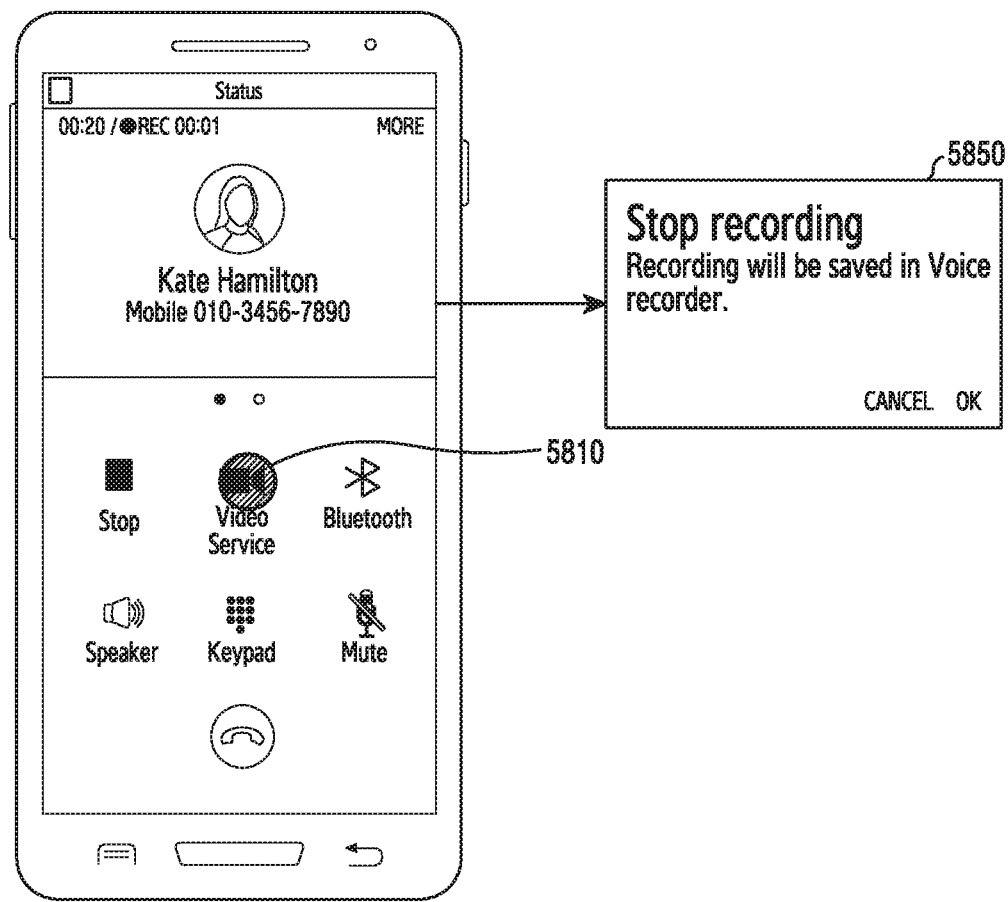
FIGS. 58 and 59 are diagrams illustrating an example of an operation of performing a video service in electronic devices according to various embodiments of the present disclosure.
Figure 59:
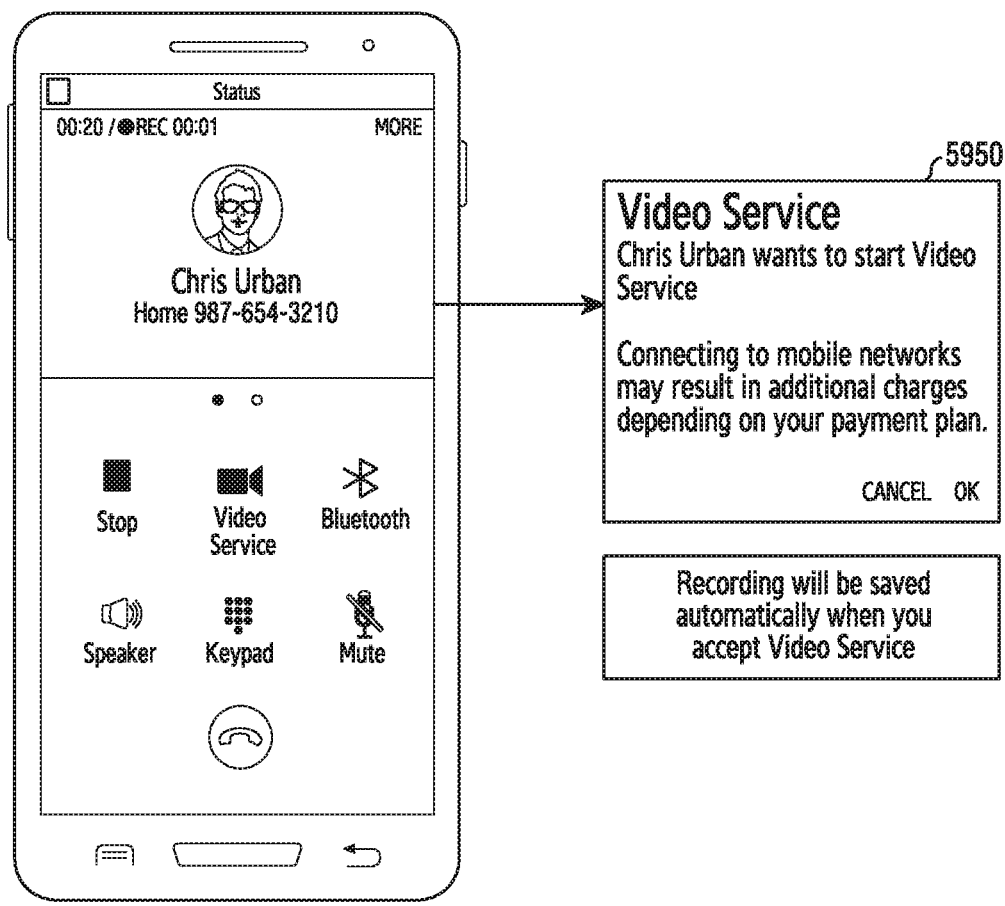

FIGS. 58 and 59 are diagrams illustrating an example of an operation of performing a video service in electronic devices according to various embodiments of the present disclosure.

According to various embodiments, FIGS. 58 and 59 illustrate examples of an operation performed when a video service is started while a (call) voice recording function is performed at the time of a voice call.

According to various embodiments, FIG. 58 shows an example of processing when the video service is started while the voice recording function according to a voice call is performed in the first electronic device transmitting a video. As shown in FIG. 58, the first electronic device may provide whether the voice recording is terminated when the video service is started during the voice recording, through a pop-up 5850 (e.g., step recording). According to one embodiment, when detecting a user input by the service object 5810 for initiating the video service during the voice recording, the first electronic device may display a pop-up indicating that the voice recording is terminated and a voice recording file is stored and may provide the displayed pop-up to the user.

According to one embodiment, when acceptance (e.g., OK) is selected in the pop-up 5850, the first electronic device may terminate the voice recording function (operation) and may start the video service. For example, in the first electronic device, a voice recording session may be terminated and the voice recording file may be stored in a storage unit (e.g., memory). In various embodiments, the stored voice recording file may be a call recording associated with the call of the video service, and therefore may be viewed as an association file with the corresponding video service session, as in the description related to the media footprint.

According to one embodiment, the first electronic device may maintain the voice recording session and may perform voice recording in parallel at the start of the video service. For example, the first electronic device may record voice information excluding the video of the video service, and may perform bookmarking or the like on a portion where the video service is performed.

According to one embodiment, the first electronic device may maintain the voice recording session and may perform video and voice recording in parallel at the start of the video service. For example, the first electronic device may record video and audio information, and may process a predetermined still image (e.g., one of a default image and an image input when the video communication is started) as video session data during a corresponding interval, with respect to the voice recording session before the video recording is performed and thereby may store the processed still image as a moving image file. At the same time, it is also possible to perform bookmarking and the like on a portion where the start, conversion, and termination of the voice and video service occur in the video service execution.

According to various embodiments, FIG. 59 shows an example of processing when the video service is requested from the first electronic device during the voice recording function according to the voice call in the second electronic device receiving a video. As shown in FIG. 59, when the video service is requested during the voice recording, the second electronic device may provide whether the voice recording is terminated, through a pop-up 5950 (e.g., video service). According to one embodiment, when receiving a request to initiate the video service from the first electronic device during the voice recording, the second electronic device may display a pop-up indicating that the video service has been requested from the first electronic device, the voice recording is terminated upon acceptance of the video service, and a voice recording file is stored, and may provide the displayed pop-up to the user.

According to one embodiment, when acceptance (e.g., OK) is in selected in the pop-up 5950, the second electronic device may terminate the voice recording function (operation) and may start the video service. According to various embodiments, the stored voice recording file may be a call recording associated with the call of the video service, and therefore may be viewed as an association file with the corresponding video service session, as in the description related to the above-described media footprint.

According to one embodiment, the second electronic device may maintain the voice recording session and may perform voice recording in parallel at the start of the video service. For example, the second electronic device may record voice information excluding the video of the video service, and may perform bookmarking or the like on a portion where the video service is performed.

Figure 60:
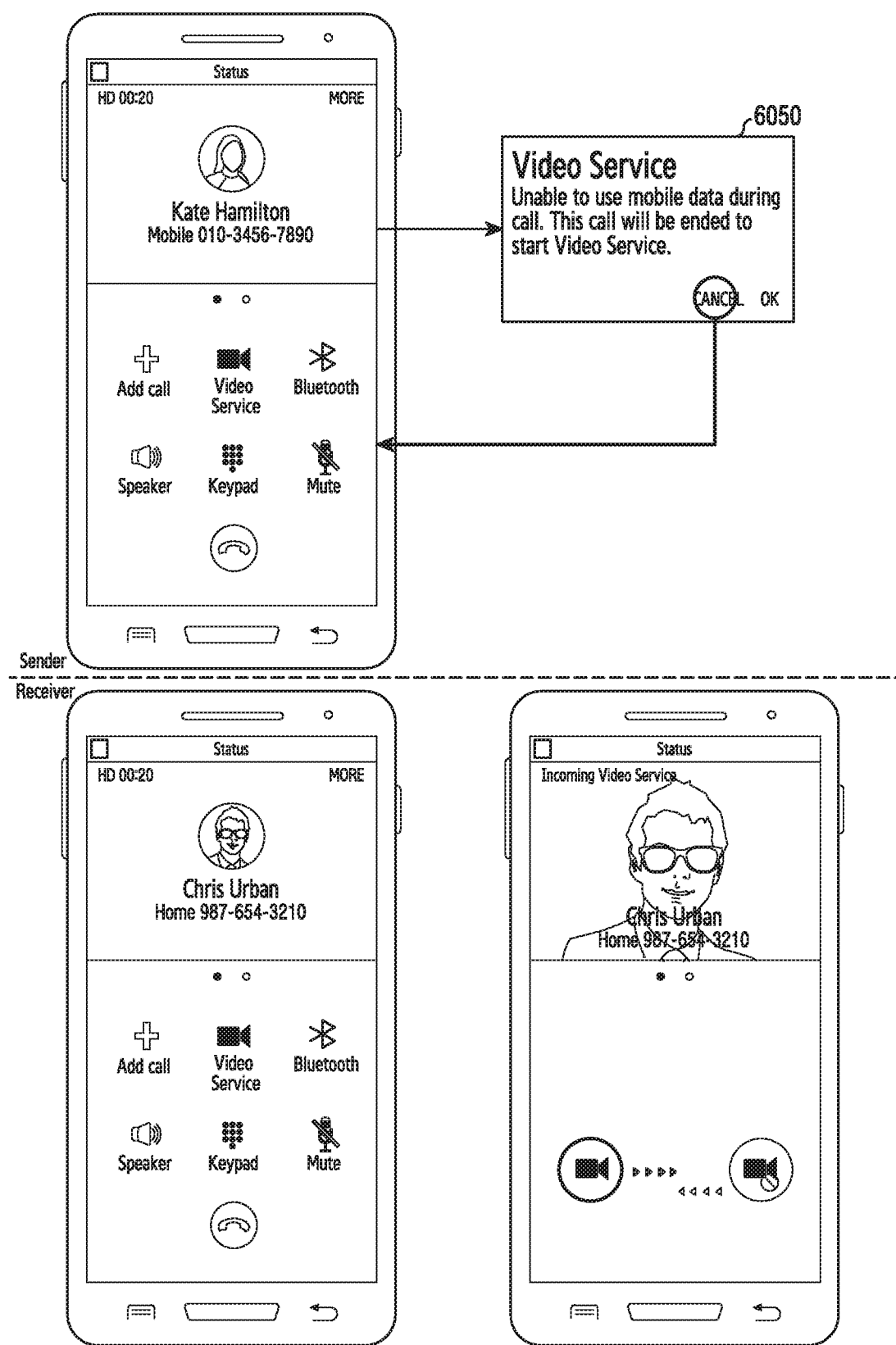
FIG. 60 is a diagram illustrating an example of an operation of performing a video service in an electronic device according to various embodiments of the present disclosure.

FIG. 60 is a diagram illustrating an example of an operation of performing a video service in an electronic device according to various embodiments of the present disclosure.

According to various embodiments, FIG. 60 shows an example of an operation performed when a data session is unavailable at the time as in a voice call in a CDMA 1× situation.

According to one embodiment, as shown in FIG. 60, when detecting a user input by a service object for initiating a video service, the first electronic device may determine whether the corresponding service is available. For example, whether the use of data is impossible in the CDMA 1× situation or during a voice call may be determined. When it is determined that the use of data is impossible in the CDMA 1× situation or during the voice call based on the determination result, the first electronic device may terminate the voice call according to the corresponding result, and may display a pop-up indicating the start of the video service and provide the same to a user.

According to one embodiment, when cancellation (e.g., cancel) is selected in the pop-up 6050, the first electronic device may be operable to maintain the voice call without starting the video service. When acceptance (e.g., OK) is selected in the pop-up 6050, the first electronic device may terminate the voice call and may connect the video service. For example, the first electronic device may initiate a call connection for the video service after the end of the voice call.

According to one embodiment, the second electronic device may receive the call connection by the video service of the second electronic device after the end of the voice call with the first electronic device, and may display a user interface (e.g., call acceptance or rejection screen) selecting whether the call connection is received and may provide the user interface to the user.

Figure 61:
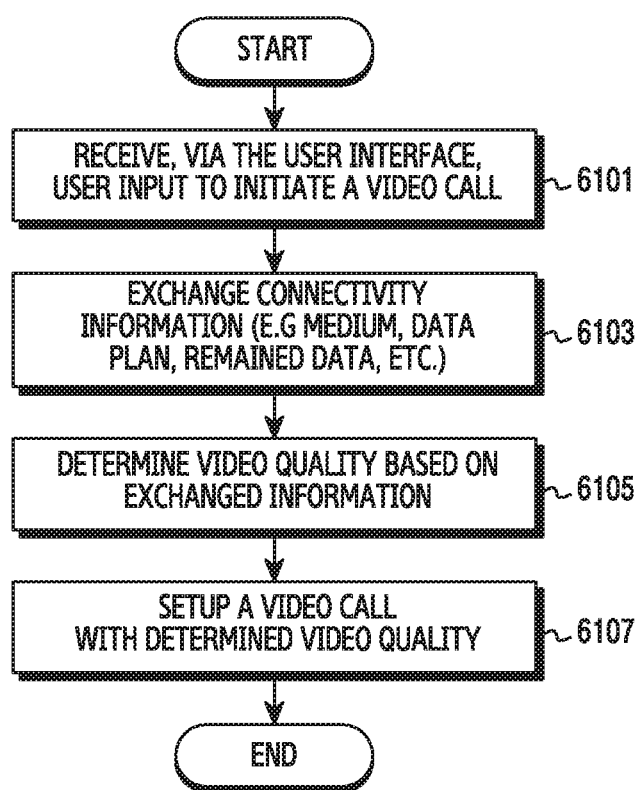
FIG. 61 is a flowchart illustrating a method of performing a video service in an electronic device according to various embodiments of the present disclosure.

FIG. 61 is a flowchart illustrating a method of performing a video service in an electronic device according to various embodiments of the present disclosure.

As shown in FIG. 61, an example of an operation of determining image quality when a video service connection is requested during a voice call is illustrated. For example, FIG. 61 shows an example of an operation of providing adaptive streaming according to various embodiments. According to various embodiments, an operation of setting and changing the image quality according to data or connectivity characteristics during the video service may be performed.

Referring to FIG. 61, in operation 6101, the controller 580 (e.g., a processor of an electronic device acting as an originating terminal) may receive a user input for initiating a video call through a user interface. According to one embodiment, the controller 580 may detect a user input using a service object or an input such as a voice command or a gesture, which is set to initiate the video service.

In operation 6103, the controller 580 may exchange connectivity information. According to one embodiment, the controller 580 may exchange the connectivity information with at least one of a network, a server, and a counterpart electronic apparatus for the video service. In various embodiments, the connectivity information may include at least one of medium, data plan, and remained data.

In operation 6105, the controller 580 may determine the video quality based on the exchanged information.

In operation 6107, the controller 580 may set the video call to have the determined video quality. For example, the controller 580 may perform the video call based on the determined video quality.

As described above, according to various embodiments, it is possible to provide the video service in consideration of the video quality based on the first electronic device (or the second electronic device receiving a video) transmitting a video.

According to various embodiments, in order to perform the video service, a process of confirming the availability of the video service through the user interface (e.g., service object) may be completed, and connectivity characteristic information of the user may be confirmed in an acceptance process (or prior to the acceptance process) of a video service request from the second electronic device.

According to one embodiment, when the first electronic device (or the user of the first electronic device) uses an LIE unlimited plan, photographing or transmission video quality may be determined as ultra-high definition (UHD)/full-high definition (FHD)-level quality. According to one embodiment, when the first electronic device uses a 2 GB flat rate system or when an alert is set upon the use of 2 GB data in the first electronic device, the initial photographing or transmission video quality may be determined as high definition (HD)/standard definition (SD)-level quality. In various embodiments, the determined video quality may be maintained for a predetermined time and may be adaptively changed according to a data usage amount of the user or data remaining amount. According to various embodiments, the video quality may be determined differentially according to a user's plan as shown in the following Table 1, and the video quality may be changed according to the changed information.

TABLE 1

| Connectivity Information | | Video Quality |
|---|---|---|
| WiFi | | UHD/FHD |
| LTE | unlimited plan | UHD/FHD |
| | 10 GB | UHD/FHD |
| | 5 GB | FHD/HD |
| | 2 GB | SD |

According to one embodiment, when the first electronic device (or the user of the first electronic device) is connected to a Wi-Fi network, the initial photographing or transmission video quality may be photographed/transmitted according to a determined standard. According to one embodiment, when the first electronic device performs the video service by simultaneously using the Wi-Fi network and a cellular network, it is possible to follow the photographing/transmission video quality set by either the Wi-Fi network or the cellular network, and to change the same by adjusting a part of the video quality according to the ratio of the two networks. For example, when the cellular network is considered, the corresponding process may be performed by reducing the corresponding video quality by at least predetermined level (e.g., video resolution, frame rate level, color conversion level, or the like) than the standard using only the Wi-Fi network. For example, the level of the video resolution may be lowered in the order of 8K UHD, 4K UHD, FHD (1080p), HD (720p), SD (480p), video graphic array (VGA), and the like, depending on the number of pixels. For example, the level of the frame rate may be lowered in the order of 120 frames per second, 60 frames per second, 30 frames per second, and 15 frames per second. For example, the color conversion level may be lowered according to the number of bits per pixel in the order of RGB32, RGB, YUV, and the like.

According to one embodiment, in the case of the video service using a plurality of P2P connections, the video quality to be photographed/transmitted may be set differently according to the connectivity of the first electronic device. In addition, according to various embodiments, the video quality may be changed to UHD, FHD, HD, and SD, as the number of users increases and the data remaining amount due to the charge plan used by the user decreases.

According to various embodiments, even at the time of video transmission through recording as well as streaming, the operation corresponding to the above description may be applied in the same or similar manner.

FIGS. 62A, 62B, 62C, 63A and 63B are diagrams illustrating an example of an operation of performing a video service in an electronic device according to various embodiments of the present disclosure.

According to various embodiments, FIGS. 62A, 62B, 62C, 63A and 63B illustrate examples of an operation of determining a pose change of a user based on a user gesture (or motion of an electronic device) during a voice call and switching the corresponding call mode to an appropriate call mode (or communication mode) (e.g., voice call mode or video call mode) according to the pose change of the user to perform the corresponding call. For example, FIGS. 62A, 62B, 62C, 63A and 63B illustrate examples of providing a gesture based video service. According to various embodiments, during the voice call, it is possible to intuitively switch immediately to the video service without a separate additional operation, through a motion gesture of any one user.

Referring to FIGS. 62A-62C, FIG. 61A illustrates an example of a case in which the first electronic device 6210 originating a video and the second electronic device 6220 receiving a video are in a call. According to one embodiment, the user of the first electronic device 6210 and the user of the second electronic device 6220 are respectively in the process of making a voice call while placing the electronic devices 6210 and 6220 in their ears.

Figure 62C:
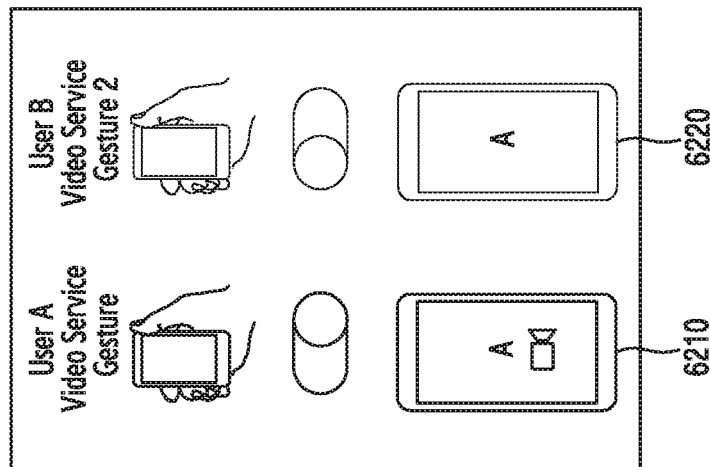
FIGS. 62A, 62B, 62C, 63A and 63B are diagrams illustrating an example of an operation of performing a video service in an electronic device according to various embodiments of the present disclosure.
Figure 62B:
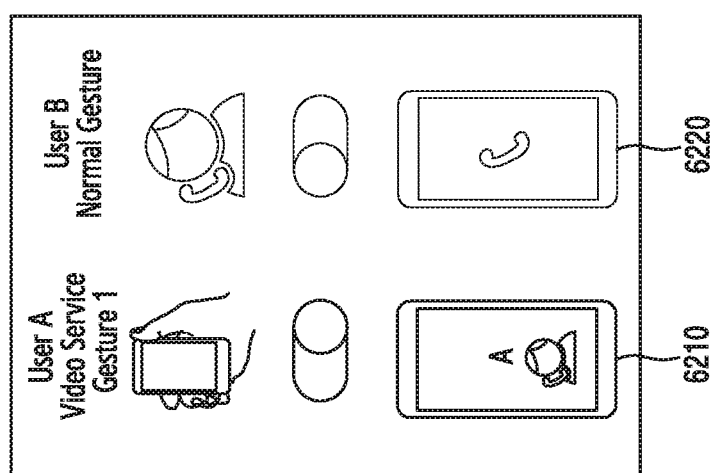
Figure 62A:
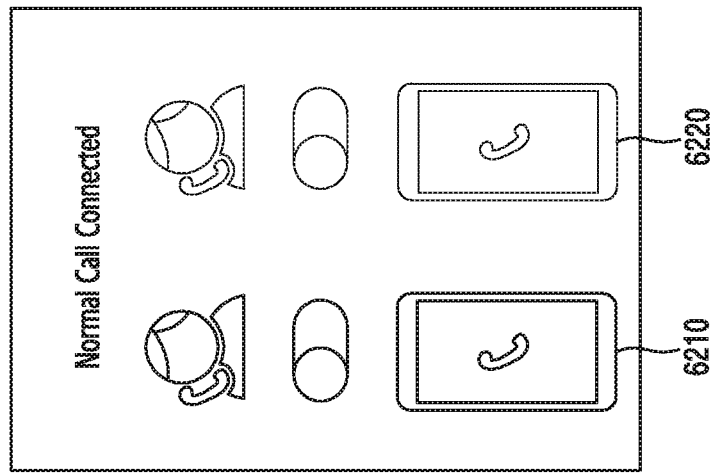

FIG. 62B illustrates an example of a case in which the first electronic device 6210 initiates a video communication connection. According to one embodiment, the user of the first electronic device 6210 may be in a state of removing or releasing the first electronic device 6210 from the ear (e.g., open position mode), and the user of the second electronic device 6220 may be in a state of placing the second electronic device 6220 in the ear (e.g., at ear mode). The first electronic device 6210 may detect the gesture of the user (e.g., status change of the first electronic device 6210) to perform a transition to the video call mode. A screen example thereof is shown in FIG. 63A.

Figures 63A, 63B:
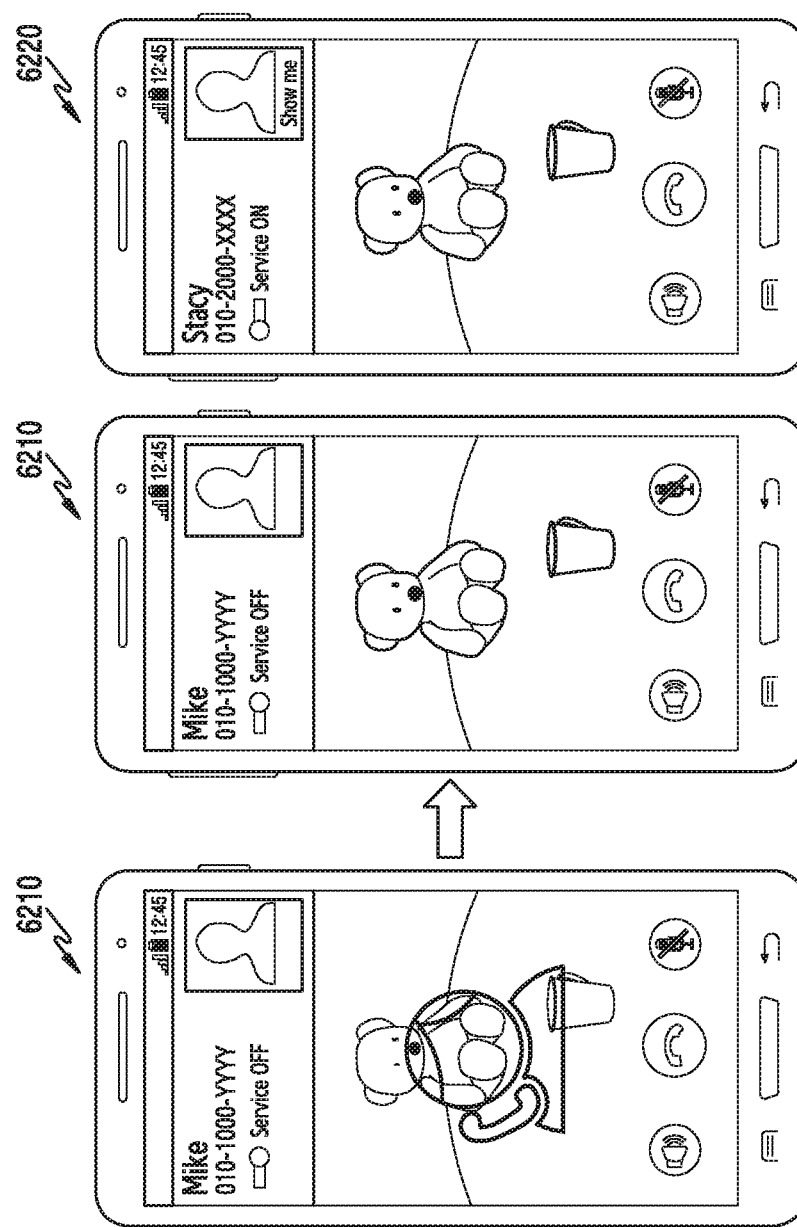

Referring to FIG. 63A, the first electronic device 6210 may display information about the status of the second electronic device 6220 through a preview region of a user interface and may provide the displayed information to the user. According to one embodiment, until the first electronic device 6210 receives a response to a video communication connection request from the second electronic device 6220, the first electronic device 6210 may display information about a state in which the user of the second electronic device 6220 places the second electronic device 6220 in his or her ear, through a GUI (e.g., image, icon, or text). The first electronic device 6210 may be in a state of requesting the video communication connection from the second electronic device 6210 according to the switching of the communication mode, at the time of switching of the video communication mode. Additionally, a camera on state may be displayed through a GUI, so that the first electronic device 6210 may perform the video reception by the camera and may display information indicating that the received video can be transmitted. According to various embodiments, a service ON/OFF GUI may indicate the display of whether a counterpart electronic device transmits a video, and a camera ON/OFF GUI may indicate the display of whether a local device transmits a video. For example, through the service window 5450 of the first electronic device 5410, the GUI of camera ON or camera OFF according to whether the first electronic device 5410 transmits a video may be displayed and provided to be adjacent to (e.g., lower end) the GUI of the service ON or service OFF according to whether the second electronic device 5420 transmits a video.

FIG. 62C illustrates an example of a case in which the second electronic device 6220 permits the video communication connection. According to one embodiment, the user of the first electronic device 6210 may be in a state of removing the first electronic device 6210 from the ear and the user of the second electronic device 6220 may be in a state of removing the second electronic device 6220 from the ear. The second electronic device 6220 may detect the gesture of the user (e.g., state change of the second electronic device 6220) to perform a transition to the video communication mode. A screen example thereof is shown in FIG. 63B.

Referring to FIG. 63B, the first electronic device 6210 and the second electronic device 6220 may share a camera video of the first electronic device 6210 via the preview region of the user interface as described above, and thereby may respectively display the same video.

Hereinafter, a gesture-based communication mode switching operation will described below with reference to FIGS. 62A, 62B, 62C, 63A, and 63B.

According to various embodiments, when a plurality of users exchanges information during a voice call or through an application, they may request a video communication connection to transmit a real-time video from any one electronic device to another electronic device. Alternatively, they may request a job such as stopping, pausing, or resuming the video transmission during the video communication. In various embodiments, a menu, an icon, a key, or a button may be used for such a user input, or on the other hand, the above-described function may be provided using one or more of a simple gesture, proximity of an object, and a pose of an electronic device.

In various embodiments, an example according to the communication mode switching will be described below.

According to one embodiment, the first electronic device 6210 transmitting a video is required to connect the video communication in order to transmit the video to the second electronic device 6220 during the voice call. The first electronic device 6210 may recognize one or more of the gestures and proximity to request the video communication from the second electronic device 6220 or to transmit the video, and may perform the corresponding function.

According to one embodiment, when a video communication connection request is received from the first electronic device 6210 during the voice call, the second electronic device 6220 receiving a video may recognize one or more of the gesture and proximity to permit the video communication request or to receive the video, and may perform the corresponding function.

In various embodiments, an example of determining the communication mode (e.g., video communication mode and voice communication mode) will be described below. Hereinafter, the first electronic device 6210 transmitting a video will be described as an example, but the operation of the first electronic device 6210, which will be described below may be performed equally or similarly even in the second electronic device 6220.

According to one embodiment, the first electronic device 6210 may calculate a distance with an object (e.g., a user's face) by a proximity sensor (e.g., optical sensor, ultrasonic sensor, camera, depth sensor, or the like) of the first electronic device 6210, and may determine, when the calculated distance is less than a first threshold value, that the corresponding communication mode is the voice communication mode. According to one embodiment, the first electronic device 6210 may calculate the distance with the object (e.g., a user's face) by the proximity sensor of the first electronic device 6210, and may determine, when the calculated distance is equal to larger than a second threshold value, that the corresponding communication mode is the video communication mode.

According to one embodiment, when the movement of the first electronic device 6210 is detected, a change in the distance with the object may be calculated by the proximity sensor of the first electronic device 6210, and the corresponding mode may be determined to be the voice communication mode when the movement becomes close to the object and the distance is less than or equal to the first threshold value. According to one embodiment, when the movement of the first electronic device 6210 is detected, the change in the distance with the object may be calculated by the proximity sensor of the first electronic device 6210, and the corresponding mode may be determined to be the video communication mode when the movement becomes away from the object and the distance is equal to or larger than the second threshold value. For example, the first threshold value may be 70% of a maximum effective measurement value, and the second threshold value may be 30% of the maximum effective measurement value.

According to one embodiment, the first electronic device 6210 may detect a change in the area of a contact surface of the object with a portion (e.g., TSP, display, or optical sensor built-in display) of the first electronic device 6210 or a change in capacitance, and may determine, when the area of the contact surface is less than or equal to a third threshold value (e.g., 5% of the area of the maximum contact surface) or when a difference between a capacitance value and a reference capacitance value is less than or equal to a fourth threshold value (e.g., 0.1% of a maximum distance), that the corresponding communication mode is the video communication mode. According to one embodiment, the first electronic device 6210 may detect the change in the area of the contact surface of the object with the portion (e.g., TSP or display) of the first electronic device 6210 or the change in capacitance, and may determine, when the area of the contact surface is equal to or larger than a fifth threshold value (e.g., 20% of the area of the maximum contact surface) or when the difference between the capacitance value and the reference capacitance value is equal to or larger than a sixth threshold value (e.g., 30% of the maximum difference value), that the corresponding communication mode is the voice communication mode.

According to one embodiment, the first electronic device 6210 may detect the change in the area of the contact surface of the object with the portion of the first electronic device 6210 or the change in capacitance, and may determine, when the area reduction amount of the contact surface is equal to or larger than a seventh threshold value or when the change amount of the capacitance value is equal to or larger than an eighth threshold value and the capacitance value becomes close to the reference capacitance value, that the corresponding communication mode is the video communication mode. According to one embodiment, the first electronic device 6210 may detect the change in the area of the contact surface of the object with the portion (e.g., TSP or display) of the first electronic device 6210 or the change in capacitance, and may determine, when the area increase amount of the contact surface is equal to or larger than a ninth threshold value or when the change amount of the capacitance value is equal to or larger than a tenth threshold value and the distance between the capacitance value and the reference capacitance value becomes larger, that the corresponding communication mode is the voice call mode.

According to one embodiment, when a force feedback detected by a force sensor (e.g., piezo sensor) of the first electronic device 6210 is less than or equal to an eleventh threshold value, the first electronic device 6210 may determine that the corresponding communication mode is the video call mode. According to one embodiment, when the force feedback detected by the force sensor (e.g., piezo sensor) of the first electronic device 6210 is equal to or larger than a twelfth threshold value, the first electronic device 6210 may determine that the corresponding communication mode is the voice call mode.

According to one embodiment, when the size of a biological signal detected through a galvanic skin response (GSR), electrocardiogram (ECG), photoplethysmogram (PPG), a body temperature sensor, or the like of the first electronic device 6210 is less than or larger than a thirteenth threshold value, the first electronic device 6210 may determine that the corresponding communication mode is the voice call mode, and when the size of the biological signal is less than or equal to a fourteenth threshold value, the first electronic device 6210 may determine that the corresponding communication mode is the video call mode.

According to one embodiment, the first electronic device 6210 may determine that the communication mode is the video call mode based on the determination result of at least one communication mode described above, and then, when one or more of a user's face and user's eyes are not detected through a camera (e.g., front camera) disposed in the same direction as a display (e.g., 531 of FIG. 5) on which information is displayed, a function according to the video communication mode may not be performed. According to one embodiment, the first electronic device 6210 may determine that the communication mode is the voice call mode based on the determination result of at least one communication mode described above, and then, when the user's face or the user's eyes are detected through the camera. (e.g., front camera) disposed in the same direction as the display on which information is displayed, a function according to the voice communication mode may not be performed.

As described above, according to various embodiments, the first electronic device 6120 and the second electronic device 6220 may perform communication mode determination during the voice call with each other. According to one embodiment, the electronic devices 6210 and 6220 may not perform communication mode determination when they are in a dialing state therebetween. According to one embodiment, the electronic devices 6210 and 6220 may not perform communication mode determination even when the dialing state is switched to a call progress state (e.g., during call). For example, when the voice call is connected in the electronic device, a reference mode (default mode) (e.g., voice call mode) may be maintained without performing communication mode determination. By way of another example, the dialing state may be switched to the call process state (e.g., during call), and then communication mode determination may be, performed after a predetermined time (e.g., 5 seconds).

According to one embodiment, the electronic devices 6210 and 6220 may also notify a remote electronic device (e.g., counterpart electronic device) of the mode switching. For example, the first electronic device 6210 may notify the second electronic device 6220 of the mode switching so that the second electronic device 6220 may guide the mode switching to be performed or automatic mode switching to be performed.

In various embodiments, an example of an operation of performing switching from the voice call mode to the video call mode will be described as below.

According to on e embodiment, when detecting switching from the voice call mode to the video call mode, the first electronic device 6210 originating a video may perform an evaluation operation concerning whether a video communication connection is established.

For example, when the video communication connection is not established, the first electronic device may transmit a video communication request to a remote electronic device (e.g., the second electronic device 6220 receiving a video), may establish the video communication connection when acceptance is detected in response to the request, and may initiate camera video reception through the control of a media processor, preview display, media encoding, and the transmission of encoded media via a network.

By way of another example, when the video communication connection is established, the first electronic device 6210 may operate as follows. According to one embodiment, when the camera is in a standby mode (e.g., operation mode in which power is applied to the camera but video processing {e.g., storage or transmission of camera buffer} is not performed) or in a power off mode, the first electronic device 6210 may switch a camera power mode to a camera driving mode to resume camera video reception and transmission, and may initiate camera video reception and encoding, and transmission to the remote device (the second electronic device 6220). According to one embodiment, the first electronic device 6210 may enable rapid video reception when the camera is in the standby mode, so that the standby mode may be applied at the time of a pause or stoppage operation. According to one embodiment, the power off mode may be applied upon the stoppage operation, and the standby mode may be applied upon the pause operation.

According to one embodiment, when detecting switching from the voice call mode to the video call mode, the second electronic device 6220 receiving a video may perform an evaluation operation concerning whether the video communication connection is established.

For example, when the video communication connection is not established, the second electronic device 6220 may transmit a video communication request to a remote electronic device (e.g., the first electronic device 6210 originating a video), may receive and decode the encoded media transmitted by the first electronic device 6210 in response to the request, and may display the decoded information through the display and output the same through an audio output device.

By way of another example, when the video communication connection is established, the second electronic device 6220 may operate as follows. According to one embodiment, the second electronic device 6220 may request the first electronic device 6210 to perform a video resume operation, may receive and decode the encoded media transmitted by the first electronic device 6210 in response to the request, and may display the decoded information through the display and output the same through the audio output device. According to one embodiment, when the encoded video is continuously received from the first electronic device 6210, the second electronic device 6220 may control a decoder and the display through the media processor so that the encoded video may be decoded and displayed on the display.

According to various embodiments, an example of an operation of switching from the video call mode to the voice call mode will be described as follows.

According to one embodiment, when detecting a transition from the video call mode to the voice call mode, the first electronic device 6210 originating a video may perform an evaluation operation concerning whether the video transmission is paused or stopped.

For example, when the video transmission is stopped, the first electronic device may terminate video reception using the camera through the media processor and video encoding, image processing, video transmission, and video communication connection. According to various embodiments, the termination of the video transmission may be performed according to a button, an icon, a key, a voice command, or a gesture input driving a stoppage function.

By way of another example, when the video transmission is paused, the first electronic device 6210 may terminate video reception using the camera through the media processor and video encoding, image processing, video transmission, and video communication connection, or may apply the standby mode example, the first electronic device 6210 may cause the camera to enter the standby mode, and may stop encoding, image processing, and video transmission. According to various embodiments, the pause of the video transmission may be performed according to an operation of covering a cover during the video communication to cover the display (e.g., detected by a magnet {e.g., hail sensor} or a proximity sensor), an operation of placing the first electronic device 6210 in the ear, an operation of turning off the display, an operation of moving the display down to the floor, and the like.

According to one embodiment, when detecting a transition from the video call mode to the voice call mode, the second electronic device 6220 receiving a video may perform an evaluation operation concerning whether the video reception is paused or stopped.

For example, the second electronic device 6220 may operate as follows when the video reception is paused, for example, when the video communication connection is established in an operation of covering the cover during the video communication to cover the display (e.g., detected by a magnet {e.g., hall sensor} or a proximity sensor), an operation of placing the second electronic device 6220 in the ear, an operation of turning off the display, and the like. According to one embodiment, the second electronic device 6220 may request the first electronic device 6210 to perform a video pausing operation and then may not perform a video receiving operation. According to one embodiment, the second electronic device 6220 may turn off the display to prevent the display of the video while maintaining the video communication (e.g., video reception, decoding, storage, etc.), or may replace the corresponding video with another predetermined image to display the image.

By way of another example, when the video reception is stopped, the second electronic device 6220 may request the first electronic device 6210 to perform a video termination operation, or may notify that the video reception is impossible and then may not perform the video reception operation.

In various embodiments, an example of an operation of displaying communication mode-related information of a counterpart electronic device when a communication mode is changed will be described as follows.

According to various embodiments, in order to perform a transition to the video call mode during the voice call while the user places the electronic device in the ear, the user may perform the operation of releasing the electronic device from the ear or may open the closed cover. The electronic device may detect a change in at least one of proximity, motion, contact area, capacitance, and pressure due to the operation of releasing the electronic device from the ear or the opening of the closed cover, and may determine that the detected change is the transition to the video call mode. When detecting a transition to the video call mode by a changed sensor value, the electronic device may display the communication status (e.g., FIG. 63A) of the counterpart electronic device and may provide the displayed information to the user.

Figure 64:
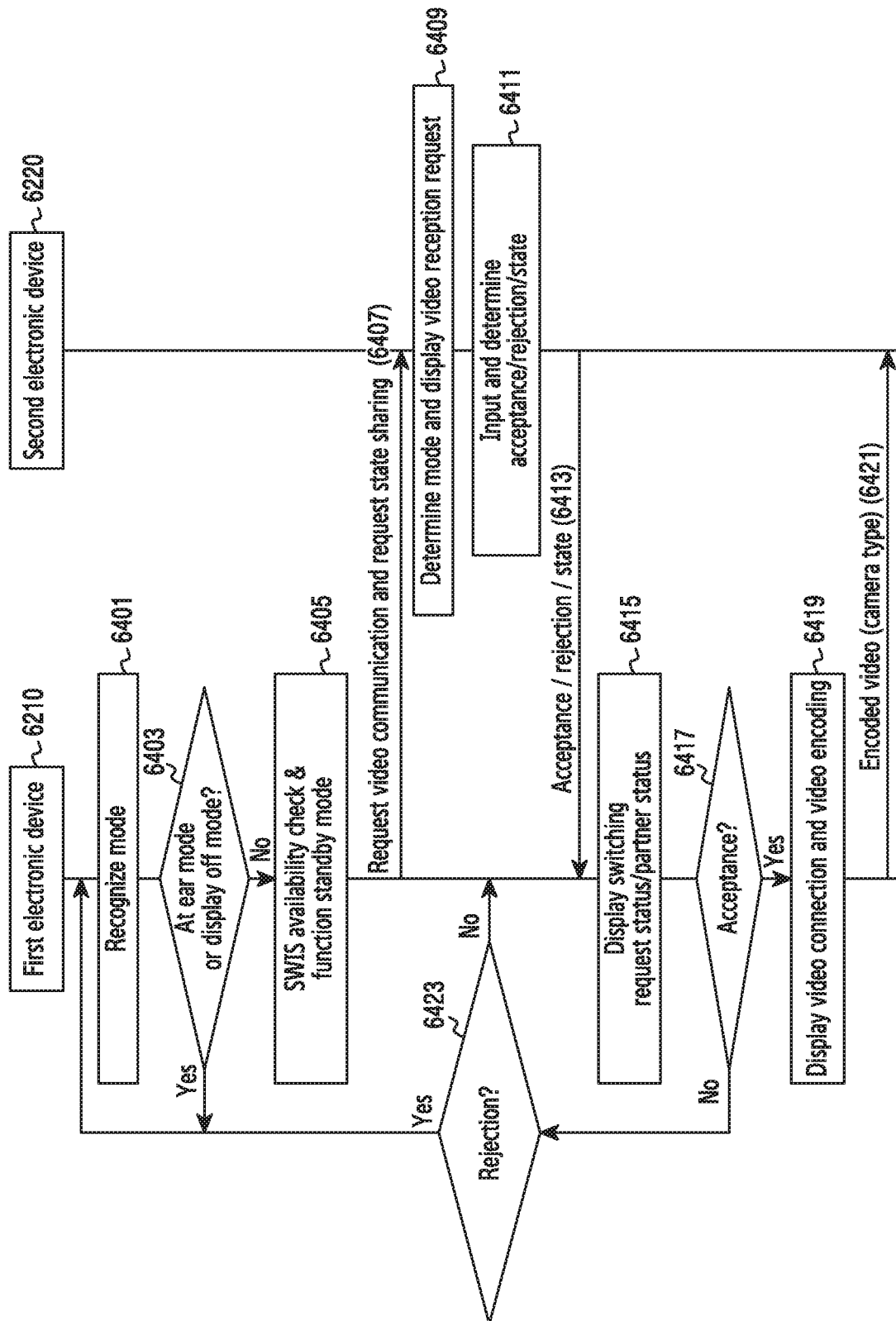
FIG. 64 is a diagram illustrating a method of performing a video service in an electronic device according to various embodiments of the present disclosure.

FIG. 64 is a diagram illustrating a method of performing a video service in an electronic device according to various embodiments of the present disclosure.

In various embodiments, as in the description made with reference to FIGS. 62A, 62B, 62C, 63A and 63B, FIG. 64 illustrates an operation of requesting and receiving a video communication based on a gesture during a voice call of the electronic device 500 (e.g., the first electronic device 6210 originating a video and the second electronic device 6220 receiving a video).

Referring to FIG. 64, in operation 6401, the first electronic device 6210 may recognize the mode (e.g., at ear mode, open position mode, display off mode, display open mode, etc.) of the first electronic device 6210 during the voice call.

In operation 6403, the first electronic device 6210 may determine whether the result of the mode recognition is at ear mode or display off mode. For example, the first electronic device 6210 may detect a change in the status of the first electronic device 6210 based on various sensors, and may determine whether the detected change in the status corresponds to at ear mode, display off mode, open position mode, or display on(open) mode. According to one embodiment, the first electronic device 6210 may determine whether a user places the first electronic device 6210 in the ear to perform a voice call, whether the cover of the first electronic device is closed, whether the user performs an operation of releasing the first electronic device 6210 from the ear to perform a transition to the video call mode during the voice call, whether the closed cover is opened, and the like, based on sensor information measured through sensors (e.g., one or more of motion sensor, proximity sensor, pressure sensor, camera, and capacitive sensor) of the first electronic device 6210 during the voice call. For example, the first electronic device 6210 may detect a change in one or more of proximity, motion, contact area, capacitance, and pressure due to the operation of releasing the first electronic device 6210 from the ear or opening the closed cover, and may determine that the detected change is the transition to the video call mode.

When the change in the status of the first electronic device 6210 is not detected (YES of operation 6403) (e.g., when it is at ear mode or display off mode) in operation 6403, the first electronic device 6210 may proceed to operation 6401 to perform operations before operation 6401.

When the change in the status of the first electronic device 6210 is detected (NO of operation 6403) (e.g., when it is open position mode or display on (open) mode) in operation 6403, the first electronic device 6210 may check the availability of the video service and may set a function standby mode in operation 6405.

In operation 6407, the first electronic device 6210 may request a video communication request and status sharing from the second electronic device 6220.

In operation 6409, the second electronic device 6220 may determine the mode of the second electronic device 6210 and may display a video reception request (e.g., video communication connection request). According to various embodiments, the second electronic device 6210 may determine the mode of the second electronic device 6210 to correspond to operations 6401 and 6403 described above.

In operation 6411, the second electronic device 6220 may determine a user response corresponding to the video reception request. For example, the second electronic device 6220 may determine any one input of acceptance, rejection, and state of the user for the video reception request.

In operation 6413, the second electronic device 6220 may transmit a response (e.g., acceptance, rejection, or state) corresponding to the user input, to the first electronic device 6210. In various embodiments, the second electronic device 6220 may transmit acceptance, rejection, or state to the first electronic device 6210 according to particular conditions (e.g., one or more of user's setting and detection of the elapse of a predetermined response standby time) even without the user input.

In operation 6415, the first electronic device 6210 may determine a transition request status by the second electronic device 6220 and may display the communication status of the second electronic device 6220 based on the response of the second electronic device 6220.

In operation 6417, the first electronic device 6210 may determine whether the transition request status of the second electronic device 6220 is accepted.

When the transition request status is not accepted (NO of operation 6417) in operation 6417, the first electronic device 6210 may determine whether the transition request status is rejected in operation 6423.

When the transition request status is rejected (YES of operation 6423) in operation 6423, the first electronic device 6210 may proceed to operation 6401 to perform operations before operation 6401, and may resume the voice call mode according to the status change of the first electronic device 6210.

When the transition request status is not rejected (NO of operation 6423) in operation 6423, the first electronic device 6210 may proceed to operation 6415 to perform operations before 6415. For example, the first electronic device 6210 may wait for the acceptance of the video communication connection request of the second electronic device 6220 while displaying the communication status of the second electronic device 6220.

When the transition request status is accepted (YES of operation 6417) in operation 6417, the first electronic device may perform the video communication connection with the second electronic device 6220 and may encode and display the camera video in operation 6419.

In operation 6421, the first electronic device 6210 may transmit the encoded video to the second electronic device 6220. In addition, when transmitting the video, the first electronic device 6210 may provide information on the type of the camera which is currently driven in the first electronic device 6210, to the second electronic device 6220.

As described above, according to various embodiments. In a state in which the voice call is maintained between the first electronic device 6210 and the second electronic device 6220 by the voice communication mode, the voice communication mode may be switched to the video communication mode when the call mode change is detected. According to various embodiments, in a state in which the video call is maintained between the first electronic device 6210 and the second electronic device 6220 by the video communication mode, the video communication mode may be switched to the voice communication mode when the call mode change is detected.

According to various embodiments, when the first electronic device detects the transition to the video call mode in a state in which the voice call is maintained between the first electronic device 6210 and the second electronic device 6220 by the voice call mode, the first electronic device 6210 may display the call mode (e.g., voice call mode or video call mode) of the second electronic device 6220.

According to various embodiments, the call mode of the second electronic device 6220 may include one of the voice call mode and the video call mode.

According to various embodiments, the types of an event in which the first electronic device 6210 detects the transition to the video call mode may include at least one of a menu, a key, a button, and a gesture input for voice recognition or situation recognition, motion or proximity change, or video transmission or reception. The voice recognition may include recognizing a voice command, for example, "camera driving". The situation recognition may include recognizing the situation according to the voice input, such as "I'll show you with a camera" or "I'll show you what I'm seeing". The motion or proximity change may include, for example, motion from an at ear position to open position and proximity change, or proximity change detection by an optical sensor according to cover open.

According to various embodiments, the display method of the first electronic device 6210 may use one or more of display in text or image, display in audio, and display in vibration.

According to one embodiment, when the first electronic device 6210 is switched to the video call mode, the first electronic device 6210 may use the camera of the first electronic device 6210 to receive a video (image), and may synthesize the received video and the call mode-related display of the second electronic device 6220 to display the synthesized information on the display the call example, the first electronic device 6210 may display the call mode of the second electronic device 6220, such as an overlay, PIP, or PPP, using the media processor.

According to one embodiment, when the first electronic device 6210 transmits the video communication request, the first electronic device 6210 may include a corresponding operation situation and whether the other party answers and may sequentially display the corresponding information in images or text.

According to one embodiment, the first electronic device 6210 may confirm whether the video communication function is activated or deactivated. For example, when the first electronic device 6210 is switched to the video call mode, the first electronic device 6210 may display the availability of the video communication according to the status information of the first electronic device 6210 or the second electronic device 6220. In one example, when the first electronic device 6210 is determined to be switched to the video call mode, the availability of the video communication may be determined by capabilities of the two electronic devices 6210 and 6220 prior to the transmission of the video communication request to the second electronic device 6220 or the status information of the two electronic devices 6210 and 6220, and the determination result may be displayed through activation/deactivation of the GUI. In a case in which the first electronic device 6210 is capable of performing the video communication, the first electronic device 6210 may transmit the video communication request to the second electronic device 6220 when the activated GUI is selected by a user input. According to one embodiment, when the video communication is determined to be available, the power mode of the camera may be switched to the camera driving mode or the camera standby mode.

According to one embodiment, when the first electronic device 6210 is switched to the video call mode, a voice output may be switched from the receiver to the speaker, or an audio output volume may be increased above a predetermined reference. For example, in the case of the video call mode, the user may look up the preview through the display, so that a distance between the first electronic device 6210 and the user may be increased, and thus the voice output (e.g., sound pressure increase or speaker change) is required to be changed.

According to various embodiments, in a case in which the first electronic device 6210 is in the video call mode, when the second electronic device 6220 is switched from the voice call mode to the video call mode, the corresponding status may be displayed on the first electronic device 6220.

According to one embodiment, the second electronic device 6220 may automatically permit video reception upon the transition to the video call mode, and the video may be automatically received from the first electronic device 6210 in response to the permission.

According to one embodiment, when detecting the transition to the video call mode, the second electronic device 6220 may display a video communication request message transmitted from the first electronic device 6210 on the display of the second electronic device 6220, may select whether to permit the video reception, and may receive the video via a network after the permission.

Figure 65:
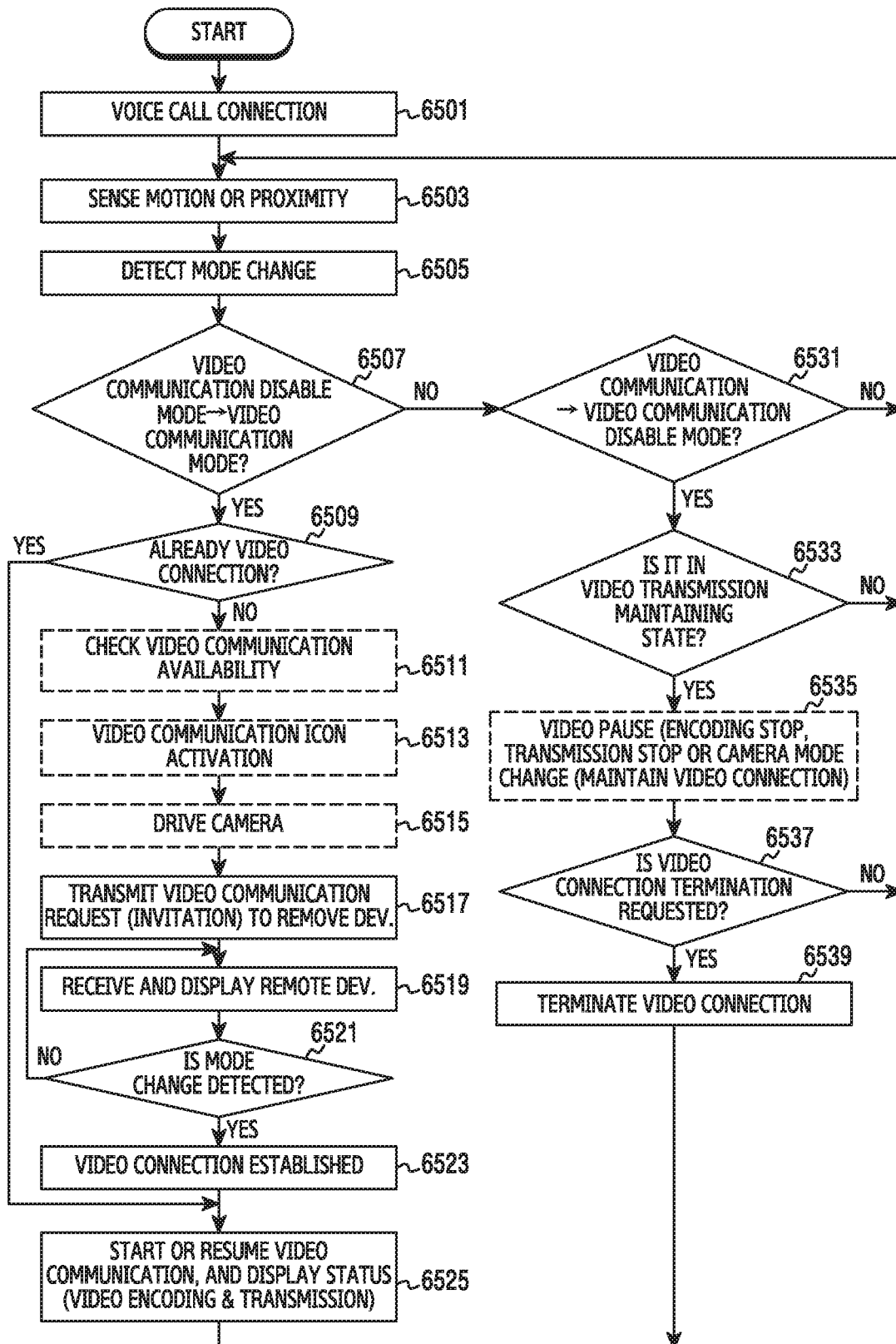
FIG. 65 is a flowchart illustrating a method of performing a video service in an electronic device according to various embodiments of the present disclosure.

FIG. 65 is a flowchart illustrating a method of performing a video service in an electronic device according to various embodiments of the present disclosure.

In various embodiments, FIG. 65 illustrates an operation of processing video communication according to a communication mode change of a user during a voice call, an example of a processing operation of the electronic device 500 (e.g., the first electronic device 6210).

Referring to FIG. 65, in operation 6501, the controller 580 (e.g., a processor of an electronic device acting as an originating terminal) of the electronic device 500 may be in a voice communication state by the voice call connection with a remote device (e.g., the second electronic device 6220 receiving a video).

In operation 6503, the controller 580 may sense the motion or proximity of the electronic device 500 during the voice call.

In operation 6505, the controller 580 may detect a mode change of the electronic device 500 based on the sensed result.

In operation 6507, the controller 580 may determine whether the detected mode is a transition from a video communication disable mode to a video call mode. For example, the controller 580 may determine whether electronic device 500 is switched from the voice call mode to the video call mode.

When it is determined that the detected mode is the transition to the video call mode (e.g., video communication disable mode→ video call mode) in operation 6507, the controller 580 may determine whether the video communication connection has already been established in operation 6509.

When the video communication connection has already been established in operation 6509 (YES of operation 6509), the controller 580 may proceed to operation 6525 to perform video communication start or video communication resume and related status display. For example, the controller 580 may encode the video, may display the encoded video, and transmit the displayed video.

When the video communication connection has not been established in operation 6509 (NO of operation 6509), the controller 580 may selectively perform operation 6511, operation 6513, and operation 6515. For example, when the video communication connection is an initial video communication connection, the controller 580 may check the availability of the video communication in operation 6511, may display a video communication icon (e.g., service object) to be activated, and may control camera driving in operation 6515. According to various embodiments, when the previously connected (or paused) video communication is resumed according to the mode change, the controller 580 may not selectively perform operation 6511, operation 6513, and operation 6515.

In operation 6517, the controller 580 may transmit a video communication request (or invitation) to the remote device (e.g., the second electronic device 6220).

In operation 6519, the controller 580 may receive the status of the remote device from the remote device (e.g., the second electronic device 6220), and may display the status of the remote device.

In operation 6521, the controller 580 may determine whether the video communication request (or invitation) is accepted by the remote device.

When the video communication request (or invitation) is not accepted by the remote device in operation 6521 (NO of operation 6521), the controller 580 may proceed to operation 6519 to perform operations before operation 6519.

When the video communication request (or invitation) is accepted by the remote device in operation 6521 (YES of operation 6521), the controller 580 may establish the video communication connection with the remote device in operation 6523.

In operation 6525, the controller 580 may perform video communication start or video communication resume, and may perform related information (e.g., connected state) display. For example, the controller 580 may encode a video, may display the encoded video, and may transmit the displayed video.

When the detected mode is not the transition to the video call mode (e.g., video communication disable mode→ video call mode) in operation 6507 (NO of operation 6507), the controller 580 may determine whether the detected mode is a transition from the video call mode to the video communication disable mode in operation 6531. For example, the controller 580 may determine whether the electronic device 500 is switched from the video call mode to the voice call mode.

When the status change of the electronic device 500 does not correspond to the transition to the voice call mode (e.g., video call mode→video communication disable mode) in operation 6531 (NO of operation 6531), the controller 580 may proceed to operation 6503 to perform operations before operation 6503.

When the status change of the electronic device 500 corresponds to the transition to the voice call mode (e.g., video call mode→video communication disable mode) in operation 6531 (YES of operation 6531), the controller 580 may determine whether the electronic device 500 is in a video transmission maintaining status in operation 6533.

When it is determined that the electronic device 500 is not in the video transmission maintaining status in operation 6533 (NO of operation 6533), the controller 580 may proceed to operation. 6503 to perform operations before operation 6503.

When it is determined that the electronic device 500 is in the video transmission maintaining status in operation 6533 (YES of operation 6533), the controller 580 may control video pausing in response to the video transmission maintaining status in operation 6535. For example, the controller 580 may control a pause function by encoding stoppage of the camera video, transmission stoppage, or the camera mode change. In various embodiments, upon the pause, the video connectivity may be maintained even without transmitting a real-time video.

In operation 6537, the controller 580 may determine whether there is a video communication connection end request.

When there is no video communication connection end request in operation 6537 (NO of operation 6537), the controller 580 may proceed to operation 6503 to perform operations before operation 6503.

When there is the video communication connection end request in operation 6537 (YES of operation 6537), the controller 580 may terminate the video communication connection in response to the video communication connection end request.

Hereinafter, as described with reference to FIG. 65, a specific example of processing a video service in response to the communication mode change of the user during the voice call will be described.

According to various embodiments, the first electronic device 6210 and the second electronic device 6220 may perform voice communication using one or more of wired and wireless communication. According to various embodiments, the first electronic device 6210 may detect a change in the communication mode through sensor information measured using sensors (e.g., one or more of motion sensor, proximity sensor, pressure sensor, camera, and capacitive sensor) and a communication mode change request signal received via a network, during the voice communication.

According to various embodiments, when a transition from another mode (e.g., voice call mode) to the video call mode is detected in the first electronic device 6210, the first electronic device 6210 may determine whether the video communication is connected via a network process module or a network.

According to various embodiments, when the video communication is not connected, the first electronic device 6210 may transmit a request for the video communication, for example, an invitation message to the second electronic device 6220 through the message server. According to one embodiment, the first electronic device 6210 may transmit a video communication request to a video communication management server, and may transmit a video communication request message to the second electronic device 6220. According to another embodiment, the first electronic device 6210 may directly transmit the video communication request to the second electronic device 6220 without going through the server.

According to various embodiments, the first electronic device 6210 may display a status associated with the second electronic device 6220 through the display of the first electronic device 6210, or may output the status through an audio.

According to one embodiment, the first electronic device 6210 may display information. (e.g., a message "during requesting video communication") transmitted to the second electronic device 6220 by the first electronic device 6210 or video codec-related information (e.g., video resolution, communication speed, frame rate, codec type, etc.) of the second electronic device 6220 stored in the first electronic device 6210.

According to one embodiment, the first electronic device 6210 may display information (e.g., communication mode type, video communication-related information, etc.) received from the Second electronic device 6220 or a network monitoring result received via the network.

According to various embodiments, when the second electronic device 6220 permits the video communication in response to the video communication connection request of the first electronic device 6210, the first electronic device 6210 and the second electronic device 6220 may establish the video communication.

According to one embodiment, when the second electronic device 6220 permits the video communication, the second electronic device 6220 may establish the communication connection for the video communication with the first electronic device 6210 via the video communication management server. For example, information (e.g., bandwidth, codec type, address information of each electronic device 6210 or 6220, port information, network request information, service registration information, etc.) for the video communication connection between the first electronic device 6210 and the second electronic device 6220 may be shared or notified through the video communication management server, so that a P2P communication connection between the two electronic devices 6210 and 6220 may be established.

According to one embodiment, the video communication connection may be established through direct communication between the first electronic device 6210 and the second electronic device 6220. For example, when the second electronic device 6220 permits the video communication, mutual information (e.g., information of remote devices stored in an address book by a contact sync agent upon information registration after the installation of an application) may be utilized. To this end, the second electronic device 6220 may notify the first electronic device 6220 of a video communication permission message or information for the video communication connection.

According to various embodiments, the first electronic device 6210 may perform an operation of determining the availability of the video communication before or after requesting the video communication from the second electronic device 6220. For example, in order to determine the availability of the video communication, the availability of the video communication may be determined according to one or more of an installation status, capability, and a service status of an application or module, and a GUI (e.g., service icon, text, image, etc.) may be displayed according to the determination result or whether the corresponding service is available may be determined. According to one embodiment, when it is determined that the video communication is available based on the determination result of the availability of the video communication, the first electronic device 6210 may switch the camera to the driving mode, may receive a video through the camera, and may activate an associated GUI. According to another embodiment, when is determined that the video communication is unavailable based on the determination result of the availability of the video communication, the associated GUI may be deactivated or an error message may be output, or a current status may be maintained as is.

According to various embodiments, the first electronic device 6210 and the second electronic device 6220 may resume or restart one or more of real-time video processing and video transmission and reception when the video communication has already been connected. According to one embodiment, the first electronic device 6210 may be switched to the camera driving mode to resume the video communication when the camera is not in the camera driving mode. According to one embodiment, when the camera is in the driving mode, the first electronic device 6210 may perform one or more of performing an operation of displaying an input video (e.g., operation of displaying a real-time camera preview video in display off, pause, image display, and the like), an operation of resuming real-time video transmission, and an operation of performing video encoding. According to one embodiment, when the video communication is paused while the video communication is connected, the first electronic device 6210 may control the status of the first electronic device 6210 to be confirmed and a disabled module to be driven in order to receive, process, and transmit a real-time video through the media processor.

According to various embodiments, when a transition from the video call mode to another mode (e.g., voice call mode) is detected in the first electronic device 6210, the first electronic device 6210 may determine whether it is in a video transmission maintaining status through the network or the process module, and may determine whether the video communication is terminated according to a user input.

According to one embodiment, when the video communication termination is requested, the first electronic device 6210 may switch the camera driving mode to the camera off mode, may perform processing (e.g., maintaining only the voice communication connection, video encoding stoppage, video processing stoppage, etc.) of the media processor according to the switched information, and may terminate the connection for the video communication.

According to one embodiment, when the voice communication in the voice call mode between the first electronic device 6210 and the second electronic device 6220 is made via a first network, the voice communication may be transmitted and received via the first network and the video communication may be transmitted and received via a second network at the time of a transition to the video call mode. According, to another embodiment, when the voice communication in the voice call mode between the first electronic device 6210 and the second electronic device 6220 is made via the first network, both the voice communication and the video communication may be transmitted and received via the second network at the time of the transition to the video call mode. At this time, the first network may maintain only the connection status without exchanging voice data, and the voice communication may be performed again through the first network when the video communication mode is terminated or paused. According to various embodiments, at the time of the transition to the video call mode, the first network may maintain only the connection status without exchanging voice data, and the voice communication may be performed through the second network when the video call mode is paused. According to another embodiment, when the pause of the video communication is requested, the second network may maintain only the connection status without exchanging real-time video data, and the voice communication may be performed through the first network. This is to minimize a delay time for re-executing the P2P connection, or the like upon resuming the video communication. According, to one embodiment, when a video communication pause is requested, the first electronic device 6210 may perform one or more of switching the camera driving mode to the standby mode (e.g., an operation mode in which video processing {e.g., camera buffer storage or transmission} is not performed even though power is applied to the camera), stopping the video encoding, or stopping network transmission, preventing the video from being displayed on the display, and transmitting a still image to the second electronic device 6220.

According to one embodiment, the first electronic device 6210 may turn off the display and may maintain the camera driving and the transmission of the encoded image while the preview is not displayed.

According to one embodiment, the first electronic device 6210 may output the still image to the display, and may maintain the camera driving and the transmission of the encoded video.

According to one embodiment, the first electronic device 6210 may transmit another data (e.g., one or more of minimum connection maintaining signal, still image, preview image, and I-frame image of the video) instead of the real-time video data.

Figure 66:
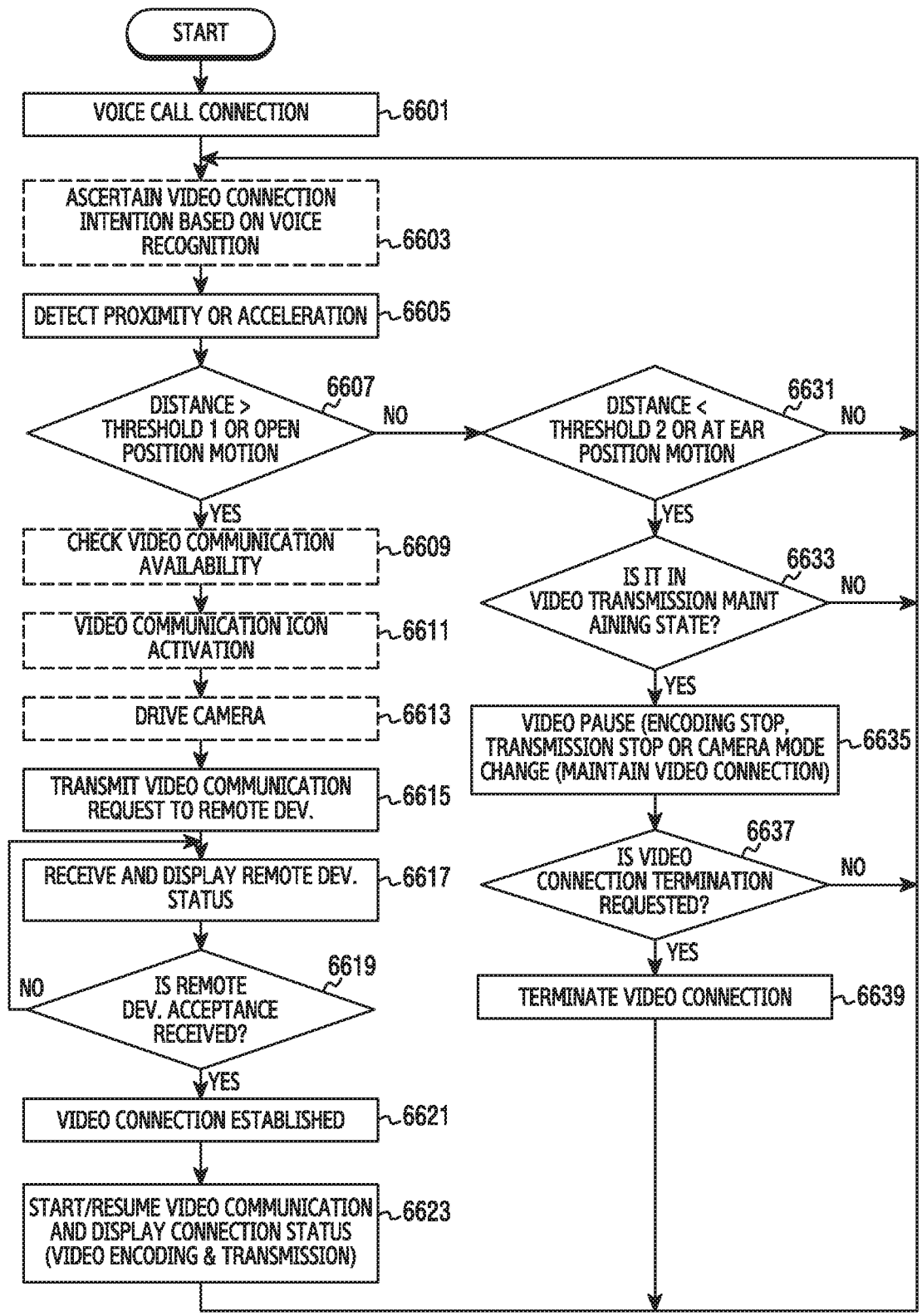
FIG. 66 is a flowchart illustrating a method of performing a video service in an electronic device according to various embodiments of the present disclosure.

FIG. 66 is a flowchart illustrating a method of performing a video service in an electronic device according to various embodiments of the present disclosure.

In various embodiments, FIG. 66 illustrates an example of a processing operation of the electronic device 500 (e.g., the first electronic device 6210) originating a video, for example, an operation of processing the start and resume of video communication based on proximity and motion in the first electronic device 6210.

Referring to FIG. 66, in operation 6601, the controller 580 (e.g., a processor of an electronic device acting as an originating terminal) of the electronic device 500 may be in a voice communication state by a voice call connection with a remote device (e.g., the second electronic device 6220 receiving a video).

In operation 6603, the controller 580 may ascertain a video communication connection intention based on voice recognition. For example, the controller 580 may ascertain an intention to perform video communication during the voice call through a voice recognition technique for conversation contents, and thereby may perform an operation of starting or resuming the video communication. In operation 6605, the controller 580 may detect proximity or acceleration of the electronic device 500 during the voice call. According to various embodiments, the controller 580 may determine a distance with an object (e.g., a user's face or a user's ear) or a change in the distance based on the proximity or acceleration.

In operation 6607, the controller 580 may determine whether the distance is greater than a first threshold value or whether the electronic device 500 corresponds to an open position motion. For example, the controller 580 may detect a status change of the electronic device 500 and may determine whether the status change corresponds to a status change for starting or resuming the video call. According to one embodiment, the controller 580 may detect a call mode change (e.g., switching from a voice call mode to a video call mode) on the basis of the detected change or the change in the distance.

By way of another example, when is determined that there is the video communication connection intention based on voice recognition, whether a gesture for the video communication is actually performed may be determined in operations 6607 and 6631, and thereby whether a transition to the video call mode is performed may be determined.

When the status change corresponds to a status change (e.g., distance>threshold 1 or open position motion) of the electronic device 500 for the video call in operation 6607 (YES of operation 6607, the controller 580 may selectively perform operations 6609, 6611, and 6613. For example, when the status change of the electronic device 500 is a call mode change (e.g., a transition from the voice call mode to the video call mode), the controller 580 may check the availability of the video communication in operation 6609, and may display a video communication icon (e.g., service object) to be activated in operation 6611, and may control camera driving in operation 6613. According to various embodiments, when the previously connected (or paused) video communication is resumed according to the communication mode change, the controller 580 may not selectively perform operation 6611, operation 6613, and operation 6615.

In operation 6615, the controller 580 may transmit a video communication request to a remote device (e.g., the second electronic device 6220 which is in communication).

In operation 6617, the controller 580 may receive the status of the remote device from the remote device (e.g., the second electronic device 6220), and may display the status of the remote device.

In operation 6619, the controller 580 may determine whether the video communication request (or invitation) is accepted by the remote device.

When the video communication request (or invitation) is not accepted by the remote device in operation 6619 (NO of operation 6619), the controller 580 may proceed to operation 6617 to perform operations before operation 6617.

When the video communication request (or invitation) is accepted by the remote device in operation 6619 (YES of operation 6619), the controller 580 may establish the video communication connection with the remote device in operation 6621.

In operation 6523, the controller 580 may perform video communication start or video communication resume, and may perform related information (e.g., connected state) display. For example, the controller 580 may encode a video, may display the encoded video, and may transmit the displayed video.

When the status change does not correspond to the status change (e.g., distance>threshold 1 or open position motion) of the electronic device 500 for the video call in operation 6607 (NO of operation 6607), the controller 580 may determine whether the distance is greater than a second threshold value or whether the electronic device 500 corresponds to an at ear position motion in operation 6731. For example, the controller 580 may detect the status change of the electronic device 500 and may determine whether the status change corresponds to the status change for starting or resuming the voice call. According to one embodiment, the controller 580 may detect the call mode change (e.g., transition from the video call mode to the voice call mode) based on the detected result in operation 6631.

When the status change of the electronic device 500 does not correspond to the status change (e.g., distance <threshold 2 or an at ear position motion) for the voice call in operation 6631 (NO of operation 6631), the controller 580 may proceed to operation. 6603 to thereby perform operations before operation 6603.

By way of another example, when it is determined that there is, the video communication connection intention based on the voice recognition, whether a gesture for the video communication is actually performed may be determined in operations 6609 and 6731 and thereby whether the transition to the video call mode is performed may be determined.

When the status change of the electronic device 500 corresponds to the status change (e.g., distance <threshold 2 or an at ear position motion) for the voice call in operation 6631 (YES of operation 6631), the controller 580 may determine whether the electronic device 500 is in a video transmission maintaining status in operation 6633.

When it is determined that the electronic device 500 is not in the video transmission maintaining status in operation 6633 (NO of operation 6633), the controller 580 may proceed to operation. 6603 to perform operations before operation 6603.

When it is determined that the electronic device 500 is in the video transmission maintaining status in operation 6633 (YES of operation 6633), the controller 580 may control the video pause in response to the video transmission maintaining status for example, the controller 580 may control the pause function by encoding stoppage of the camera video, transmission stoppage thereof, or the camera mode change. According to various embodiments, the video communication connection may be maintained upon the pause.

In operation 6637, the controller 580 may determine whether there is a video communication connection end request.

When there is no video communication connection end request in operation 6637 (NO of operation 6637), the controller 580 may proceed to operation 6603 to perform operations before operation 6603.

When there is the video communication connection end request in operation 6637 (YES of operation 6637), the controller 580 may terminate the video communication connection in response to the video communication connection end request.

Figure 67:
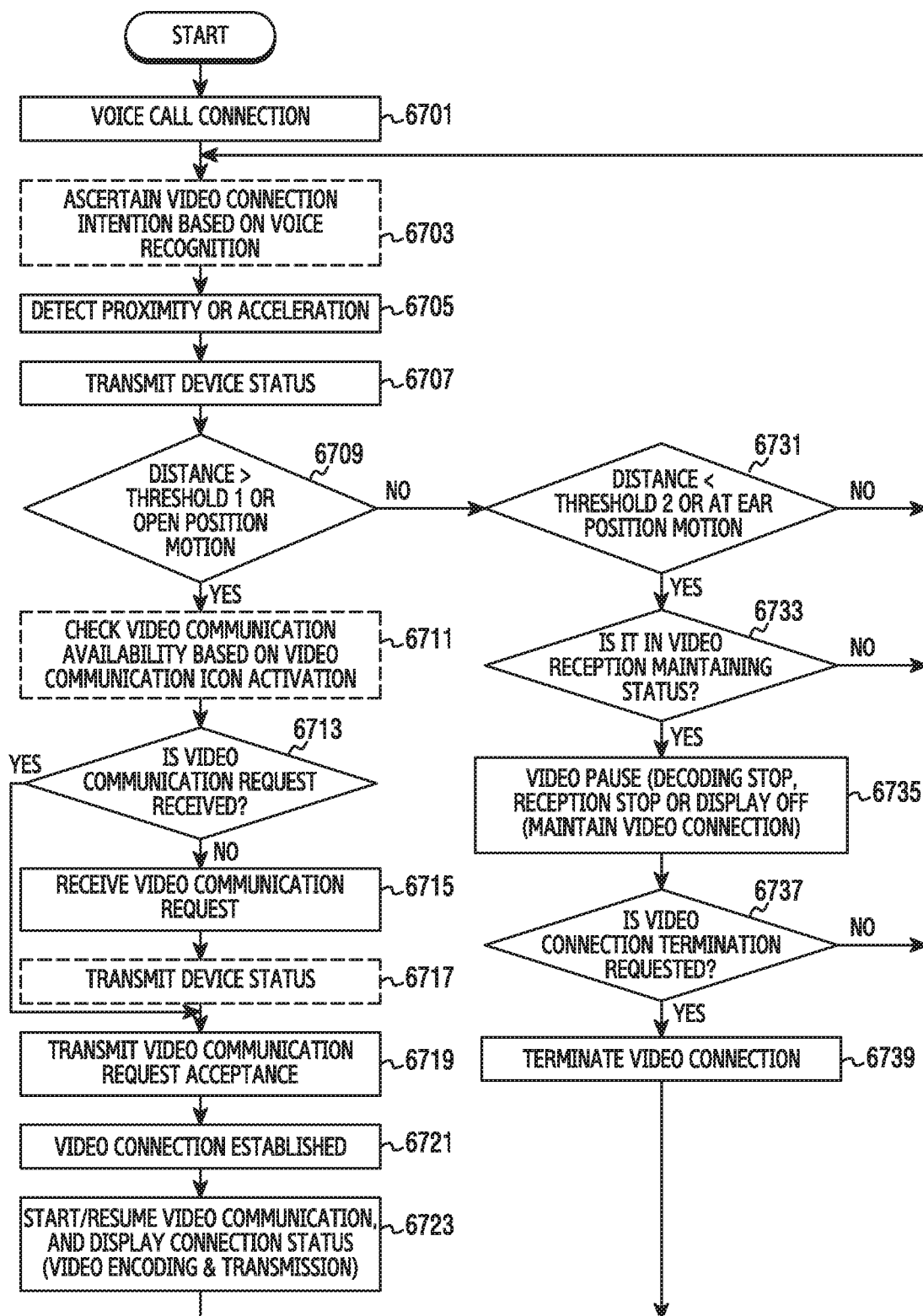
FIG. 67 is a flowchart illustrating a method of performing a video service in an electronic device according to various embodiments of the present disclosure.

FIG. 67 is a flowchart illustrating a method of performing a video service in an electronic device according to various embodiments of the present disclosure.

In various embodiments, FIG. 67 illustrates an example of a processing operation of the electronic device 500 (e.g., the second electronic device 6220) receiving a video, for example, an operation of starting and resuming video communication based on proximity and motion in the second electronic device 6220.

Referring to FIG. 67, in operation 6701, the controller 580 (e.g., a processor of an electronic device acting as a receiving terminal of the electronic device 500 may be in a voice communication state by a voice call connection with a remote device (e.g., the first electronic device 6210 transmitting a video).

In operation 6703, the controller 580 may ascertain a video communication connection intention based on voice recognition. For example, the controller 580 may ascertain an intention to perform video communication during the voice call through voice recognition, and thereby may perform an operation of starting or resuming the video communication.

In operation 6705, the controller 580 may detect proximity or acceleration of the electronic device 500 during the voice call. According to various embodiments, the controller 580 may determine a distance with an object (e.g., a user's face or a user's ear) based on the proximity or acceleration.

In operation 6707, the controller 580 may transmit the status of the electronic device 500 to the remote device (e.g., the first electronic device 6210).

In operation 6709, the controller 580 may determine whether the distance is greater than a first threshold value or whether the electronic device 500 corresponds to an open position motion. For example, the controller 580 may detect a status change of the electronic device 500 and may determine whether the status change corresponds to a status change for starting or resuming the video call. According to one embodiment, the controller 580 may detect a call mode change (e.g., switching from a voice call mode to a video call mode) on the basis of the detected result.

When the status change corresponds to any status change (e.g., distance>threshold 1 or open position motion) of the electronic device 500 for the video call in operation 6709 (YES of operation 6709), the controller 580 may selectively perform operation 6711. For example, when the status change of the electronic device 500 is a call mode change (e.g., a transition from the voice call mode to the video call mode), the controller 580 may check the availability of the video communication in operation, and may display a video communication icon (e.g., service object) to be activated in response to the fact that the video communication is available. According to various embodiments, when the previously connected (or paused) video communication is resumed according to the communication mode change, the controller 580 may not selectively perform operation 6711.

In operation 6713, the controller 580 may determine the setting of video communication request reception. According to one embodiment, the controller 580 may determine whether to automatically accept the video communication reception according to the video communication mode transition or to manually accept the same by a user input.

When the video communication request is automatically received in operation 6713 (YES of operation 6713), the controller 580 may proceed to operation 6719 to perform operations before operation 6719.

When the video communication request is manually received in operation 6713 (NO of operation 6713), the controller 580 may receive the video communication request according to the user input in operation 6715. For example, the controller 580 may display a video communication connection request (or invitation) of a remote device (e.g., the first electronic device 6210), and may receive a user input (e.g., an input of any one of acceptance, rejection, and state for the video reception) for the video communication connection request. According to one embodiment, in operation 6715, the reception of the video of the remote device (e.g., the first electronic device 6210) may be accepted, that is, the video communication request may be received from the user. In various embodiments, the second electronic device 6220 may transmit acceptance, rejection, or state to the first electronic device 6210 according to particular conditions (e.g., one or more of user's setting and detection of the elapse of a predetermined response standby time) even without the user input.

In operation 6717, the controller 580 may selectively transmit the status of the electronic device 500 to the remote device (e.g., the first electronic device 6210). According to various embodiments, operation 6717 may not be performed. According to one embodiment, when the status of the electronic device 500 is the same status as the status of operation 6707, operation 6717 may not be performed.

According to one embodiment, when the status of the electronic device 500 is different from the status of operation 6707, operation 6717 may not be performed. In operation 6719, the controller 580 may transmit an acceptance response to the video communication request to the remote device (e.g., the first electronic device 6210) in response to the acceptance of the video communication request reception.

In operation 6721, the controller 580 may establish the video communication connection with the remote device (e.g., the first electronic device 6210).

In operation 6723, the controller 580 may perform video communication start or video communication resume, and may display an association status (e.g., connected status). For example, the controller 580 may encode a video, may display the encoded video, and may transmit the displayed video.

When the status change does not correspond to the status change (e.g., distance>threshold 1 or open position motion) of the electronic device 500 for the video call in operation 6709 (NO of operation 6709), the controller 580 may determine whether the distance is smaller than a second threshold value or whether the electronic device 500 corresponds to an at ear position motion. For example, the controller 580 may detect the status change of the electronic device 500 and may determine whether the status change corresponds to the status change for starting or resuming the voice call. According to one embodiment, the controller 580 may detect the call mode change (e.g., transition from the video call mode to the voice call mode) based on the detected result.

When the status change of the electronic device 500 does not correspond to the status change (e.g., distance <threshold 2 or an at ear position motion) for the voice call in operation 6731 (NO of operation 6731), the controller 580 may proceed to operation 6703 to thereby perform operations before operation 6703.

When the status change of the electronic device 500 corresponds to the status change (e.g., distance <threshold 2 or an at ear position motion) for the voice call in operation 6731 (YES of operation 6731), the controller 580 may determine whether the electronic device 500 is in a video reception maintaining status in operation 6733.

When it is determined that the electronic device 500 is not in the video reception maintaining status in operation 6733 (NO of operation 6733), the controller 580 may proceed to operation 6703 to perform operations before operation 6703.

When it is determined that the electronic device 500 is in the video reception maintaining status in operation 6733 (YES of operation 6733), the controller 580 may control (request) the pause in response to the video reception maintaining status in operation 6735. For example, the controller 580 may control the pause function by decoding stoppage of the received video, reception stoppage thereof, or display off. According to various embodiments, the video communication connection may be maintained upon the pause.

In operation 6737, the controller 580 may determine whether there is a video communication connection end request.

When there is no video communication connection end request in operation 6737 (NO of operation 6737), the controller 580 may proceed to operation 6703 to perform operations before operation 6703.

When there is the video communication connection end request in operation 6737 (YES of operation 6737), the controller 580 may terminate the video communication connection in response to the video communication connection end request in operation 6739.

Hereinafter, as described with reference to FIGS. 66 and 67, a specific example of processing a video service in response to a change of a communication mode of a user during a voice call in the electronic device 500 will be described.

According to various embodiments, the first electronic device 6210 transmitting a video and the second electronic device 6220 receiving a video may process video transmission and reception based on gestures and poses. For example, as described in the description made with reference to FIGS. 66 and 67, the first electronic device 6210 and the second electronic device 6220 may ascertain an intention to perform video communication during a voice call, and perform an operation of starting or resuming the video communication according to the ascertained result.

According to various embodiments, the first electronic device 6210 may determine a distance between the first electronic device 6210 and an object (e.g., a user's face) through a proximity sensor, and may determine the status of the electronic device to be at ear mode and open position mode based on a motion through a motion sensor (e.g., acceleration sensor or geomagnetic sensor) or a pose (e.g., three-dimensional pitch, yaw, or roll-based information) of an electronic device. In various embodiments, the ear mode may indicate a mode in which the electronic device is located near the user's ear, and the open position mode may indicate other modes (e.g., a case in which a user watches the display of the electronic device or places the same on the floor) except for the ear mode.

According to various embodiments, when it is determined that the distance from the object (e.g., the user's face) is greater than the first threshold value by the proximity sensor of the first electronic device 6210 and the distance becomes larger as the movement is detected by the motion sensor, the corresponding communication mode may be determined to be the video communication mode.

According to various embodiments, when it is determined that the distance from the object (e.g., the user's face) is smaller than the second threshold value by the proximity sensor of the first electronic device 6210 and the distance from the object becomes smaller as the movement is detected by the motion sensor, the corresponding communication mode may be determined to be the video communication disable mode.

According to various embodiments, when the condition of the ear mode or the open position mode is not satisfied, a message indicating that the current status mode is maintained or the mode status is being switched may be displayed on the first electronic device 6210 or may be transmitted to the second electronic device 6220.

According to various embodiments, when the transition to the video call mode is detected, the electronic device 500 may further include a process of determining whether the first electronic device 6210 and the second electronic device 6220 are all the same video communication application or use the same module (e.g., package).

According to various embodiments, the electronic device 500 may mutually exchange a control signal of the remote device.

According to various embodiments, it is possible to control a specific application using an application ID and a control signal.

In various embodiments, a method of recognizing a user's gesture or pose may include the following.

According to one embodiment, it is possible to identify a camera to be operated through an operation of reversing the electronic device. For example, when it is recognized through the proximity sensor that the electronic device is placed on the floor, an operation of reversing the electronic device with a plurality of cameras may be recognized by the camera or the motion sensor, and a camera that is oriented in the opposite direction other than the bottom may be detected and the detected camera may be operated in the video call mode.

According to one embodiment, face, ear, hand, and object position may be recognized using one or more of the proximity sensor and optical sensor of the electronic device, and whether the object in close proximity is the ear or the front face may be determined to determine whether the video call mode is driven.

According to one embodiment, when motion is detected and the object approaches the rear of the electronic device in a predetermined distance region, a camera oriented toward the rear may be driven. Additionally, according to various embodiments, a zoom in and zoom out function may be performed according to the rear proximity.

According to one embodiment, pose recognition or face position recognition using a gas sensor of the electronic device, and a proximity check operation may be performed. For example, by measuring the bad breath with the gas sensor when the electronic device is near the mouth of the user, it may be determined that the electronic device is close to the face.

According to various embodiments, a function by distance-based mode recognition may be provided.

According to one embodiment, a function according to the frontal proximity of the user of the first electronic device 6210 may be distinguished. According to one embodiment, in the case of closest proximity, the corresponding mode may be determined to be a voice mode, a camera standby mode, a pause mode, a secret communication mode, or a receiver mode. According to one embodiment, in the case of intermediate proximity, it is possible to determine whether video mode switching according to the movement, camera operation mode switching, preview mode, secret story mode release, or speaker mode is operated. According to one embodiment, in the case of long-distance proximity, it is possible to determine whether video mode, secret story mode release, or speaker mode is operated.

According to one embodiment, a function according to the frontal proximity of the user of the second electronic device 6220 may be distinguished. According to one embodiment, in the case of closest proximity, the corresponding mode may be determined to be a voice mode, a camera standby mode, a pause mode, a secret communication mode, or a receiver mode. According to one embodiment, in the case of intermediate proximity, it is possible to determine whether video mode switching according to the movement, camera operation mode, preview mode, secret story mode release, or speaker mode is operated. According to one embodiment, in the case of long-distance proximity, the corresponding mode may be determined to be the video mode.

According to one embodiment, for the same motion, different functions may be provided depending on an electronic device transmitting a video and an electronic device receiving a video.

According to various embodiments, it is possible to provide various functions according to user gesture or point recognition in various control modes.

According to one embodiment, the function by distance-based mode recognition may be used in the video transmission/reception mode. For example, a video communication-related user interface may be activated when the first electronic device is distant from the object and is located at a predetermined distance from the object. In another example, when the corresponding distance is less than a predetermined distance depending on the frontal proximity during the video transmission and reception, a voice communication mode, a standby mode, a pause mode, a secret communication mode, or a receiver mode may be separately provided. In another example, when the frontal proximity is less than a predetermined distance during non-video communication, a notification may be generated through sound, vibration, light signal, or the like at the time of video request, and a notification may be also generated through a wearable device.

According to one embodiment, the function by distance-based mode recognition may be used in a zoom mode. For example, it is possible to control the camera of the first electronic device according to the action of the first electronic device. As an example, it is possible to provide a zooming function according to proximity in the backward direction and a gesture. As another example, it is possible to control the camera of the first electronic device according to the action of the second electronic device. In one example, a zoom control command according to proximity or gesture in the forward direction or a gesture may be transmitted to the first electronic device.

According to one embodiment, the function by distance-based mode recognition may be used to designate region of interest (ROI). For example, when the camera focuses on a predetermined direction or a predetermined region in a state in which the movement of the electronic device is stopped, or when the designation is detected through a user interface, a predetermined region input using the camera may be set as an ROI. For example, it is possible to improve the image quality through auto focusing, auto exposure, perspective correction, bit rate increase of the corresponding region, or the like based on the corresponding ROI region. As another example, it is possible to provide an augmented reality (AR) information providing function, for example, image recognition and related information. For another example, auto-capture may be provided. For example, after the elapse of a predetermined time, auto-capture (high resolution) or a still shot/video recording user interface may be generated.

Figure 68A:
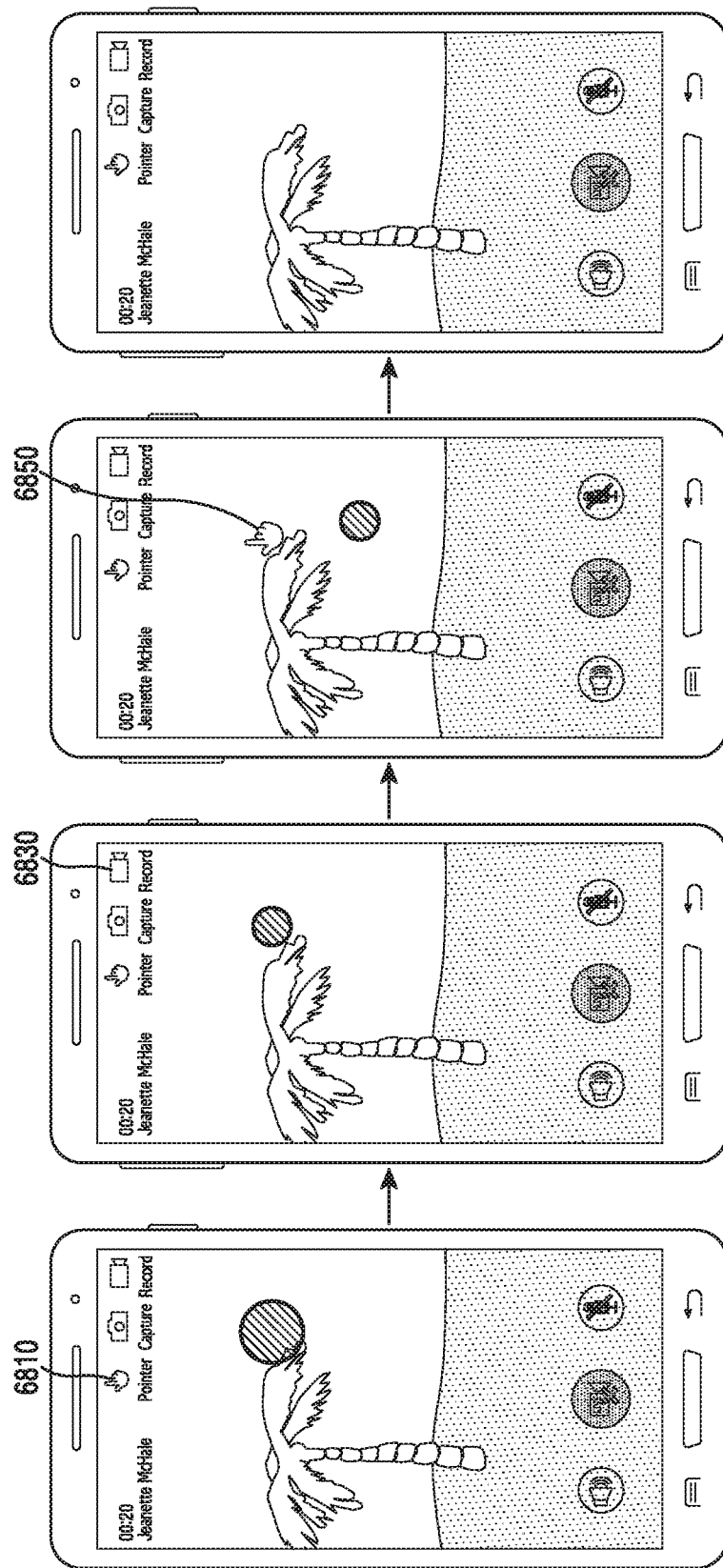
FIGS. 68A and 68B are diagrams illustrating an example or an operation of performing a video service in an electronic device according to various embodiments of the present disclosure.
Figure 68B:
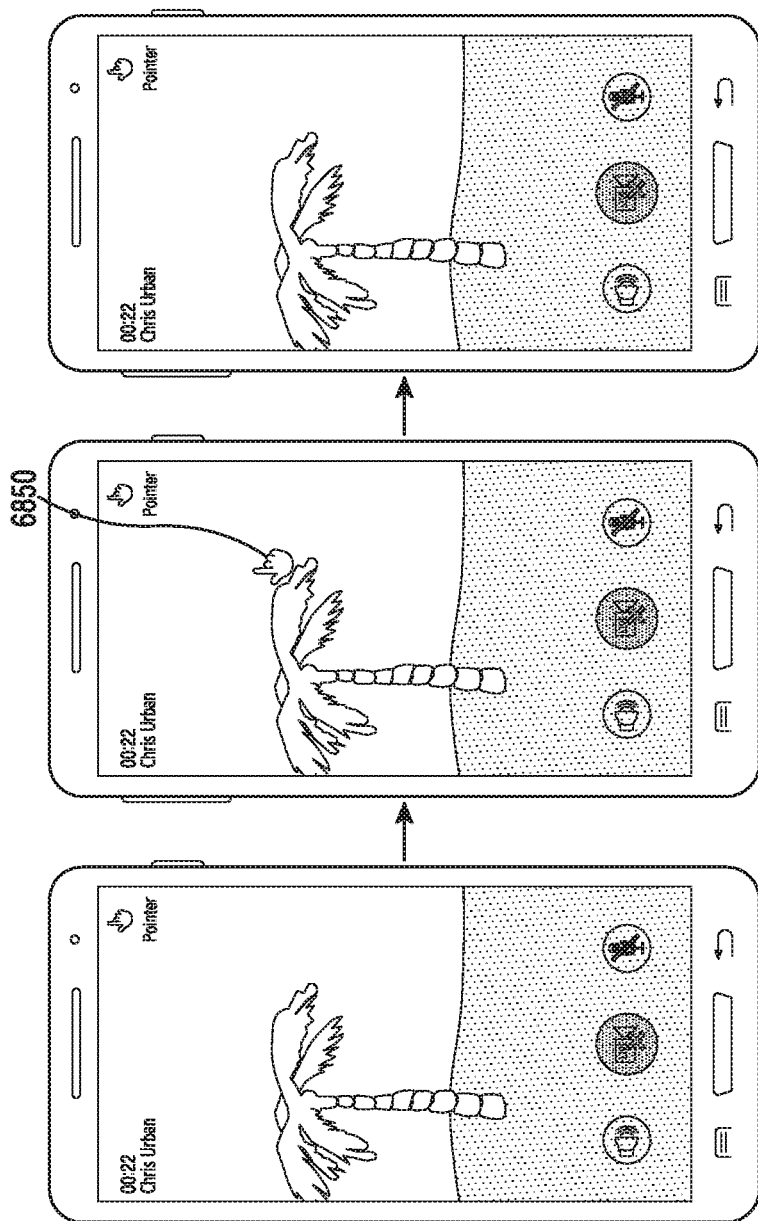

FIGS. 68A and 68B are diagrams illustrating an example of an operation of performing a video service in an electronic device according to various embodiments of the present disclosure.

According to various embodiments, when performing a video service, a streaming video may be paused to share a still screen, and additional interactions may be provided based on the still screen. In various embodiments, interactions that can be performed on the still screen may include, for example, interactions that insert various annotations, such as pointing to highlight a specific portion of the scene. Examples of this operation are shown in FIGS. 68A, 68B, 69A and 69B.

As shown in FIGS. 68A and 68B, while the first electronic device transmitting a video transmits the corresponding video, the first electronic device or the second electronic device receiving a video may provide a pointer button 6810. In various embodiments, the pointer button 6810 and a pointer mode (or pointing function) according to the pointer button 6810 may be executed in both the first electronic device and the second electronic device.

The first electronic device or the second electronic device may pause the streaming video and may display the still image in response to a user input (e.g., touch or tap) by the pointer button 6810. According to various embodiments, a separate image (e.g., pointer 6850) may be automatically provided in one region of the preview region when the still screen is displayed. According to various embodiments, when the user input (e.g., a touch) is detected on the preview region after the still screen is displayed, the pointer 6850 may be provided to the corresponding portion.

According to various embodiments, when the pointer 6850 is displayed (or the pointer mode is activated), other buttons (e.g., record button 6830) except for the pointer button 6810 may be subjected to dim processing and displayed in the function region, or may be prevented from being displayed on the screen.

Referring to FIGS. 68A and 68B, the user of the first electronic device may select the pointer button 6810 to pause a moving image (or a preview image or a streaming image displayed in real-time acquired through the camera) displayed on the preview region. When the moving image is paused through the pointer button 6810 in the first electronic device, the moving image in the preview region may also be stopped and displayed in the second electronic device. According to one embodiment, in the state where the video is paused, the user may select the pointer button 6810 again to display a moving image (e.g., a streaming image) instead of the paused video. The first electronic device may resume the video communication when the pointer button 6810 is selected again, and may transmit the stopped image back to the second electronic device again as a moving image. Here, even in the second electronic device, the automatically stopped video may be changed to the moving image to be displayed.

According to one embodiment, the user may pause the moving image through the pointer button 6810 and may touch a portion of the preview region to display a specific type of icon (hereinafter, pointer) 6850 at the corresponding position. According to another embodiment, the electronic device may automatically display and provide the pointer 6850 when pausing the moving image according to a user input by the pointer button 6810.

According to various embodiments, additionally or alternatively, in the pointer mode execution by the pointer button 6810, it is possible to automatically pause a video according to a specific user input (e.g., long press input) in a state where the video is displayed as the moving image in the preview region, and to automatically enter the pointer mode to display the pointer 6850 at a position (e.g., long pressed position) corresponding to the user input.

According to various embodiments, when displaying the pointer 6850 in the first electronic device, the pointer 6850 may also be displayed in the second electronic device. According to one embodiment, when pointer mode activation (e.g., function on) or the display of the pointer 6850 display is performed in either of the electronic devices, the pointer mode activation or the display of the pointer 6850 may be automatically performed on the other electronic device. According to one embodiment, when pointer mode deactivation (e.g., function off) or removal of the pointer 6850 is performed on either of the electronic devices, pointer mode deactivation or removal of the pointer 6850 may be automatically performed on the other electronic device.

According to various embodiments, when the pointer 6850 is displayed and another region is touched, the video may be resumed, and the displayed pointer 6850 may disappear on the screen. According to various embodiments, only the display position of the pointer 6850 in the paused state of the video may be changed to another region (e.g., region corresponding to the user input) and displayed directly at the corresponding position. According to various embodiments, when the screen is continuously touched (or dragged), the movement trajectory of the pointer 6850 may be displayed on the screen. Even in this case, when the video is resumed, all of the displayed pointer 6850 and the trajectory may disappear at the same time as the video is resumed.

According to various embodiments, the position of the pointer 6850 may be moved. According to one embodiment, in the state where the pointer 6850 is displayed, the user may perform positional movement of the pointer 6850 by an input of selecting (e.g., touching) the pointer 6850 and then moving (e.g., dragging) the selected pointer 6850 to another position. According to another embodiment, in the state where the pointer 6850 is displayed, the user may perform positional movement of the pointer 6850 by an input of touching a region (e.g., another one region where the pointer 6850 is not displayed in the preview region) adjacent to the pointer 6850 and then moving to another position. According to another embodiment, in the state in which the pointer 6850 is displayed, the user may perform the positional movement of the pointer 6850 by an input set at a position where the pointer 6850 is to be moved in the preview region.

Figure 69A:
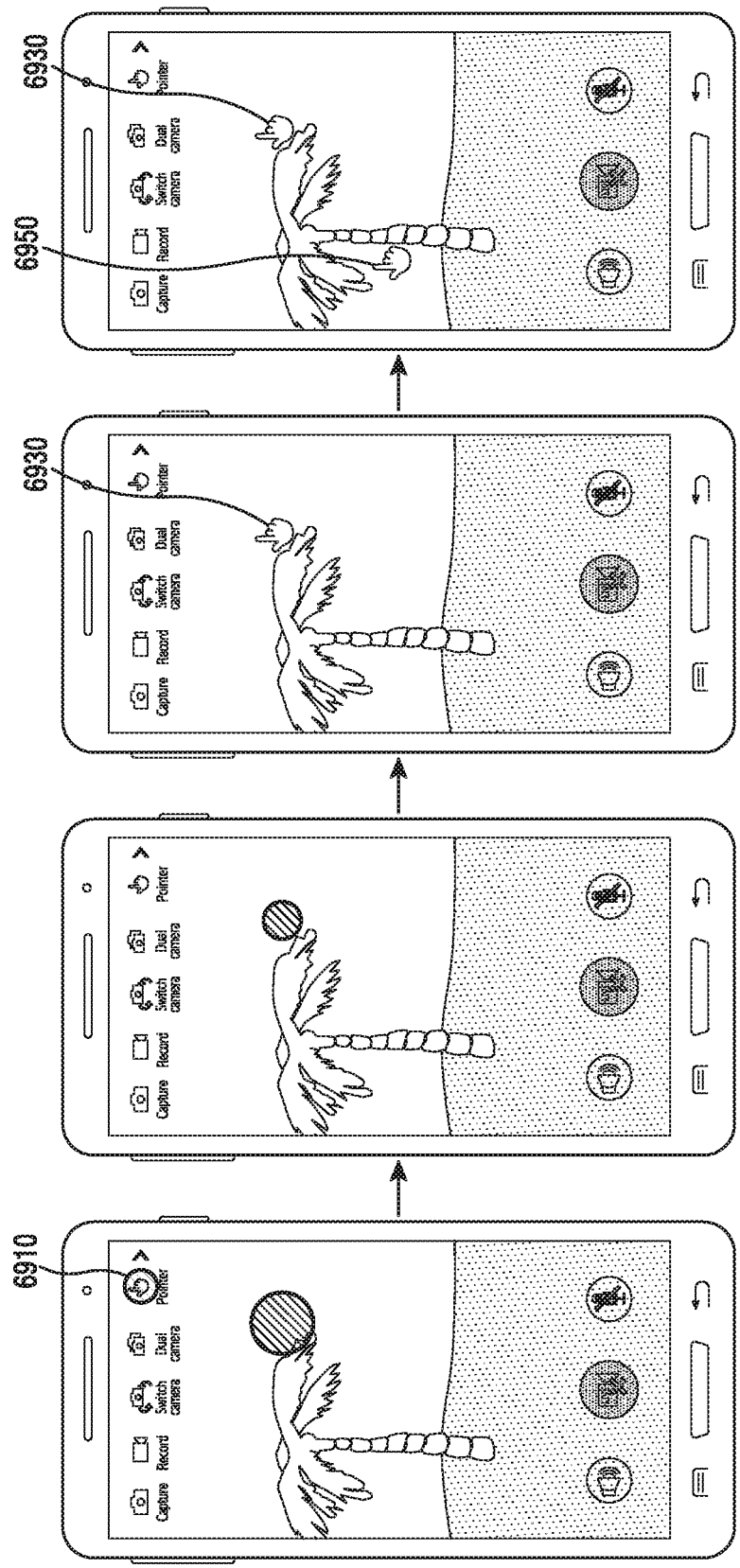
FIGS. 69A and 69B are diagrams illustrating an example of an operation of performing a video service in an electronic device according to various embodiments of the present disclosure.
Figure 69B:
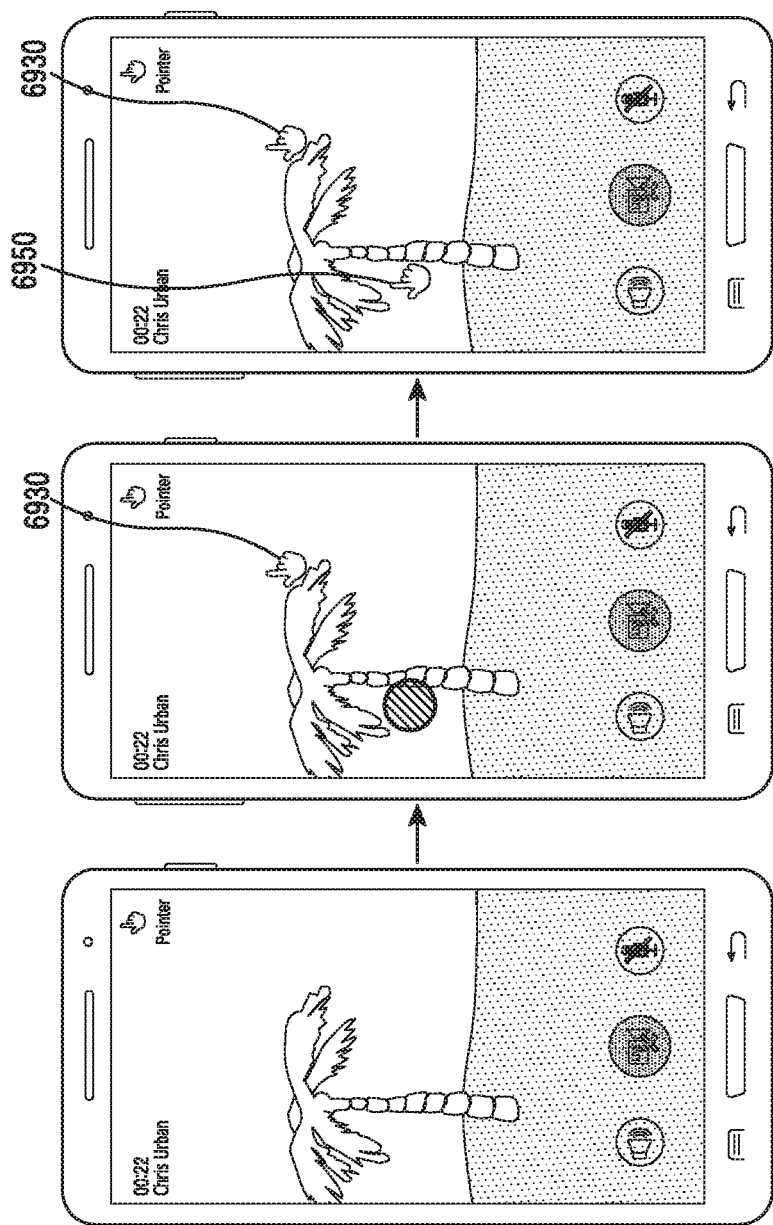

FIGS. 69A and 69B are diagrams illustrating an example of an operation of performing a video service in an electronic device according, to various embodiments of the present disclosure.

As shown in FIGS. 69A and 69B, FIGS. 69A and 69B may include operations corresponding to those described in the description with reference to FIGS. 68A and 68B described above. For example, operations (e.g., operations such as entering a pointer mode, displaying/hiding a pointer, movement, video pausing, pointer mode automatic entry according to user input, and the like) related to the pointer button 6910 and the pointers 6930 and 6950 shown in FIGS. 69A and 69B may correspond to those described with reference to the pointer button 6810 and the pointer 6850 shown in FIGS. 68A and 683.

Referring to FIGS. 69A and 69B, FIGS. 69A and 69B may illustrate an example of displaying a plurality of pointers corresponding to multiple users.

According to various embodiments, pointers 6930 and 6950 may be independently on/off controlled in a first electronic device originating a video and a second electronic device receiving a video.

According to various embodiments, the pointers 6930 and 6950 may be displayed and provided with different shapes, different sizes, or different colors depending on a subject inputting a pointer or executing a pointing mode.

According to various embodiments, the pointer 6930 executed by the first electronic device and the pointer 6950 executed by the second electronic device may be provided in different shapes, different sizes, or different colors. In various embodiments, the pointers 6930 and 6950 shown in the first and second electronic devices may have the same shape.

According to one embodiment, the pointer 6930 executed by the first electronic device may be displayed with a white pointer, and the pointer 6950 executed by the second electronic device may be displayed with a black pointer.

According to one embodiment, the pointer 6930 executed by the first electronic device may be displayed as a hand pointer, and the pointer 6950 executed by the second electronic device may be displayed as an arrow pointer.

According to various embodiments, in the first electronic device and the second electronic device, the pointers 6930 and 6950 by the corresponding user and the pointers 6950 and 6930 by the opponent user may be separately provided in different shapes, different sizes, or different colors. For example, a pointer executed by each electronic device by itself may be displayed as a white pointer, and a pointer executed by the other party may be displayed as a black pointer. In various embodiments, the pointers shown in the first electronic device and the second electronic device may have different forms.

According to one embodiment, the pointer 6930 executed by the first electronic device may be displayed as a white pointer in the first electronic device and as a black pointer in the second electronic device. The pointer 6950 executed by the second electronic device may be displayed as a black pointer in the first electronic device.

According to one embodiment, the pointer 6950 executed by the second electronic device may be displayed as a black pointer in the first electronic device and as a white pointer in the second electronic device. The pointer 6930 executed by the first electronic device may be displayed as a black pointer in the second electronic device.

According to various embodiments, the first electronic device or the second electronic device may, after executing the pointer, respond to the screen touch so that the first electronic device and the second electronic device may display a pointer at the corresponding location.

According to various embodiments, the first electronic device or the second electronic device may normally operate recording during the use of the pointer in the pointer mode. For example, a media footprint service may be provided and recorded including a pointer upon recording.

Figure 70:
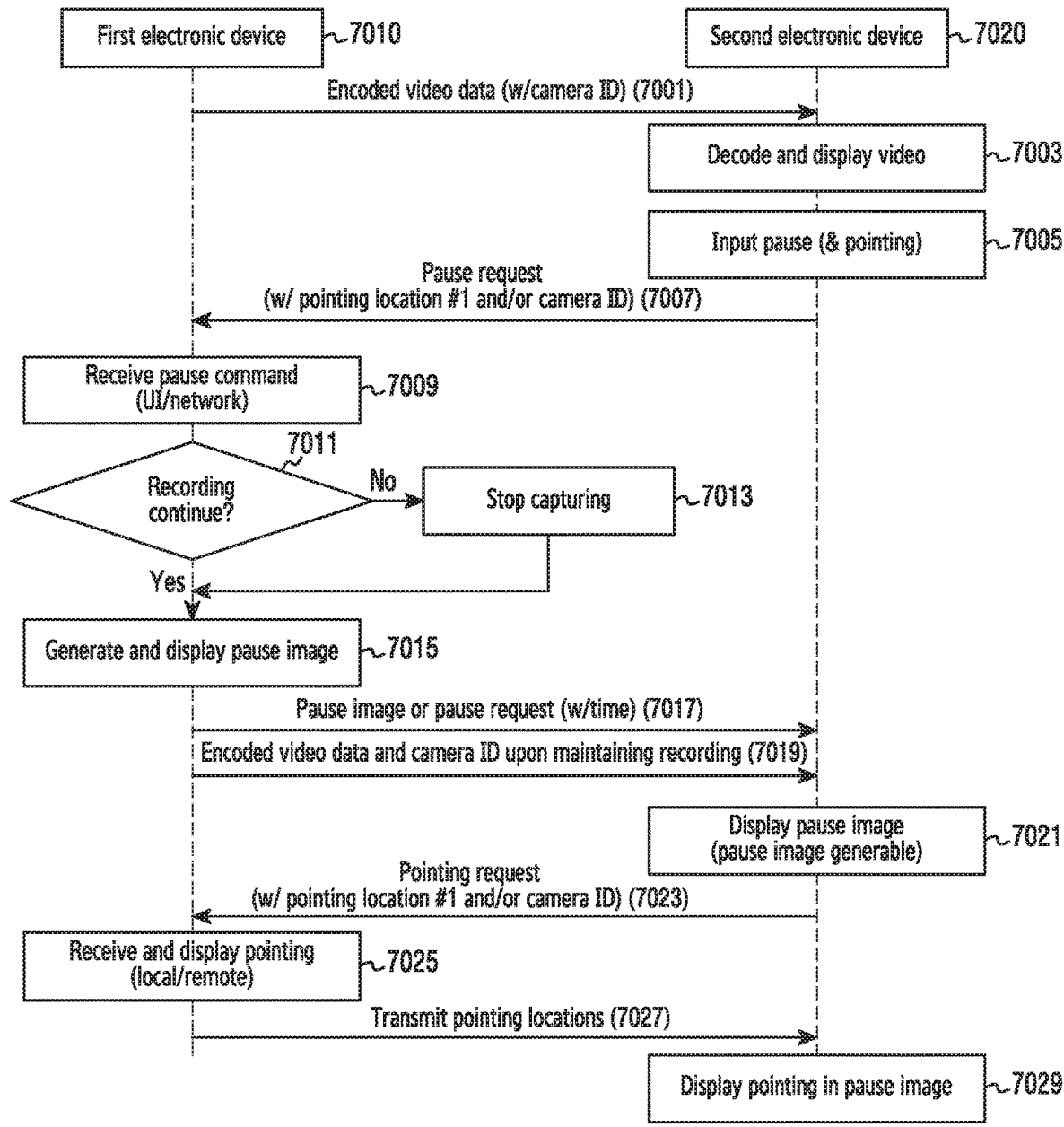
FIG. 70 is a diagram illustrating a method of performing a video service in electronic devices according to various embodiments of the present disclosure.

FIG. 70 is a diagram illustrating a method of performing a video service in electronic devices according to various embodiments of the present disclosure.

As shown in FIG. 70, an example of an operation in which an electronic device pauses a video and processes a point mode is illustrated. For example, FIG. 70 may show an example of an operation of processing a pause between electronic devices.

Referring to FIG. 70, in operation 7001, a first electronic device 7010 may transmit an encoded video to a second electronic device 7020. According to various embodiments, the first electronic device 7010 may provide information (e.g., camera ID) about the type of the camera, which is currently driven, to the second electronic device 7020 when transmitting the encoded video.

In operation 7003, the second electronic device 7020 may decode and display the encoded video received from the first electronic device 7010. In various embodiments, when a plurality of camera IDs are used in a video service, a plurality of video data corresponding to the respective camera IDs may be decoded, and at least one of the decoded video data may be displayed. In various embodiments, when displaying a plurality of videos, they may be displayed in PIP, PBP, overlap, or overlay scheme.

In operation 7005, the second electronic device 7020 may detect a user input for pausing a video. According to one embodiment, the second electronic device 7020 may determine, detecting a long press input by a user, that the long press input is a pause. According to one embodiment, the second electronic device 7020 may determine, when detecting a user input by a pointer button, that the user input is a pause. According to one embodiment, the second electronic device 7020 may determine, when a pressure greater than a predetermined strength is detected, that the pressure is a pause. According to various embodiments, the second electronic device 7020 may execute a pointer mode and display a pointer in response to the user input. According to various embodiments, a camera ID corresponding to a video to be paused by a user input (e.g., pointer button, touch, pressure, etc.) may be determined.

In operation 7007, the second electronic device 7020 may transmit a pause request of the video to the first electronic device 7010. According to various embodiments, the second electronic device 7020 may transmit, to the first electronic device 7010, a pause command including the position of the pointer of the second electronic device 7020 and/or the camera D.

In operation 7009, the first electronic device 7010 may receive the pause command from the second electronic device 7020. In various embodiments, the pause command may be used to control a client's UI, and may be transmitted to a media process management module through a network management module, and thereby may be used to control the camera, encoding, or transmission.

In operation 7011, the first electronic device 7010 may determine whether recording is continued.

When it is determined that the recording is not continued in operation 7011 (NO of operation 7011) (e.g., the end of the recording), the first electronic device 7010 may stop an operation of capturing a video, and may proceed to operation 7015.

When it is determined that the recording is continued in operation 7011 (YES of operation 7011), the first electronic device 7010 may generate and display a paused video, and then may continue to record a video on a display displayed in the first electronic device 7010 in operation 7015. For example, the video displayed on the display of the first electronic device 7010 may be continuously recorded in connection with the paused video and pointing control controlled by a user input in the first electronic device 7010 and the second electronic device 7020 based on the paused video, other than recording of a real-time video by the camera.

According to another embodiment, when it is determined that the recording is continued (YES of operation 7011), the first electronic device 7010 may generate and display a paused video and then may continuously record a moving image received through the camera in operation 7015.

In operation 7017, the first electronic device 7010 may transmit the paused video or a pause request (e.g., control signal) to the second electronic device 7020. According to various embodiments, when transmitting the pause request, the first electronic device 7010 may transmit time information. (e.g., time at which pause was performed or time at which paused video was generated) related to the pause to the second electronic device 7020.

In operation 7019, the first electronic device 7010 may transmit an encoded video and the camera ID to the second electronic device 7020 in real-time, when the recording is continued in operation 7011. According to various embodiments, when recording transmission is not maintained (e.g., upon termination of the recording or upon recording transmission stoppage request automatically or by a user interface), the first electronic device 7010 may not perform operation 7019.

In operation 7021, the second electronic device 7020 may display the paused video. According to one embodiment, the second electronic device 7020 may display the received paused video in response to the reception of the paused video from the first electronic device 7010. According to one embodiment, the second electronic device 7020 may generate and display the paused video. For example, the second electronic device 7020 may pause a video (e.g., decoding stoppage) in response to the reception of the pause request from the first electronic device 7010. According to one embodiment, the second electronic device 7020 may generate and provide a video (e.g., extracted frame image or still image) corresponding to time information in a moving image received from the first electronic device 7010, as the paused video.

In operation 7023, the second electronic device 7020 may selectively transmit a pointing request to the first electronic device 7010. According to various embodiments, the second electronic device 7020 may include the position of the pointer and/or the camera ID together with the pointing request and may transmit them to the first electronic device 7010.

In operation 7025, the first electronic device 7010 may operate to display the pointer in response to the reception of the pointing request from the second electronic device 7020. According to various embodiments, the first electronic device 7010 may operate to display the pointer on at least one of the first electronic device 7010 and the second electronic device 7020.

In operation 7027, the first electronic device 7010 may transmit position information about the position of the pointer displayed on the first electronic device 7010 to the second electronic device 7020.

In operation 7029, the second electronic device 7020 may display and provide the pointer on the paused video. According to various embodiments, the second electronic device 7020 may display the pointer at the position corresponding to the position information received from the first electronic device, in the paused video.

As described above, according to various embodiments, a pointer indicator (e.g., icon or the like) may be displayed on a video shared between electronic devices and may be provided to a user.

According to one embodiment, unique pointer indicators (e.g., a unique icon predetermined for each electronic device, an emoticon, etc.) may be separately provided for each user (or for each electronic device).

According to one embodiment, in a state in which the pointer indicator is displayed, a pointer indicator displayed in response to re-enter (e.g., touch or tap) at the same position as the position input to generate the pointer indicator may be removed. For example, when the pointer indicator selects the displayed position, the display of the pointer indicator may be removed. According to various embodiments, a dual camera view mode may be provided. According to one embodiment, the camera ID to pause a video may be designated (identified) to stop only the camera input. According to one embodiment, in the electronic device transmitting a video, videos from the respective cameras may be generated as a composite image according to the dual camera view mode and transmitted, or may be transmitted independently.

According to various embodiments, in the pause mode for pausing a video, a pointer mode or a zoom mode may be provided. According to one embodiment, in the pause mode, the pointer mode or the zoom mode may be distinguished by a user input (e.g., icon based or gesture based). According to one embodiment, when the pointer mode is executed in the pause mode, a pointer may be added to the paused video to display the paused video. According to one embodiment, when the zoom mode is executed in the pause mode, image processing and camera control operations may be performed.

According to various embodiments, information about a zoom region of the other party may be received and displayed in the zoom mode. According to one embodiment, ROI or zoom region-related information (e.g., position, range, selected object, etc.) designated by a counterpart electronic device or a user of the counterpart electronic device may be received, so that an indicator associated with the corresponding region may be displayed on the display based on the designated ROI or zoom region. According to one embodiment, during a zoom-in operation, video processing may be performed on the corresponding region of zoom-in, in consideration of recapture, quality improvement of a corresponding block, a bit rate, and the like. For example, when the corresponding ROI region is designated and the zoom-in operation is performed on the corresponding region, resolution change of the camera or auto-focus and auto exposure function may be performed based on an image pixel value of ROI or distance information between the ROI and the camera for the purpose of video processing of the image of the corresponding region, and thereby may obtain a higher quality video. For example, by controlling the image processor or network management module based on the ROI, image encoding and transmission quality (e.g., codec, bit rate, frame rate, drop rate, etc.) may be controlled.

According to various embodiments, electronic device and network control may be performed in the pause mode. According to one embodiment, when the camera operation is stopped, the camera may enter a standby mode, and then may enter another mode (e.g., camera power off mode) according to the elapse of a predetermined time. According to one embodiment, a network for the P2P connection may be operated to maintain a real-time streaming protocol (RTSP) session for transmitting and receiving voice or video data in real-time.

Figure 71:
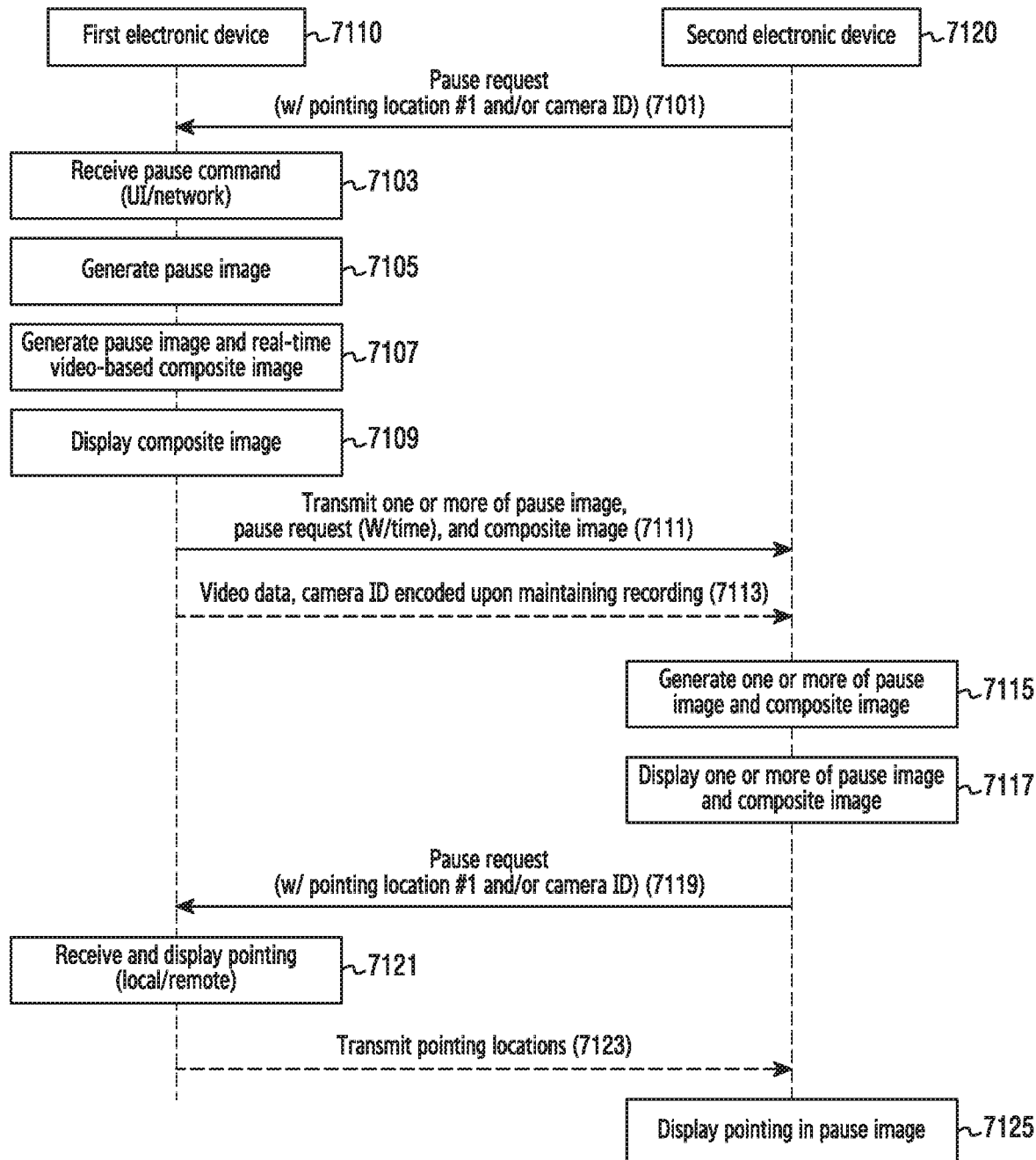
FIG. 71 is a diagram illustrating a method of performing a video service in electronic devices according to various embodiments of the present disclosure.

FIG. 71 is a diagram illustrating a method of performing a video service in electronic devices according to various embodiments of the present disclosure.

As shown in FIG. 71, an example of an operation of displaying a real-time video and a paused video simultaneously in an electronic device is illustrated. For example, FIG. 71 may show an example of an operation of processing pause and pointing between electronic devices.

Referring to FIG. 71, in operation 7101, the second electronic device 7120 may transmit a pause request to the first electronic device 7110. According to various embodiments, the second electronic device 7120 may transmit, to the first electronic device 7110, a pause command including the position of the pointer of the second electronic device 7120 and/or a camera ID together with a pause request.

In operation 7103, the first electronic device 7110 may receive the pause request from the second electronic device 7120.

In operation 7105, the first electronic device 7110 may generate a paused video.

In operation 7107, the first electronic device 7110 may generate a composite image based on the paused video and a real-time video.

In operation 7109, the first electronic device 7110 may display the composite image. For example, the first electronic device 7110 may display a video obtained by synthesizing the paused video and the real-time video, on a preview region.

Inc operation 7111, the first electronic device 7110 may transmit at least one of the paused video, the pause request, and the composite image to the second electronic device 7120. According to various embodiments, when transmitting the pause request, the first electronic device 7110 may transmit time information (e.g., time at which the pause was performed or time at which the paused video was generated) related to the pause to the electronic device 7120.

In operation 7113, when recording is maintained, the first electronic device 7110 may transmit an encoded video and the camera ID to the second electronic device 7120. According to various embodiments, when recording is not maintained (e.g., upon the end of recording), the first electronic device 7110 may not perform operation 7113.

In operation 7115, the second electronic device 7120 may generate at least one of the paused video and the composite image. For example, the second electronic device 7120 may pause the corresponding video (e.g., stop decoding or the like) in response to the reception of the pause request from the first electronic device 7110. According to one embodiment, the second electronic device 7120 may generate the paused video as a video corresponding to the time information received from the first electronic device 7110. According to one embodiment, the second electronic device 7120 may synthesize the generated paused video and real-time video to generate the composite image. According to various embodiments, when receiving at least one of the paused video and the composite image from the first electronic device 7110, the second electronic device 7120 may not perform operation 7115.

In operation 7117, the second electronic device 7120 may display at least one of the paused video and the composite image. According to one embodiment, the second electronic device 7120 may display the received paused video in response to the reception of the paused video from the first electronic device 7110. According to one embodiment, the second electronic device 7120 may display the received composite image in response to the reception of the composite mage from the first electronic device 7110.

In operation 7119, the second electronic device 7120 may selectively transmit a pointing request to the first electronic device 7110. According to various embodiments, the second electronic device 7120 may include the position of the pointer and/or the camera ID together with the pointing request, and may transmit them to the first electronic device 7110.

In operation 7121, the first electronic device 7110 may operate to display the pointer in response to the reception of the point request from the second electronic device 7210. According to various embodiments, the first electronic device 7110 may operate to display the pointer on at least one of the first electronic device 7110 and the second electronic device 7120.

In operation 7123, the first electronic device 7110 may transmit position information about the position of the pointer displayed on the first electronic device 7110, to the second electronic device 7120.

In operation 7125, the second electronic device 7120 may display and provide the pointer on the paused video. According to various embodiments, the second electronic device 7120 may display the pointer at the position corresponding to the position information of the pointer received from the first electronic device 7110, on the paused video.

As described above, according to various embodiments, the real-time video and the paused video may be simultaneously displayed to a user.

According to various embodiments, in the case of video previewing may be performed on a video to be recorded.

According to one embodiment, as the paused video, a preview video that is being photographed/recorded during a user operation may be displayed in the background, thereby enabling the real-time recording status to be inquired.

According to various embodiments, when performing a function such as pointing or zooming, a currently input view and a view of the paused video may be collated. According to one embodiment, a user may compare a previously viewed item with a currently viewed item, or compare an object pointed by the user with an object currently on the preview to determine the current position.

According various embodiments, an object at a pointing position on the paused video may be designated as an ROI, and image processing may be performed on the object on the preview currently displayed.

According to various embodiments, in a method of providing the paused video and the real-time video, the first electronic device transmitting a video may generate the composite image through a video encoder, and may transmit the generated image to the second electronic device receiving a video.

According to various embodiments, in a method of providing the paused video and the real-time video, the first electronic device and the second electronic device may receive only the paused command to generate the paused video, and may generate and display the composite image from the electronic devices.

According to various embodiments, in a method of providing the paused video and the real-time video, a video to be previewed and the paused video may be processed in different video layers, thereby providing the corresponding videos through independent processing in anniversary form using transparency. According to one embodiment, the corresponding videos may be processed in the form of video layer+paused image layer+control GUI layer.

According to various embodiments, an input applied to the paused video may be applied to the preview. According to one embodiment, when a face designated through selection in the paused video is displayed on a preview video, the displayed face may be automatically tracked or may be subjected to automatic blurring.

According to various embodiments, an augmented reality (AR) may be provided. According to one embodiment, 3D mapping such as matching using an indoor 3D map and the paused video may be provided.

Figure 72:
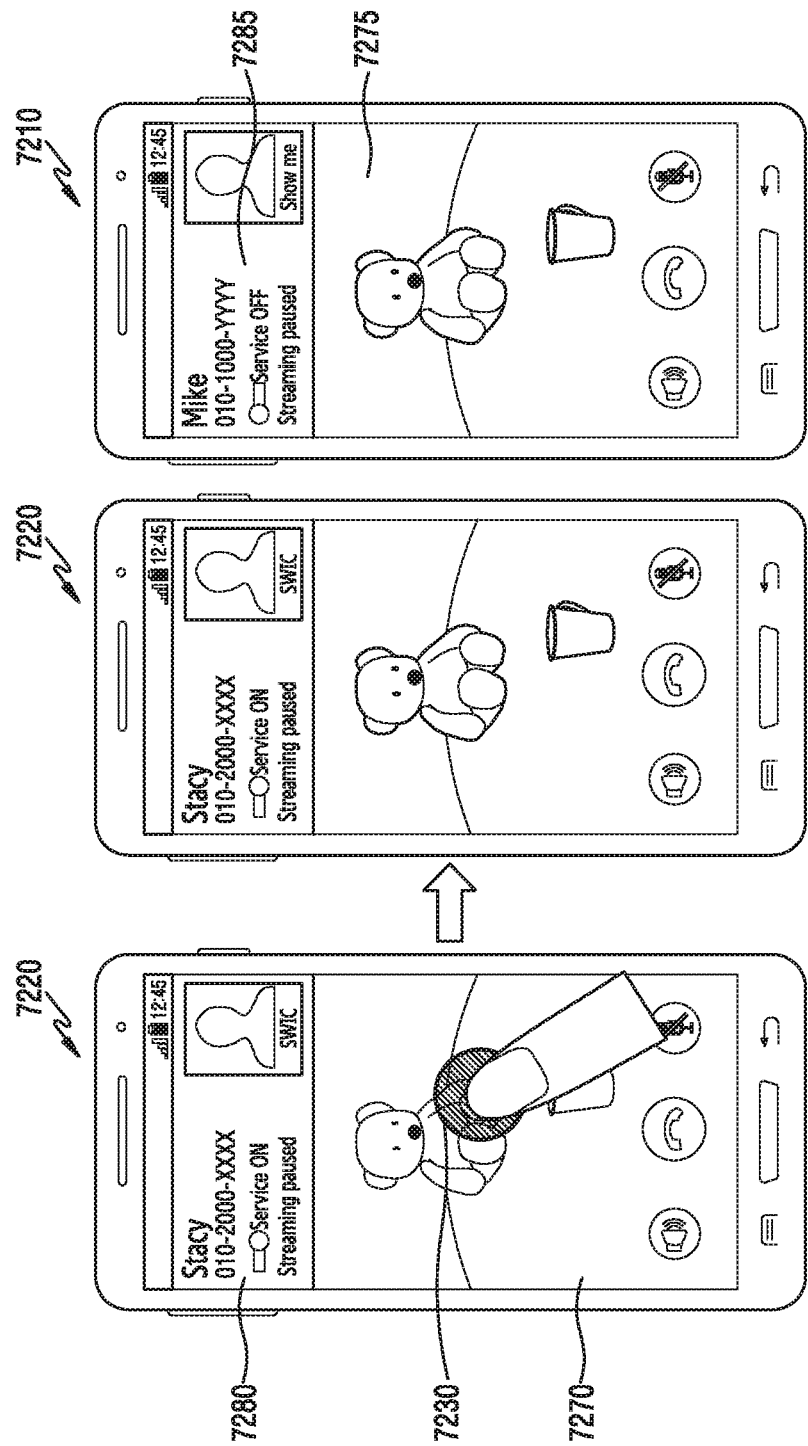
FIGS. 72 and 73 are diagrams illustrating an example of an operation of performing a video service in an electronic device according to various embodiments of the present disclosure.
Figure 73:
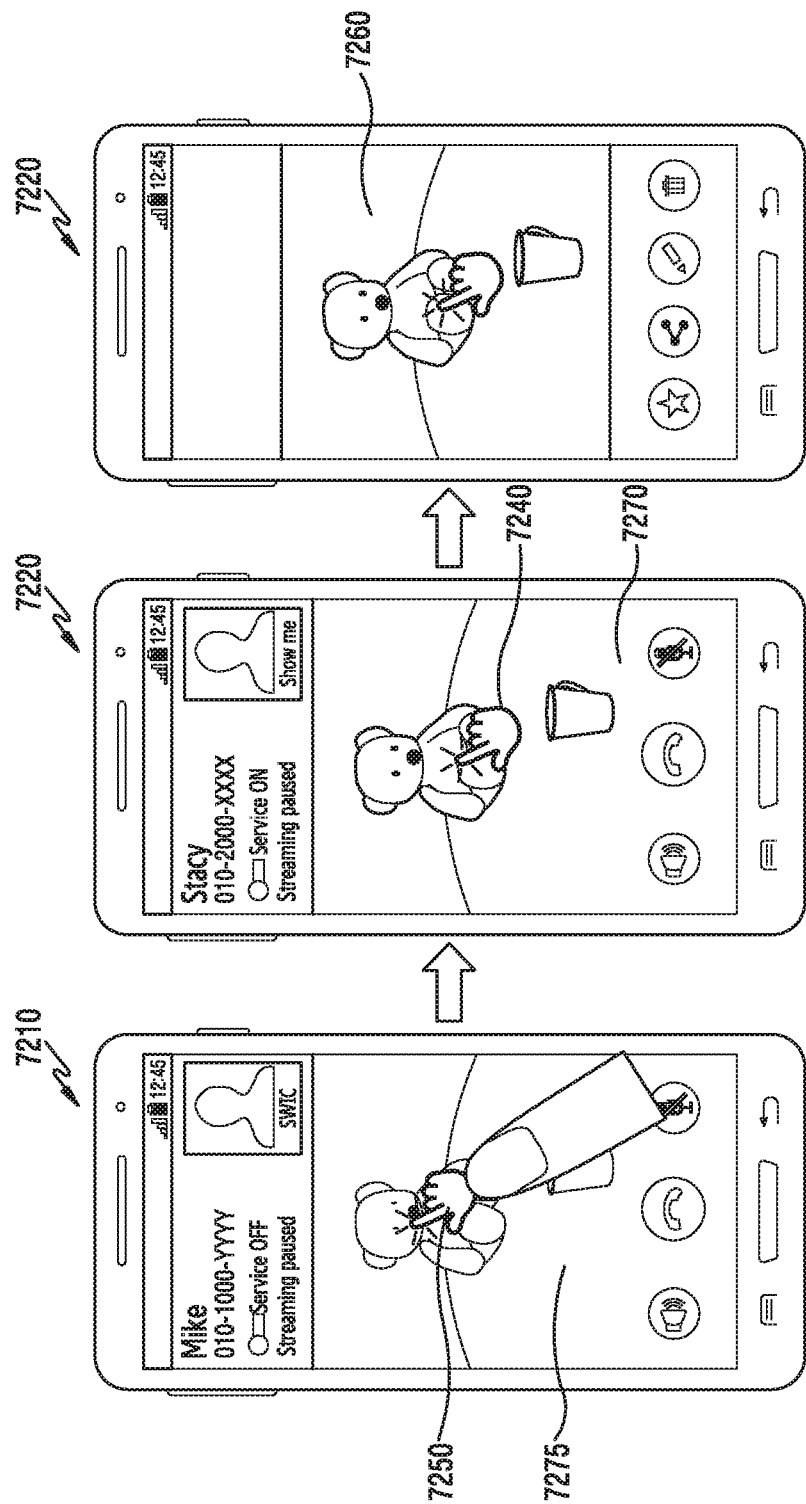

FIGS. 72 and 73 are diagrams illustrating an example of an operation of performing a video service in an electronic device according to various embodiments of the present disclosure.

As shown in FIGS. 72 and 73, examples of an operation performed in a pause mode and a pointer mode between electronic devices are illustrated. According to various embodiments, FIGS. 72 and 73 illustrate an example of a case in which the second electronic device 7220 executes the pause mode and the pointer mode in response to the pause mode based on a user input while the first electronic device 7210 transmitting a video transmits a video to the second electronic device 7220 receiving a video. According to various embodiments, the pause mode and the pointer mode in response to the pause mode may be executed even by the user of the first electronic device 7210.

Referring to FIG. 72, the second electronic device 7220 may detect a set user input 7230 (e.g., tap or touch) to enter the pause mode while receiving a video from the first electronic device 7210. According to one embodiment, a user may perform tap 7230 on a video stream of a first preview region 7270 for the purpose of pause. The second electronic device 7220 may request the first electronic device 7210 to pause the video stream in response to the user input. According to various embodiments, streaming may be stopped in both the first electronic device 7210 and the second electronic device 7220.

According to various embodiments, entering the pause mode may be performed even by at least one of gesture recognition, voice command recognition, and user situation recognition.

According to various embodiments, the first electronic device 7210 may process the display and transmission of the paused video and related information in response to the video pausing request of the second electronic device 7220. The first electronic device 7210 may display the paused video through the first preview region 7270, and may transmit the paused video to the second electronic device 7220. According to one embodiment, the first electronic device 7210 may transmit the pause request and the related time information to the second electronic device 7220. The second electronic device 7220 may display the paused video based on the paused video received from the first electronic device 7210 or the related time information.

The first electronic device 7210 may indicate that it is in the pause status through a second preview region 7285. For example, the first electronic device 7120 may display information such as "streaming paused" on the second preview region 7285 and may provide the displayed information to the user.

The second electronic device 7220 may display the paused video through the first preview region 7270 in response to the reception of the paused video from the first electronic device 7210. According to one embodiment, when receiving the pause request from the first electronic device 7210, the second electronic device 7220 may generate a paused video which is the same as or similar to the paused video of the first electronic device 7210 based on the received time information, as the video stored in the second electronic device 7220, and may display the generated paused video through the first preview region 7270.

The second electronic device 7220 may indicate that it is in the pause status through the second preview region 7280 while displaying the paused video on the first preview region 7270. For example, the second electronic device 7220 may display the information such as "streaming paused" on the second preview region 7280 and may provide the same to the user.

According to various embodiments, the user of the first electronic device 7210 may resume streaming through the user input on the first preview region 7270 in a state in which the streaming is paused. According to various embodiments, the resume of the streaming may be performed even by the user of the second electronic device 7220. The first electronic device 7210 may resume the display of the streaming video (e.g., moving image) and video transmission in response to the user input or the input of the second electronic device 7220.

Referring to FIG. 73, the first electronic device 7210 may detect a set user input (e.g., long press input {or long press gesture}) to enter the pointer mode or a pointer mode entry request from the second electronic device 7220, in the pause mode. According to one embodiment, the user of the second electronic device 7220 may perform a long press input on the paused video of the first preview region 7270 to enter the pointer mode. The second electronic device 7220 may request the first electronic device 7210 to enter the pointer mode in response to the user input. The first electronic device 7210 may enter the pointer mode to display the pointer 7250 on any one region of the first preview region 7275 in response to the user input or the request of the second electronic device 7220, and may transmit pointer-related information to the second electronic device 7220. The second electronic device 7220 may display the pointer 7240 on any one region of the first preview region 7270 based on the pointer-related information received from the first electronic device 7210.

According to various embodiments, the pointer may be displayed in both the first electronic device 7210 and the second electronic device 7220. For example, the second electronic device 7220 may display the pointer 7240 at the position of the first preview region 7270 corresponding to the position where the pointer 7250 is displayed in the first preview region 7275 of the first electronic device 7210.

According to one embodiment, the pointers 7240 and 7250 may be displayed at the position corresponding to the user input. For example, according to one embodiment, the pointers 7240 and 7250 may be displayed on a user designation region (e.g., a specific object on the paused video). According to one embodiment, the pointers 7240 and 7250 may be displayed at a position (e.g., upper end position of the user input position) adjacent to the position corresponding to the user input, or may be displayed on an arbitrary region of the first preview regions 7270 and 7275.

According to various embodiments, the pointer mode entry may be performed by at least one of the first electronic device 7210 and the second electronic device 7220 and pointers may be generated in the first electronic device 7210 and the second electronic device 7220, and thereby a plurality of pointers may be displayed on the preview regions 7270 and 7275 and may be provided. According to various embodiments, when the plurality of pointers are displayed, the plurality of pointers may be classified and displayed in different shapes or different colors for each subject according to a subject (e.g., the first electronic device 7210 and the second electronic device 7220) generating the corresponding pointer. According to various embodiments, as to the plurality of pointers, the pointer of each electronic device itself and the pointer of the other party may be classified in different shapes or in different colors in each electronic device and may be displayed.

According to various embodiments, in the pointer mode, the set user input (e.g., menu, gesture, voice command, tap, or touch) storing a video may be detected by at least one of the first electronic device 7120 and the second electronic device 7220. According to one embodiment, the corresponding user may perform tap on the pointer (e.g., 7240 or 7250) of the preview region to store a currently displayed video. For example, the user may perform video storage in a state in which a pointer is designated to a specific object in the paused video. According to another embodiment, the user may store the video by the user input based on a menu or gesture for storing the video.

According to various embodiments, the first electronic device 7210 and the second electronic device 7220 may capture (e.g., screen shot) and store the screen displayed on the review region in response to the user input. According to various embodiments, the captured video may be a video that includes the paused video and the pointer, and may be stored commonly in the first electronic device 7210 and the second electronic device 7220, respectively.

According to various embodiments, the first electronic device 7210 and/or the second electronic device 7220 may store videos and may display and provide the capture video 7260 automatically or based on the user input.

According to various embodiments, the first electronic device 7210 and/or the second electronic device 7220 may store the captured video, may display importance (e.g., select a star icon) to be seen on the stored image list screen, may share the displayed information (utilizing DLNA, AllShare, and BT icons), and may edit (e.g., pencil icon) the shared information or delete (e.g., trash icon) the same.

Figure 74:
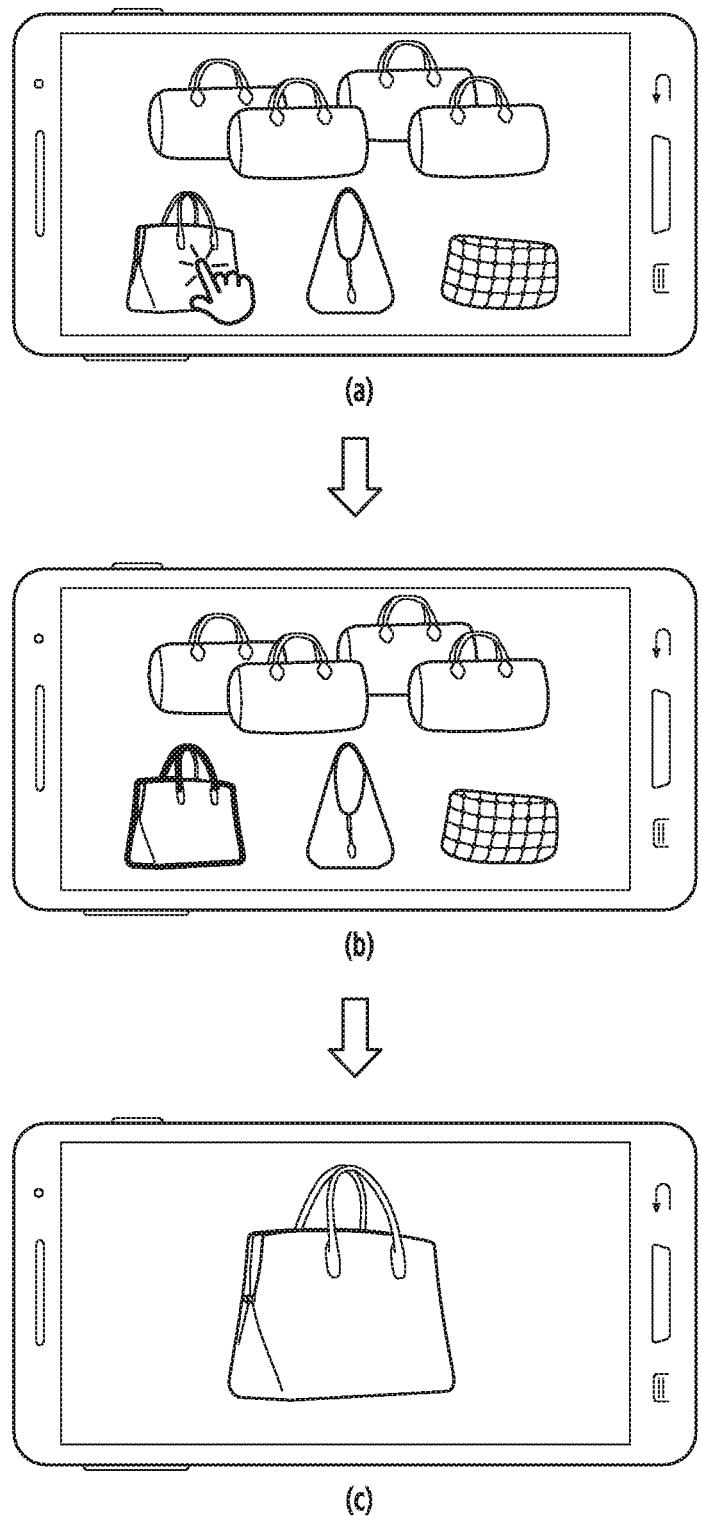
FIGS. 74 and 75 are diagrams illustrating an example of an operation of performing a video service in an electronic device according to various embodiments of the present disclosure.
Figure 75:
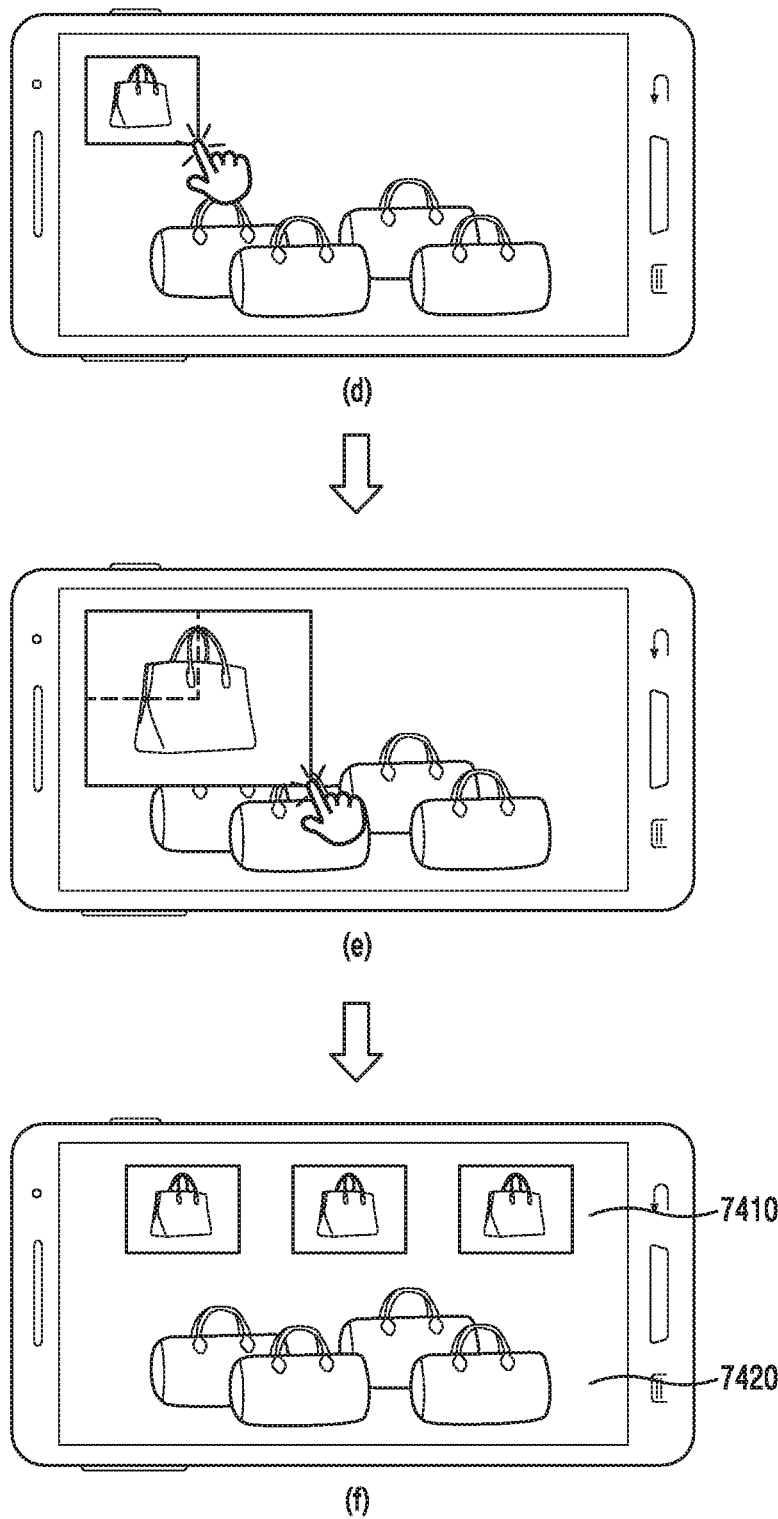

FIGS. 74 and 75 are diagrams illustrating an example of an operation of performing a video service in an electronic device according to various embodiments of the present disclosure.

Referring to FIGS. 74 and 75, an example of an operation for performing pointing & capturing in an electronic device is illustrated. According to various embodiments, a pointing function may be performed on a user input (e.g., a long press input) in a real-time video or a paused video.

As shown in (A) of FIG. 74, a user may designate an object position by a user input (e.g., TSP touch) in the real-time video or the paused video. Alternatively, the electronic device may analyze a fingertip image from a photographed image and may compare the analyzed image with the paused video to designate the object position corresponding to the fingertip, so that the fingertip in front of the camera receiving a video of the electronic device can be recognized. For example, the electronic device may receive a video including a bag using a rear camera, and the user may designate a bag image by placing the fingertip between the rear camera and the bag.

As shown in (B) of FIG. 74, the electronic device may extract an image object region of a position where a user input occurs, in response to the execution of the pointing function. For example, the electronic device may extract an object region corresponding to the object position designated by the user. According to one embodiment, the electronic device may extract an edge, a depth-based object, or a color-based region through a media processor to thereby extract the image object region from the paused video.

As shown in (C) of FIG. 74, the electronic device may store a video and/or a still image based on the extracted image object region. According to various embodiments, the electronic device may store the video and/or the image together with tag information of the extracted image object region. According to various embodiments, when a zooming function is performed (e.g., zoom-in), a raw image/frame may be used. According to one embodiment, the electronic device may control a camera, an encoder, a size controller (e.g., resizer), an image process module, a network, and the like to perform video processing.

According to various embodiments, the image object region may be set as an PCI based on the pointing position, and an operation for video quality improvement may be performed. For example, exposure, definition, or focus may be adjusted. According to one embodiment, the image object region may be captured through optical or digital zooming. According to one embodiment, the image object region may be stored based on a maximum resolution image using a camera sensor.

As shown in (D) of FIG. 75, the electronic device may display an image or a video (hereinafter, referred to as snapshot video) associated with the stored image object region on a portion of the display. In various embodiments, the image object region may be displayed in an overlay, POP, or PIP scheme, independently of the video (hereinafter, referred to as a real video) displayed on the display.

As shown in (E) of FIG. 75, the electronic device may enlarge, reduce, or move the displayed snapshot video by a user input. According to various embodiments, a user may compare are object (e.g., object) using the snapshot video, through a pointing & capturing function.

As shown in (F) of FIG. 75, the electronic device may sequentially display and provide a plurality of snapshot videos on the display, in response to the repeated performance of the pointing & capturing, function. For example, the electronic device may separately display a thumbnail region 7410 and a real region 7420, may display the corresponding information on the thumbnail region 7410 on the basis of the order (or reverse order of storing the image object regions which are previously set as ROIs to be stored, and may display a real video on the real region 7420.

According to various embodiments, when the corresponding operation may be performed by the second electronic device receiving a video, the second electronic device may transmit the pointing position or ROI information to the first electronic device transmitting a video, as a control signal, and the first electronic device may perform the same function corresponding to the above by the control of the media processor.

Figure 76:
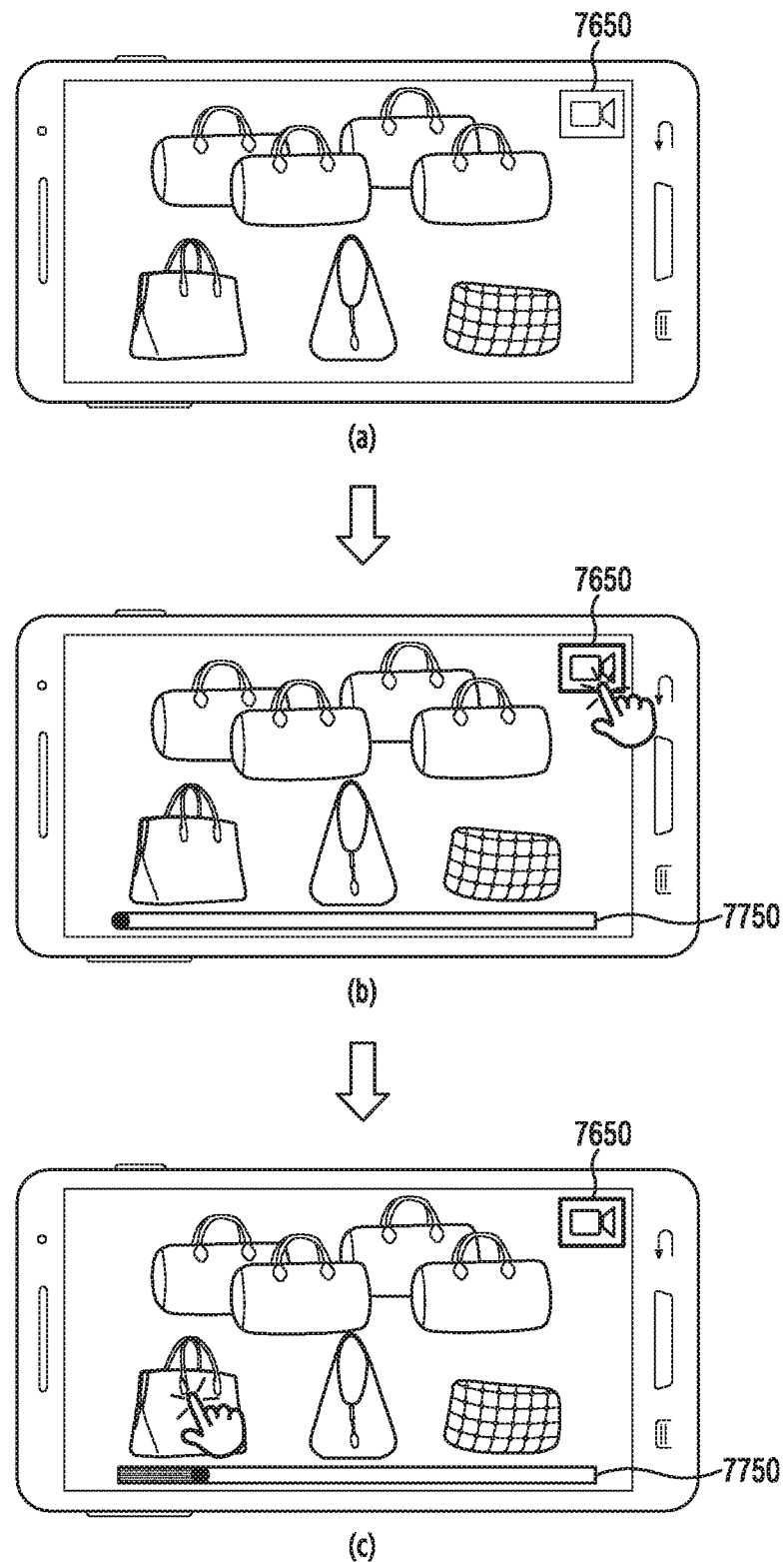
FIGS. 76 and 77 are diagrams illustrating an example of an operation of performing a video service in an electronic device according, to various embodiments of the present disclosure.
Figure 77:
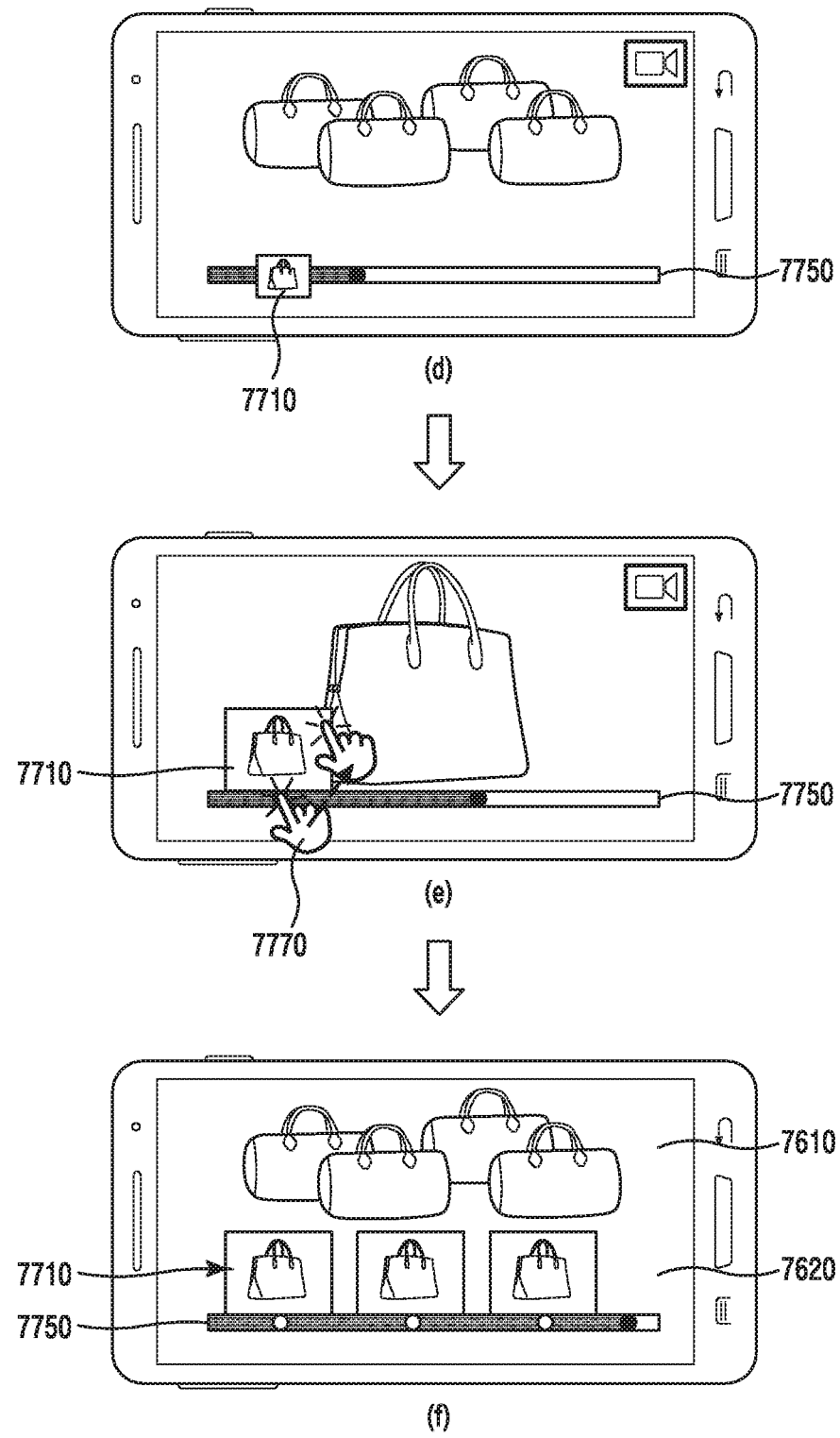

FIGS. 76 and 77 are diagrams illustrating an example of an operation of performing a video service in an electronic device according to various embodiments of the present disclosure.

Referring to FIGS. 76 and 77, an example of an operation of performing recording & pointing in an electronic device is illustrated. According to various embodiments, the recording & pointing may indicate a function of capturing, when a real-time video is recorded, the recorded real-time video when the pointing function is driven, and displaying an indicator of the captured video in a progress bar of the recorded video to thereby index the recorded position. According to various embodiments, for the recording & pointing, the electronic device may display a video recording button 7650 through a user interface and may provide the displayed information to a user.

According to various embodiments, when the user of the electronic device originating a video and the user of the electronic device receiving a video wish to record a video during the video service and desires a pausing & pointing function, the region pointed by the corresponding user may be captured or reproduced to be provided.

As shown in (A) of FIG. 76, the user may record video data or audio data transmitted and received in real-time through the video recording button 7650.

As shown in (B) of FIG. 76, when detecting an input by the video recording button 7650, the electronic device may display the progress, bar 7750 on one region of the user interface to provide the displayed information to the user.

According to various embodiments, when performing recording, the electronic device may notify a user that the electronic device is in a recording state through the video recording button 7650. For example, the recording state may be displayed by changing and displaying the color of the video recording button 7650 or by changing the type of the recording button 7650.

According to various embodiments, a maximum recordable time may also be displayed through the progress bar 7750. In various embodiments, the maximum recordable time may be a time designated in advance through setting, or may be automatically provided by calculating a time based on the remain amount of a memory or a battery.

According to various embodiments, a recording time accumulated to the present as recording is performed may be displayed in the progress bar 7750, as an indicator (e.g., slider or the like).

As shown in (C) of FIG. 76, during the progress of recording, a user may designate the position of a specific object of a video through a user input (e.g., touch), or may designate the position of the specific object through a finger gesture (e.g., fingertip) in front of the camera. According to one embodiment, the electronic device may analyze the finger gesture and may designate the position of the object in the video.

According to various embodiments, when pointing on a specific position occurs or ROI setting occurs during the progress of recording, the electronic device may extract the image object region associated with the corresponding pointing or ROI.

According to various embodiments, the electronic device may store the extracted image object region as a video and/or a still image. According to various embodiments, the electronic device may store the video and/or the still image together with tag information of the extracted image object region. According to various embodiments, when a zooming function is performed (e.g., zoom-in), a raw image/frame may be used. According to one embodiment, the electronic device may control the camera, the encoder, the size controller (e.g., resizer), the image process module, the network, and the like to perform video processing.

According to various embodiments, the image object region may be set as an ROI based on the pointing position, and an operation for video quality improvement may be performed. For example, exposure, definition, or focus may be adjusted. To this end, the electronic device may set the ROI by calculating proximity between a depth-based object and the camera. For example, even when an object is partially overlapped and displayed on the display, the region of a desired object among the overlapping objects may be determined based on a distance. According to one embodiment, the image object region may be captured or recorded via optical or digital zooming.

As shown in (D) of FIG. 77, the electronic device may display and provide an image or video 7710 associated with the stored image object region on a portion of the progress bar 7750 in an overlay manner. According to one embodiment, the electronic device may display the image or video 7710 in PBP, PIP, thumbnail, or the like.

As shown in (E) of FIG. 77, the electronic device may display the image or video 7710 in the progress bar 7750 in the form of an indicator/marker 7770 (e.g., a hand shape, arrow, etc.) using symbols or graphics, and may provide the image or video 7710 so as to be enlarged or inquired by a user input. According to one embodiment, the user may move the marker 7770 displayed on the progress bar 7750, may inquire (enlarge or reduce) an image captured through the selection of the thumbnail 7710, or may reproduce and display the corresponding portion. According to various embodiments, the user may use the recording & pointing for comparison of objects, and the like.

As shown in (E) of FIG. 77, the electronic device may sequentially display and provide the related image or video 7710 in various regions of the process bar 7750, in response to the repeated performed of the recording & pointing function. For example, the electronic device may separately display the real region 7610 and the progress bar region 7620, a real video may be displayed on the real region 7610, and a plurality of related image or videos may be sequentially displayed through the progress bar 7750 of the progress bar region 7620.

According to various embodiments, a user may easily retrieve and inquire an object of a position in which an object of interesting is recorded, and may enable detailed inquiry by enlarging the stored related image or video (e.g., captured image).

According to various embodiments, when the corresponding operation is performed by the second electronic device receiving a video, the second electronic device may transmit the corresponding pointing position or ROI information to the first electronic device transmitting a video, as a control signal, and the first electronic device may perform the same function corresponding to the above description by the control of the media processor.

As described above, the electronic device 500 according to various embodiments may include a process of performing a voice call with an electronic device based on a first electronic device, a process of detecting a user input for performing a video call with the other electronic device during performing the video call with the other electronic device, a process of connecting the video call based on a second network in response to the user input and displaying a user interface associated with the video call on the display, and a process of displaying a video acquired using a camera through the user interface and transmitting the displayed video to the other electronic device through the second network.

According to various embodiments, the first network and the second network may include the same network or different networks. According to various embodiments, upon the service connection, voice and video may use different networks or the same network. According to one embodiment, when a voice uses packet switching of the cellular communication protocols, the voice may be transmitted using the packet switching of the video or cellular communication protocol. According to another embodiment, when voice and video are switched to use the same communication, the connection of the communication used for the voice may be terminated. Alternatively, only minimum connection of the communication may be maintained and thereafter, the communication used for the voice may be used again for the voice call at the time of video termination (e.g., service connection termination). According to another embodiment, the first network in which only the minimum connection is maintained may automatically support the voice call after the end of video communication.

According to various embodiments, the user input may include a pose status change of the electronic device, a proximity status change, a gesture input, situation recognition, or a voice command input.

According to various embodiments, the user input may include a status change signal received from the other electronic device through the second network.

According to various embodiments, a process of detecting the user input may include a process of monitoring the user input and switching the call mode to correspond to a change in the user input.

According to various embodiments, the switching process may include a process of switching the call mode, connecting the video call to the other electronic device according to the switching of the call mode, or requesting a video call connection termination.

According to various embodiments, the video call connection may include a process of performing a transition to the video call mode according to the user input in a state in which maintaining the voice call with the other electronic device by the voice call mode, and a process of processing the video call according to the video call mode in a state of maintaining the voice call.

According to various embodiments, the process of displaying the user interface may include a process of detecting the transition to the video call mode of the electronic device and a process of displaying information about the call mode of the other electronic device through the user interface displayed on the display.

According to various embodiments, the process of displaying the user interface may include a process of displaying at least one object associated with additional function execution on the user interface in the video call mode.

According to various embodiments, the process of detecting the user input associated with function execution on the object or the user interface may include a process of processing at least one of camera switching, video pausing, pointing, zooming, capturing, and recording in response to the user input.

According to various embodiments, the process of processing the pointing may include a process of pausing the video according to a first input in the video call mode and a process of displaying the pointer on the paused video according to a second input.

According to various embodiments, the first input and the second input may include an input by at least one of the electronic device and the other electronic device.

According to various embodiments, the electronic device 500 may include a process of resuming the paused video in response to a third input in a state in which the video is paused.

According to various embodiments, the process of displaying the user interface may include a process of displaying an indication on availability of the video call with the other electronic device through the user interface.

According to various embodiments, the process of displaying the indication may include a process of monitoring the availability the video call with the other electronic device and a process of changing and displaying the indication according to the availability of the video call with the other electronic device.

According to various embodiments, the availability of the video call may include a process of determining the availability of the video call with the other electronic device during the voice call.

According to various embodiments, when the transition to the video call mode is determined, the electronic device may include a process of determining the availability of the video call based on capabilities or status information of the electronic device and the other electronic device, before transmitting the video to the other electronic device.

According to various embodiments, the electronic device may include a process of displaying the indication to be activated when the video call is available based on the determination result, and a process of displaying the indication to be deactivated when the video call is unavailable.

According to various embodiments, the electronic device may include a process of switching a power mode of the camera to a camera driving mode or a camera standby mode upon video call mode switching.

According to various embodiments, when detecting a user input during the voice call with the electronic device, the other electronic device may include a process of performing a transition to the video call mode and receiving and displaying the video transmitted from the electronic device through the second network.

According to various embodiments, when the video call mode is requested by the electronic device, the other electronic device may include a process of automatically accepting video reception and automatically receiving the video transmitted from the electronic device.

Figure 78:
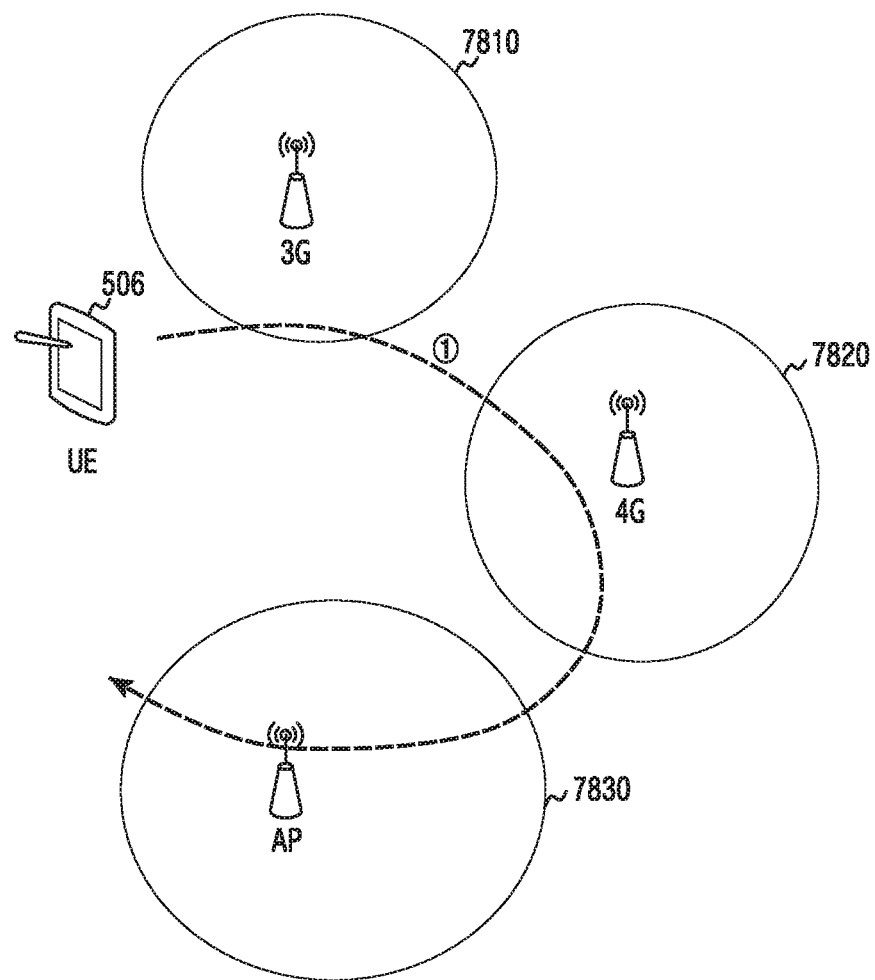
FIG. 78 is a diagram illustrating an example of an operation of performing a video service in an electronic device according to various embodiments of the present disclosure.

FIG. 78 is a diagram illustrating an example of an operation of performing a video service in an electronic device according to various embodiments of the present disclosure.

As shown in FIG. 78, an example of an operational scenario according to a network change is illustrated.

Referring to FIG. 78, the electronic device 500 may have mobility. As the electronic device 500 has mobility, a network used by the electronic device 500 may be changed. According to one embodiment, the electronic device 500 is connected to a 4G network 7820 (e.g., LTE, etc.), and then moves to (enters) the coverage of a 3G network 7810 (e.g., WCDMA, HSPA, etc.) out of the coverage of the 4G network 7820 to thereby be connected to the 3G network 7810. According to one embodiment, the electronic device 500 is connected to the 4G network 7820 (e.g., LTE, etc.), and then moves to (enters) the coverage of the 3G network 7810 (e.g., WCDMA, HSPA, etc.) out of the coverage of the 4G network 7820 to thereby be connected to the 3G network 7810. According to one embodiment, the electronic device 500 is connected to the 4G network 7820 (e.g., LIE, etc.), and then moves to (enters) the coverage of a Wi-Fi network 7830 out of the coverage of the 4G network 7820 to thereby be connected to the Wi-Fi network 7830.

According to one embodiment, the connection between the electronic device 500 and the network may take a certain times. For example, in the case of Wi-Fi, when no scanning is performed, processing such as scanning, authentication, association (L2 layer connection), DHCP (L3 layer connection), and the like may be sequentially performed, and it may take 2 to 3 seconds. As another example, in a similar manner even in the case of LTE, it may take 2 to 5 seconds depending on the network environment.

According to various embodiments, a connection network may be changed according to the movement of the electronic device 500, and communication pipe quality (e.g., bandwidth, delay characteristics, etc.) provided to a video communication application may be changed according to the characteristics of the connection network.

According to various embodiments, a network-related module (e.g., network component) of the electronic device 500 may inform the video call application of the above-described change. The video call application may inform the user of the change of the network. For example, the video call application may provide a change in the network to the user based on message provision, icon provision, image provision, and the like.

According to various embodiments, the electronic device 500 may need to perform a call session connection again as the connection network is changed. For example, the electronic device 500 may be disconnected from the network. In this case, the video call application may reconnect only the call session while maintaining the display of the user interface. According to one embodiment, the electronic device 500 may repeatedly reproduce videos of the last few seconds before disconnecting from the network, and provide the reproduced videos to a user. According to another embodiment, the electronic device 500 may display and provide a captured video (or a still image) to a user before disconnecting from the network.

According to various embodiments, the network-related module (e.g., network component) of the electronic device 500 may prepare the connection of another network in advance when the strength of a network signal falls below a specific value according to the movement of the electronic device 500. According to one embodiment, the electronic device 500 may perform Wi-Fi scanning in advance or establish a connection in advance when the strength of an LTE signal is weakened. According to another embodiment, the electronic device 500 may perform LTE scanning in advance or establish a connection in advance when the Wi-Fi signal is weakened.

According to various embodiments, when the electronic device 500 is connected to another network, the network-related module may inform the video call application that it is connected to another network. The video call application may transmit and receive video call data through a new connection.

The embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

The invention claimed is:

1. An electronic device comprising:
   a camera;
   a display;
   at least one sensor;
   a communication unit configured to establish wireless communication with another electronic device using at least one protocol; and
   a processor configured to be functionally connected to the camera, the display, the at least one sensor, and the communication unit,
   wherein the processor is configured to:
   perform a call with the other electronic device,
   detect a state change of the electronic device based on sensing information sensed by the at least one sensor while the call is maintained,
   determine whether the state change of the electronic device corresponds to a user gesture for switching a call mode, and
   in response to determining that the state change of the electronic device corresponds to the user gesture for switching the call mode, switch the call mode,
   wherein switching the call mode comprises switching the call mode from a voice call mode to a video call mode, and from a video call mode to a voice call mode, and
   in response to detecting switching of the call mode from the voice call mode to the video call mode, display information about a call mode of the other electronic device through a user interface displayed on the display.

2. The electronic device as claimed in claim 1, wherein the processor is further configured to:
   detect a change in a contact area between the electronic device and another object, based on the sensing information, and
   if an amount of the change in the contact area is greater than a certain threshold, determine that the state change corresponds to the user gesture for switching the call mode.

3. The electronic device as claimed in claim 1, wherein the processor is further configured to:
   detect a change in a distance between the electronic device and another adjacent object, based on the sensing information, and
   if an amount of the change in the distance is greater than a certain threshold, determine that the state change corresponds to the user gesture for switching the call mode.

4. The electronic device as claimed in claim 1, wherein the processor is further configured to:
   detect a force feedback change detected by a force sensor of the electronic device, based on the sensing information, and
   if an amount of the force feedback change is greater than a certain threshold, determine that the state change corresponds to the user gesture for switching the call mode.

5. The electronic device as claimed in claim 1, wherein the processor is further configured to:
   detect a magnitude of a bio-signal detected by a bio-signal sensor of the electronic device, based on the sensing information, and
   determine that the state change corresponds to the user gesture for switching the call mode, according to whether the detected magnitude of the bio-signal is greater than a certain threshold.

6. The electronic device as claimed in claim 1, wherein the processor is further configured to:
   request a video call connection to the other electronic device or request to end the video call connection, in response to switching the call mode.

7. The electronic device as claimed in claim 6, wherein the processor is further configured to:
   before or after requesting the video call connection to the other electronic device, check at least one of an installation state of a related application of the other electronic device, an installation state of a related module of the other electronic device, and a call service state of the other electronic device, in order to check an availability of a video communication connection.

8. The electronic device as claimed in claim 1, wherein the processor is further configured to:
   detect a user input associated with function execution on the user interface, and
   process at least one of camera switching, video pausing, pointing, zooming, capturing, and recording in response to the user input.

9. The electronic device as claimed in claim 8, wherein the processor is further configured to:
   pause a video according to a first user input and display a pointer on the paused video according to a second user input.

10. An operating method of an electronic device comprising:
    performing a call with another electronic device;
    detecting a state change of the electronic device based on sensing information sensed by the at least one sensor while the call is maintained;
    determining whether the state change of the electronic device corresponds to a user gesture for switching a call mode; and
    in response to determining that the state change of the electronic device corresponds to the user gesture for switching the call mode, switching the call mode,
    wherein switching the call mode comprises switching the call mode from a voice call mode to a video call mode, and from a video call mode to a voice call mode, and
    in response to detecting switching of the call mode from the voice call mode to the video call mode, display information about a call mode of the other electronic device through a user interface displayed on the display.

11. The operating method of the electronic device as claimed in claim 10, further comprising:

detecting a change in a contact area between the electronic device and another object, based on the sensing information, and if an amount of the change in the contact area is greater than a certain threshold, determining that the state change corresponds to the user gesture for switching the call mode.

12. The operating method of the electronic device as claimed in claim 10, further comprising:

detecting a change in a distance between the electronic device and another adjacent object, based on the sensing information, and if an amount of the change in the distance is greater than a certain threshold, determining that the state change corresponds to the user gesture for switching the call mode.

13. The operating method of the electronic device as claimed in claim 10, further comprising:

detecting a force feedback change detected by a force sensor of the electronic device, based on the sensing information, and if an amount of the force feedback change is greater than a certain threshold, determining that the state change corresponds to the user gesture for switching the call mode.

14. The operating method of the electronic device as claimed in claim 10, further comprising:

detecting magnitude of a bio-signal detected by a bio-signal sensor of the electronic device, based on the sensing information, and determining that the state change corresponds to the user gesture for switching the call mode, according to whether the detected magnitude of the bio-signal is greater than a certain threshold.

15. The operating method of the electronic device as claimed in claim 10, wherein switching the call mode comprises requesting a video call connection to the other electronic device or requesting to end the video call connection.

16. The operating method of the electronic device as claimed in claim 15, further comprising:

before or after requesting the video call connection to the other electronic device, checking at least one of an installation state of a related application of the other electronic device, an installation state of a related module of the other electronic device, and a call service state of the other electronic device, in order to check an availability of a video communication connection.

17. The operating method of the electronic device as claimed in claim 10, further comprising:

detecting a user input associated with function execution on the user interface, and processing at least one of camera switching, video pausing, pointing, zooming, capturing, and recording in response to the user input.

18. The operating method of the electronic device as claimed in claim 17, further comprising:

pausing a video according to a first user input and displaying a pointer on the paused video according to a second user input.

* * * * *